US007764162B2

(12) United States Patent
Cash et al.

(10) Patent No.: US 7,764,162 B2
(45) Date of Patent: Jul. 27, 2010

(54) HANDHELD PROGRAMMER FOR LIGHTING CONTROL SYSTEM

(75) Inventors: Audwin W. Cash, Bethlehem, PA (US); Rishi Raj Kumar, Bethlehem, PA (US); Christopher J. Rigatti, Philadelphia, PA (US); Dragan Veskovic, Allentown, PA (US); John C. Hewson, Philadelphia, PA (US)

(73) Assignee: Lutron Electronics Co., Inc., Coopersburg, PA (US)

(*) Notice: Subject to any disclaimer, the term of this patent is extended or adjusted under 35 U.S.C. 154(b) by 370 days.

(21) Appl. No.: 11/948,408

(22) Filed: Nov. 30, 2007

(65) Prior Publication Data

US 2008/0084270 A1 Apr. 10, 2008

Related U.S. Application Data

(62) Division of application No. 11/375,462, filed on Mar. 13, 2006, now Pat. No. 7,391,297.

(60) Provisional application No. 60/661,055, filed on Mar. 12, 2005.

(51) Int. Cl.
*G05B 23/02* (2006.01)

(52) U.S. Cl. .................... 340/3.5; 340/825.52; 315/318

(58) Field of Classification Search ......... 315/291–295, 315/307, 308, 312, 317, 318; 340/3.5, 3.32, 340/310.11, 825.21, 825.52, 825.72
See application file for complete search history.

(56) References Cited

U.S. PATENT DOCUMENTS 3,742,450 A 6/1973 Weller ........................ 375/257
4,277,726 A 7/1981 Burke
4,701,938 A 10/1987 Bell ........................... 375/257
5,463,286 A 10/1995 D'Aleo et al.
5,506,715 A 4/1996 Zhu (Continued)

FOREIGN PATENT DOCUMENTS

DE 19622295 11/1997

(Continued)

OTHER PUBLICATIONS

Lutron Electronics Co., Inc. SG-PRON 5-Button Programing Wallstation with Infrared Receiver Specification Submittal sheet, May 29, 2003, 4 pages.

(Continued)

*Primary Examiner*—Douglas W Owens
*Assistant Examiner*—Jimmy T Vu
(74) *Attorney, Agent, or Firm*—Ostrolenk Faber LLP

(57) ABSTRACT

The invention regards a system and method for using a handheld programming device to configure a lighting control system wirelessly. In one embodiment, at least one device configured with a processing section is installed in the lighting control system. A communications receiver that is operable to receive a signal from the handheld programming device is also installed in the lighting control system, wherein the signal includes an instruction for configuring the lighting control system. Further, the signal is wirelessly sent from the handheld programming device to the communications receiver, and the instruction is transmitted from the communications receiver to a device in the system. The instruction functions to configure the lighting control system.

3 Claims, 108 Drawing Sheets

U.S. PATENT DOCUMENTS

| | | | | |
|---|---|---|---|---|
| 5,554,979 | A | 9/1996 | Kohar et al. | |
| 5,572,438 | A | 11/1996 | Ehlers et al. | |
| 5,637,964 | A | 6/1997 | Hakkarainen et al. | |
| 5,705,978 | A | 1/1998 | Frick et al. | 340/511 |
| 5,787,120 | A | 7/1998 | Louagie et al. | 375/257 |
| 5,838,116 | A * | 11/1998 | Katyl et al. | 315/307 |
| 5,905,442 | A | 5/1999 | Mosebrook et al. | |
| 5,932,974 | A | 8/1999 | Wood | |
| 5,943,316 | A | 8/1999 | Davis | |
| 5,962,992 | A | 10/1999 | Huang et al. | |
| 5,987,205 | A | 11/1999 | Moseley et al. | |
| 6,037,721 | A | 3/2000 | Lansing et al. | |
| 6,236,170 | B1 * | 5/2001 | de Leijer | 315/316 |
| 6,310,440 | B1 | 10/2001 | Lansing et al. | |
| 6,388,399 | B1 | 5/2002 | Eckel et al. | |
| 6,392,368 | B1 | 5/2002 | Deller et al. | |
| 6,429,786 | B1 | 8/2002 | Bansemir et al. | 340/870.27 |
| 6,487,457 | B1 | 11/2002 | Hull et al. | |
| 6,519,509 | B1 | 2/2003 | Nierlich et al. | |
| D471,829 | S | 3/2003 | Dennis et al. | D10/85 |
| D472,831 | S | 4/2003 | Dennis et al. | D10/85 |
| 6,553,076 | B1 | 4/2003 | Huang | 375/257 |
| 6,555,966 | B2 | 4/2003 | Pitigoi-Aron | |
| 6,567,032 | B1 | 5/2003 | Mullaly et al. | |
| 6,608,453 | B2 | 8/2003 | Morgan et al. | |
| 6,608,552 | B1 * | 8/2003 | Fogel et al. | 340/310.11 |
| 6,667,578 | B2 | 12/2003 | Lansing et al. | |
| 6,674,248 | B2 | 1/2004 | Newman, Jr. et al. | |
| 6,765,968 | B1 | 7/2004 | Nelson et al. | 375/257 |
| 6,771,029 | B2 | 8/2004 | Ribarich et al. | |
| 6,794,830 | B2 | 9/2004 | Lansing et al. | |
| 6,831,569 | B2 * | 12/2004 | Wang et al. | 340/825.52 |
| 6,898,980 | B2 | 5/2005 | Behm et al. | 73/755 |
| 6,983,783 | B2 | 1/2006 | Carmen, Jr. et al. | |
| 7,109,883 | B2 | 9/2006 | Trimble et al. | 340/870.16 |
| 7,126,291 | B2 | 10/2006 | Kruse et al. | |
| 7,190,126 | B1 | 3/2007 | Paton | |
| 7,219,141 | B2 | 5/2007 | Bonasia et al. | |
| 7,277,930 | B2 | 10/2007 | Hillis et al. | |
| 7,307,542 | B1 | 12/2007 | Chandler et al. | |
| 7,309,965 | B2 | 12/2007 | Dowling et al. | |
| 7,394,451 | B1 | 7/2008 | Patten et al. | |
| 2002/0111190 | A1 | 8/2002 | Harrison et al. | |
| 2003/0057886 | A1 | 3/2003 | Lys et al. | |
| 2003/0197625 | A1 | 10/2003 | Szuba | |
| 2004/0002792 | A1 | 1/2004 | Hoffknecht | |
| 2004/0090948 | A1 | 5/2004 | Forssell et al. | |
| 2004/0184517 | A1 | 9/2004 | Westfield et al. | 375/219 |
| 2004/0217718 | A1 | 11/2004 | Kumar et al. | |
| 2005/0017453 | A1 | 1/2005 | Rehbein et al. | |
| 2005/0040247 | A1 | 2/2005 | Pouchak | |
| 2005/0043966 | A1 | 2/2005 | Harnsberger et al. | |
| 2005/0056106 | A1 | 3/2005 | Nelson et al. | 73/866.3 |
| 2005/0076296 | A1 | 4/2005 | Lee et al. | |
| 2005/0156728 | A1 | 7/2005 | Nanba | |
| 2005/0179404 | A1 | 8/2005 | Veskovic et al. | |
| 2006/0125426 | A1 | 6/2006 | Veskovic et al. | |
| 2007/0061050 | A1 | 3/2007 | Hoffknecht | |

FOREIGN PATENT DOCUMENTS

| | | | |
|---|---|---|---|
| DE | 102 21 931 | A1 | 5/2002 |
| EP | 0518916 | B1 | 2/1991 |
| EP | 0 895 209 | | 3/1999 |
| EP | 1 192 614 | | 1/2003 |
| RU | 2111543 | C1 | 5/1998 |
| RU | 98108150 | A | 2/2000 |
| WO | WO 03/007665 | | 1/2003 |

OTHER PUBLICATIONS

Lutron Electronics Co., Inc. Application Note #105: Advanced GRAFIK Eye Control using Lutron PRO Infrared Commands, Oct. 8, 2003, 2 pages.

Lutron Electronics Co., Inc., GRAFIK Eye Wallstations, Commercial Systems Technical Guide, Jun. 2004, pp. front cover, 45, rear cover.

Lightolier Controls, ATOM Installation & Operations Manual, 2001, 15 pages.

Lightolier Controls, CAMLRC Addressable Track Laser Remote Control Specification Submittal Sheet, 2002, 2 pages.

Lightolier Controls, CAM25OVAA Lytespan Track Lighting System Specification Submittal Sheet, 2 pages.

Universal Lighting Technologies, SuperDim and AddressPro Dimming Ballasts Brochure, 2004, 12 pages.

iLight LTD, iLight Intelligent Controls Brochure, not dated, 6 pages.

iLight LTD, "Pronto, pronto" Press Release, May 22, 2002, 1 page.

iLight LTD, ZEN Lighting Controller Brochure, 2003, 3 pages.

* cited by examiner

DAYLIGHT SENSOR SETUP

OCCUPANCY SENSOR SETUP

DAYLIGHT SENSOR

OCCUPANCY SENSOR

IR RECEIVER

BALLAST REPLACEMENT

300

302 304 306 308

| | | | | | | | | | | | | | |
|---|---|---|---|---|---|---|---|---|---|---|---|---|---|
| 0 | 0 | 1 | 2 | ... | ... | 84 | ... | 90 | ... | ... | ... | ... | 127 |
| | XX | XX | ... | ... | ... | S/N MSB | ... | S/N LSB | ... | ... | ... | ... | ... |
| 1 | 0 | 1 | 2 | ... | ... | 84 | ... | 90 | ... | ... | ... | ... | 127 |
| | XX | XX | ... | ... | ... | S/N MSB | ... | S/N LSB | ... | ... | ... | ... | ... |
| 2 | 0 | 1 | 2 | ... | ... | 84 | ... | 90 | ... | ... | ... | ... | 127 |
| | XX | XX | ... | ... | ... | S/N MSB | ... | S/N LSB | ... | ... | ... | ... | ... |
| ... | | | | | | | | | | | | | |
| | | | | | | | | | | | | | |
| 63 | 0 | 1 | 2 | ... | ... | 84 | ... | 90 | ... | ... | ... | ... | 127 |
| | XX | XX | ... | ... | ... | S/N MSB | ... | S/N LSB | ... | ... | ... | ... | ... |

FIG.28

HANDHELD PROGRAMMER FOR LIGHTING CONTROL SYSTEM

CROSS-REFERENCE TO RELATED APPLICATIONS

This application is a divisional of U.S. patent application Ser. No. 11/375,462, filed Mar. 13, 2006, entitled HANDHELD PROGRAMMER FOR LIGHTING CONTROL SYSTEM, which claims priority from U.S. Provisional Patent Application Ser. No. 60/661,055, filed Mar. 12, 2005, entitled HANDHELD PROGRAMMER FOR LIGHTING CONTROL SYSTEM, the entire contents of which are hereby incorporated by reference.

BACKGROUND OF THE INVENTION

1. Field of the Invention

The present invention relates generally to a multi-ballast lighting and control system, and, more particularly, to a handheld programmer for a lighting control system including a plurality of programmable fluorescent electronic dimming ballasts, occupancy sensors, daylight sensors and infrared receivers.

2. Description of the Related Art

Remote control and monitoring of electrical/electronic devices, such as load control devices of a lighting control system, is known. For example, the Digital Addressable Lighting Interface ("DALI") communication protocol allows for digital addressing of the control devices of lighting control systems. Control devices can use the DALI protocol to communicate with a load control device, for example, to adjust the intensity of a lighting load, by sending commands over a communication network. Using the DALI protocol, each control device has its own individual digital address, for example, thus enabling remote communication with the control device. Accordingly, loads can be switched on and off by commands issued by a remote console. A central controller processes the commands and issues commands in response to control the load control devices. The load control device may be operable to control, for example, a lighting load, such as an incandescent lamp or a fluorescent lamp, or a motor load, such as a motorized window treatment.

In recent years, large-scale lighting systems have been developed to meet the needs of lighting applications with distributed resources and centralized control. For example, building lighting systems are often controlled on a floor-by-floor basis or as a function of the occupancy space used by independent groups in the building. Taking a floor of a building as an example, each room on the floor may have different lighting requirements depending on a number of factors including occupancy, time of day, tasks ongoing in a given room, security and so forth, for example.

When a number of rooms are linked together for lighting purposes, control of lighting in those rooms can be centralized over a network. For example, while power to various lighting modules can be supplied locally, control functions and features of the lighting system can be directed through a control network that sends and receives messages between a controller and various lighting system components. For instance, a room with an occupancy sensor may deliver occupancy-related messages over the network to inform the controller of the occupancy condition of the given room. If the room becomes occupied, the lighting controller can cause the lighting in that room to turn on, or be set to a specified dimming level.

When messages are exchanged in the lighting control network, a protocol is employed to permit the various network components to communicate with each other. The DALI protocol represents a convention for communication adopted by lighting manufacturers and designers to permit simple messages to be communicated over a lighting network in a reasonably efficient manner. The DALI protocol calls for a 19-bit message to be transmitted among various network components to obtain a networked lighting control. The 19-bit message is composed of address bits and command bits, as well as control bits for indicating the operations to be performed with the various bit locations and the message. For example, one type of message provides a 6-bit address and an 8-bit command to deliver a command to the addressed network component. By using this protocol technique, sixty-four different devices may be addressed on the lighting network to provide the network control. A large number of commands can be directed to the addressable devices, including such commands as setting a power-on level, fade time and rates, group membership and so forth.

A conventional lighting control system, such as a system conforming to the DALI protocol, includes a hardware controller for controlling ballasts in the system. Typically, the controller is coupled to the ballasts in the system via a single digital serial interface, wherein data is transferred. A disadvantage of this single interface is that the bandwidth of the interface limits the amount of message traffic that can reasonably flow between the controller and the ballasts. This can also create delays in times to commands.

Typical DALI lighting control systems require a "bus power supply," which supplies power to the DALI communication bus. The DALI communication bus consists of a two-wire link with one wire supplying a DC voltage, e.g., 18 $V_{DC}$, and the other wire as common. The bus power supply generates the DC voltage required to allow the devices on the DALI bus to communicate. In order to transmit a bit on the DALI communication bus, a device will "short" out the link for a brief period of time. If the bus power supply fails, the devices connected to the DALI bus will not be able to communicate.

A prior art electronic dimming ballast may comprise front end, which includes an a rectifier for producing a rectified DC voltage from an AC mains supply and a boost converter for generating a boosted DC bus voltage from the rectified DC voltage. The DC bus voltage is provided to a back end, which includes an inverter for generating a high-frequency AC voltage from the DC bus voltage and an output filter for coupling the high-frequency AC voltage to the lighting load for powering the lighting load. The front end and the band end of a prior art ballast is described in greater detail in U.S. Pat. No. 6,674,248, issued Jan. 6, 2004, entitled "Electronic Ballast", the entire disclosure of which is incorporated herein by reference in its entirety.

Often, the ballast may include a processing section, for example, comprising a microprocessor, which receives multiple inputs. The inputs may be received from the ballast itself, e.g., an input concerning the magnitude of the DC bus voltage or an input concerning the output lamp current or the output lamp voltage. In addition, the inputs to the processing section may be received from an external sensor, such as an external photocell sensor or an external occupancy sensor. Furthermore, the processing section has a communication port that transmits and receives information via the DALI communications protocol. The processing section is powered by a power supply, which receives the rectified DC voltage from the rectifying circuit. An example of a ballast that comprises a microprocessor and in operable to receive a plurality of inputs, specifically, inputs from external sensors, is described in greater detail in U.S. patent application Ser. No. 10/824,248, filed Apr. 14, 2004, entitled “Multiple Input Electronic Ballast with Processor”, the entire disclosure of which is incorporated herein by reference in its entirety.

Systems for wirelessly controlling an electrical device are also known. For example, some prior art systems are operable to control the status of electrical devices such as electric lamps, from a remote location via wireless communication links, including radio frequency (RF) links or infrared (IR) links. Status information regarding the electrical devices (e.g., on, off and intensity level) is typically transmitted between specially adapted lighting control devices and at least one master control unit. One example prior art system that includes configurable devices and wireless control devices that are provided by the assignee of the present patent application is commercially known as the RADIO RA wireless lighting control system. The RADIO RA system is described in greater detail in U.S. Pat. No. 5,905,442, issued May 18, 1999, entitled, “Method and Apparatus for Controlling and Determining the Status of Electrical Devices from Remote Locations”, the entire disclosure of which is incorporated herein by reference in its entirety.

In spite of the convenience provided by remote control and monitoring systems, such as provided by the DALI protocol, control devices that may be physically located far from each other or are otherwise disparate devices, each having its own individual digital address, must be individually selected and configured to the group, typically by referencing a table of devices and/or zones. When faced with a massive list of thousands of individual control devices, the task associated with defining various groups of individual devices is daunting.

Accordingly, configuring a prior art lighting control system can take a substantial amount of time. For example, each of the individual load control devices and the associated lighting load may identified by name or number in a table, and must be located by a user in order to add the load control device to a group. Further, a plurality of individual lighting fixtures may be assigned to respective zones. Accordingly, a user must navigate through a large table of many zones, each representing a plurality of lighting fixtures, in order to define groups of lights for various patterns, such as described above. Such a table of zones is not intuitive, and tasks associated with defining various lighting patterns based upon hundreds or even thousands of zones, many of which may include several or many lighting fixtures, is problematic.

When a single ballast requires replacement, for example, due to a failure, the prior art lighting control systems provide a method for replacing a single ballast. First, the failed ballast is removed and a new ballast is installed in its place. Next, a query is sent over the communication link from the controller to identify which particular ballast is unassigned. When the new and unassigned ballast responds, the controller transmits programming settings and configuration information of the failed ballast to the new ballast. The programming settings and configuration information are stored in the new replacement ballast. The programming settings and configuration information may include, for example, settings related to a high end trim, a low end trim, a fade time and an emergency intensity level.

While automatic methods for ballast replacement may be useful to replace a single ballast, it is ineffective to replace a plurality of ballasts, since each of the plurality of ballast will require respective setting and configuration information transmitted thereto. Multiple unassigned ballasts cannot be distinguished from each other, and, accordingly, there is no way in the prior art to automatically provide respective setting and configuration information for each of a plurality of ballasts.

Furthermore, in the prior art devices, programming is accomplished from a master console or from keypads. It is desirable to be able to program the intelligent ballast of a lighting control in a wireless, handheld device.

SUMMARY OF THE INVENTION

There is a need for a handheld programmer for lighting control systems that include, for example, a plurality of programmable fluorescent electronic dimming ballasts, occupancy sensors, daylight sensors, and infrared receivers.

The invention regards a system and method for using a handheld programming device to configure a lighting control system wirelessly. In one embodiment, at least one device configured with a processing section is installed in the lighting control system. A communications receiver that is operable to receive a signal from the handheld programming device is also installed in the lighting control system, wherein the signal includes an instruction for configuring the lighting control system. Further, the signal is wirelessly sent from the handheld programming device to the communications receiver, and the instruction is transmitted from the communications receiver to a device on the system. The instruction functions to configure the lighting control system.

In another embodiment, the invention regards a system and method for replacing a ballast in a lighting control system. The lighting control system comprises a first ballast and a bus supply. A first unique identifier, such as a serial number, is preferably assigned to the first ballast. The first ballast is configured and information representing the configuration of the first ballast as well as the first unique identifier of the first ballast is stored on the bus supply.

Continuing with this embodiment, a second unique identifier is assigned to a second ballast, which is to replace the first ballast. The first ballast is removed from the lighting control system, and the second ballast is installed. Thereafter, an instruction is transmitted to the bus supply to configure the second ballast with the configuration setting(s) of the first ballast by correlating the second unique identifier with the first unique identifier. The bus supply uses the configuration information to configure the second ballast.

The configuration information represents at least one of a high end trim, a low end trim, a fade time, a ballast burn-in, an emergency level intensity setting, an intensity level to operate in response to a photosensor registering a light input, an intensity level to operate in response to an occupancy sensor registering an occupied or an unoccupied status, a time-out value, and an intensity level to operate in response to contact closure registering a closed status or an open status.

In yet another embodiment, the invention regards a system and method for maintaining information representing devices installed in a lighting control system. Preferably, each of a plurality of ballasts that are installed in the lighting control system have respective ballast configuration information stored therein. The respective ballast configuration information represents configuration setting(s) of the respective ballasts. Further, a bus supply is installed in the lighting control system and that stores the respective configuration information for all of the ballasts.

Other features and advantages of the present invention will become apparent from the following description of the invention that refers to the accompanying drawings.

BRIEF DESCRIPTION OF THE DRAWINGS

For the purpose of illustrating the invention, there is shown in the drawings a form of the invention, which is presently preferred, it being understood, however, that the invention is not limited to the precise arrangements and instrumentalities shown. The features and advantages of the present invention will become apparent from the following description of the invention that refers to the accompanying drawings, in which:

FIG. 28 illustrates an example database record layout for a data table that stores configuration and setting information for ballasts, in accordance with an example database stored on a bus power supply.

DETAILED DESCRIPTION OF EMBODIMENTS OF THE INVENTION

Figure 1:
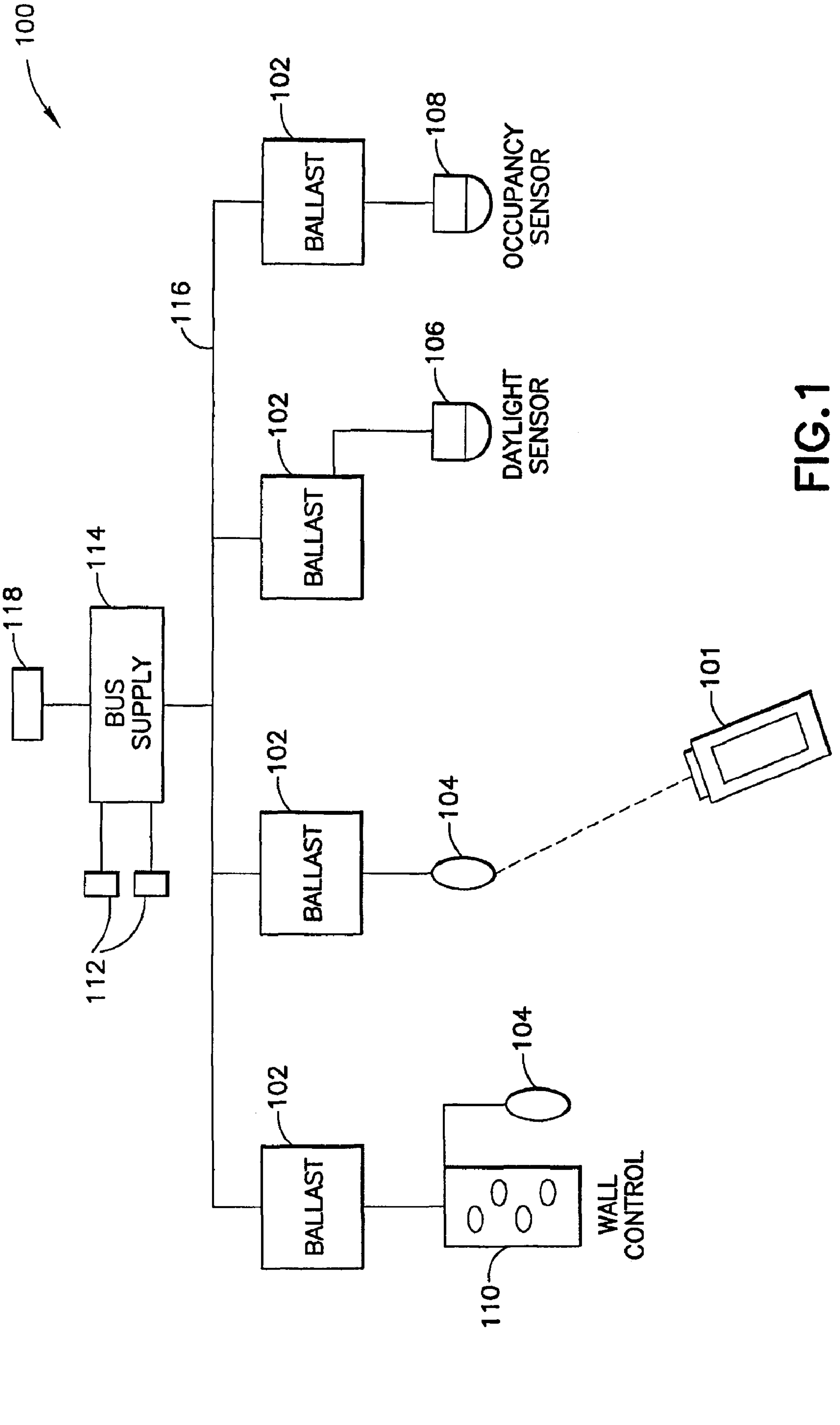
FIG. 1 illustrates a plurality of devices, including ballasts, infrared receivers, photosensors, occupancy sensors, wall controls, and a bus power supply communicating over a ballast link.

The foregoing summary, as well as the following detailed description of the preferred embodiments, is better understood when read in conjunction with the appended drawings. For the purposes of illustrating the invention, there is shown in the drawings an embodiment that is presently preferred, in which like numerals represent similar parts throughout the several views of the drawings, it being understood, however, that the invention is not limited to the specific methods and instrumentalities disclosed. Also, although the present invention is directed particularly to lighting controls, the present invention can be applied to communication signals for controlling the status of other kinds of devices, such as, for example, fan motors or motorized window treatments.

According to one aspect, the present invention is directed to a handheld programming device for a lighting control system including, for example, a plurality of programmable fluorescent electronic dimming ballasts, occupancy sensors, daylight sensors and infrared receivers. In a preferred embodiment, a remotely and manually controllable control device is used to perform various tasks, including adjusting a lighting intensity level, configuring a sensor (e.g., an occupancy sensor or a daylight sensor), defining sensor groups, configuring a wall control, performing diagnostics, and configuring or replacing a ballast. Further, the invention includes a security feature to ensure that properly authorized personnel are afforded access to perform the above tasks. For example, by password protecting the handheld programming device to exclude anyone other than an authorized user, the invention prevents unauthorized persons from configuring ballasts in the lighting control system.

Referring now to FIG. 1, an example hardware arrangement of components and devices in a building installation in accordance with a preferred embodiment of the present invention is shown, and referred herein generally as lighting control system 100. In a preferred embodiment, a command/control bus power supply 114 (also referred to herein as "bus supply") is hard wired to a communication link 116, e.g. a DALI communication link and provides a DC voltage, e.g., 18 VDC, across the two wires of the communication link.

Further, the bus supply 114 is operable to store ballast programming information and to communicate with intelligent ballasts 102 over the link 116. Preferably, bus supply 114 includes a microcontroller or other type of processor that includes a memory that stores a database 118 of the system ballasts and corresponding settings and configurations. Database 118 preferably comprises one or more data tables that are populated either automatically by individual ballasts transmitting respective information over ballast link 116, or by receiving signals transmitted by a handheld programming device 101. The bus supply 114 is operable to receive a plurality of contact closure inputs 112, which each provide an input of a closed state or an open state to the bus supply. The bus supply 114 is operable to control the lighting loads attached to each of the ballast 102 in response to a change in state of the contact closure inputs 112.

Continuing with reference to FIG. 1, the devices comprise, for example, one bus supply unit 114, ballasts 102, which may be electrically coupled to respective wall controls 110, and an infrared receiver 104 that is operable to receive infrared signals sent from the handheld programming device 101 and to send signals to an associated ballast 102. Handheld programming device 101 preferably includes a graphical user interface that enables a user to select from various menu choices and transmit commands to the system 100 via the infrared receiver 104 and define various operating conditions. Preferably, the infrared receiver 104 includes a light-emitting diode (LED), which illuminates when an infrared signal is being received and provides visual feedback to a user of the handheld programming device 101. Thus, the signals sent from handheld programming device 101 represent instructions that, in accordance with the teachings herein, enable various tasks, including adjusting a lighting intensity level, configuring a sensor (e.g., an occupancy sensor or a daylight sensor), defining ballast and/or sensor groups, configuring a wall control, performing diagnostics, and configuring or replacing a ballast, and replacing a bus supply.

Handheld programming device 101 can be any handheld device operable to transmit commands via a wireless interface, such as infrared, radio frequency or other known wireless communication technology. Handheld programming device 101 may be a personal digital assistant ("PDA") and configured with the PALM operating system, POCKET PC operating system, or other suitable operating system for a PDA. One skilled in the art will recognize that any manner of transmitting data or information in accordance with the teachings herein is envisioned.

Preferably, each ballast 102 is configured with a unique identifier, such as a serial number, that is assigned to the ballast during or after manufacture. In other words, ballasts 102 are pre-configured "out of the box", i.e., when the product is shipped with a serial number or other identifier assigned. The identifier can be a random number, or can include coded information, such as the location where the ballast was manufactured, the date the ballast was manufactured, features, etc.

Once a ballast 102 is installed on ballast link 116, a second unique identifier, such as a system address, may be assigned to the ballast 102 and the second identifier is, thereafter, associated with the first identifier (e.g., the serial number). In a preferred embodiment, the second identifier value is used as an index value in a database in bus supply 114. The bus supply can use the second identifier, for example, to pass instructions to ballast 102. Preferably, the second index value is shorter in length than the first identifier, and, accordingly, bus supply 114 can issue instructions to a respective ballast 102 faster by using the shorter second identifier instead. In an embodiment of the invention, the first identifier may be fourteen characters in length and the second identifier two characters in length.

Figure 2:
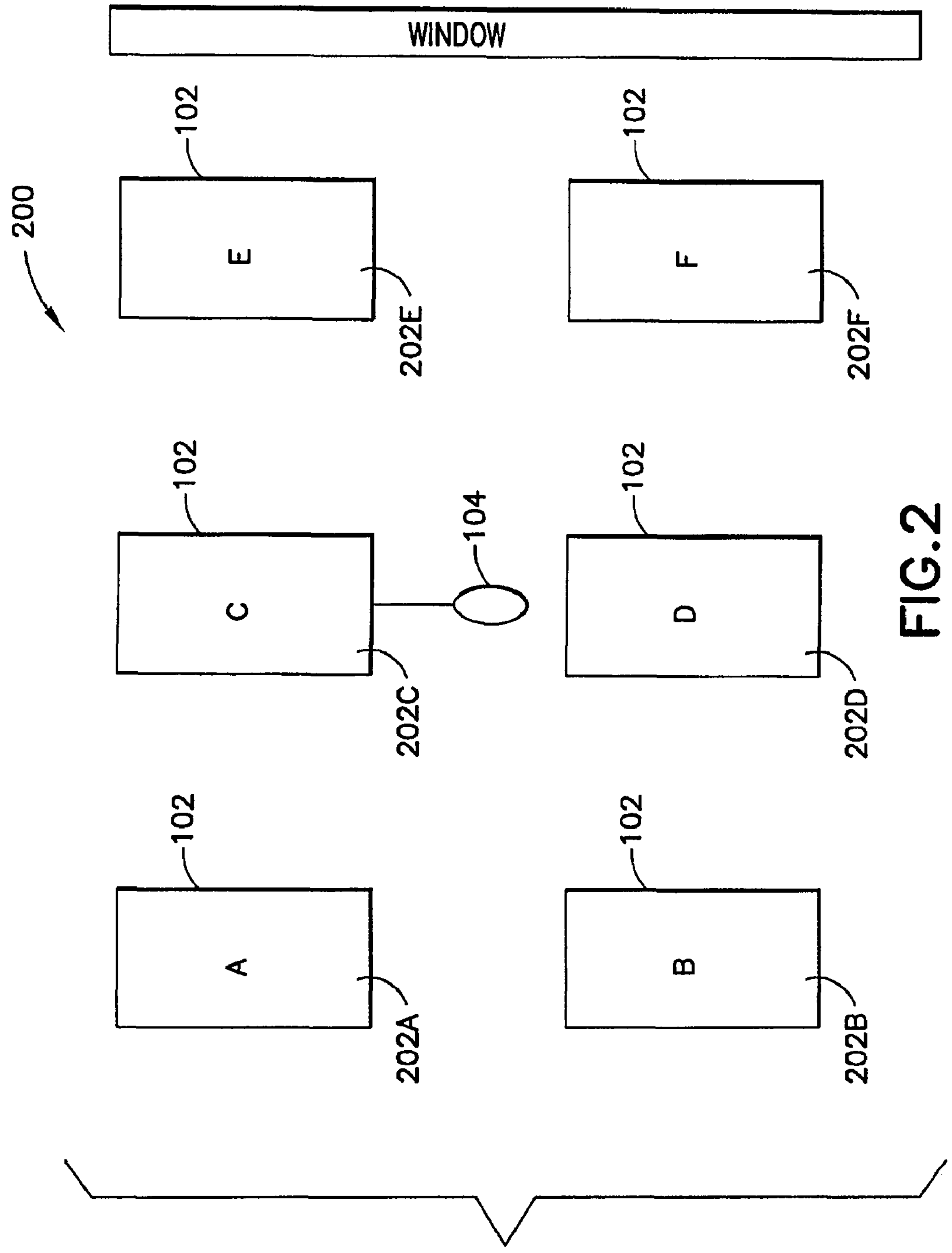
FIG. 2 illustrates an example grid of light fixtures and ballasts 102 arranged in rows and columns in a room having a window.

The present invention is operable to enable a user to define particular lighting scenes by controlling ballasts 102 to operate at various intensity levels depending on the respective location of each ballast within a room or building. FIG. 2 illustrates an example grid 200 of light fixtures and ballasts 102 arranged in a room having a window. During times of bright sunshine, light may enter the area adjacent to the grid 200 through the window and affect the lighting environment. Using handheld programming device 101, a user can decrease the intensity setting for ballasts 102 that are located in sections 202E and 202F because of the fixtures' proximity to the window. For example, the ballasts 102 controlling fixtures in sections 202E and 202F can be defined to operate at 20% intensity. The ballasts 102 controlling fixtures in sections 202C and 202D can be defined to operate at 50% intensity. The ballasts 102 controlling fixtures in sections 202A and 202B can be defined to operate at 80% intensity. Preferably, the user uses handheld programming device 101 to define groups of ballasts with respective intensity levels, for example in rows and columns as shown.

Preferably, bus supply 114 stores grouping information and respective operational settings for ballasts 102 in database 118. For example, database 118 may store values representing a ballast's row value, gain value, and ballast 102 short address (second unique identifier). Bus supply 114 preferably references values in database 118 to communicate commands to ballasts 102 in grid 200 in order to operate fixtures appropriately in accordance with instructions defined by a user using handheld programming device 101.

Many of the processes described herein are performed using a handheld programming device. The processes include using a handheld programming device to configure ballasts, replace ballasts, set up sensor devices such as daylight sensors and occupancy sensors, and to define groupings of the various devices. Many of the examples shown in the flowcharts refer to an embodiment in which a handheld programming device sends instructions via an infrared transmission. Although the descriptions in the flowcharts refer to an embodiment in which a handheld programming device 101 is used, one skilled in the art will recognize that other techniques for transmitting commands wirelessly can be used in place of infrared signals. For example, handheld programming device 101 may transmit instructions via radio frequency transmissions.

Figures 3, 3B:
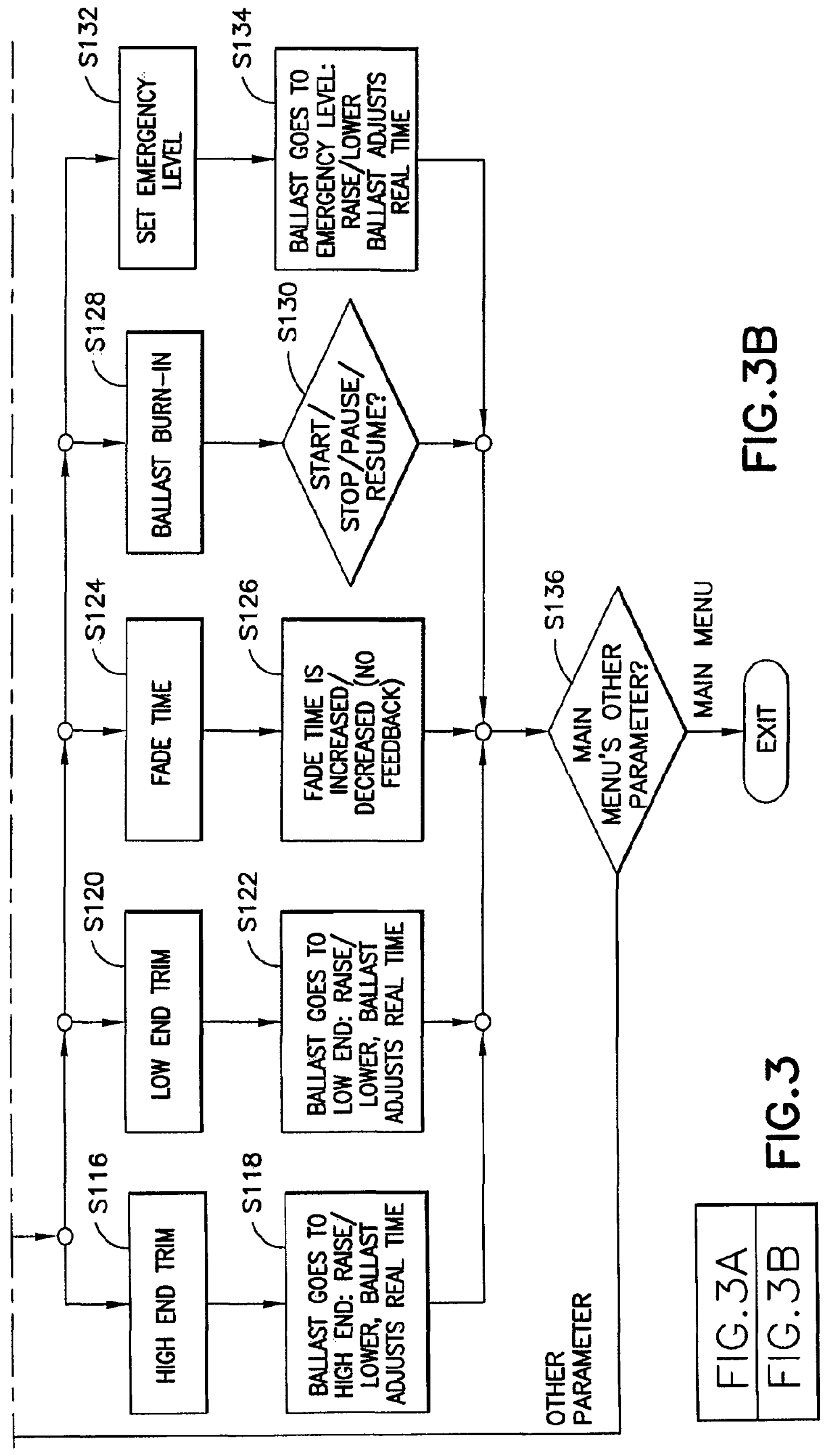
FIG. 3 shows a flowchart illustrating a method for configuring one or more ballasts using a handheld programming device in accordance with the present invention.
Figure 3A:
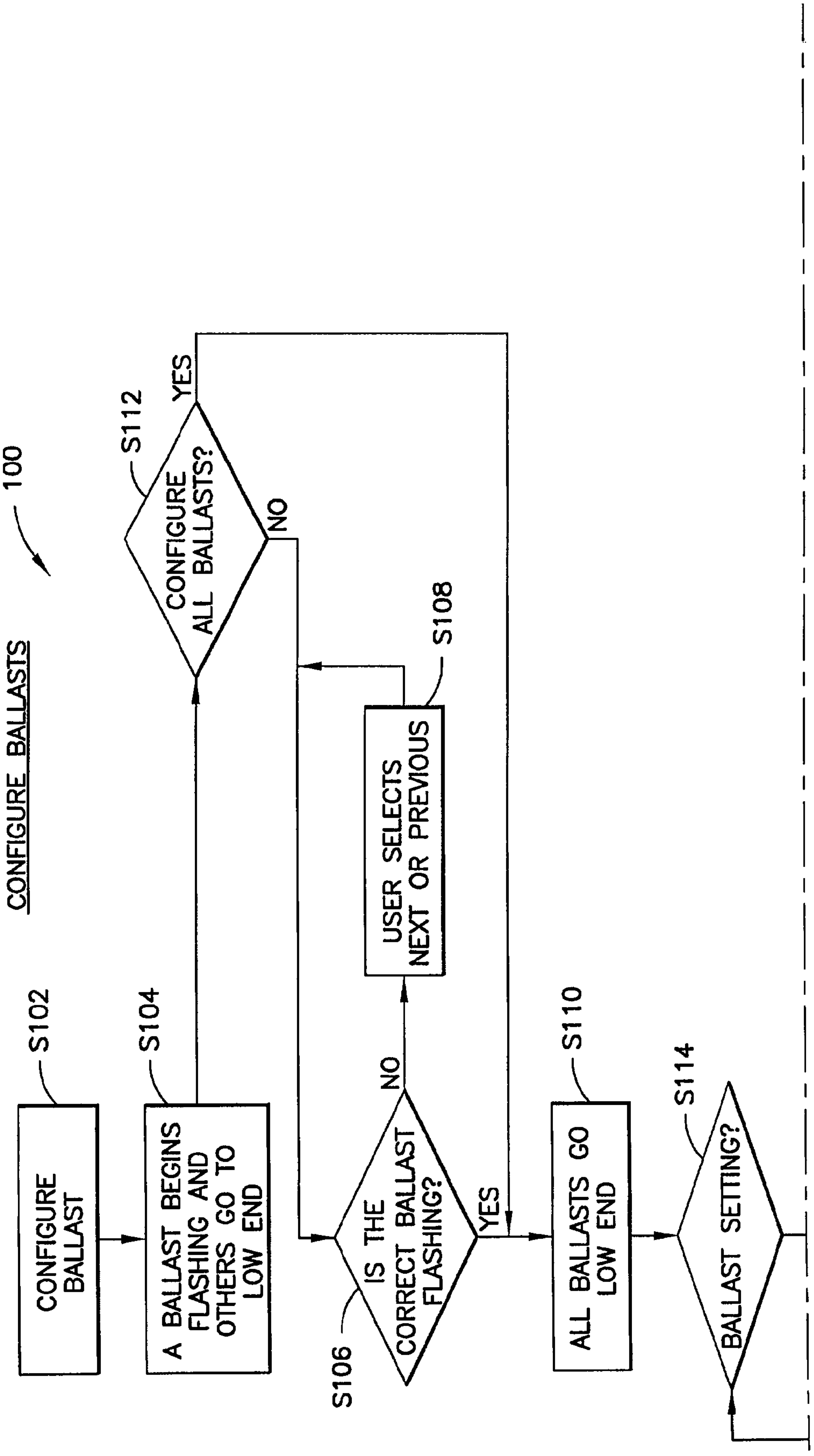

FIG. 3 shows a flowchart illustrating a method for configuring one or more ballasts 102 using a handheld programming device 101 in accordance with the present invention. The steps shown in FIG. 3 are applicable for configuring ballasts 102 after the ballasts have been physically installed and connected (i.e., wired) to ballast link 116. Using handheld programming device 101, the user transmits instructions via handheld programming device 101 to configure the ballasts. At step S102, the user points his handheld programming device 101 at an infrared receiver 104 attached to one of the ballasts 102 and selects a menu choice in the user interface provided on handheld programming device 101 to configure ballasts. At step S104, a lamp connected to one of the ballasts 102 on ballast link 116 begins flashing. In an alternative embodiment, a light emitting diode (LED) on a lamp fixture associated with ballast 102 begins flashing when the user makes a selection for configuring ballasts such in step S102. At step S112, the user can select an option provided via the user interface on handheld programming device 101 to configure all ballasts 102 installed on ballast link 116. Alternatively, the user can select a single ballast for configuration by observing the flashing at step S104 and making a determination whether the correct ballast is selected (step S106). If the user determines in step S106 that the desired ballast is not causing the flashing, then the user selects a different ballast via the handheld programming control device (step S108). For example, the user makes a selection using the graphical user interface on handheld programming device 101 for the next ballast on ballast link 116 or a previous ballast on the ballast link. The user is thereby able to select the desired ballast for configuring by stepping through a list of all of the ballasts installed on the link. When the user has determined that the desired ballast is selected for configuring, the user makes a selection on handheld programming device 101 to configure the respective device.

After the user has selected all ballasts (at step S112) or selected a single ballast (at step S106) for configuration, all ballasts are instructed to operate at respective lowest settings ("low end") at step S110. Accordingly, the user makes a selection to configure the selected ballast or all of the ballasts on the link 116. At step S114, the user makes selections on handheld programming device 101 for configuring various aspects of ballasts 102. At step S116, the user makes a selection for setting a high level ("high end trim"). The ballast 102 sets the lamp to the highest level, and the user adjusts the high level by selecting choices on handheld programming device 101, substantially in real time (step S118). For example, the user selects a graphical control, such as a button labeled with an up arrow or a down arrow, to increase or decrease the maximum preferred high end. Alternatively, the user selects a button with a numeric value such as 100, 95, 90, 85, etc., to instruct handheld programming device 101 to define a preferred maximum high end for ballasts 102.

At step S120, the user uses handheld programming device 101 to define a low level ("low end trim") for ballast 102. At step S122, thereafter, the ballasts 102 preferably automatically goes to its lowest level and the user selects options in the user interface provided on handheld programming device 101 to adjust the low level to a preferred value. As described above with respect to setting a high end trim, the user can select graphical icons in the form of buttons labeled with up and down arrows to increase or decrease preferred minimum low end of the ballast 102 or it can select a respective value (such as 5, 10, 15, etc.) to define a specific low end trim value substantially in real time.

Another option available to a user configuring a ballast in step S114 is to designate a fade time for a ballasts 102, which represents the amount of time in which a ballast fades from its operating level to the succeeding level (step S124). For example, the user makes a selection to increase or decrease a fade time, such as to one second, two seconds, five seconds or ten seconds for a ballast 102 to fade out a lamp (step S126).

Another option available to a user provides for a process for seasoning or "burn-in" of lamps to prevent a decrease in lamp life that is caused by dimming a lamp too early after a lamp is first installed (step S128). After a user selects an option for a ballast burn-in, the ballast supplies a lamp with full power for a minimum amount of time, such as 100 hours. At step S130, the user is provided an option on the handheld programming device 101 to change the state of the burn-in process, i.e., to start, stop, pause and/or resume the burn-in process.

Another option available for configuring ballasts is to define an output level for ballast(s) 102 during emergency conditions (step S132). For example, in case of a power outage or other emergency condition, a ballast 102 can be directed to operate at an emergency level as defined in step S132. Preferably, the user is provided an option in step S134 to define a particular emergency level, such as 100%, 75%, 50%, 25%, or to leave a ballast unaffected. As described above with regard to setting a high end trim and a low end trim, the user is able to define ballast(s) 102 emergency levels substantially in real time and observe the intensity of the light level during the setup process.

After a user has completed configuring one of the options (S16, S120, S124, S128 or S132), the user can use handheld programming device 101 to branch back to step S114 and select another parameter, or, alternatively, the user can exit the ballast configuring process (step S100) and return to a main menu level provided by the user interface on the handheld programming device (step S136). Thus, using handheld programming device 101, a user can configure ballasts 102 to define a high end trim, a low end trim, a fade time, a ballast burn-in, and state an output level during emergency conditions.

Figure 4A:
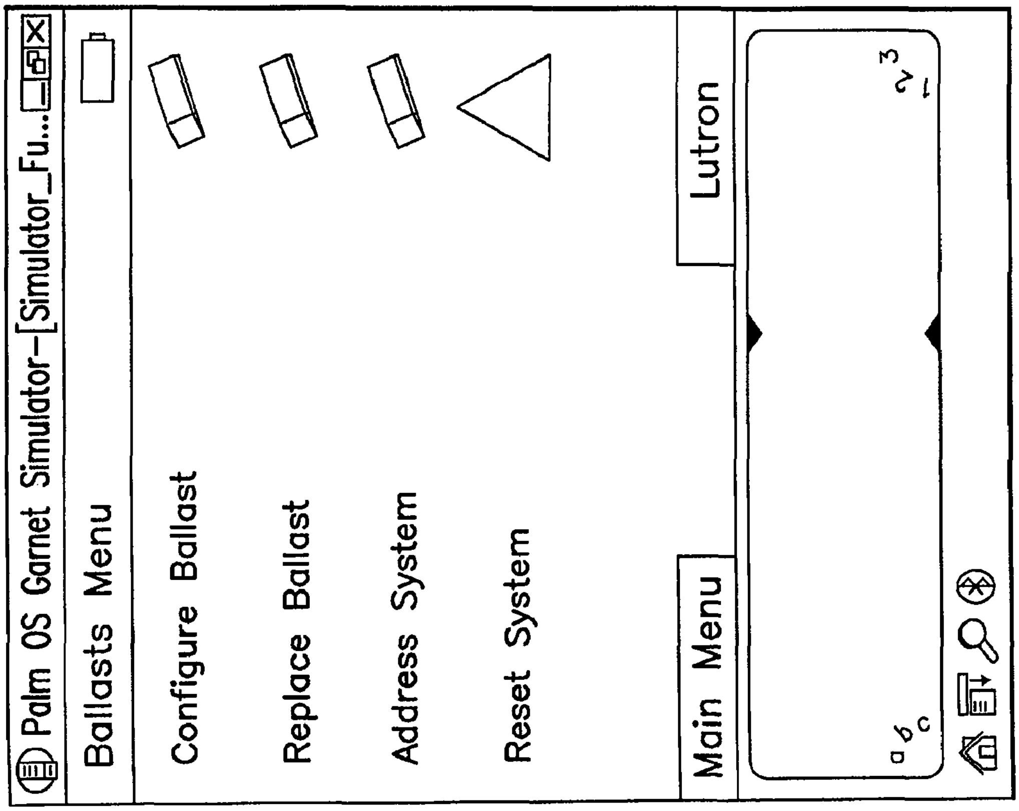
FIGS. 4A-4L illustrate example display screens provided on a handheld programming device for configuring a high end trim for one or more ballasts.
Figure 4B:
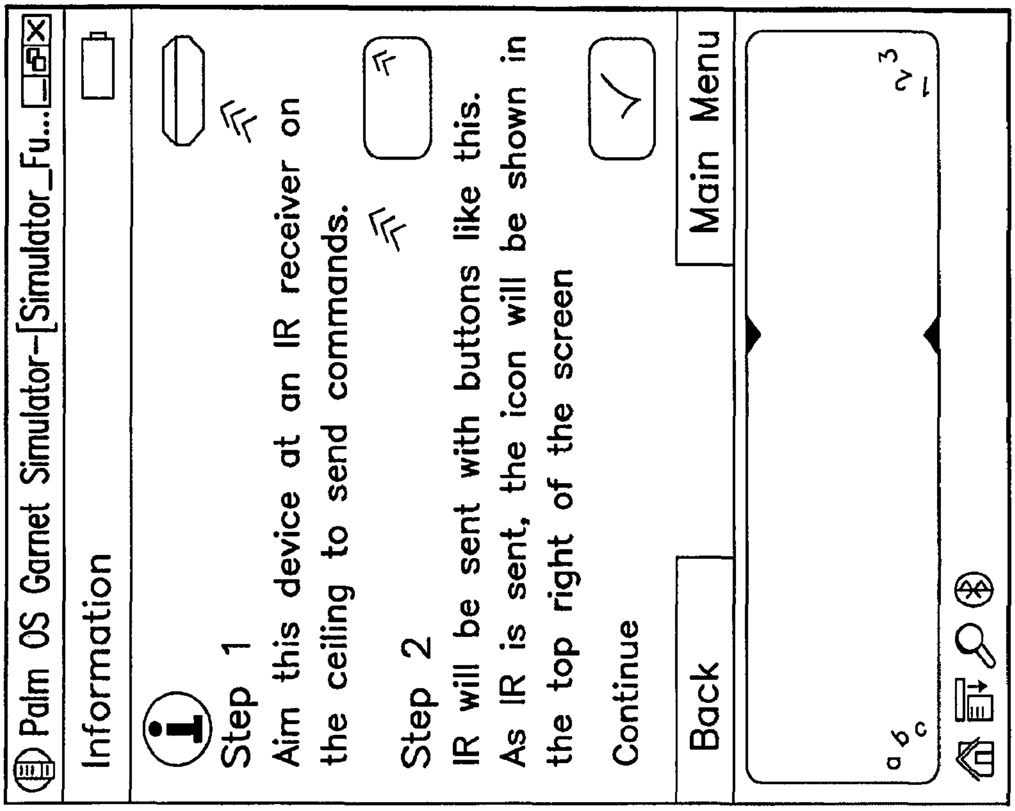
Figure 4C:
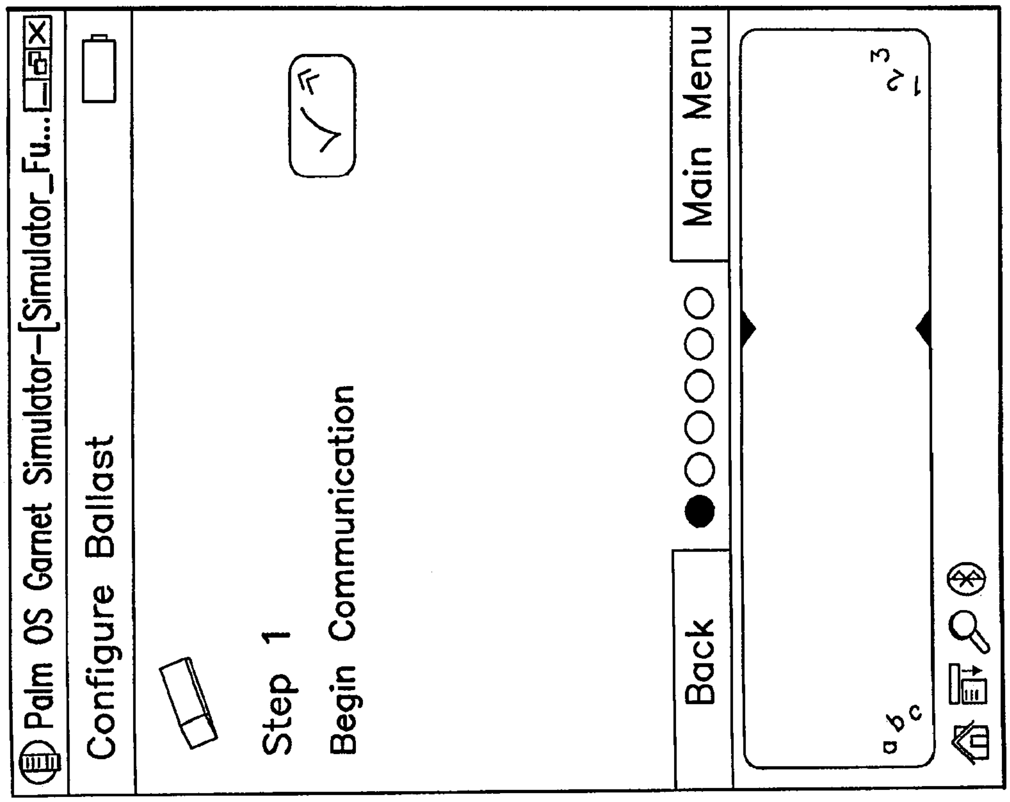
Figure 4D:
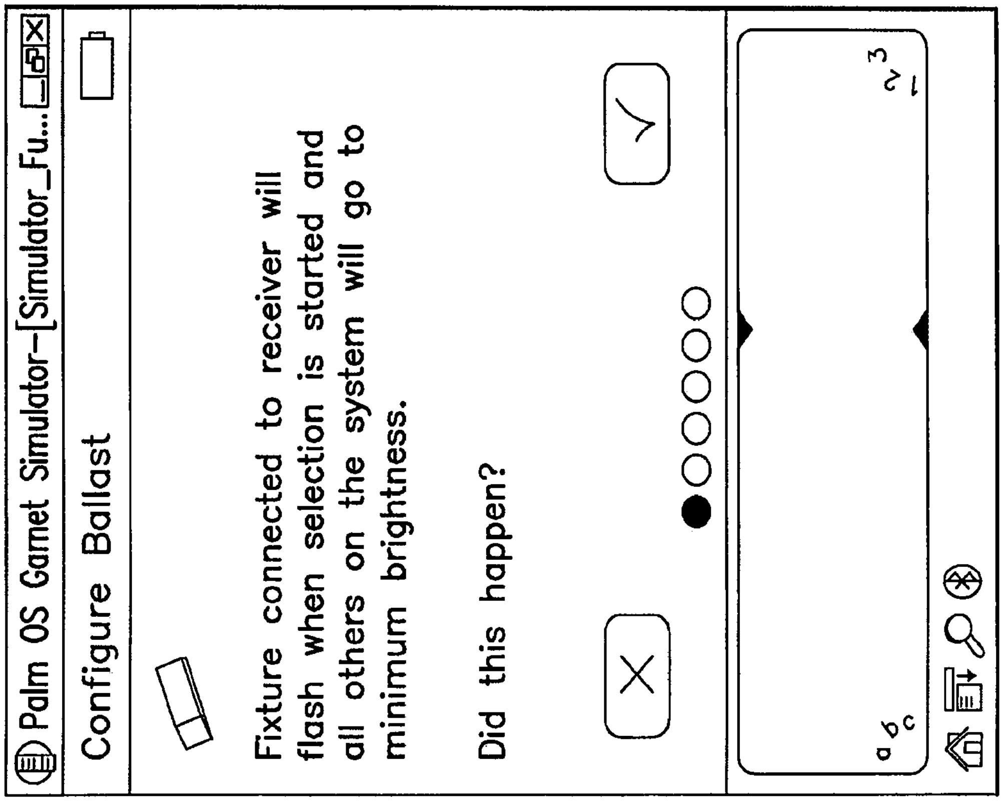
Figure 4F:
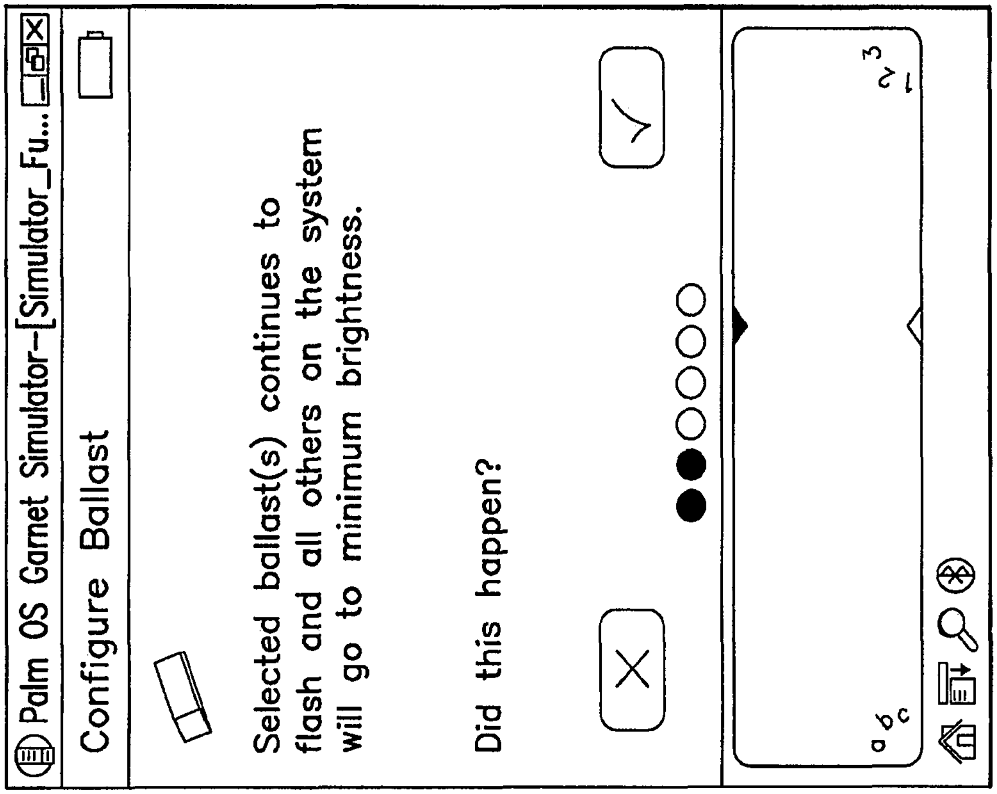
Figure 4E:
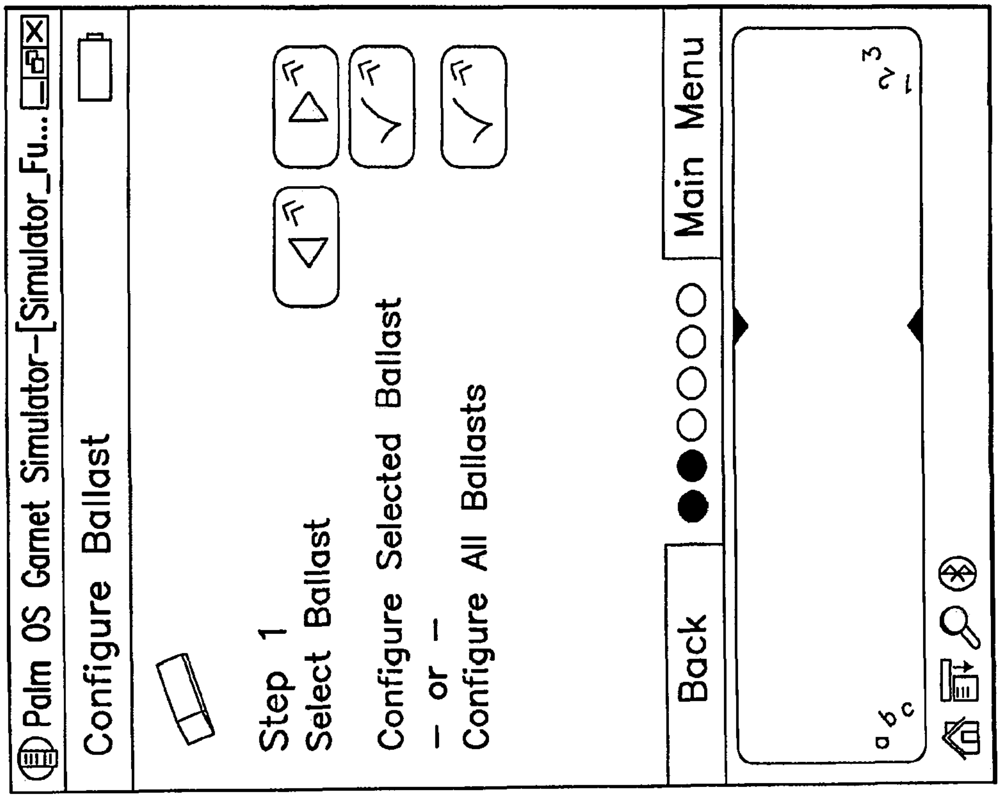
Figure 4G:
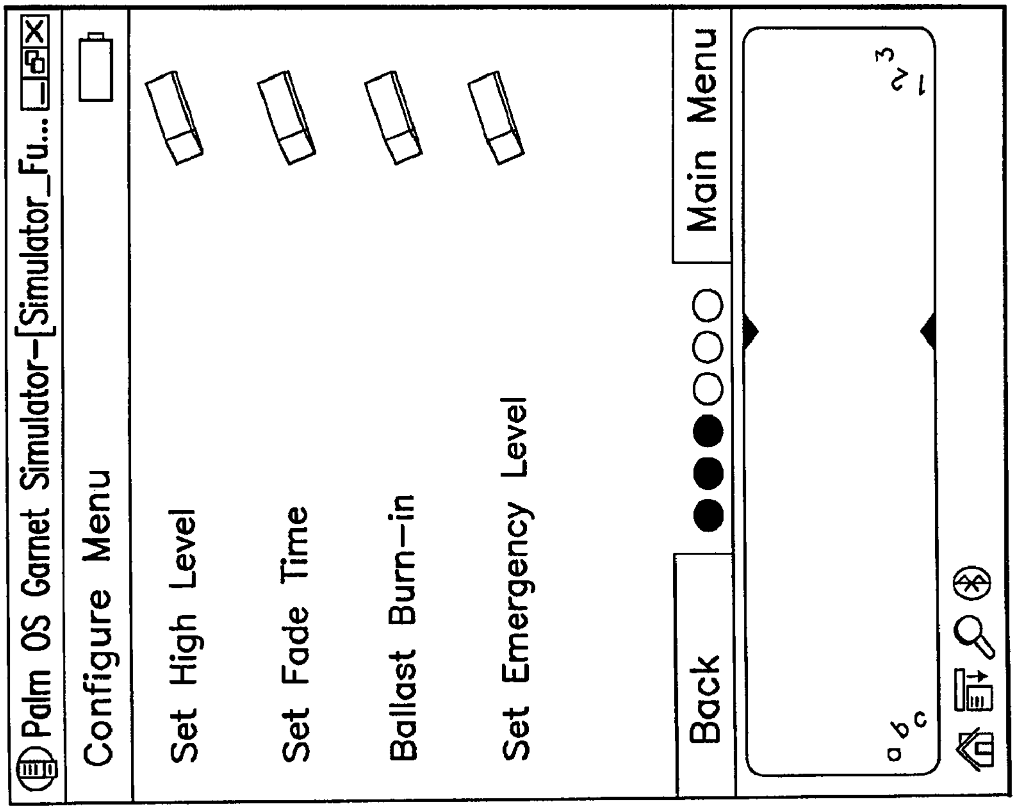

FIGS. 4A-4L illustrate example display screens provided on handheld programming device 101 for configuring a high level trim for one or more ballasts 102. In FIG. 4A, a user selects an option to configure a ballast 102. In FIG. 4B, the user is prompted to aim handheld programming device at an IR receiver 104 and select an icon, formatted as a button comprising a checkmark, to continue, and in FIG. 4C, the user is prompted to begin communicating over ballast link 116. After the user selects the icon, FIG. 4D is displayed to prompt the user to confirm that all of the fixtures on ballast link 116 are operating at minimum brightness, and a fixture associated with the ballast 102 is flashing. In FIG. 4E, handheld programming device 101 displays controls for the user to select a different ballast 102 on ballast link 116. The user preferably configures the respective ballast 102 that is selected in FIG. 4E. The user, in FIG. 4F is prompted to confirm (by selecting an icon) that a fixture associated with the respective ballast 102 selected in FIG. 4E is flashing and all other fixtures are operating at minimum brightness. If the user indicates that this has occurred, then FIG. 4G is displayed and the user is prompted to select an option for setting a high level, a fade time, a ballast burn-in or an emergency level.

Figure 4H:
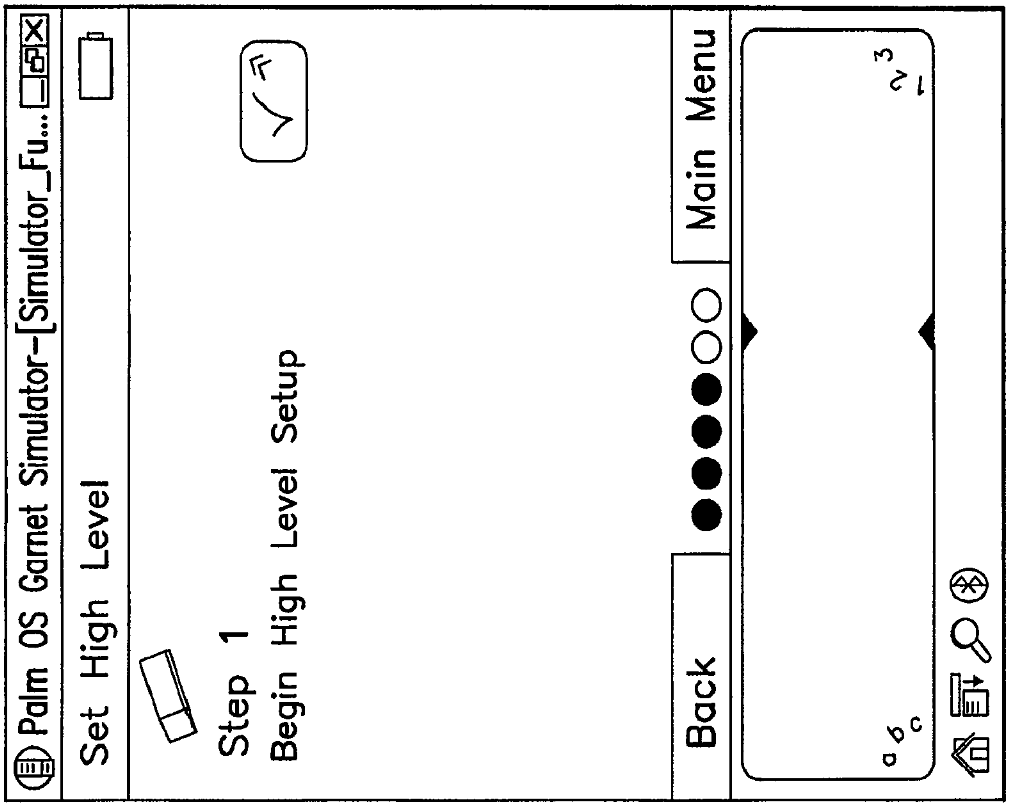
Figure 4I:
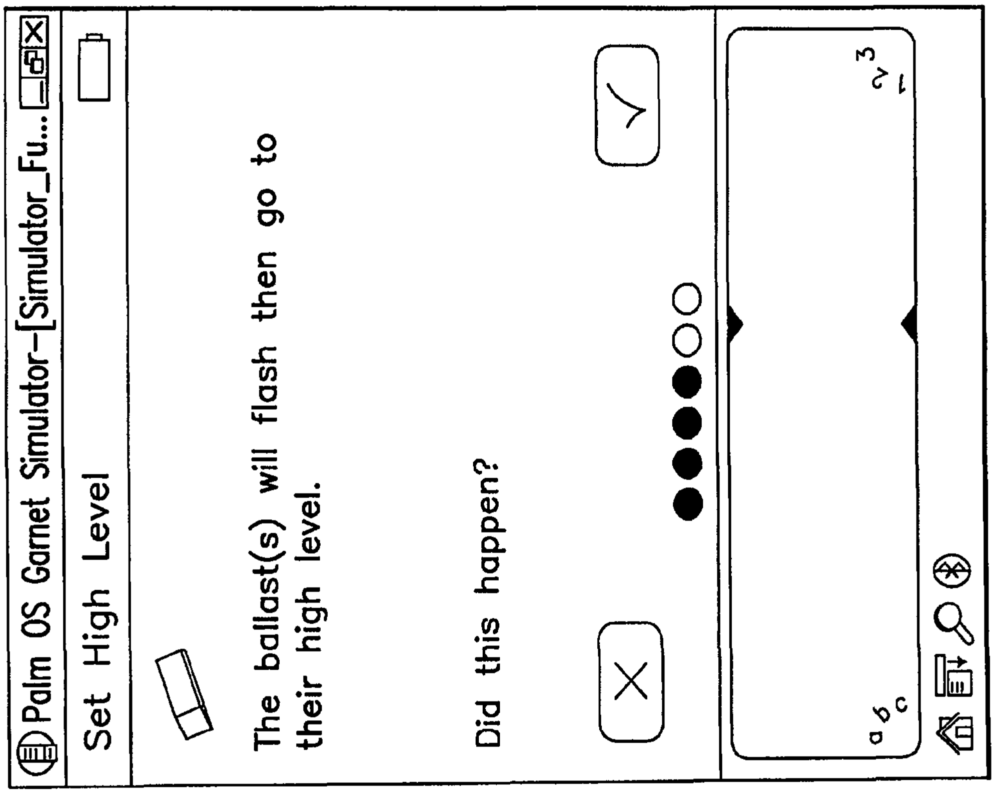
Figure 4J:
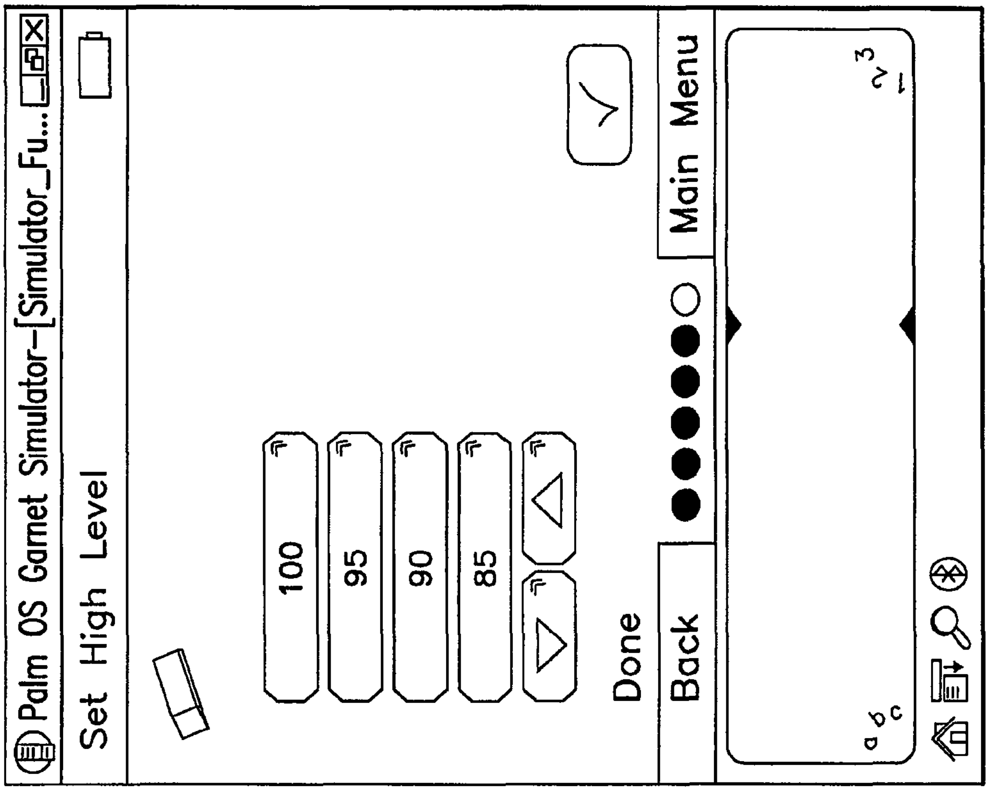
Figure 4K:
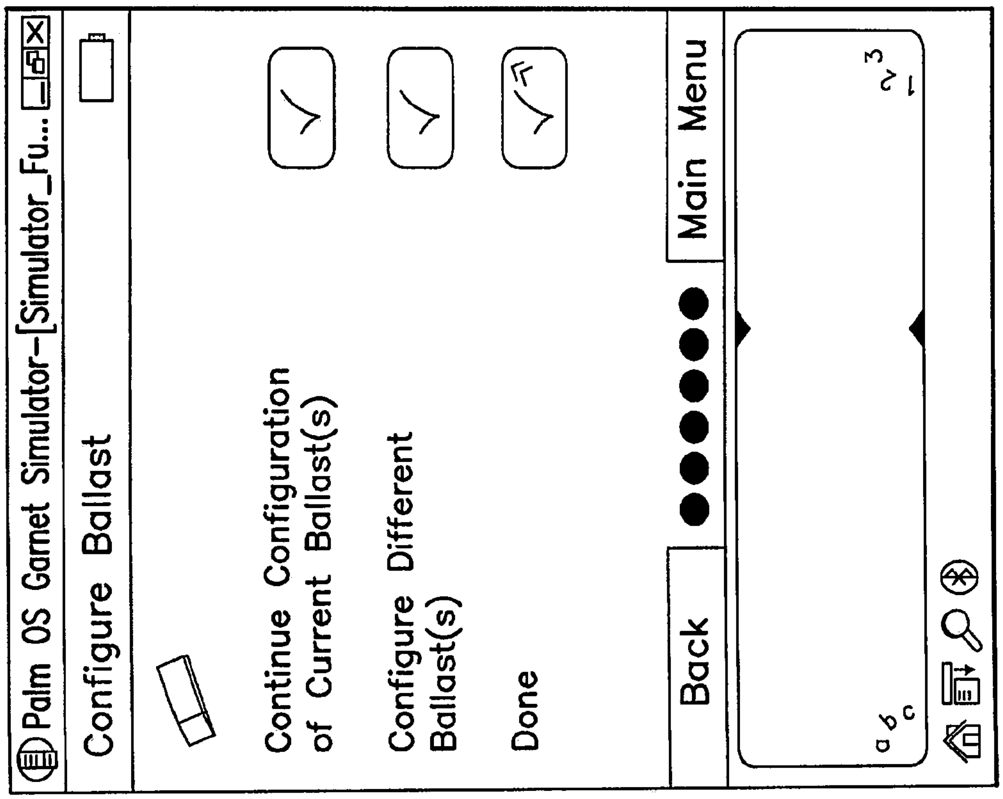
Figure 4L:
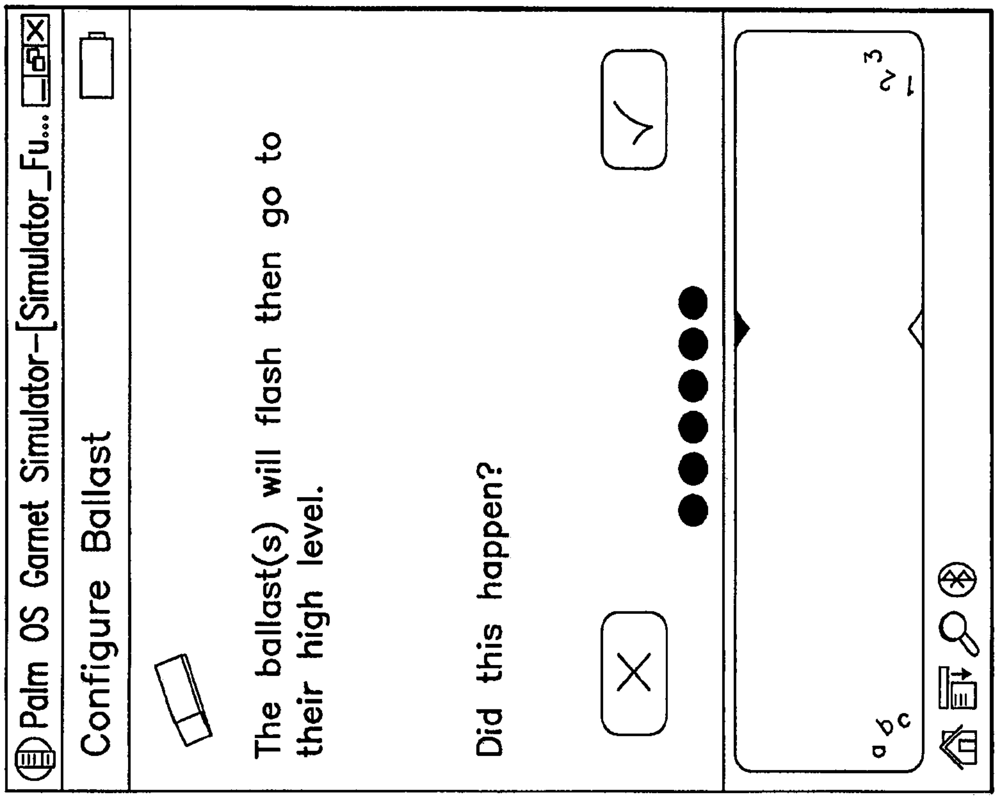

FIG. 4H is displayed when the user has selected (in FIG. 4G) an option to set a ballast 102 high level. FIG. 4H prompts the user to begin setting the high level trim for the selected ballast 102. Thereafter, FIG. 4I is displayed which enables the user to confirm that the ballast flashes, and then operates at a maximum intensity. The user then, in FIG. 4J selects a control to increase or decrease the output level of the selected ballast 102. When the user is satisfied with the level set for the high level, the user selects an icon (illustrated as a button comprising a checkmark) to select the occupied intensity level, and a display screen as shown in FIG. 4K is provided on handheld programming device 101 comprising controls to enable the user to complete setting the level, or to select another ballast 102. After making the selection in FIG. 4K, the user is prompted in FIG. 4L to confirm that the fixture associated with the ballast 102 flashes and then operates at its highest level. Thus, by interacting with the display screens on handheld programming device 101 and illustrated in the examples shown in FIGS. 4A-4L, a user can define respective high levels for a plurality of ballasts 102.

Figure 5A:
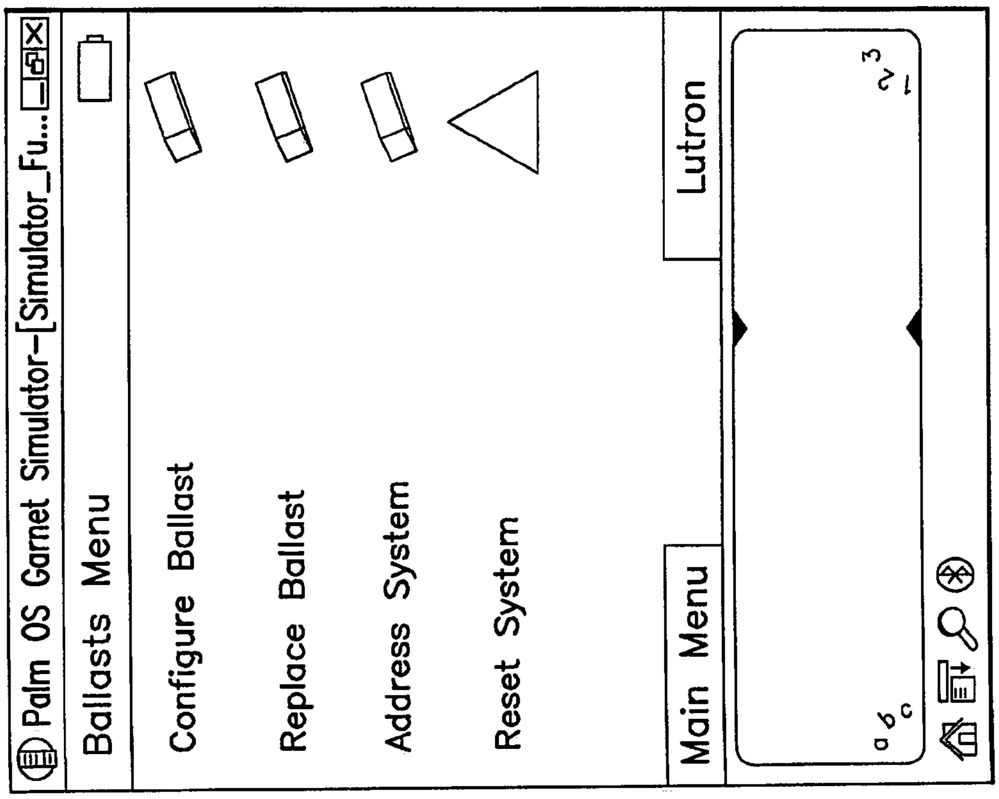
FIGS. 5A-5L illustrate example display screens provided on a handheld programming device for configuring a fade time for one or more ballasts.
Figure 5B:
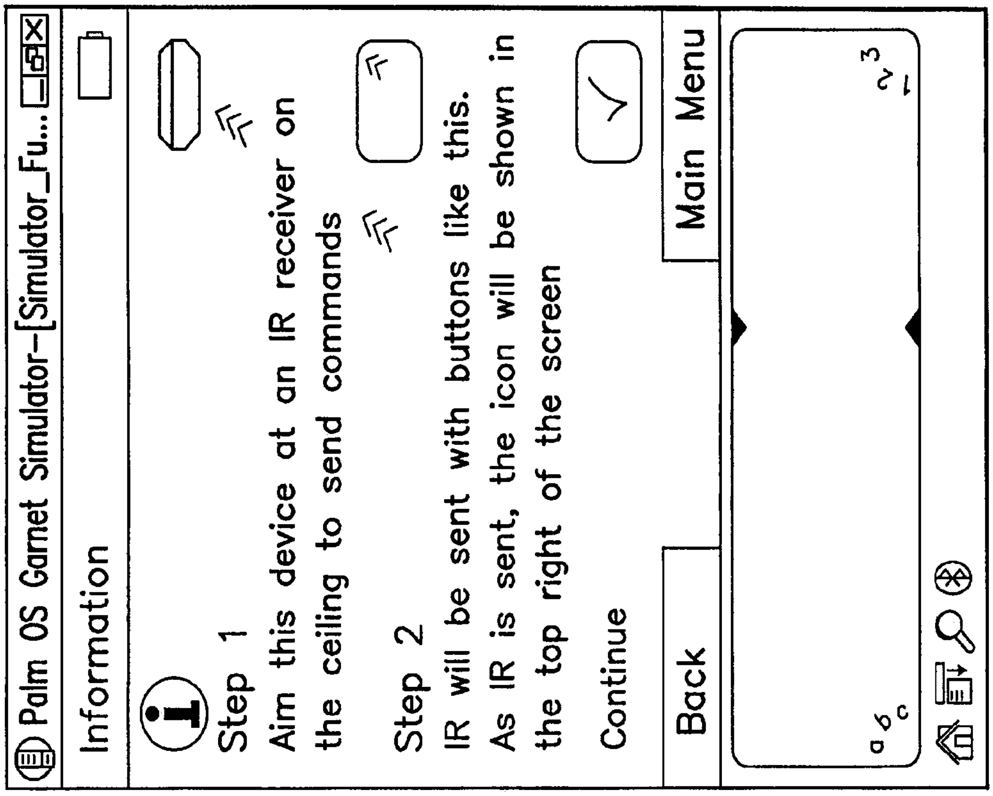
Figure 5C:
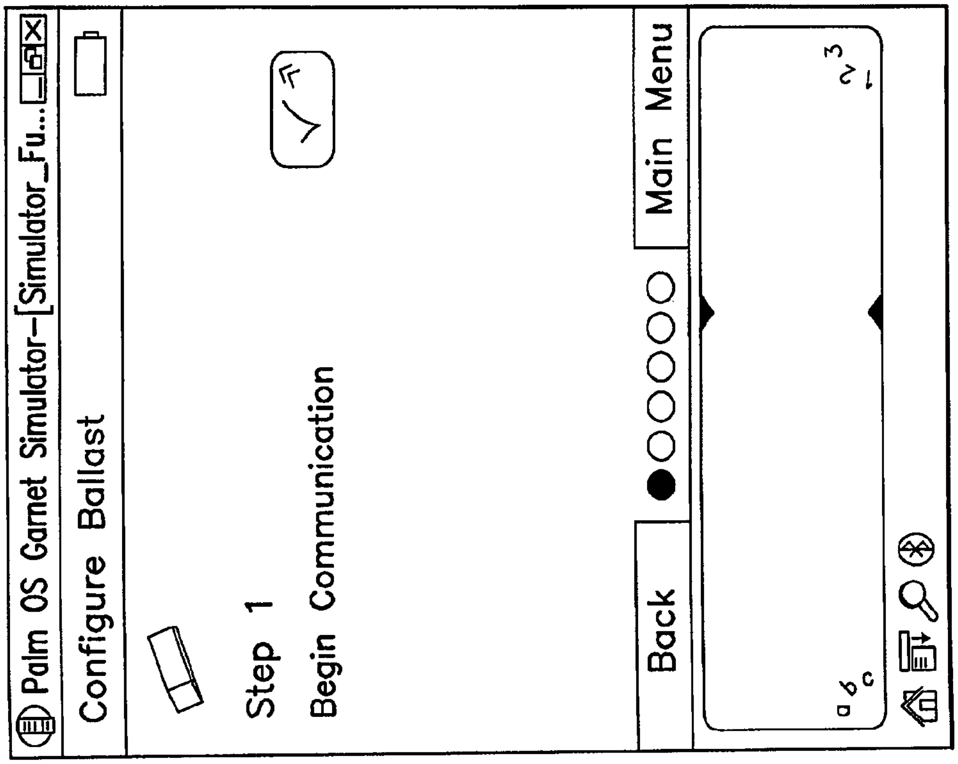
Figure 5D:
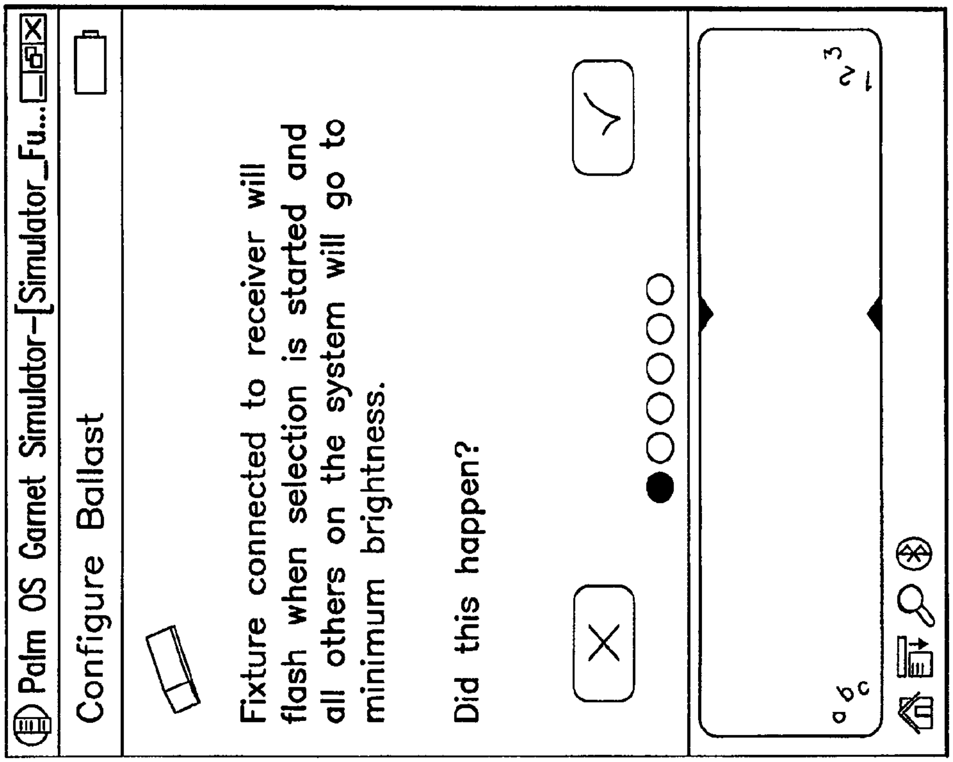
Figure 5E:
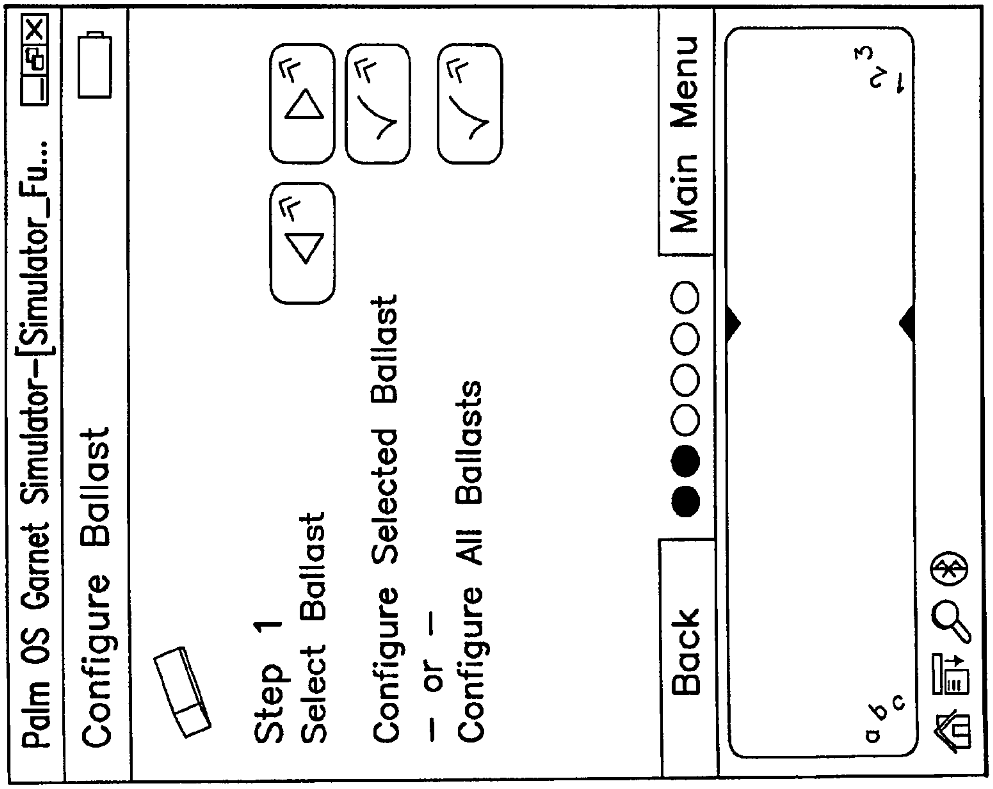
Figure 5F:
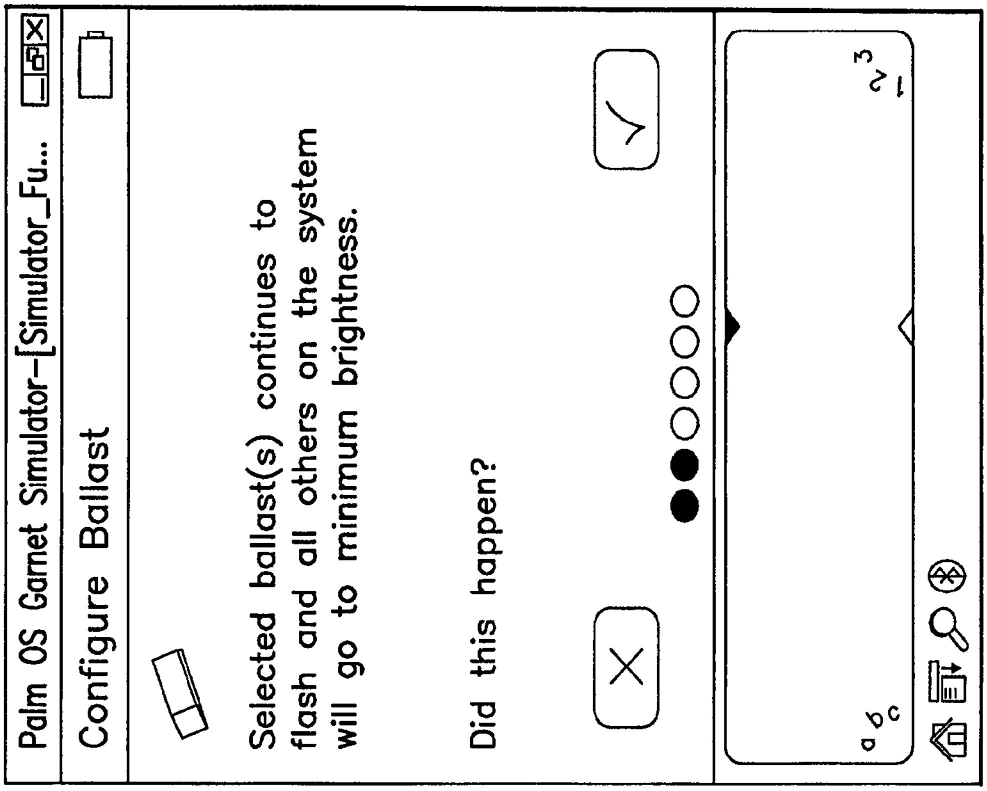
Figure 5G:
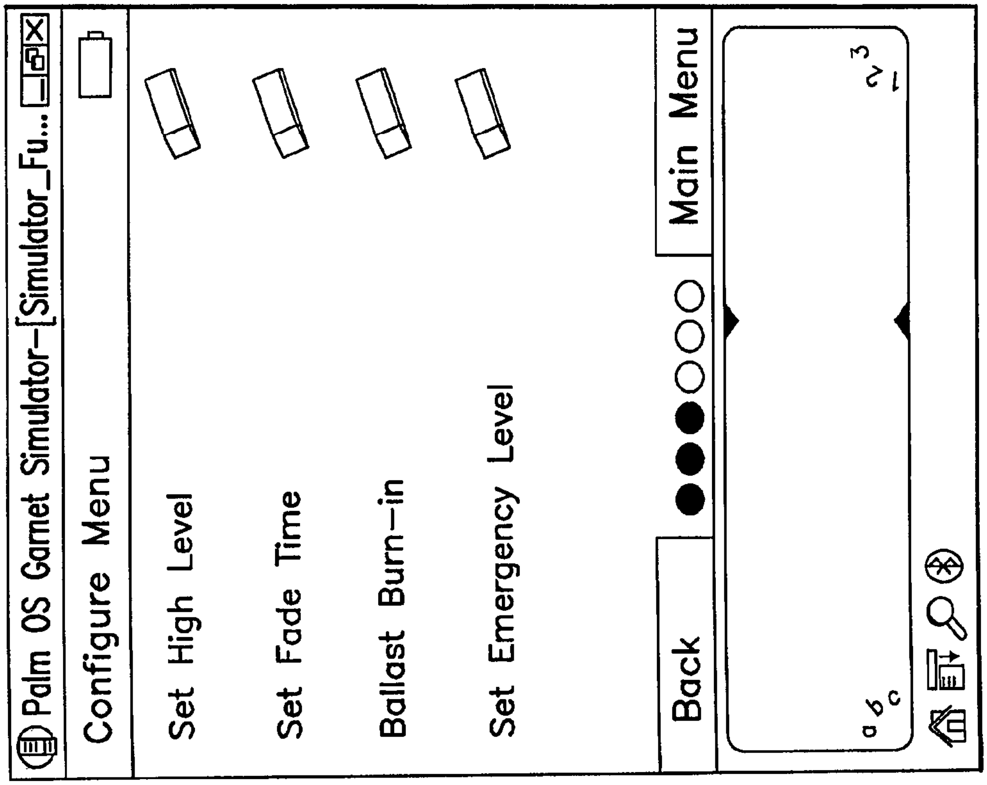

FIGS. 5A-5L illustrate example display screens provided on handheld programming device 101 for configuring a fade time for one or more ballasts 102. In FIG. 5A, a user selects an option to configure a ballast 102. In FIG. 5B, the user is prompted to aim handheld programming device at an IR receiver 104 and select an icon, formatted as a button comprising a checkmark, to continue, and in FIG. 5C, the user is prompted to begin communicating over ballast link 116. After the user selects the icon, FIG. 5D is displayed to prompt the user to confirm that all of the fixtures on ballast link 116 are operating at minimum brightness, and a fixture associated with the ballast 102 is flashing. In FIG. 5E, handheld programming device 101 displays controls for the user to select a different ballast 102 on ballast link 116. The user preferably configures the respective ballast 102 that is selected in FIG. 5E. The user, in FIG. 5F is prompted to confirm (by selecting an icon) that a fixture associated with the respective ballast 102 selected in FIG. 5E is flashing and all other fixtures are operating at minimum brightness. If the user indicates that this has occurred, then FIG. 5G is displayed and the user is prompted to select an option for setting a high level, a fade time, a ballast burn-in or an emergency level.

Figure 5H:
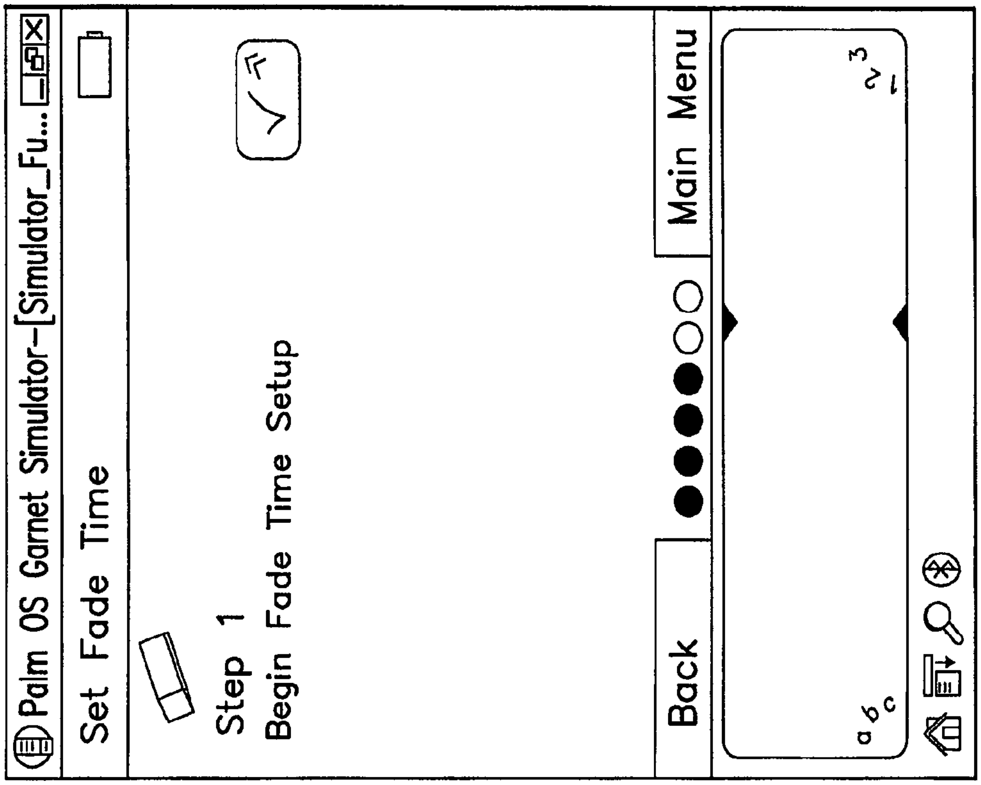
Figure 5J:
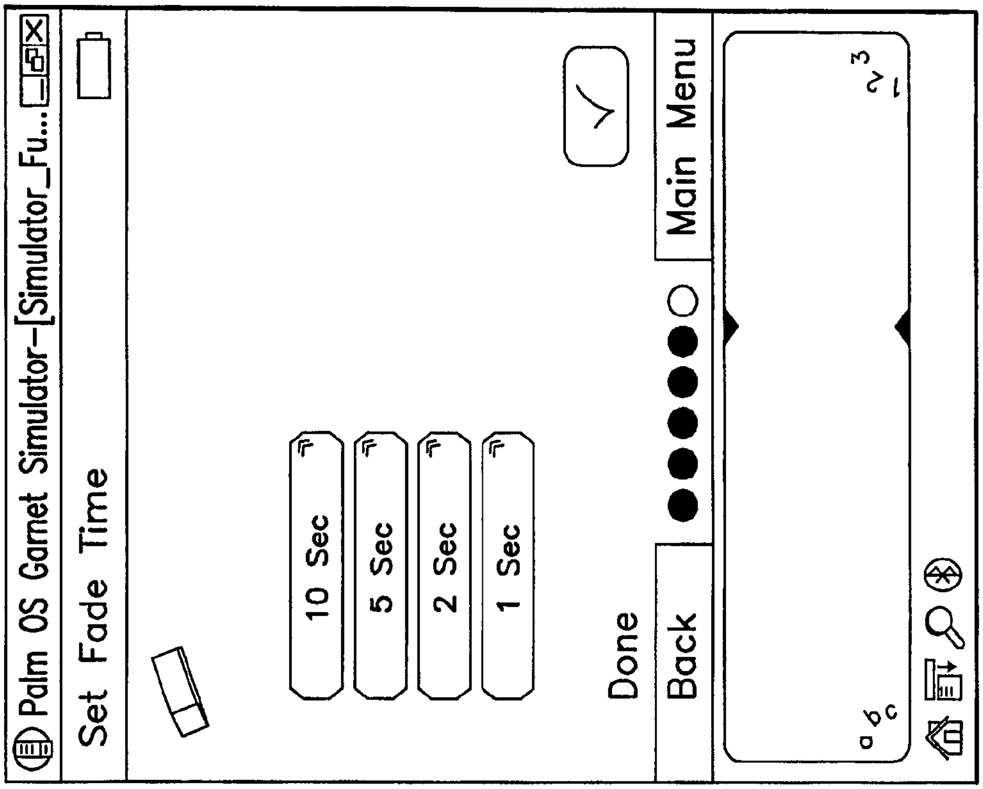
Figure 5I:
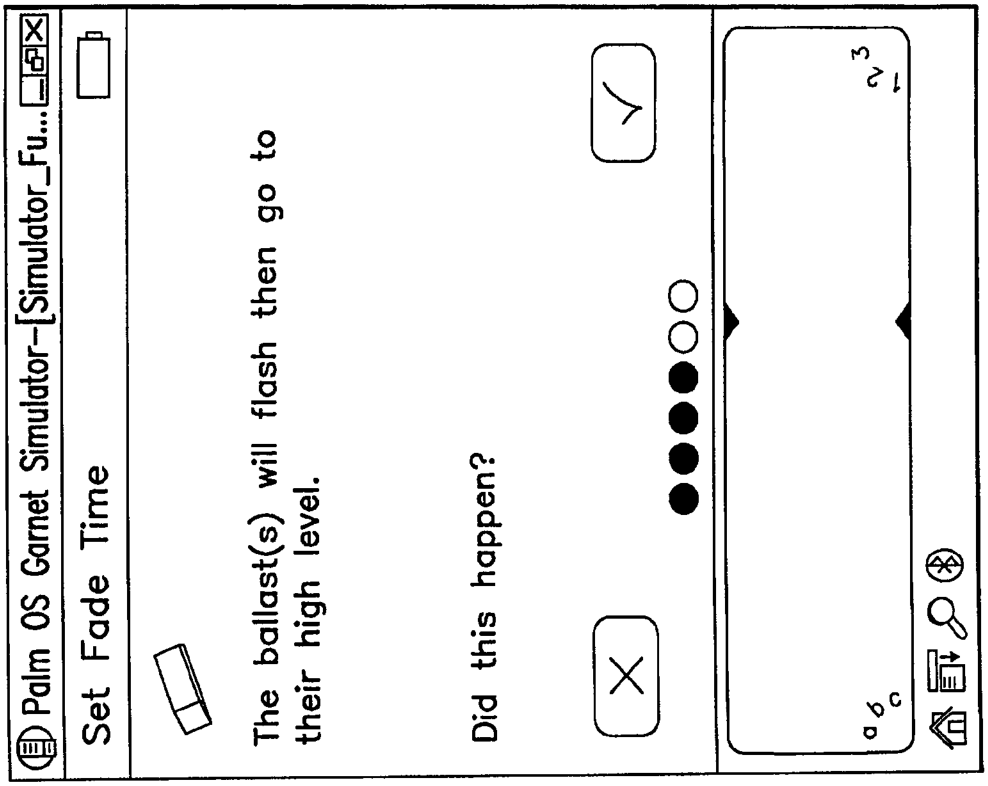
Figure 5K:
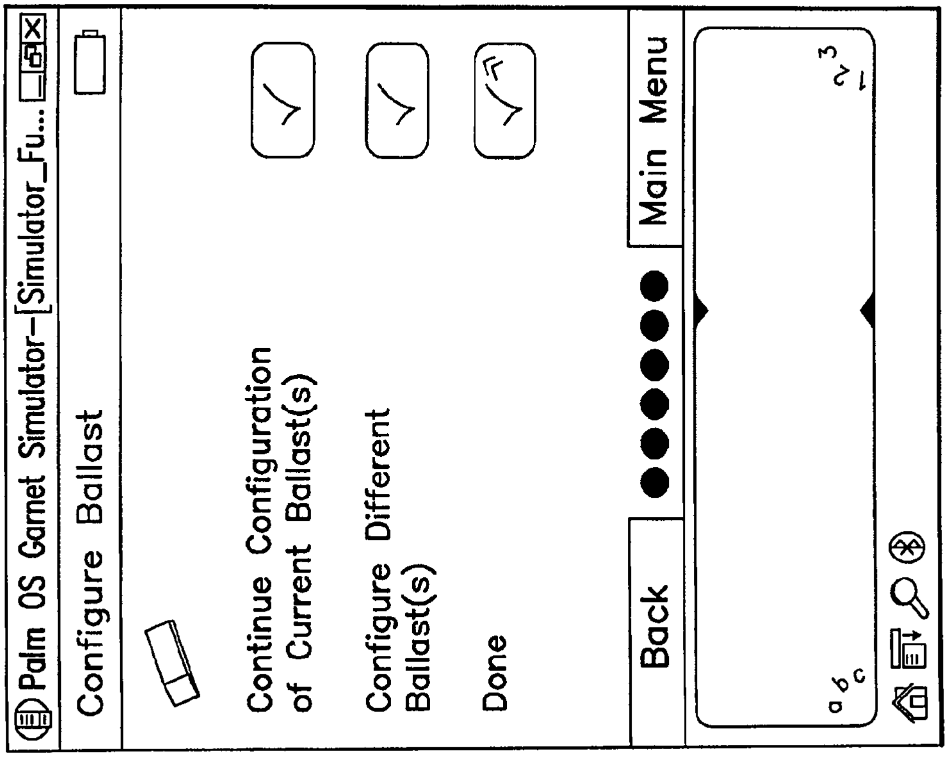
Figure 5L:
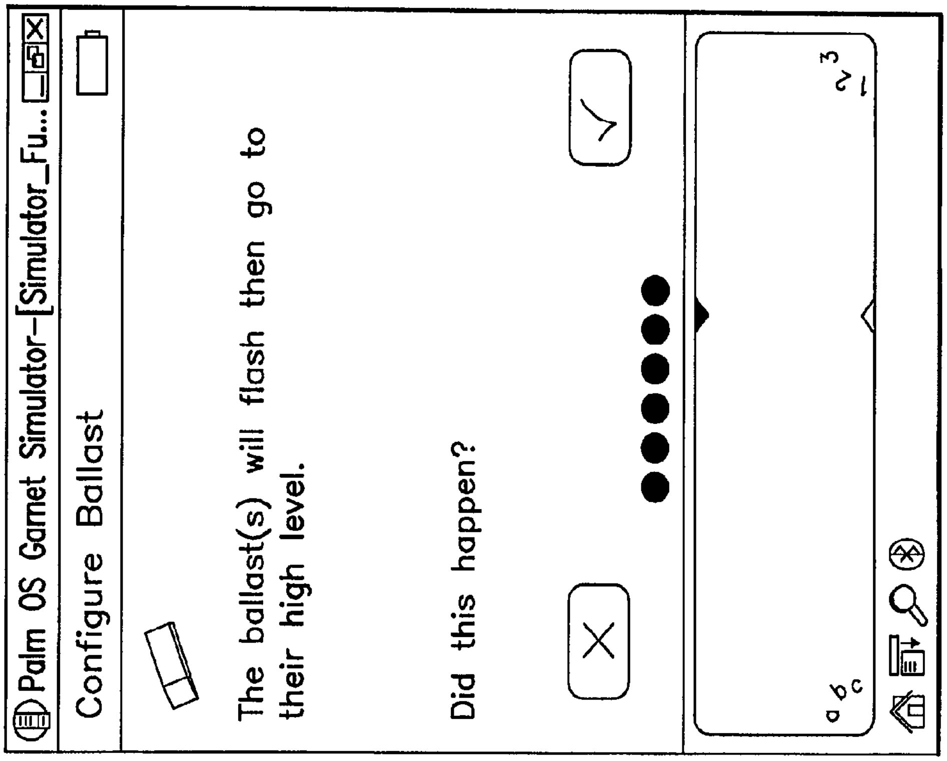

FIG. 5H is displayed when the user has selected (in FIG. 5G) an option to set a ballast 102 fade time. FIG. 5H prompts the user to begin setting the fade time for the selected ballast 102. Thereafter, FIG. 5I is displayed which enables the user to confirm that the ballast 102 flashes, and then operates at a predefined high level. The user then, in FIG. 5J selects a control to increase or decrease the value for a fade time (e.g., ten seconds, five seconds, two seconds or one second). When the user is satisfied with the fade time selection, the user selects an icon (illustrated as a button comprising a checkmark) to select the fade time, and a display screen as shown in FIG. 5K is provided on handheld programming device 101 comprising controls to enable the user to complete setting the fade time, or to select another ballast 102. After making the selection in FIG. 5K, the user is prompted in FIG. 5L to confirm that the fixture associated with the ballast 102 flashes and then operates at its high level. Thus, by interacting with the display screens on handheld programming device 101 and illustrated in the examples shown in FIGS. 5A-5L, a user can define respective fade times for a plurality of ballasts 102.

Figure 6B:
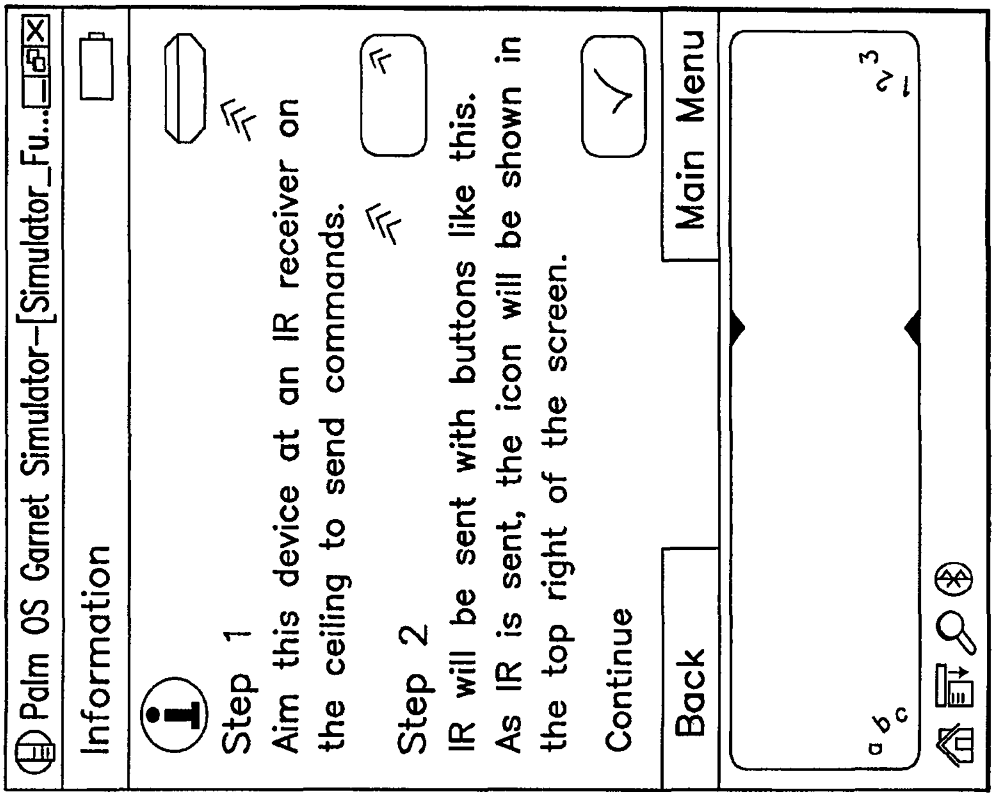
FIGS. 6A-6K illustrate example display screens provided on a handheld programming device for configuring a burn-in process state for one or more ballasts.
Figure 6A:
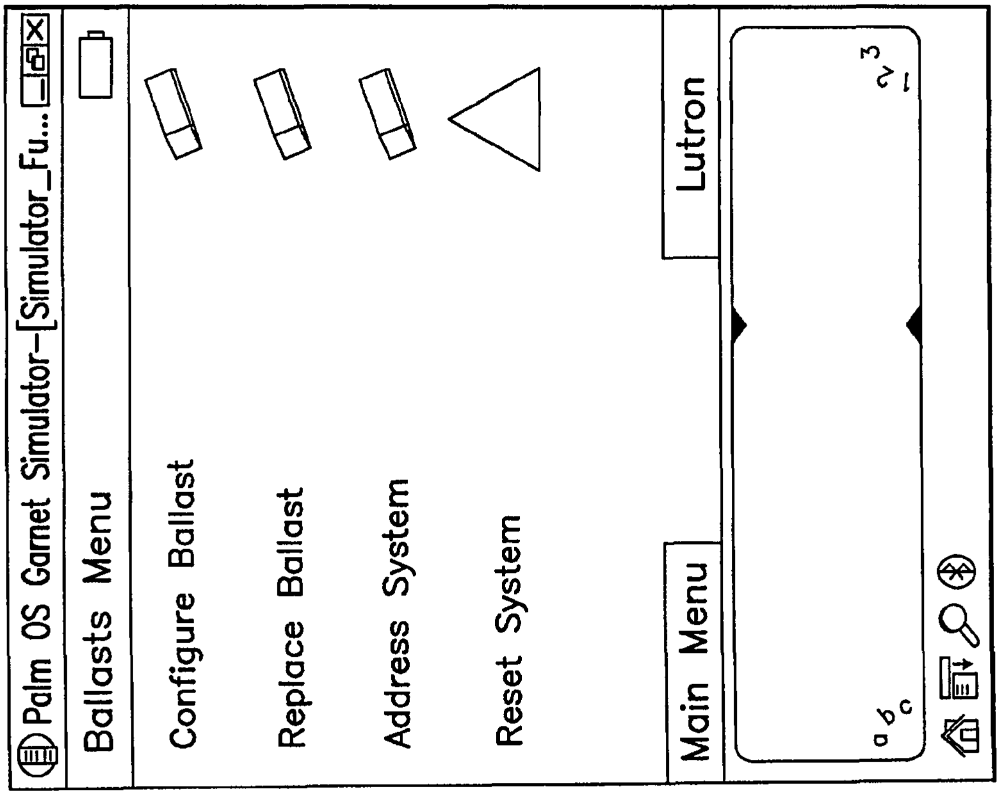
Figure 6C:
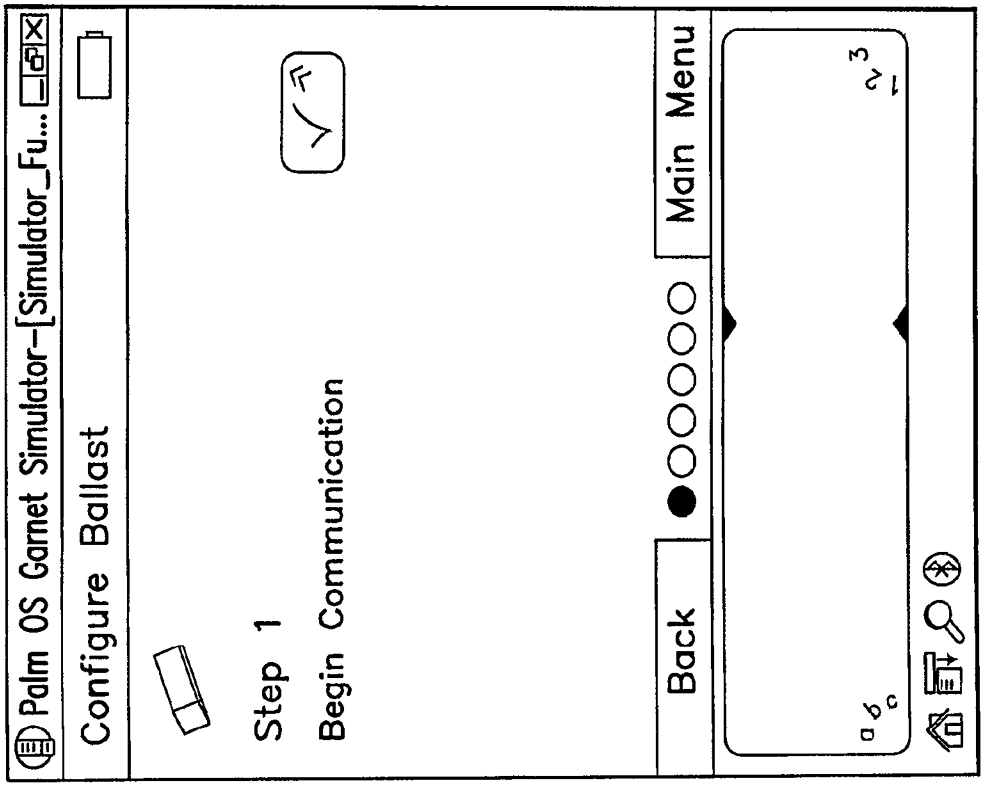
Figure 6D:
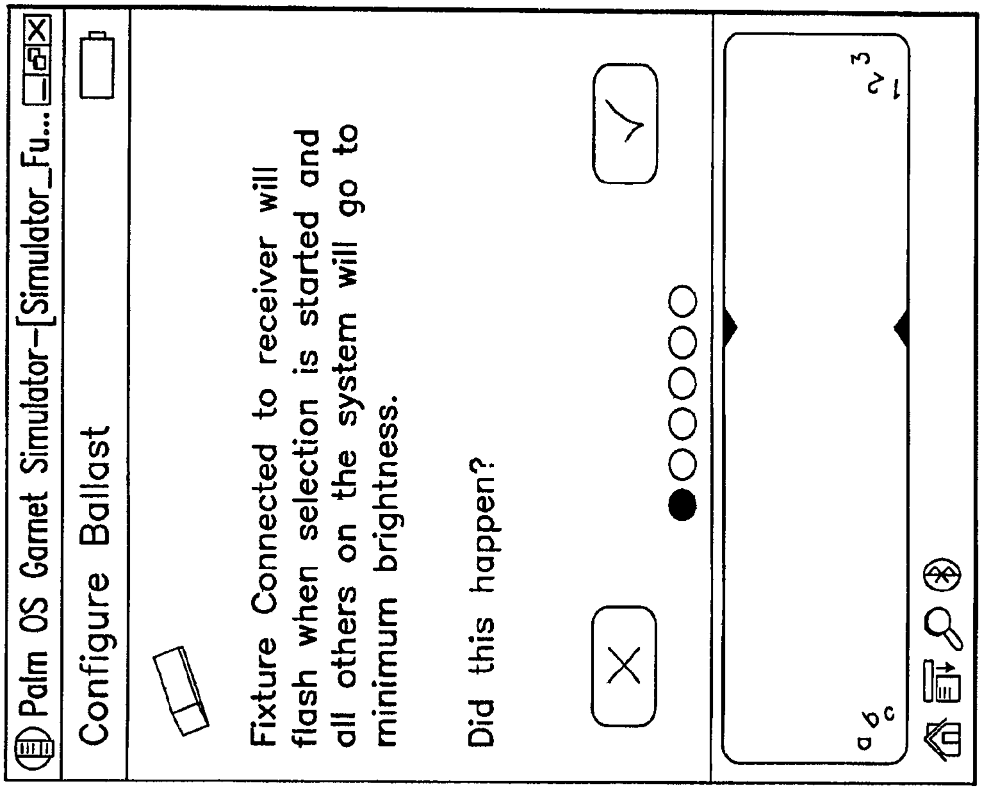

FIGS. 6A-6K illustrate example display screens provided on handheld programming device 101 for configuring a burn-in process state for one or more ballasts 102. In FIG. 6A, a user selects an option to configure a ballast 102. In FIG. 6B, the user is prompted to aim handheld programming device at an IR receiver 104 and select an icon, formatted as a button comprising a checkmark, to continue, and in FIG. 6C, the user is prompted to begin communicating over ballast link 116. After the user selects the icon, FIG. 6D is displayed to prompt the user to confirm that all of the fixtures on ballast link 116 are operating at minimum brightness, and a fixture associated with the IR receiver 104 is flashing.

Figure 6E:
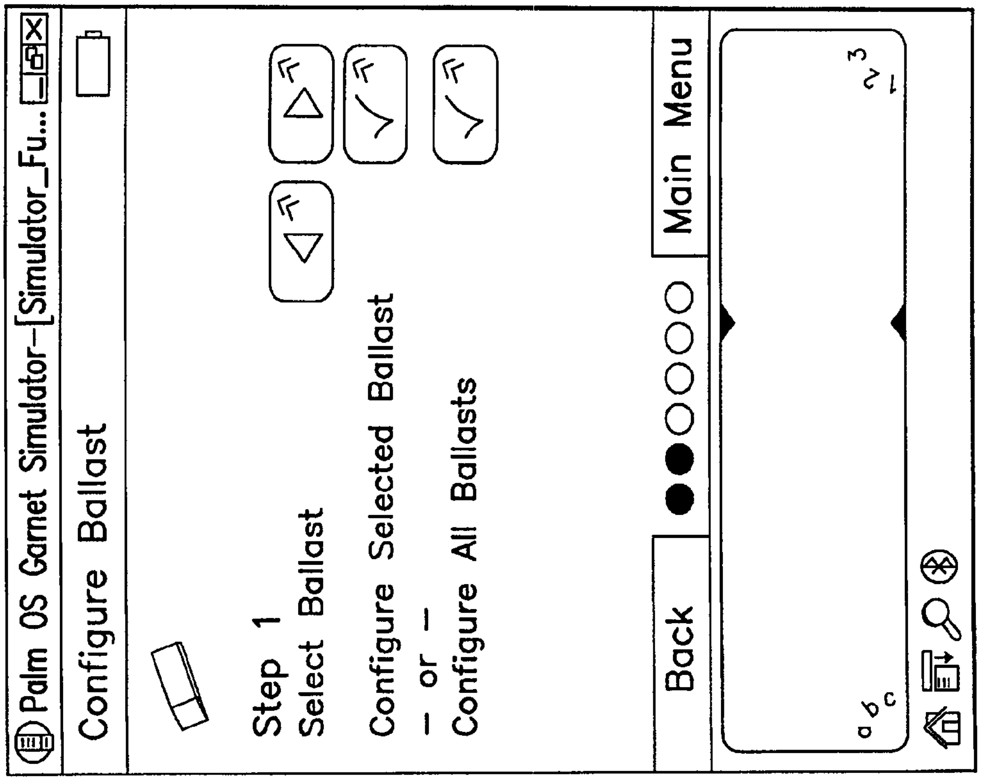
Figure 6F:
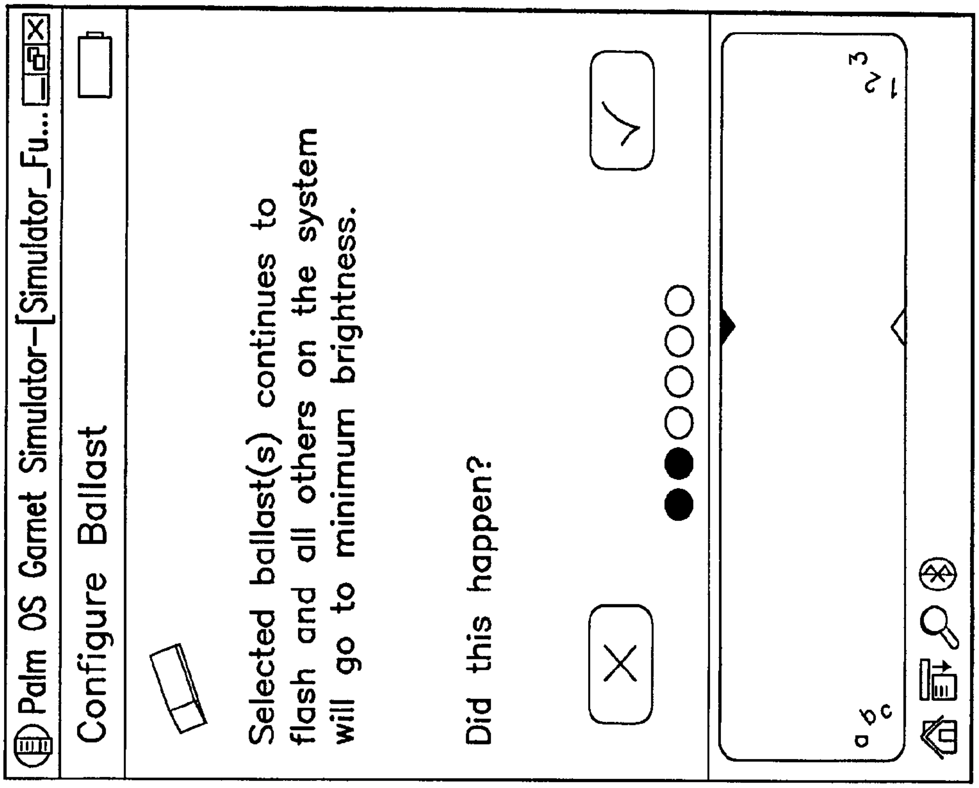
Figure 6G:
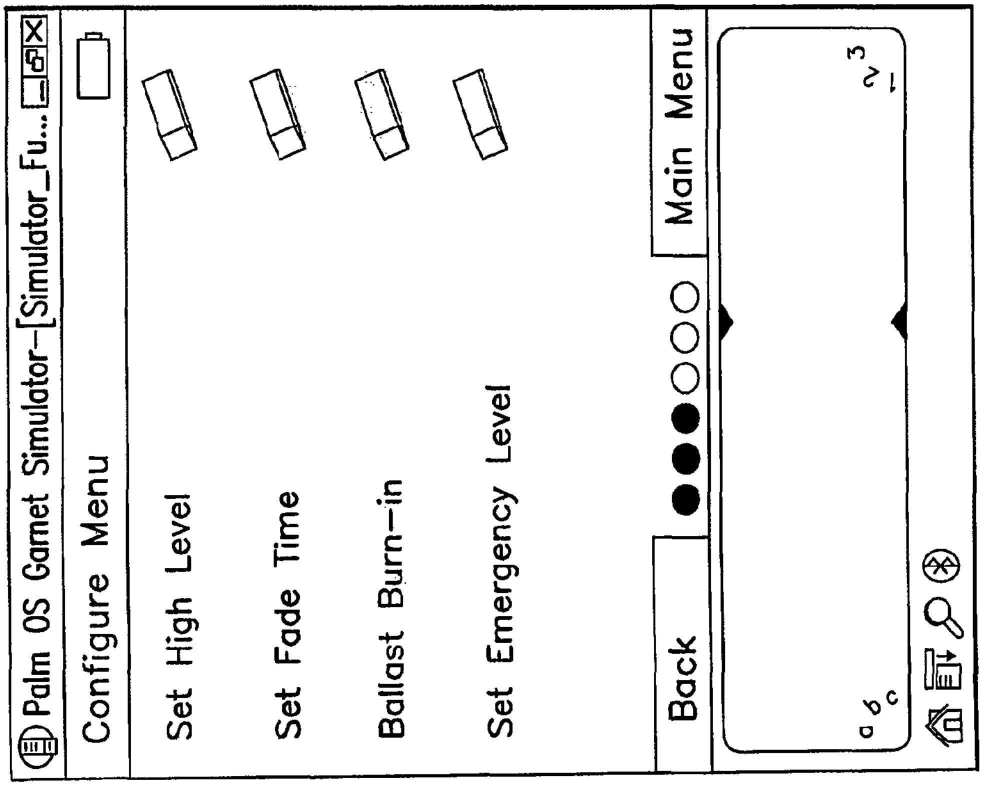

In FIG. 6E, handheld programming device 101 displays controls for the user to select a ballast 102 on ballast link 116. To select a specific ballast 102 to configure, the user presses the previous (left arrow) and next (right arrow) buttons until the lamp associated with the desired ballast begins flashing. The user then presses the "Configure Selected Ballast" button to select the desired ballast for configuring. Alternatively, the user may press the "Configure All Ballasts" button to select all of the ballasts connected to the ballast link for configuring. The user preferably configures the respective ballast 102 that is selected in FIG. 6E. The user, in FIG. 6F is prompted to confirm (by selecting an icon) that a fixture associated with the respective ballast 102 selected in FIG. 6E is flashing and all other fixtures are operating at minimum brightness. If the user indicates that this has occurred, then FIG. 6G is displayed and the user is prompted to select an option for setting a high level, a fade time, a ballast burn-in or an emergency level.

Figure 6H:
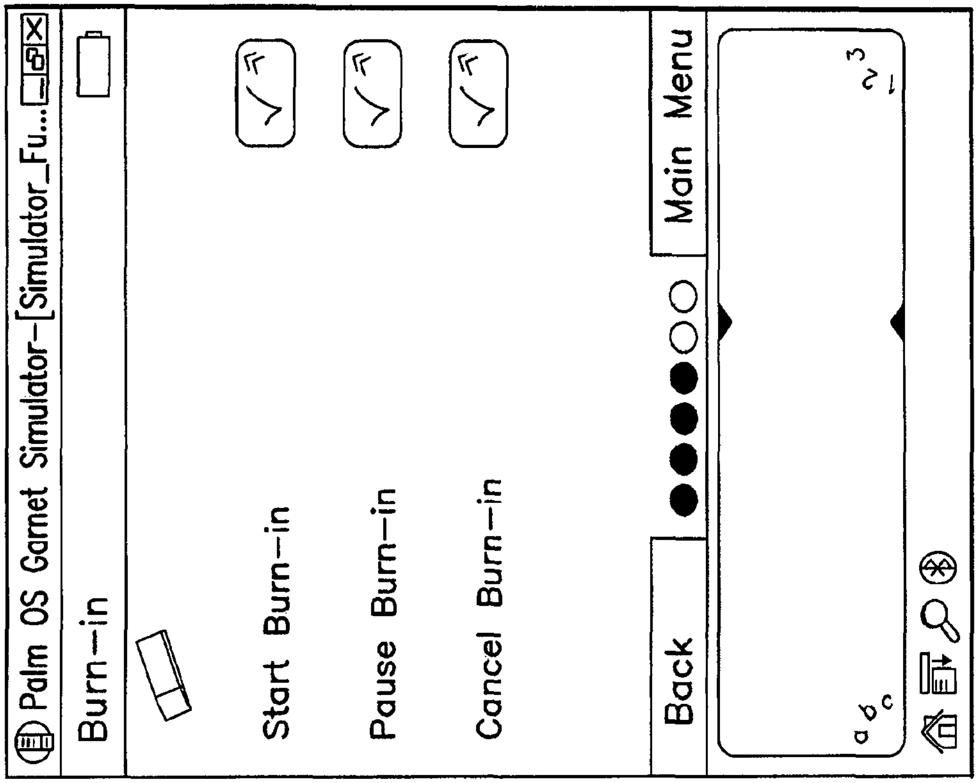
Figure 6J:
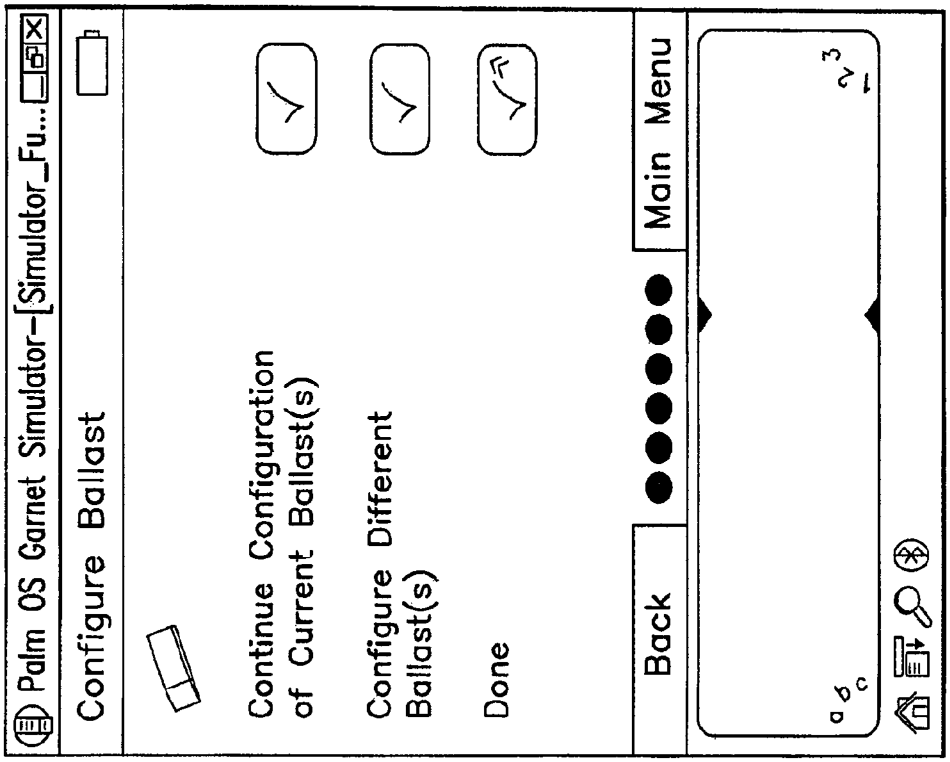
Figure 6I:
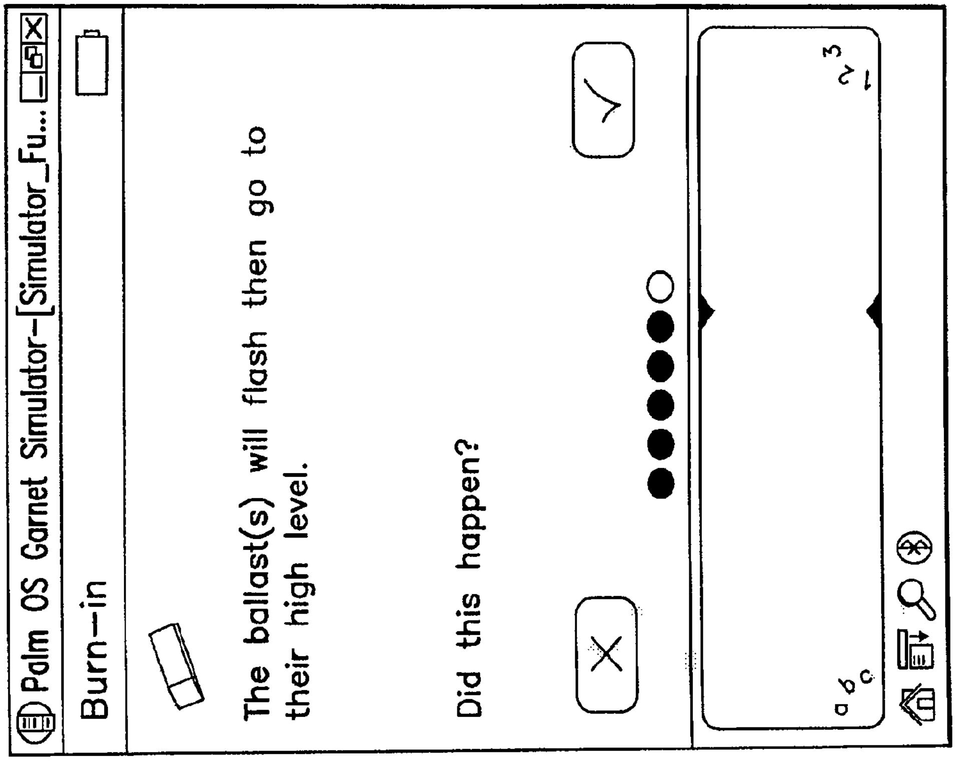
Figure 6K:
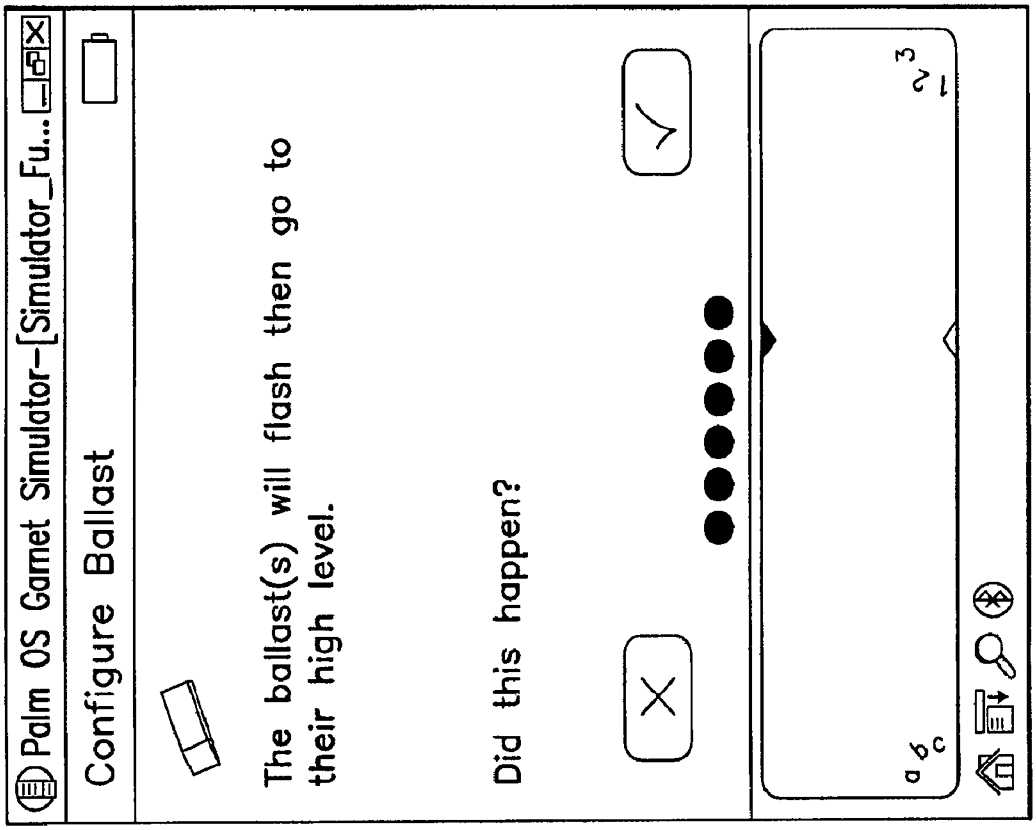

FIG. 6H is displayed when the user has selected (in FIG. 6G) an option to set the ballast 102 burn-in state. After selecting to the ballast burn-in state (i.e., to start the burn-in process, pause the burn-in process, or cancel the burn-in process), FIG. 6I is displayed which enables the user to confirm that the selected ballast 102 flashes, and then operates at a predefined high level. If so, FIG. 6J is provided on handheld programming device 101 comprising controls to enable the user to complete the burn-in process, or to select another ballast 102. After making the selection in FIG. 6J, the user is prompted in FIG. 6K to confirm that the fixture associated with the ballast 102 flashes and then operates at its high level. Thus, by interacting with the display screens on handheld programming device 101 illustrated in the examples shown in FIGS. 6A-6K, a user can define respective burn-in states for a plurality of ballasts 102.

Figure 7A:
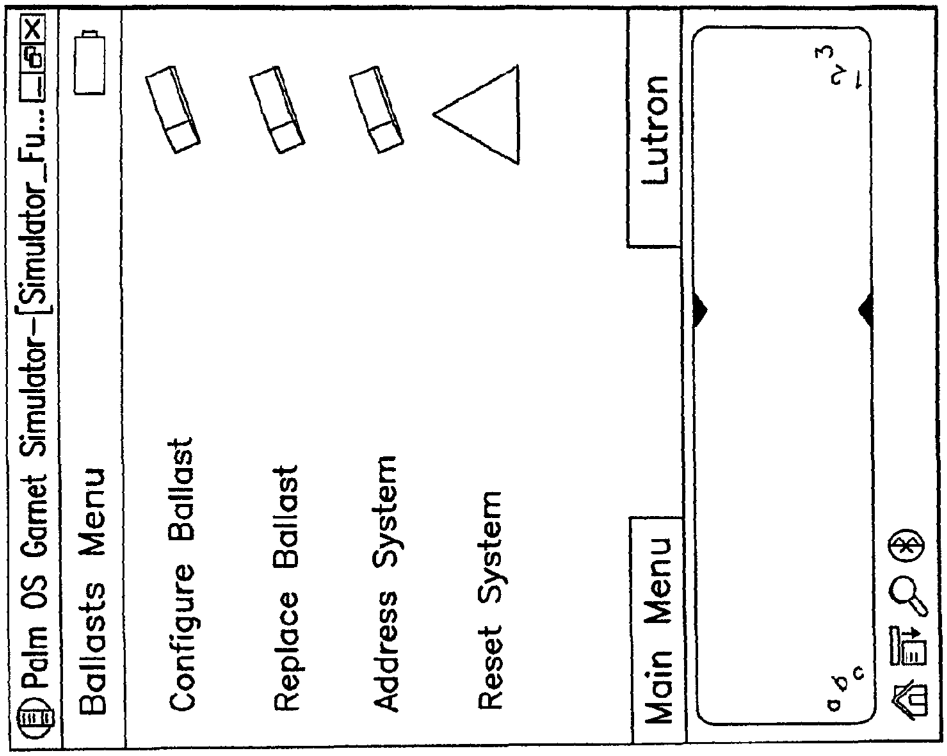
FIGS. 7A-7L illustrate example display screens provided on a handheld programming device for configuring a level for one or more ballasts to operate at during an emergency condition.
Figure 7B:
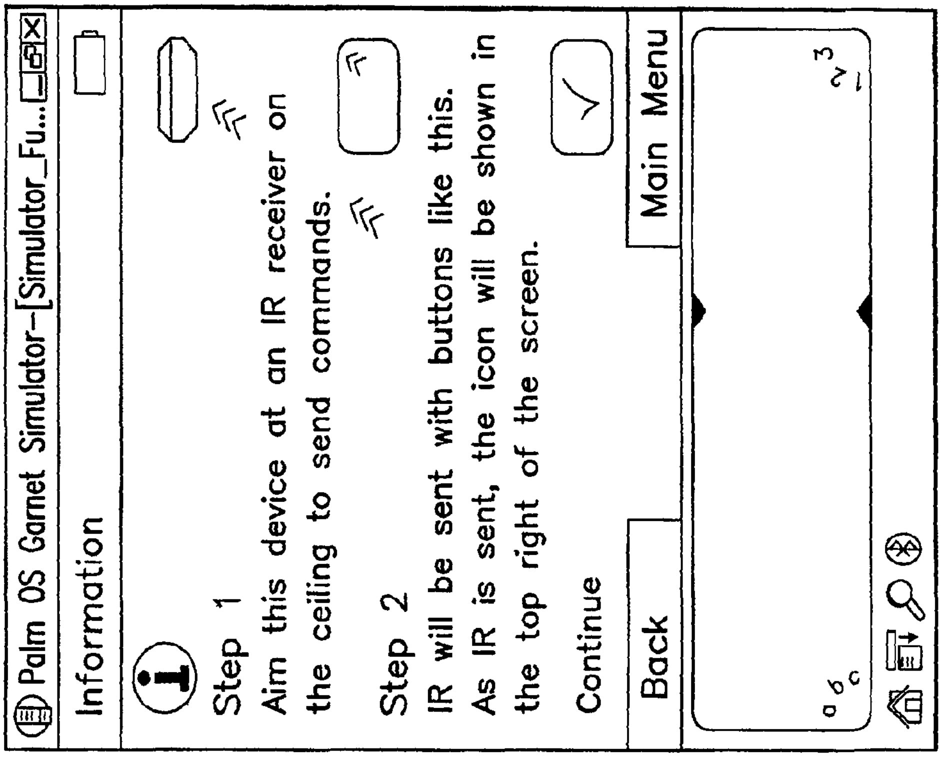
Figure 7C:
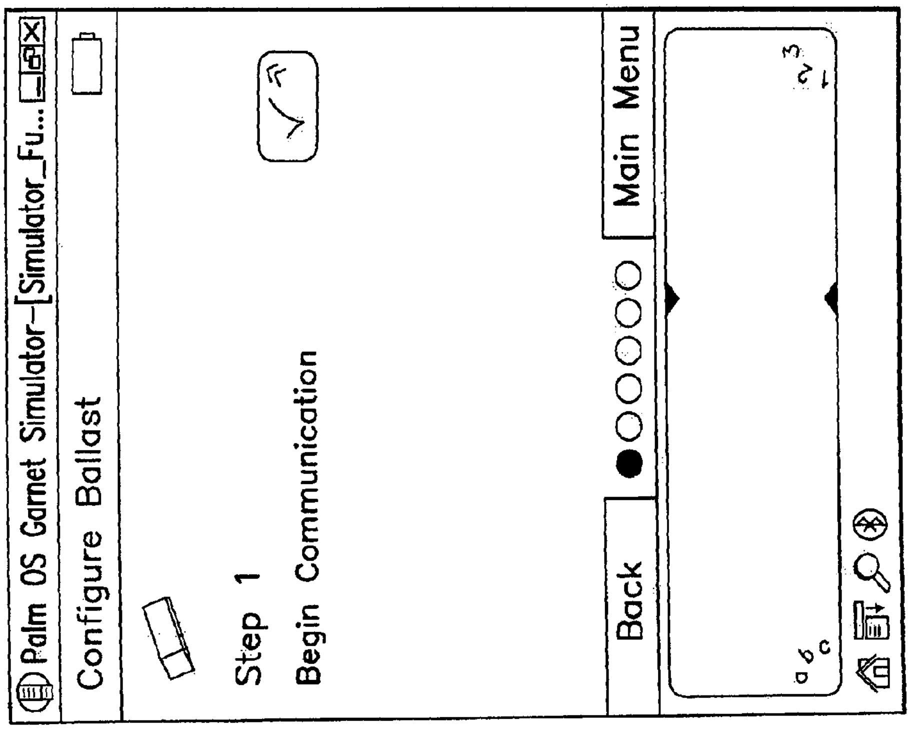
Figure 7D:
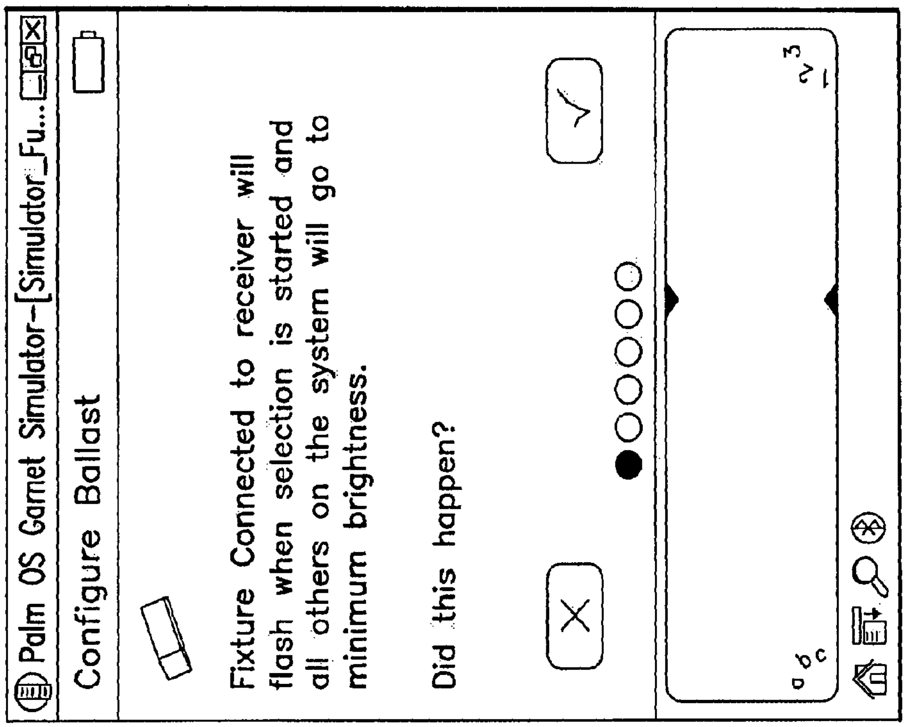
Figure 7F:
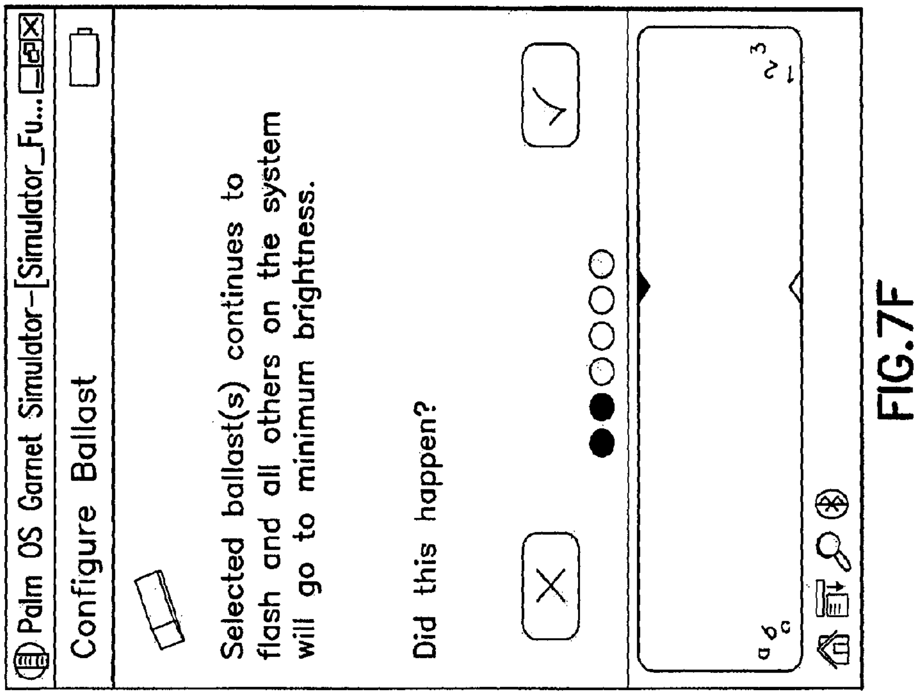
Figure 7E:
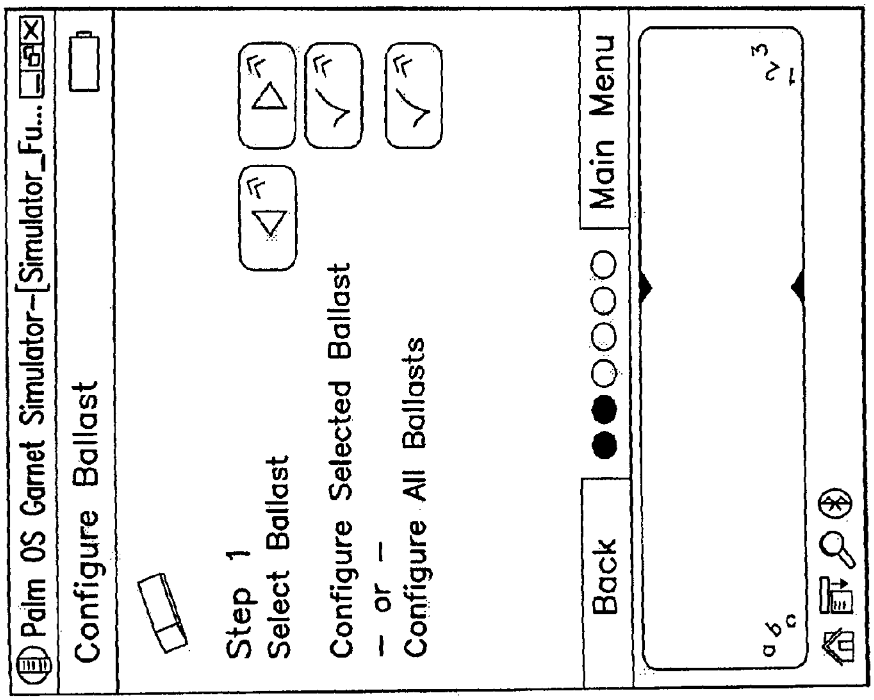
Figure 7G:
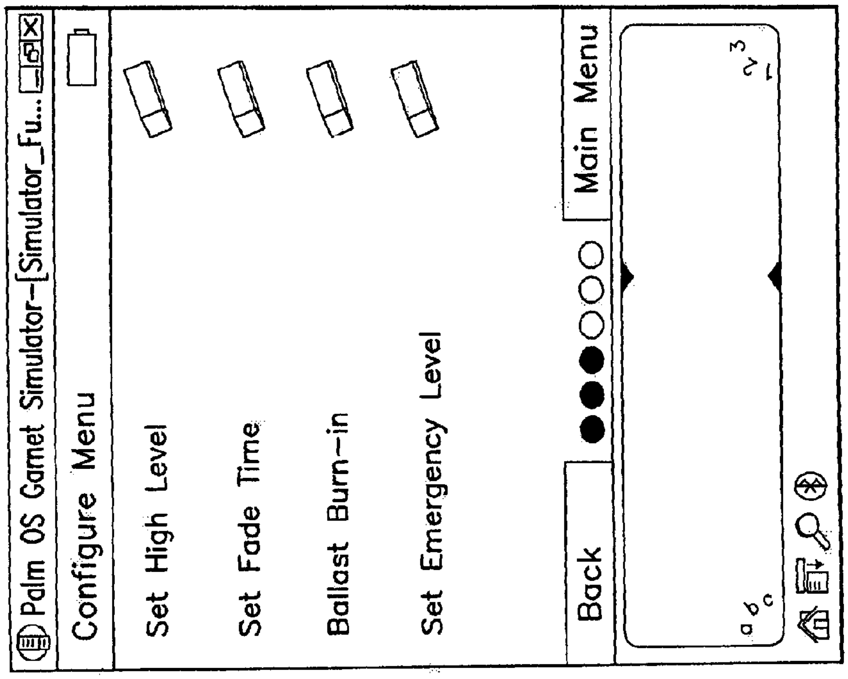

FIGS. 7A-7L illustrate example display screens provided on handheld programming device 101 for configuring a level for one or more ballasts 102 to operate at during an emergency condition. In FIG. 7A, a user selects an option to configure a ballast 102. In FIG. 7B, the user is prompted to aim handheld programming device at an IR receiver 104 and select an icon, formatted as a button comprising a checkmark, to continue, and in FIG. 7C, the user is prompted to begin communicating over ballast link 116. After the user selects the icon, FIG. 7D is displayed to prompt the user to confirm that all of the fixtures on ballast link 116 are operating at minimum brightness, and a fixture associated with the ballast 102 is flashing. In FIG. 7E, handheld programming device 101 displays controls for the user to select a different ballast 102 on ballast link 116. The user preferably configures the respective ballast 102 that is selected in FIG. 7E. The user, in FIG. 7F is prompted to confirm (by selecting an icon) that a fixture associated with the respective ballast 102 selected in FIG. 7E is flashing and all other fixtures are operating at minimum brightness. If the user indicates that this has occurred, then FIG. 7G is displayed and the user is prompted to select an option for setting a high level, a fade time, a ballast burn-in or an emergency level.

Figure 7H:
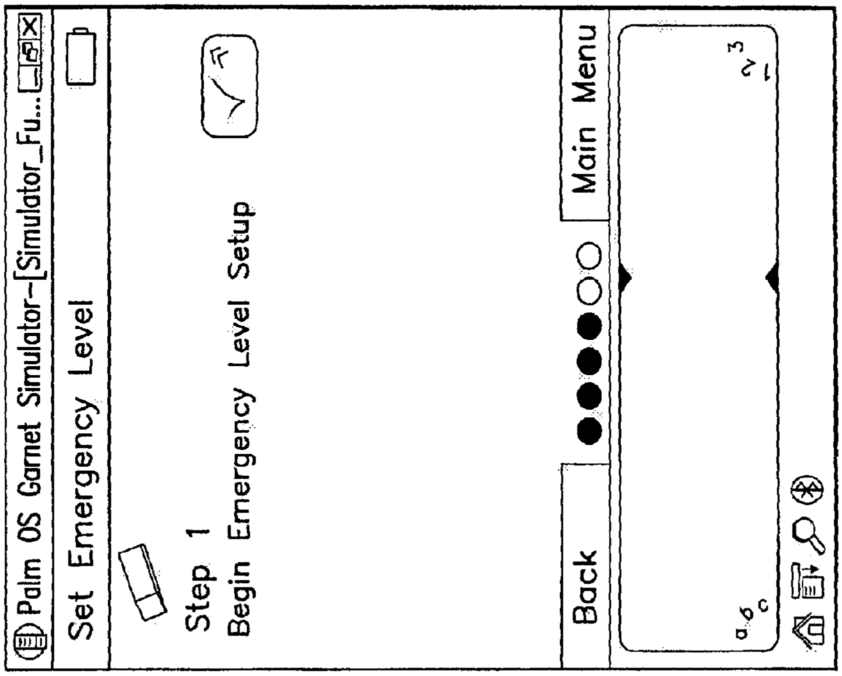
Figure 7J:
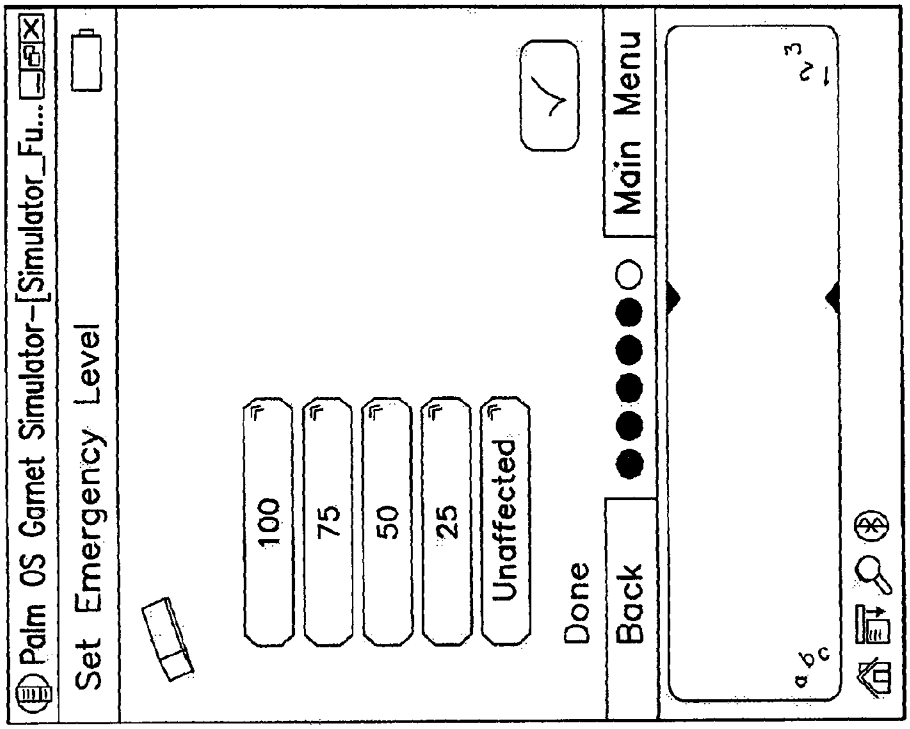
Figure 7I:
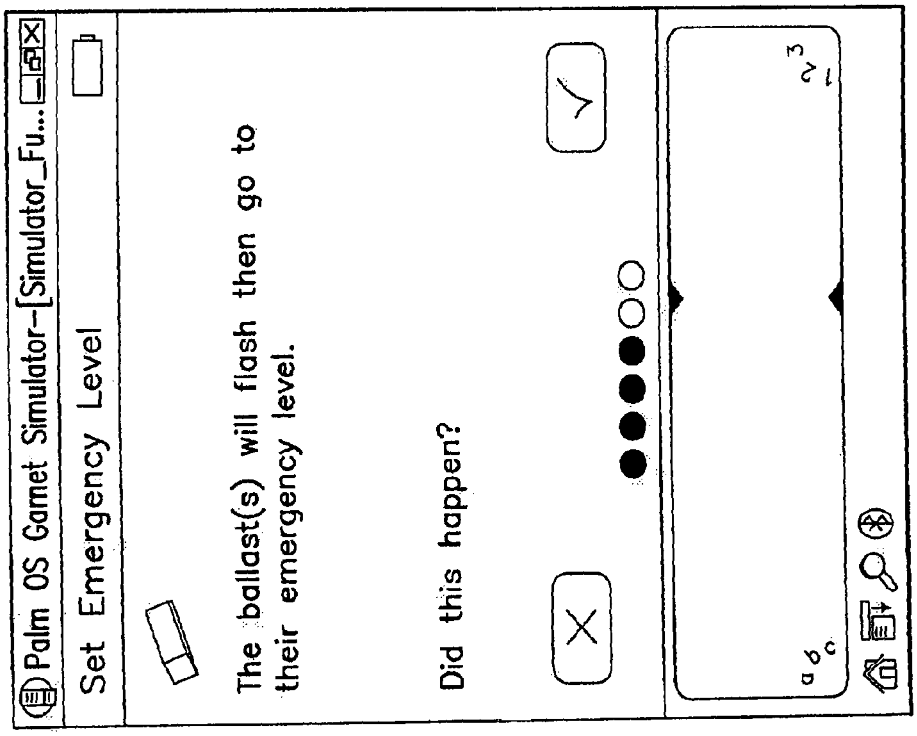
Figure 7K:
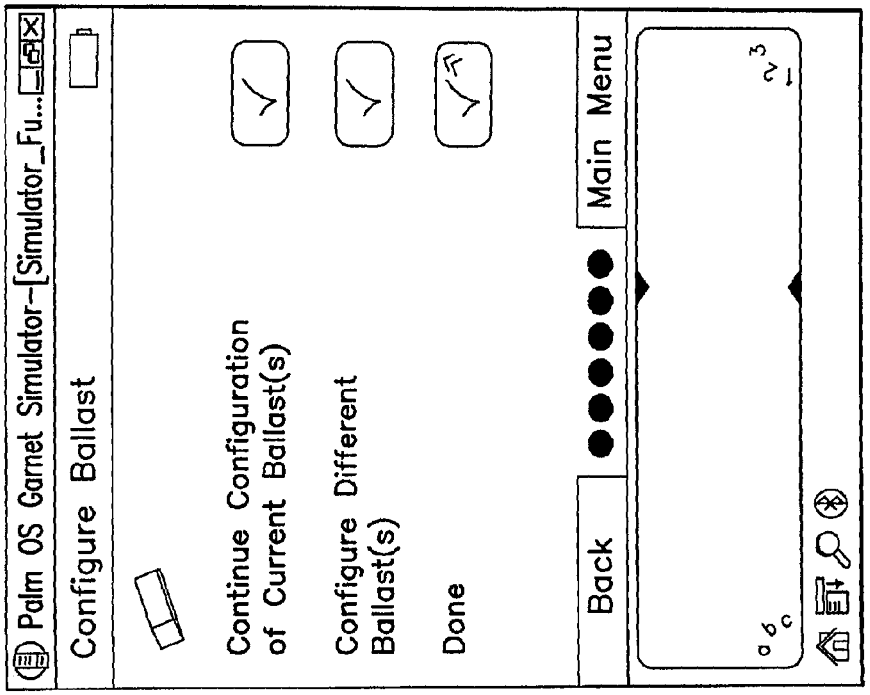
Figure 7L:
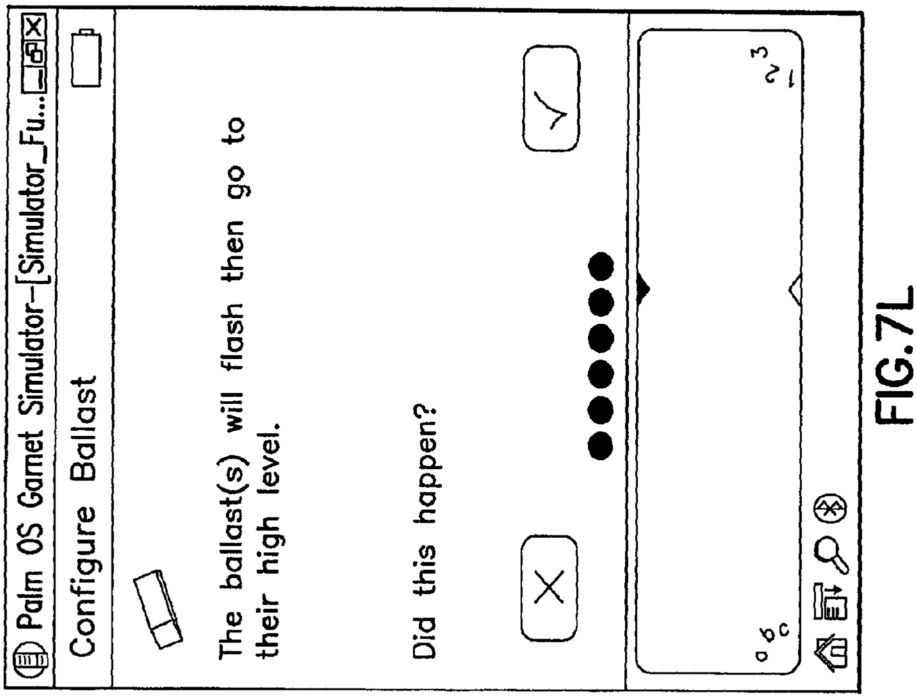

FIG. 7H is displayed when the user has selected (in FIG. 7G) an option to set an emergency level. FIG. 7H prompts the user to begin setting the emergency level for the selected ballast 102. Thereafter, FIG. 7I is displayed which enables the user to confirm that the ballast 102 flashes, and then operates at a predefined emergency level. The user then, in FIG. 7J selects a control to increase or decrease the value for the intensity level of the ballast 102 (e.g., 100, 75, 50, 25 or unaffected). When the user is satisfied with the emergency level selection, the user selects an icon (illustrated as a button comprising a checkmark) to select the emergency level, and a display screen as shown in FIG. 7K is provided on handheld programming device 101 comprising controls to enable the user to complete setting the emergency level, or to select another ballast 102. After making the selection in FIG. 7K, the user is prompted in FIG. 7L to confirm that the fixture associated with the ballast 102 flashes and then operates at its high level. Thus, by interacting with the display screens on handheld programming device 101 and illustrated in the examples shown in FIGS. 7A-7L, a user can define respective emergency levels for a plurality of ballasts 102.

Figure 8:
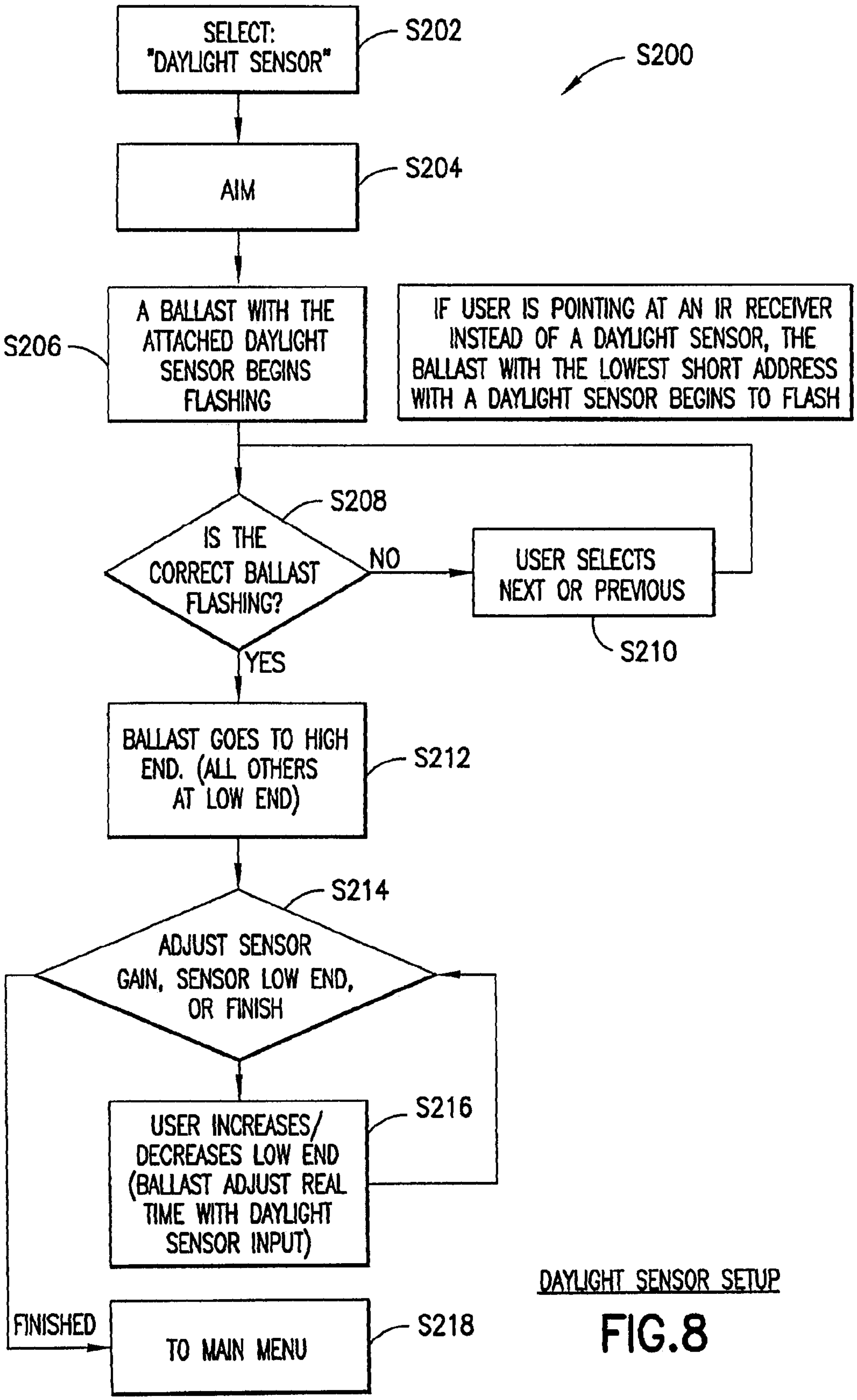
FIG. 8 shows a flowchart of a method for configuring a daylight photosensor using a handheld programming device.

FIG. 8 shows a flowchart of steps S200 for a method for configuring a photosensor 106, such as a daylight sensor, using handheld programming device 101. At step S202, the user makes a selection on handheld programming device 101 for configuring a daylight sensor or photosensor 106. At step S204, the user aims his handheld programming device 101 at an IR receiver 104 to send commands to the ballast 102 for setting the photosensor 106. At step S206, all fixtures on the system preferably go to a minimum brightness level, and the respective ballast 102 that is attached to the photosensor 106 causes a lamp attached thereto to flash on and off. If the user is pointing at an IR receiver instead of a daylight sensor, the ballast with the lowest short address connected to a daylight sensor 106 preferably flashes.

At step S208, the user makes a determination whether the desired ballast 102 is flashing. If not, then at step S210, the user selects a different ballast, for example, by selecting next or previous on handheld programming device 101. Alternatively, if the user determines that the correct ballast is flashing, then at step S212, the ballast attached to the daylight sensor outputs at its maximum intensity. In step S214, the user selects graphical controls on handheld programming device to adjust the sensor gain or low end. In this way, the user can define the degree of sensitivity of the sensor to detect when a particular amount of light, for example in a room, should cause a ballast to turn on or off or dim to a dimmed level. When the user is satisfied with the settings of the sensor, the user completes the process in step S218. Thus, using the graphical user interface provided on handheld programming device 101, a user can configure a photosensor 106.

Figure 9B:
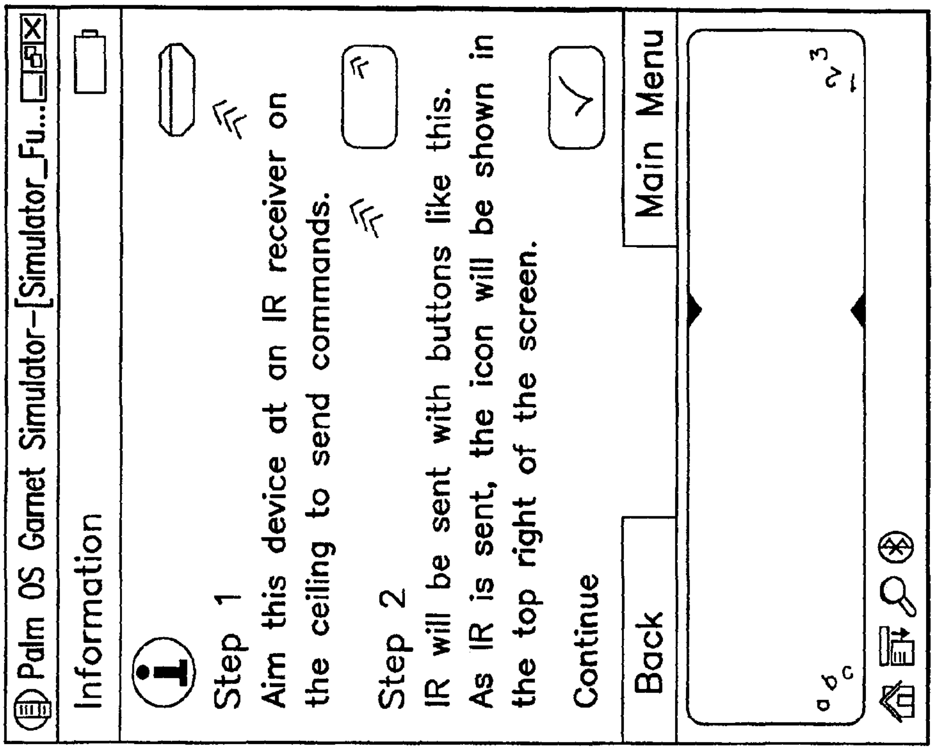
FIGS. 9A-9L illustrate example display screens provided on a handheld programming device for configuring one or more ballasts to operate in accordance with one or more occupancy sensors that sense an occupied environment.
Figure 9A:
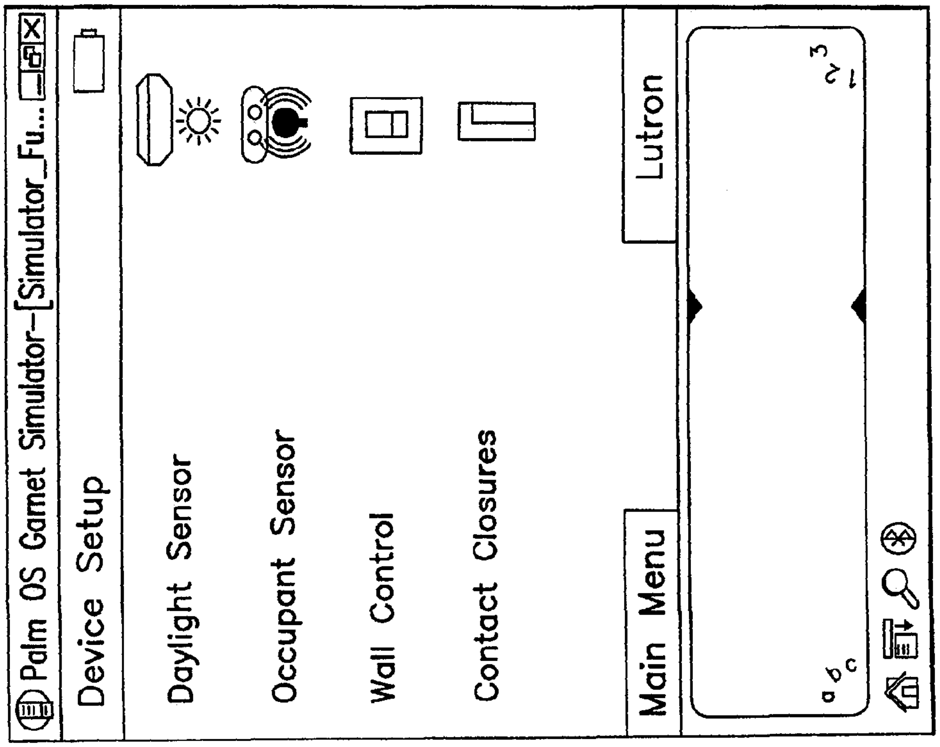
Figure 9D:
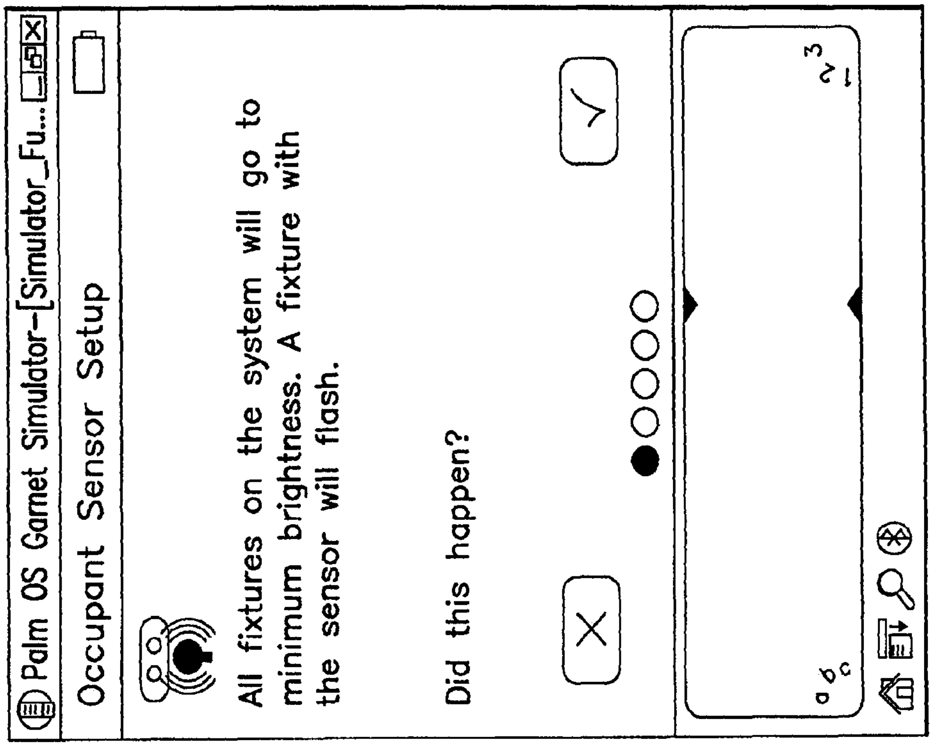
Figure 9C:
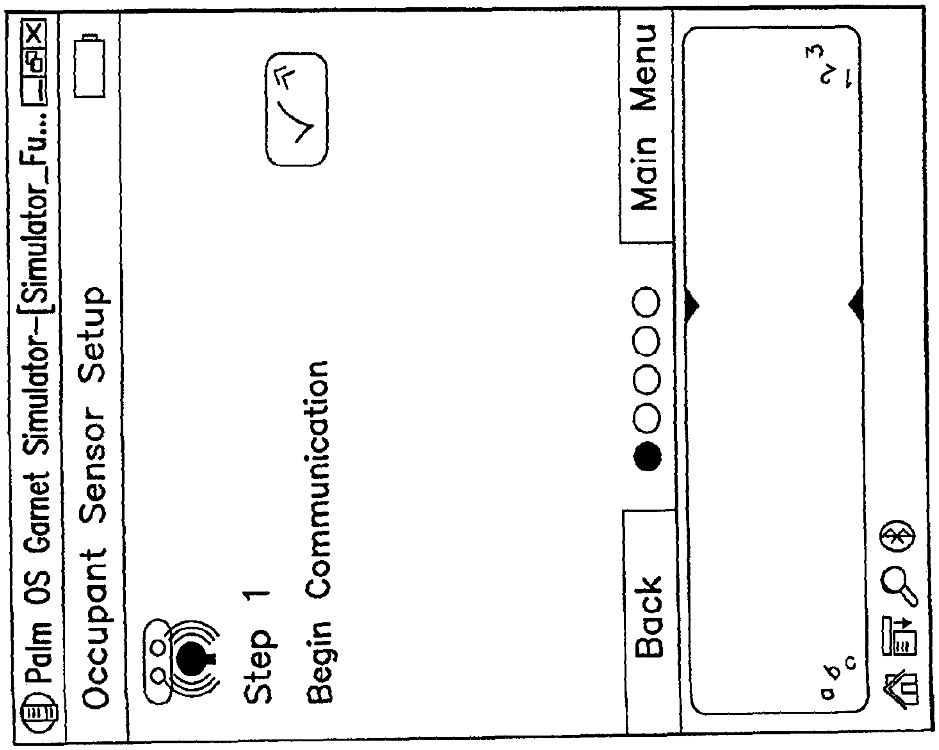
Figure 9E:
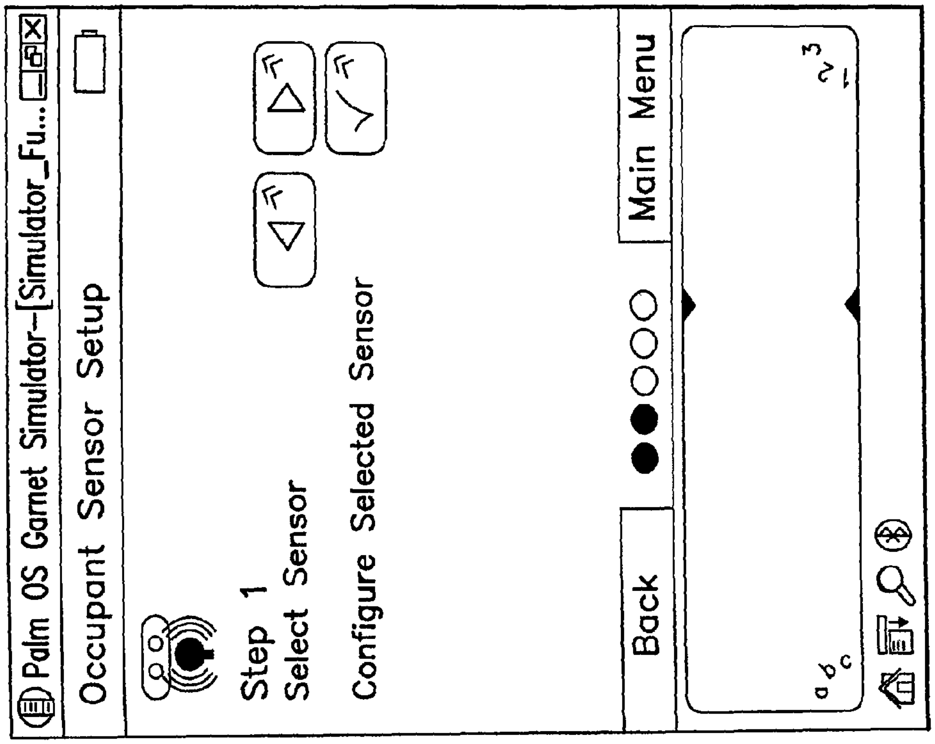
Figure 9F:
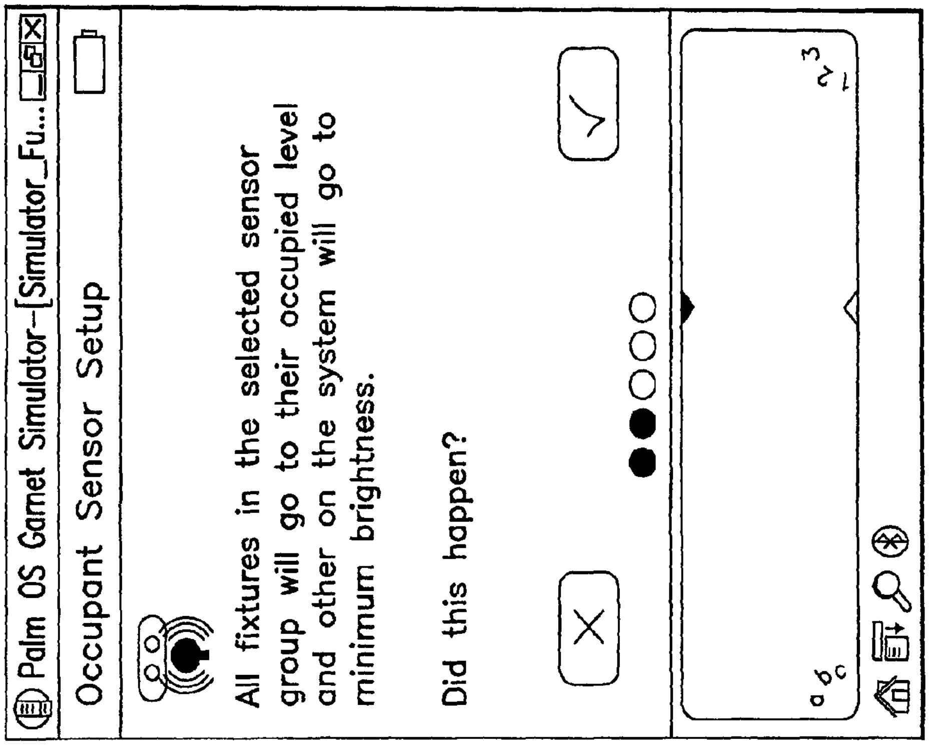
Figure 9G:
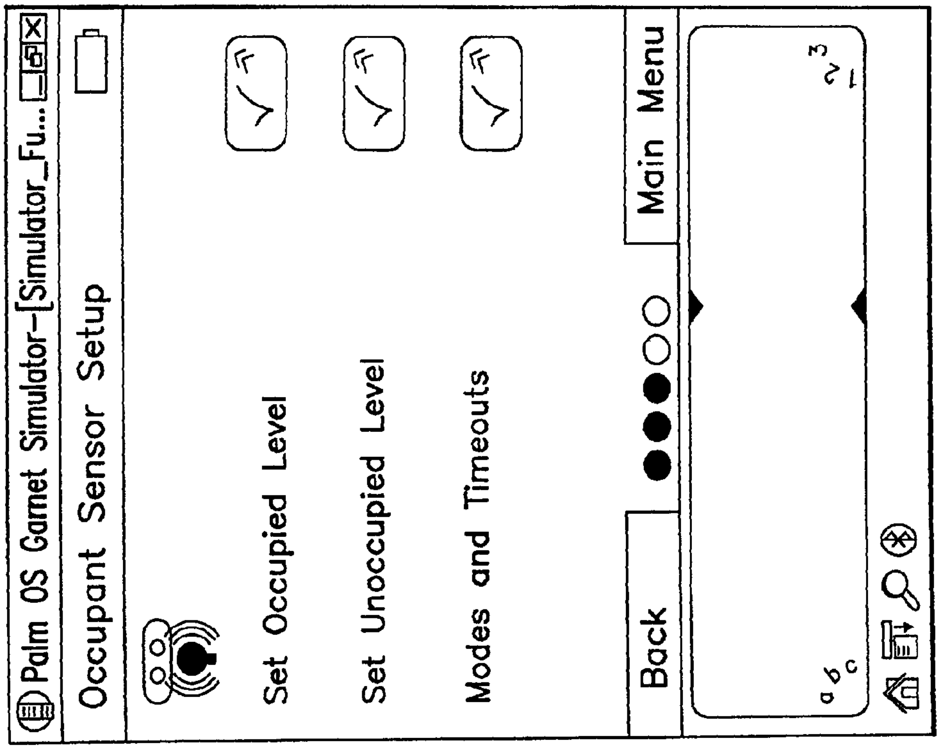

FIGS. 9A-9L illustrate example display screens provided on handheld programming device 101 for configuring one or more ballasts 102 to operate in accordance with one or more occupancy sensor devices 108 that sense an occupied environment. In FIG. 9A, a user selects an option for occupancy (displayed as “occupant”) occupancy sensor 108. In FIG. 9B, the user is prompted to aim handheld programming device at an IR receiver 104 and select an icon, formatted as a button comprising a checkmark, to continue, and in FIG. 9C, the user is prompted to begin communicating over ballast link 116. After the user selects the icon, FIG. 9D is displayed to prompt the user to confirm that all of the fixtures on ballast link 116 are operating at minimum brightness, and a fixture associated with the occupancy sensor 108 is flashing. In FIG. 9E, handheld programming device 101 displays controls for the user to select an occupancy sensor 108 on ballast link 116. The user preferably configures the respective ballast 102 connected to the occupancy sensor 108 that is selected in FIG. 9E. The user, in FIG. 9F is prompted to confirm (by selecting an icon) that one or more fixtures associated with the respective occupancy sensor 108 selected in FIG. 9E are operating at a predefined occupied lamp brightness level, and all other fixtures are operating at minimum brightness. If the user indicates that this has occurred, then a display screen, such as shown in FIG. 9G, is provided on handheld programming device 101, and the user is prompted to select an option for setting an occupied level, an unoccupied level, or to define modes and timeout values.

Figure 9H:
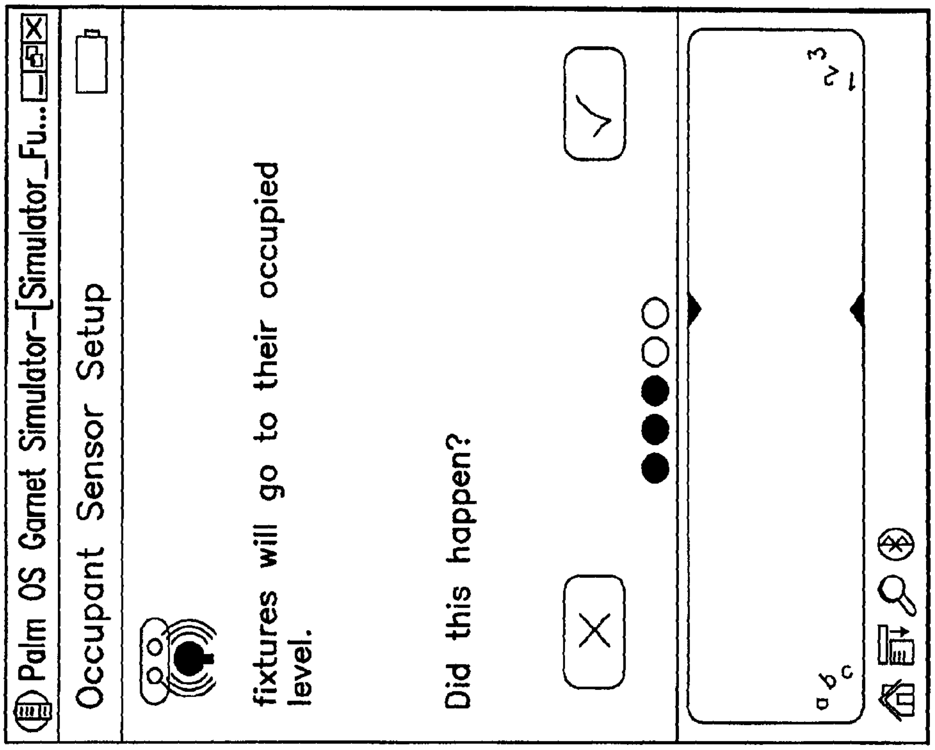
Figure 9I:
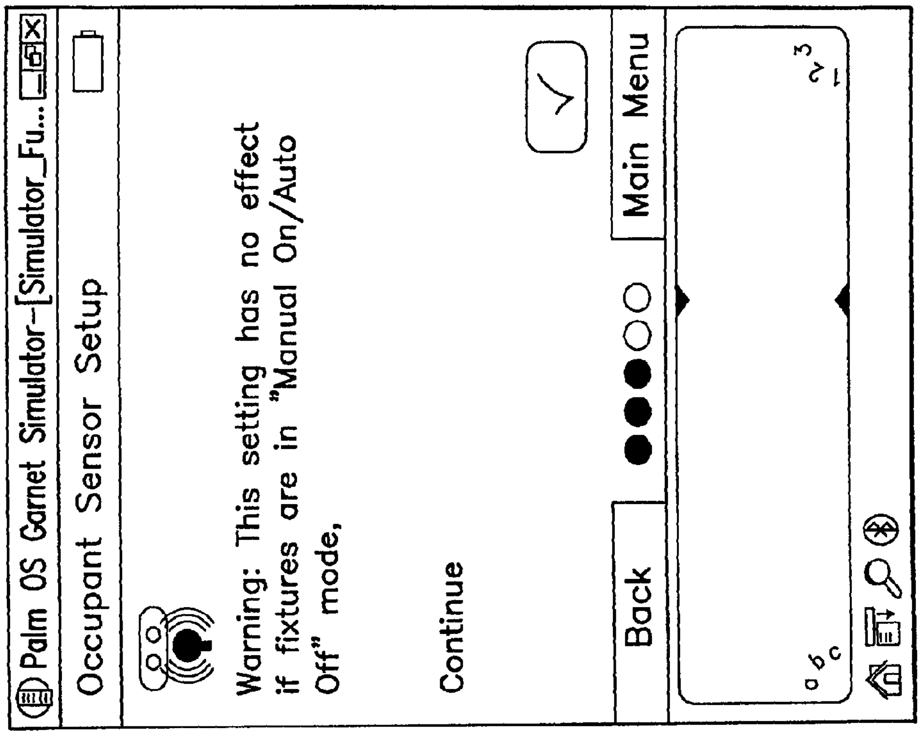
Figure 9J:
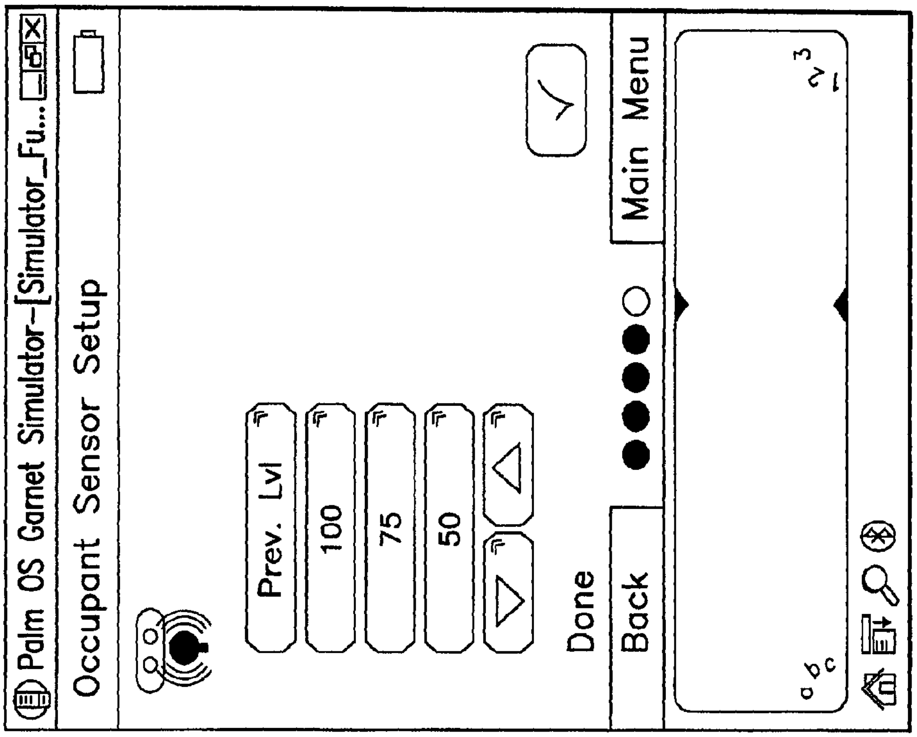
Figure 9K:
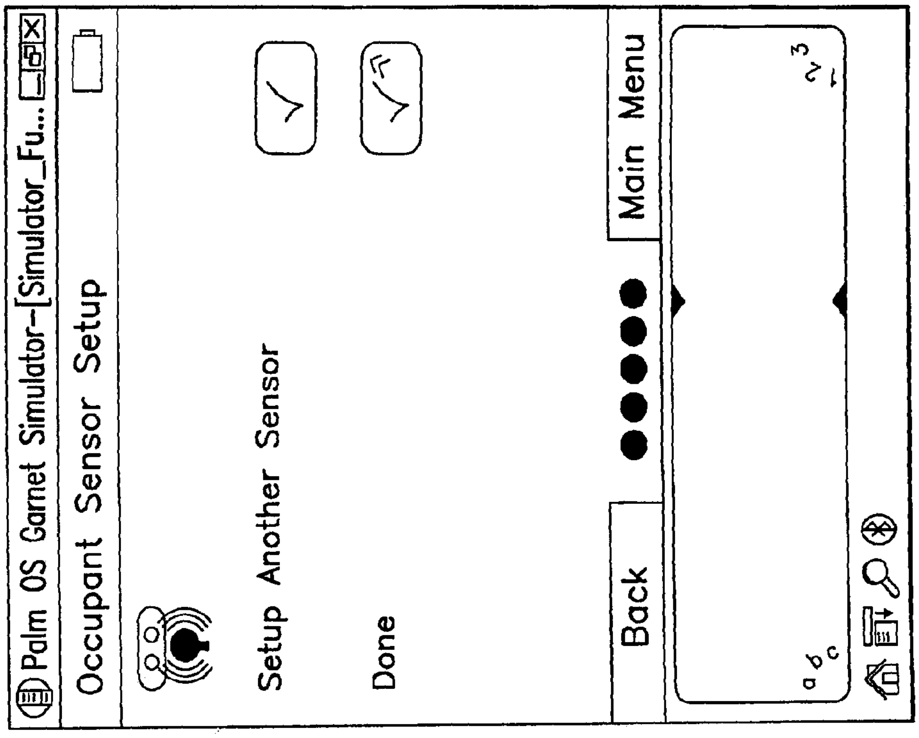
Figure 9L:
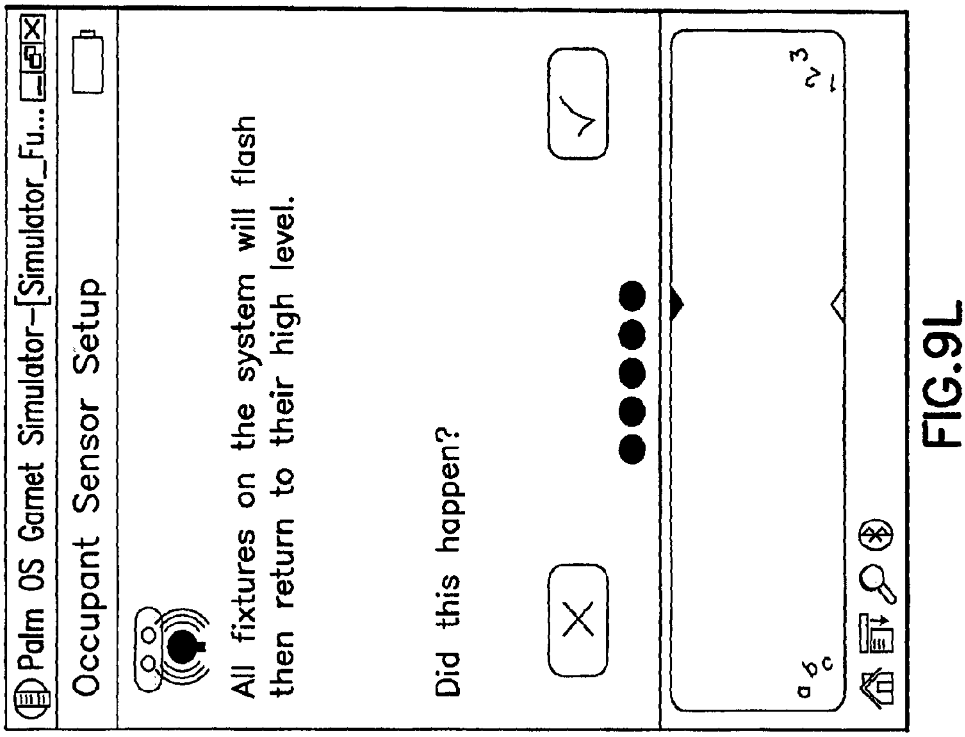

FIG. 9H is displayed when the user has selected (in FIG. 9G) an option to set a ballast 102 output level in case occupancy sensor 108 reports an occupied status. FIG. 9H prompts the user to confirm that the fixture(s) are operating at an occupied level. When the user confirms that the fixtures are operating at an occupied level, then the user is provided with a display that warns the user that the settings have no impact on operating the ballast in a manual on/off state (FIG. 9I). In FIG. 9J, the user is provided with controls to increase or decrease the intensity of the fixtures, or to define the fixtures to operate at a predefined level. When the user is satisfied with the brightness level set for the occupied level, the user selects an icon (illustrated as a button comprising a checkmark) to select the occupied intensity level, and a display screen as shown in FIG. 9K is provided on handheld programming device 101 comprising controls to enable the user to complete setting the level, or to select another occupancy sensor 108. After making the selection in FIG. 9K, the user is prompted in FIG. 9L to confirm that all fixtures operate at high level. Thus, by interacting with the display screens on handheld programming device 101 and illustrated in the examples shown in FIGS. 9A-9L, a user can define respective intensity levels for a plurality of ballasts 102 that react in response to a plurality of occupancy sensors 108 registering an occupied state.

Figure 10A:
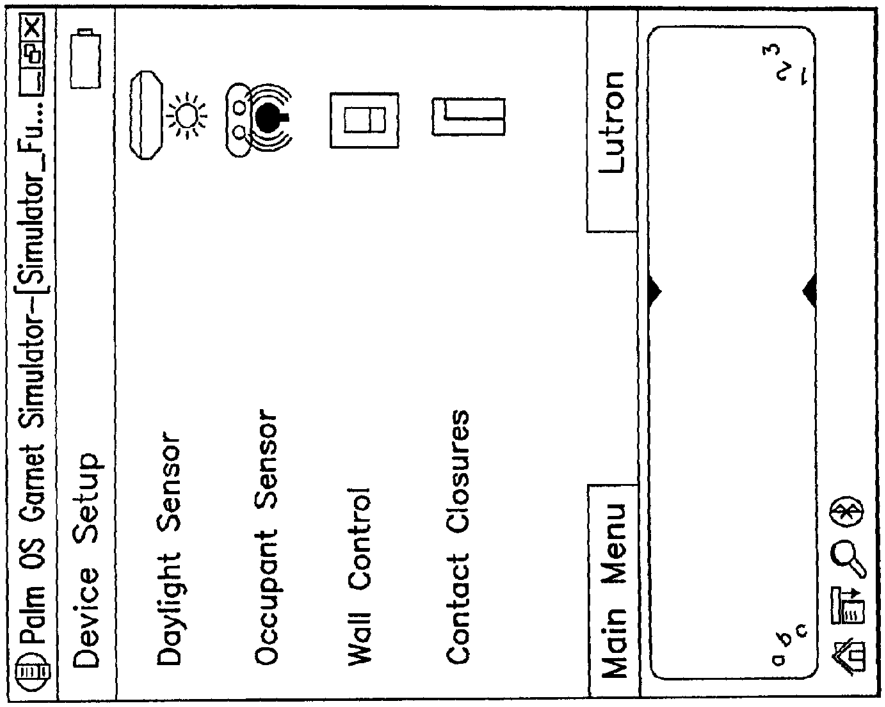
FIGS. 10A-10K illustrate example display screens provided on a handheld programming device for configuring one or more ballasts to operate in accordance with one or more occupancy sensor devices that sense one or more unoccupied environments.
Figure 10B:
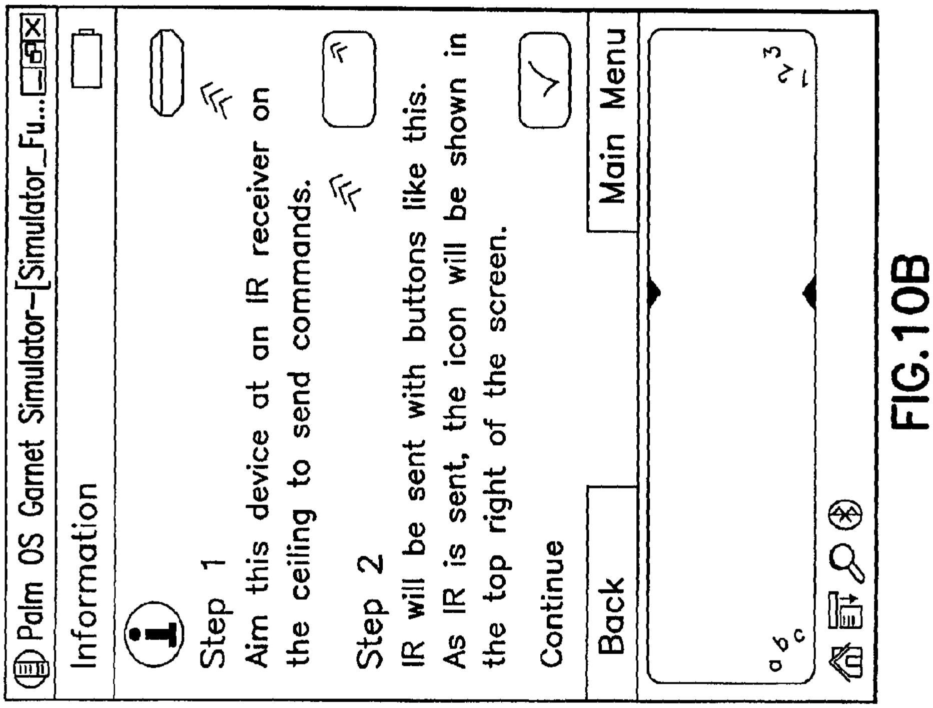
Figure 10C:
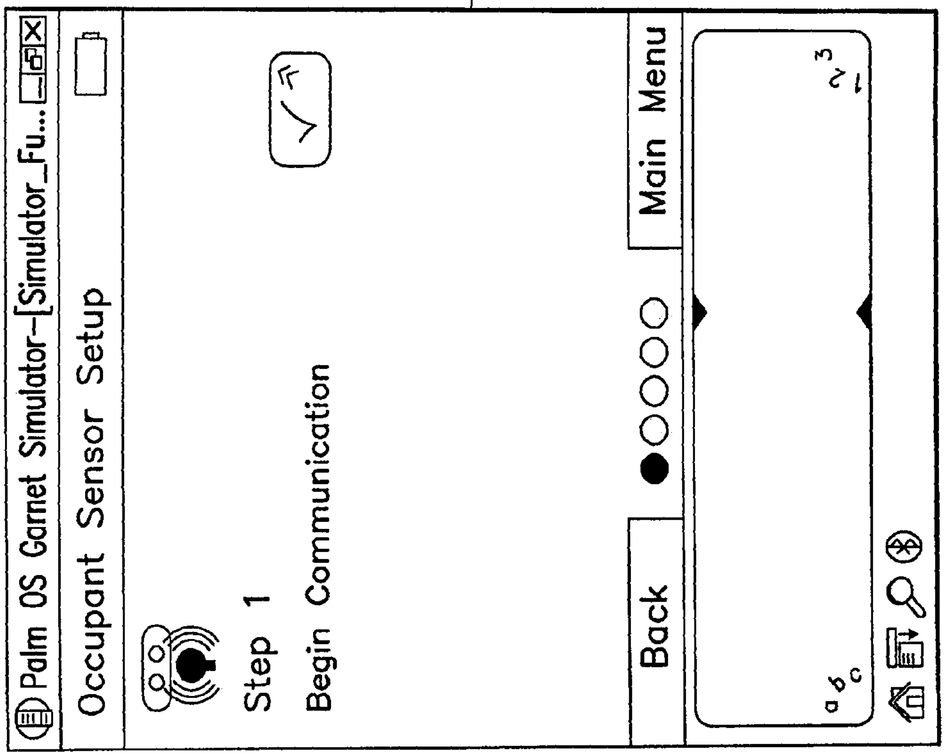
Figure 10D:
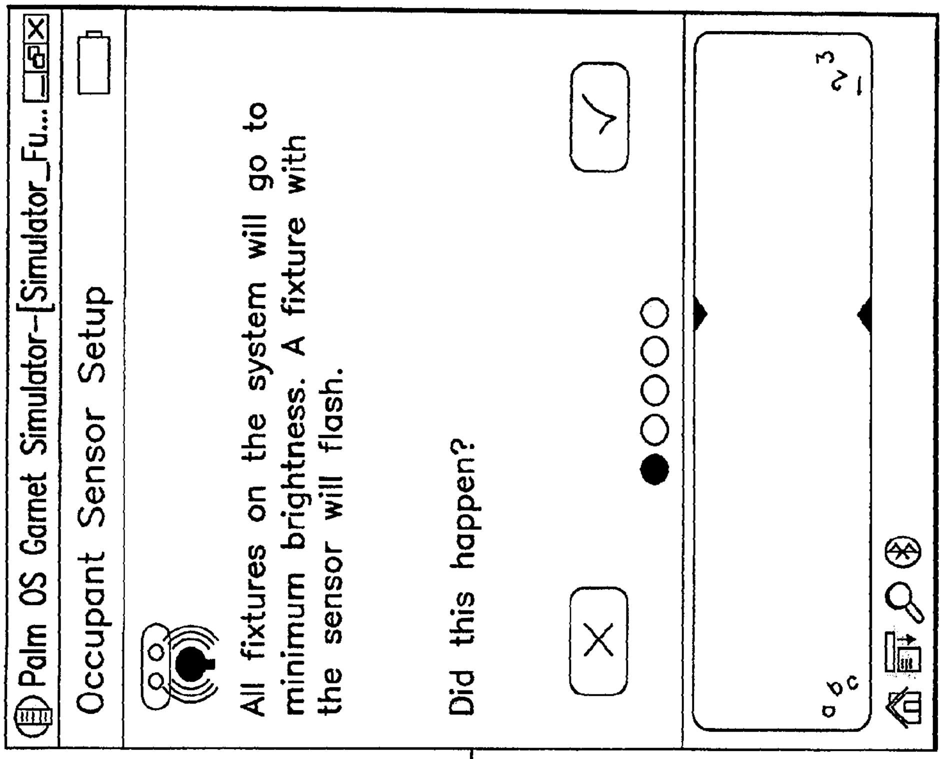
Figure 10E:
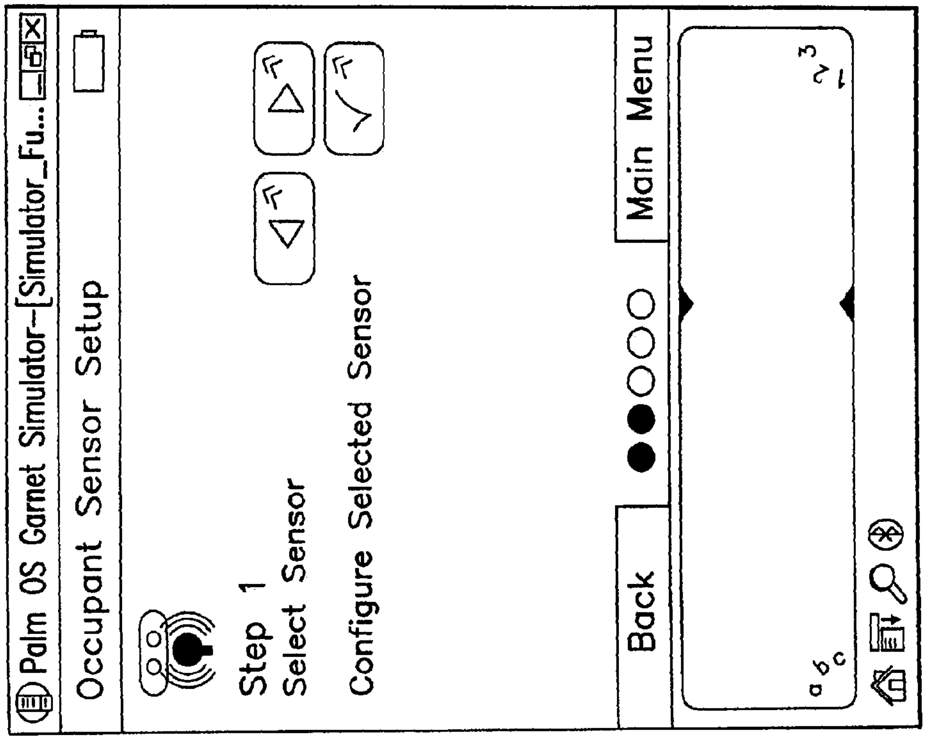
Figure 10F:
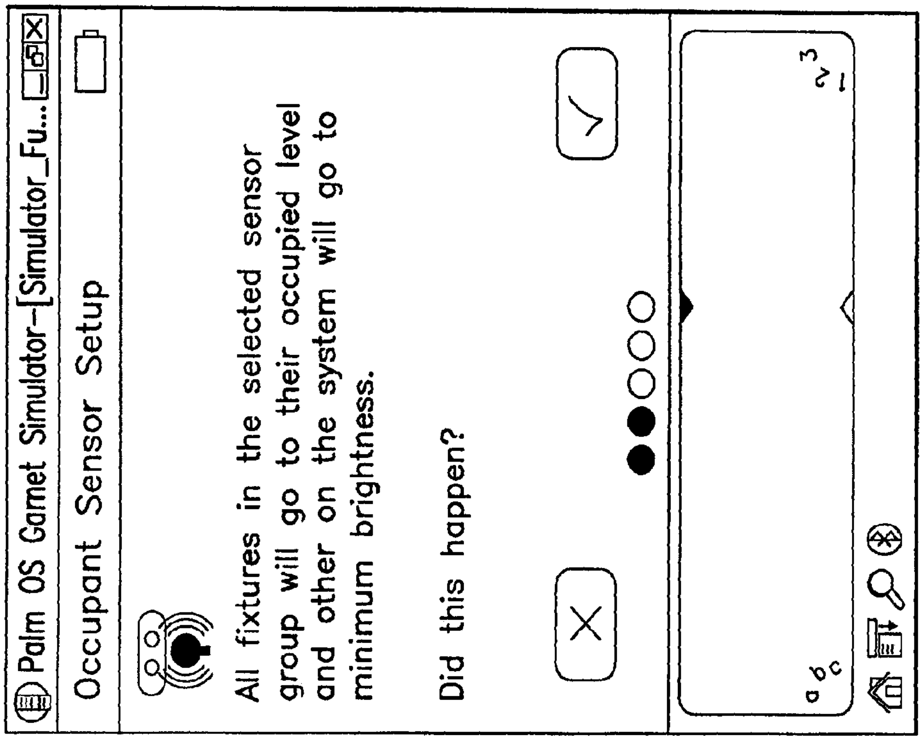
Figure 10G:
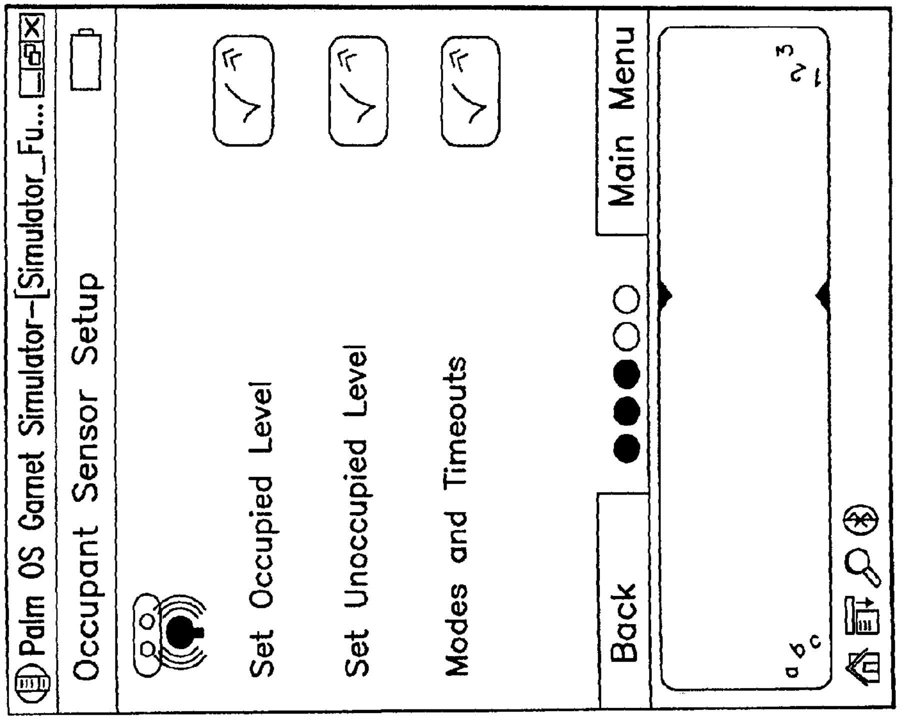

FIGS. 10A-10K illustrate example display screens provided on handheld programming device 101 for configuring one or more ballasts 102 to operate in accordance with one or more occupancy sensor devices 108 that sense one or more unoccupied environments. In FIG. 10A, a user selects an option for occupancy (displayed as “occupant”) sensor 108. In FIG. 10B, the user is prompted to aim handheld programming device at an IR receiver 104 and select an icon, formatted as a button comprising a checkmark, to continue, and in FIG. 10C, the user is prompted to begin communicating over ballast link 116. After the user selects the icon, FIG. 10D is displayed to prompt the user to confirm that all of the fixtures on ballast link 116 are operating at minimum brightness, and a fixture associated with the occupancy sensor 108 is flashing. In FIG. 10E, handheld programming device 101 displays controls for the user to select an occupancy sensor 108 on ballast link 116. The user preferably configures the respective occupancy sensor 108 that is selected in FIG. 10E. The user, in FIG. 10F is prompted to confirm (by selecting an icon) that one or more fixtures associated with the respective occupancy sensor 108 selected in FIG. 10E are operating at a predefined unoccupied level, and all other fixtures are operating at minimum brightness. If the user indicates that this has occurred, then FIG. 10G is displayed and the user is prompted to select an option for setting an occupied level, an unoccupied level, or to define modes and timeout values.

Figure 10H:
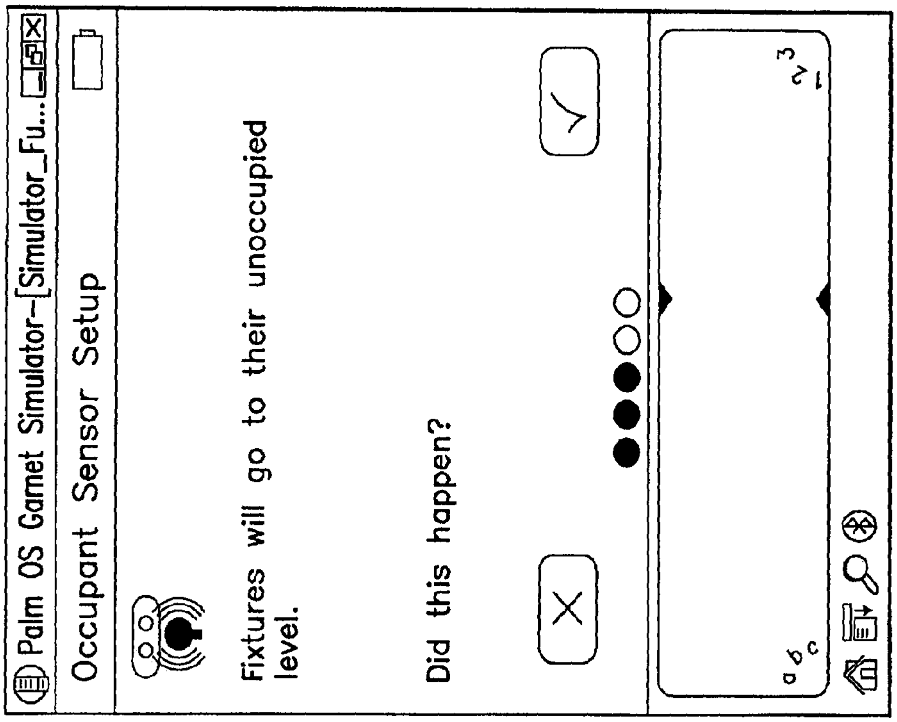
Figure 10I:
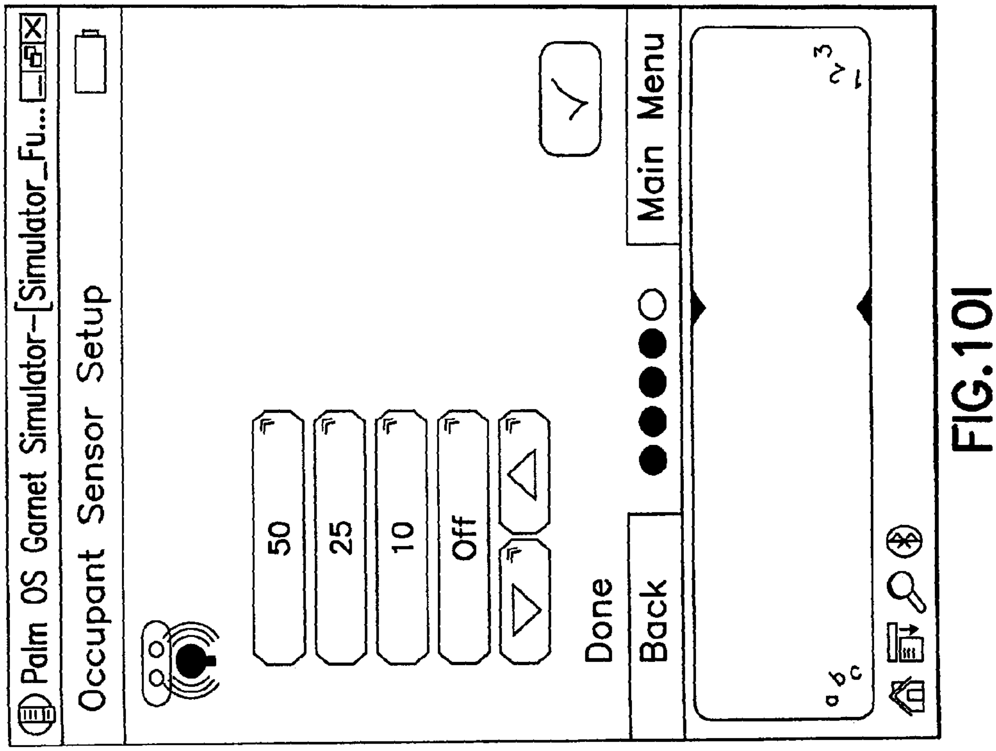
Figure 10J:
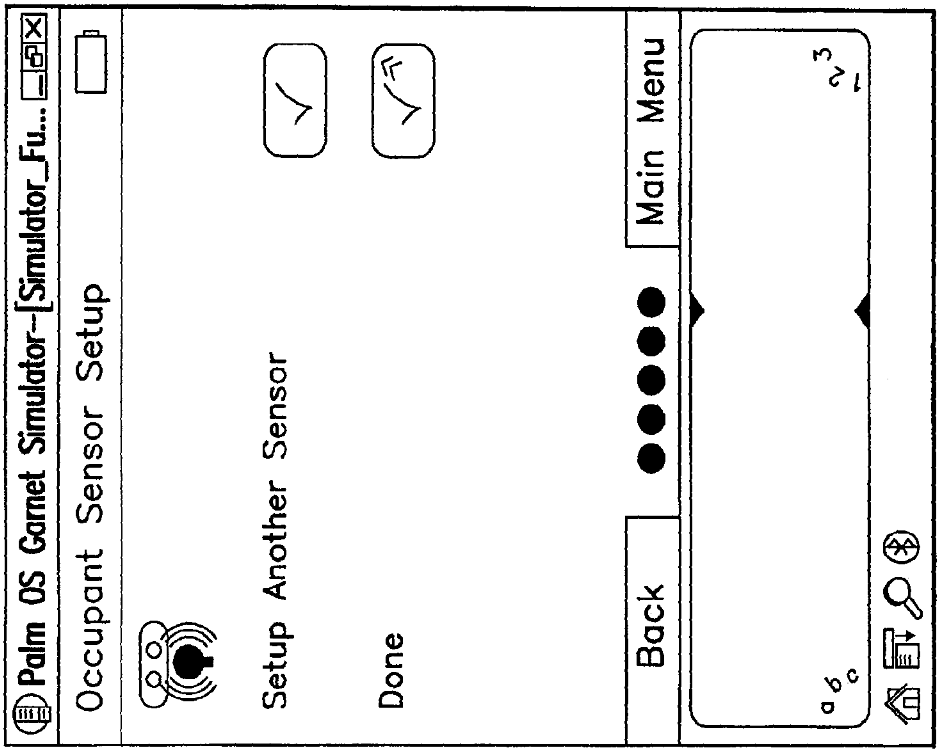
Figure 10K:
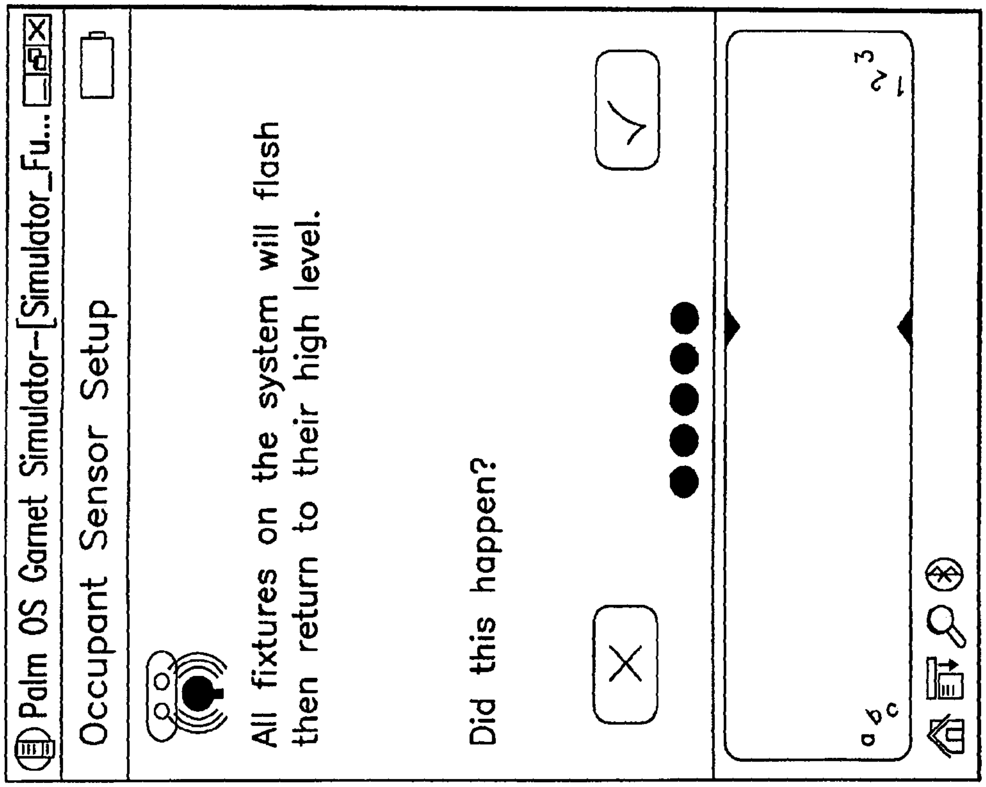

FIG. 10H is displayed when the user has selected (in FIG. 10G) an option to set a ballast 102 output level in case occupancy sensor 108 reports an unoccupied status. FIG. 10H prompts the user to confirm that the fixture(s) are operating at an occupied level. When the user confirms that the fixtures are operating at an unoccupied level, then in FIG. 10I the user is provided with controls to increase or decrease the intensity of the fixtures. When the user is satisfied with the level set for the unoccupied level, the user selects an icon (illustrated as a button comprising a checkmark) to select the unoccupied intensity level, and a display screen as shown in FIG. 10J is provided on handheld programming device 101 comprising controls to enable the user to complete setting the level, or to select another occupancy sensor 108. After making the selection in FIG. 10J, the user is prompted in FIG. 10K to confirm that all fixtures operate at high level. Thus, by interacting with the display screens on handheld programming device 101 and illustrated in the examples shown in FIGS. 10A-10K, a user can define respective intensity levels for a plurality of ballasts 102 that react in response to a plurality of occupancy sensors 108 registering an unoccupied state.

Figure 11A:
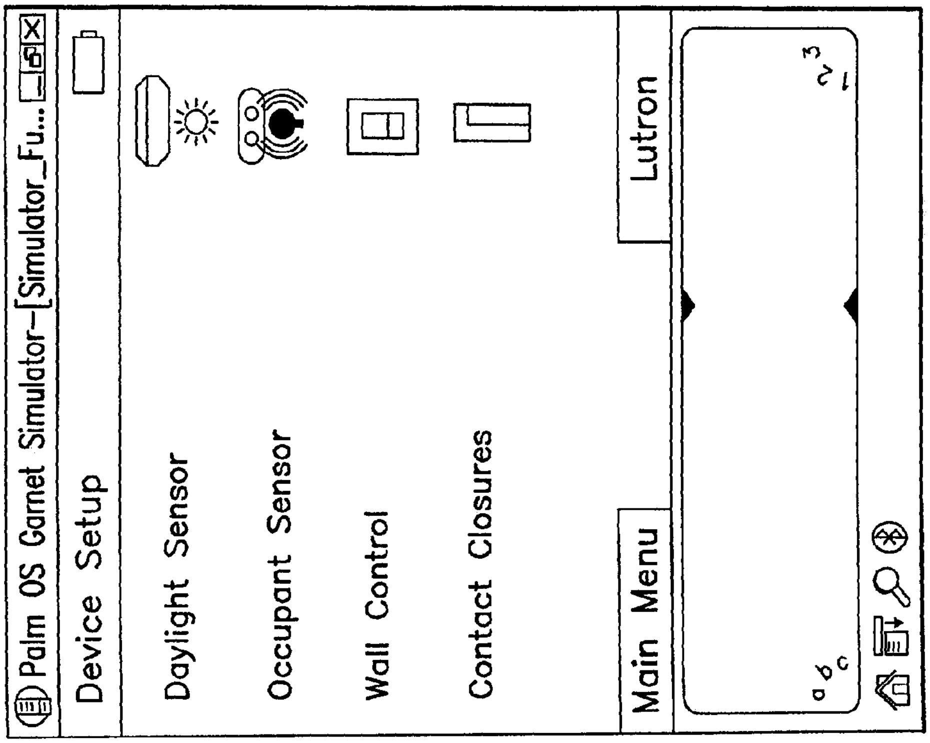
FIGS. 11A-11L illustrate example display screens provided on a handheld programming device for configuring one or more ballasts to time out.
Figure 11B:
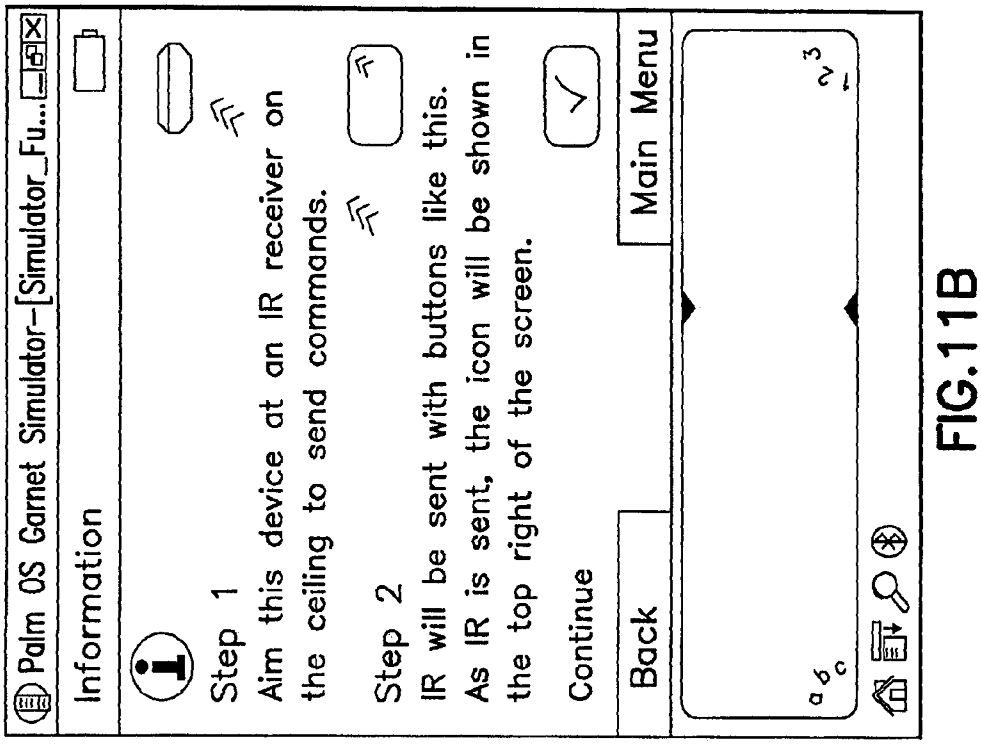
Figure 11C:
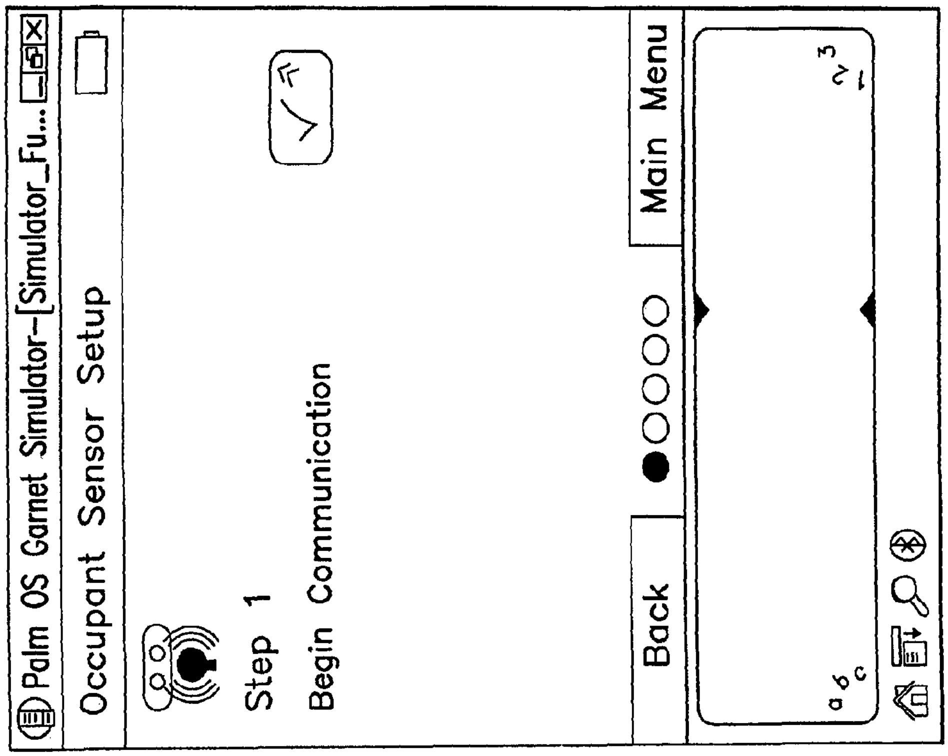
Figure 11D:
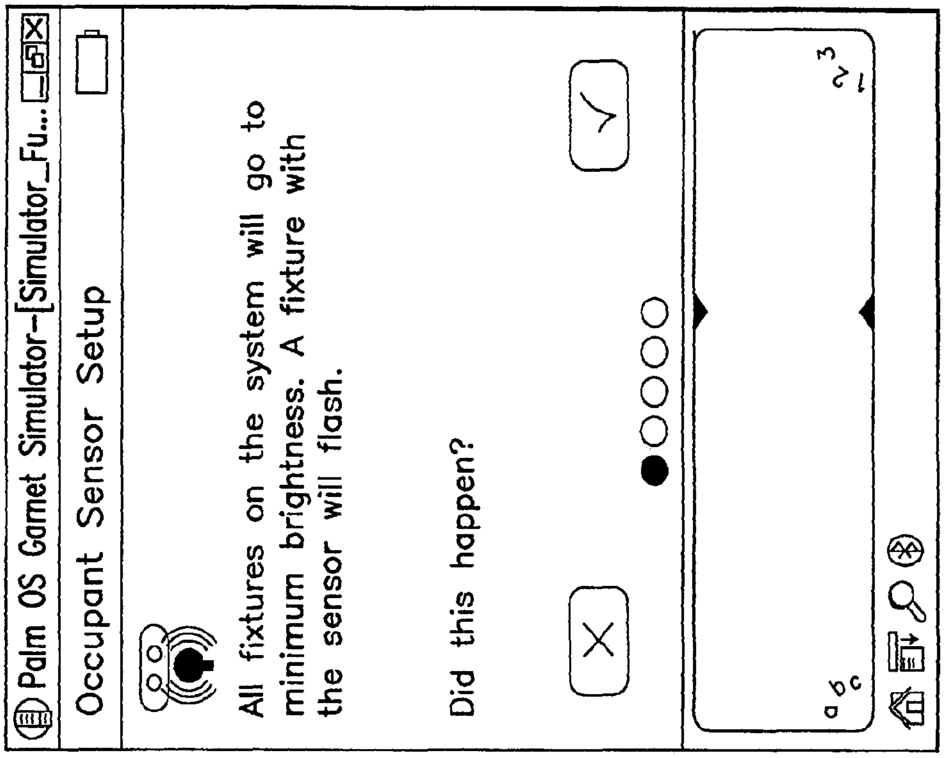
Figure 11E:
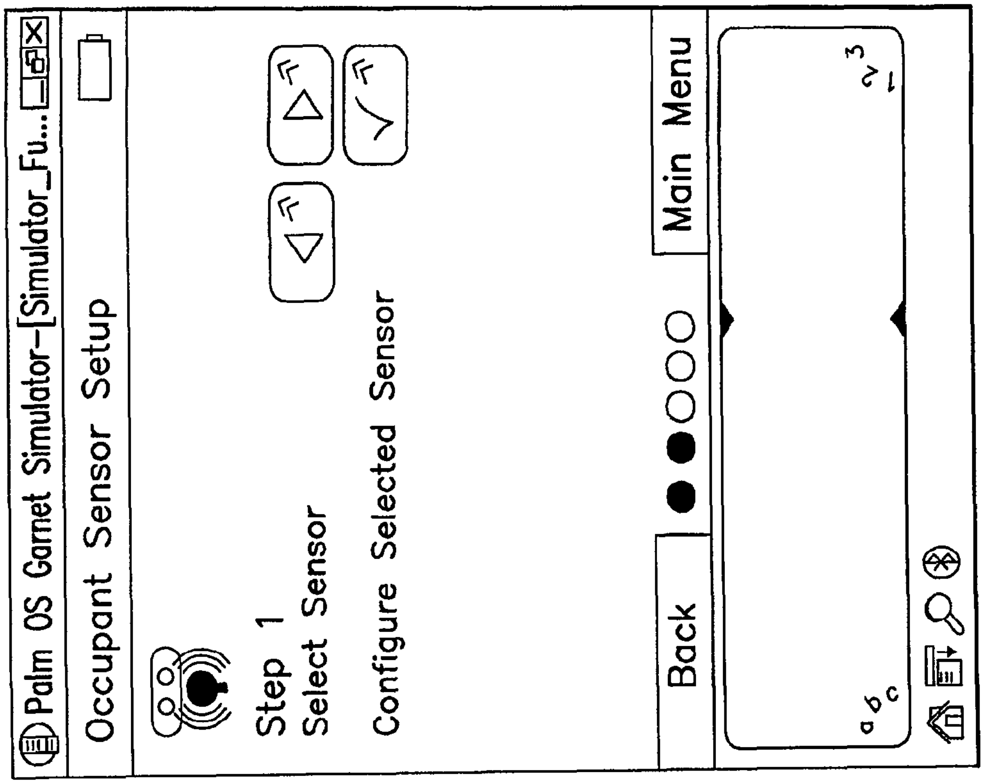
Figure 11F:
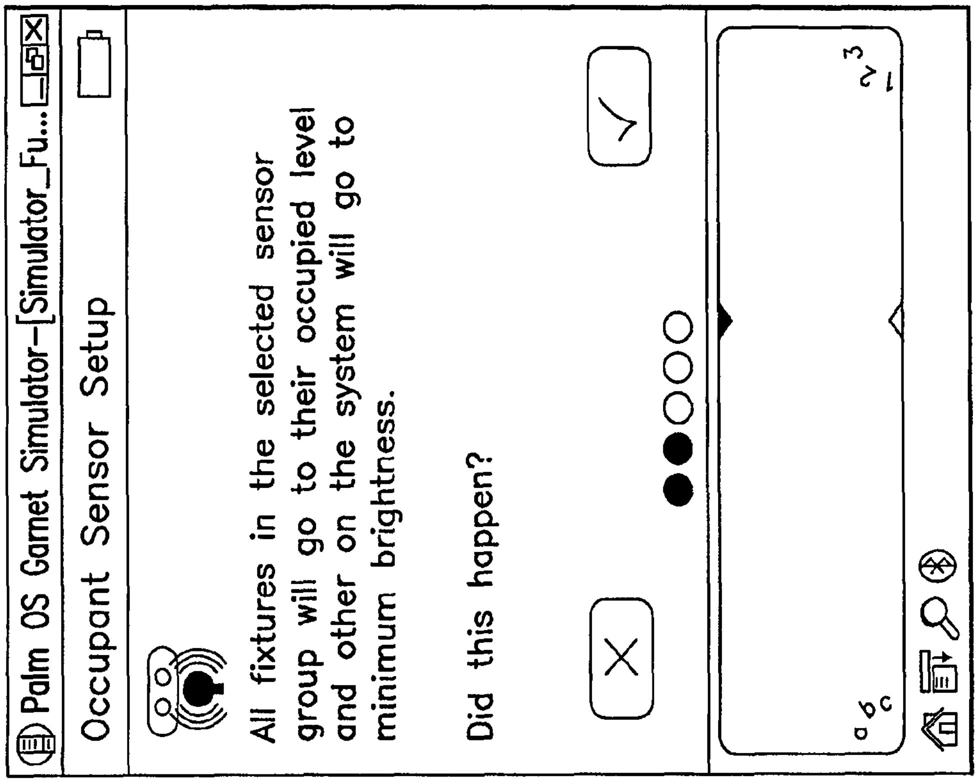
Figure 11G:
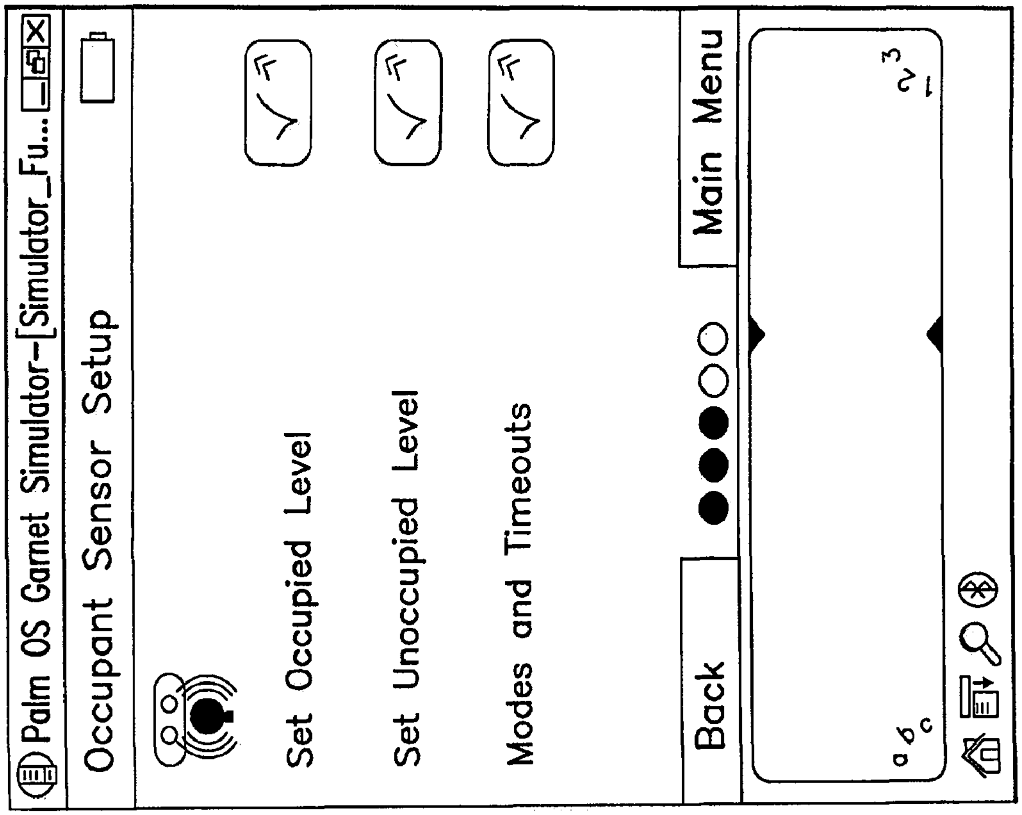

FIGS. 11A-11L illustrate example display screens provided on handheld programming device 101 for configuring one or more ballasts 102 to cause a fixture to operate at an unoccupied level after a predefined amount of time in which one or more occupancy sensor devices 108 sense an unoccupied environment (referred herein as a "timeout"). Thus, the user can use the controls provided in handheld programming device 101 to define a timeout setting in a ballast 102. In FIG. 11A, a user selects an option for occupancy (displayed as "occupant") sensor 108. In FIG. 11B, the user is prompted to aim handheld programming device at an IR receiver 104 and select an icon, formatted as a button comprising a checkmark, to continue, and in FIG. 11C, the user is prompted to begin communicating over ballast link 116. After the user selects the icon, FIG. 11D is displayed to prompt the user to confirm that all of the fixtures on ballast link 116 are operating at minimum brightness, and a fixture associated with the occupancy sensor 108 is flashing. In FIG. 11E, handheld programming device 101 displays controls for the user to select an occupancy sensor 108 on ballast link 116. The user preferably configures the respective occupancy sensor 108 that is selected in FIG. 11E. The user, in FIG. 11F is prompted to confirm (by selecting an icon) that one or more fixtures associated with the respective occupancy sensor 108 selected in FIG. 11E are operating at a predefined occupied level, and all other fixtures are operating at minimum brightness. If the user indicates that this has occurred, then FIG. 11G is displayed and the user is prompted to select an option for setting an occupied level, an unoccupied level, or to define modes and timeout values.

Figure 11H:
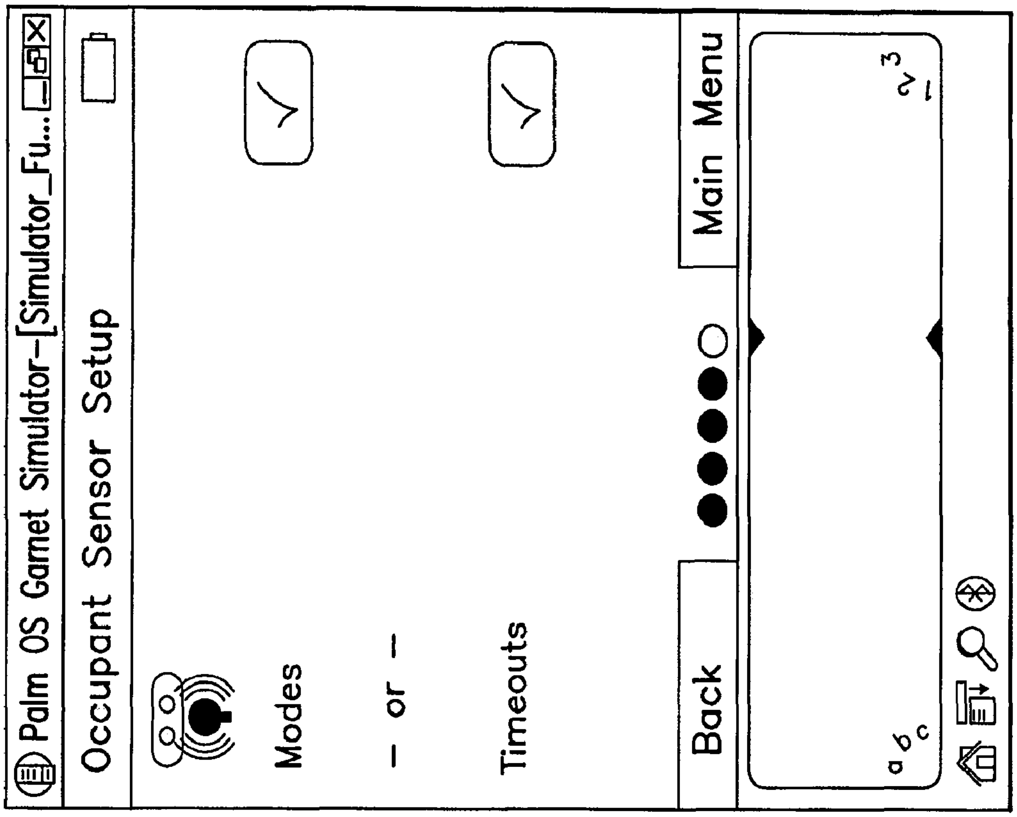
Figure 11J:
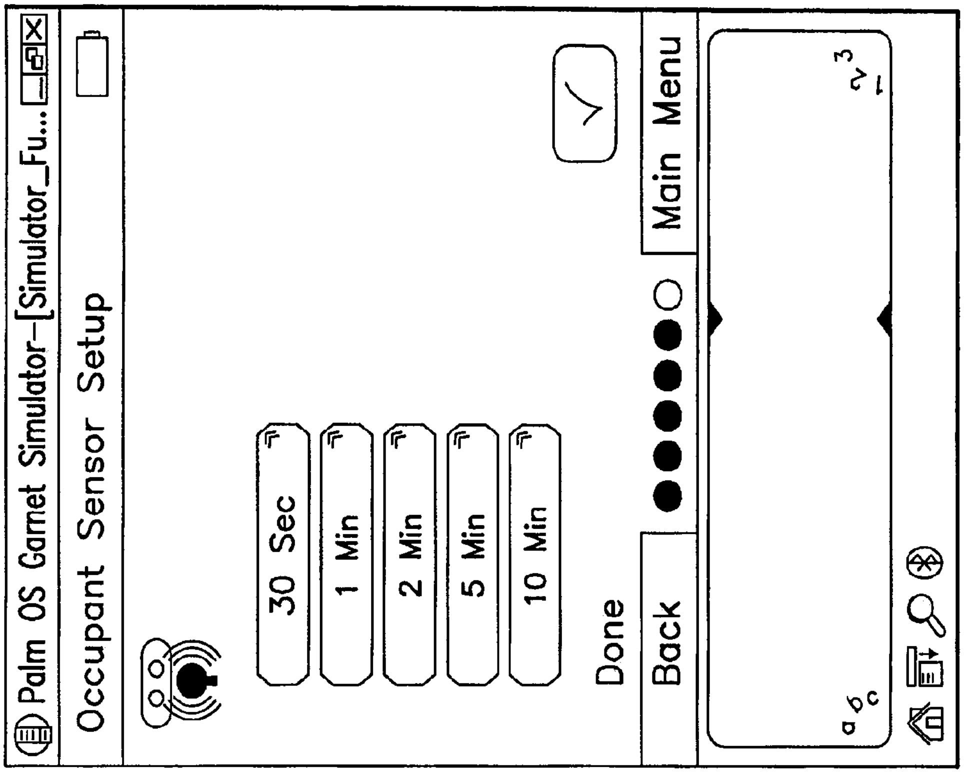
Figure 11I:
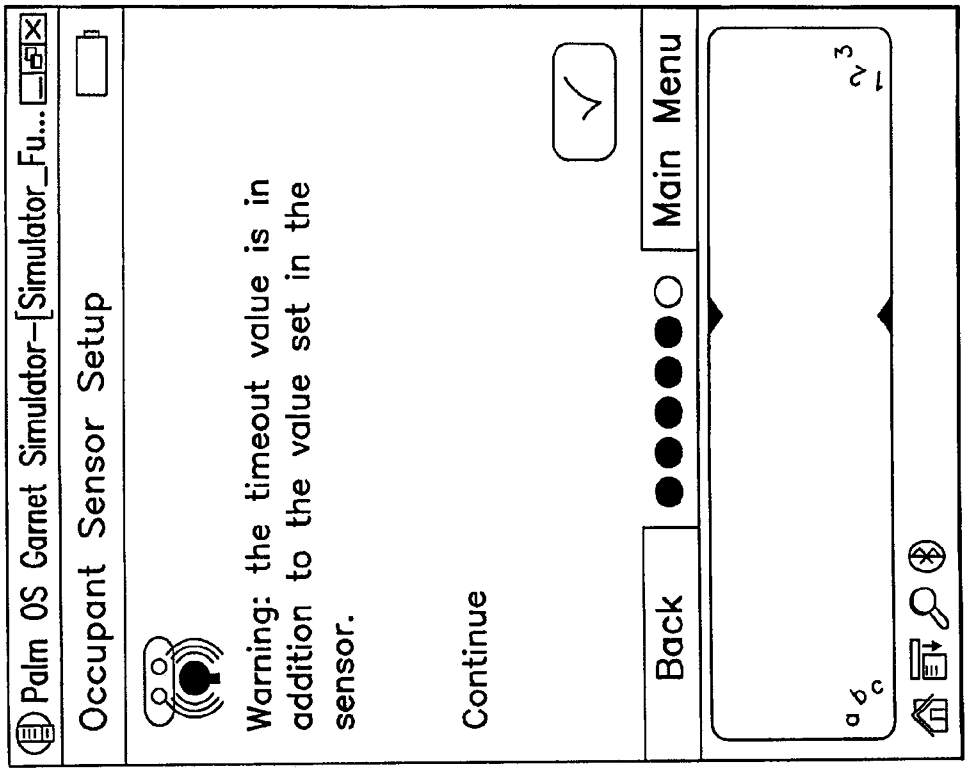
Figure 11L:
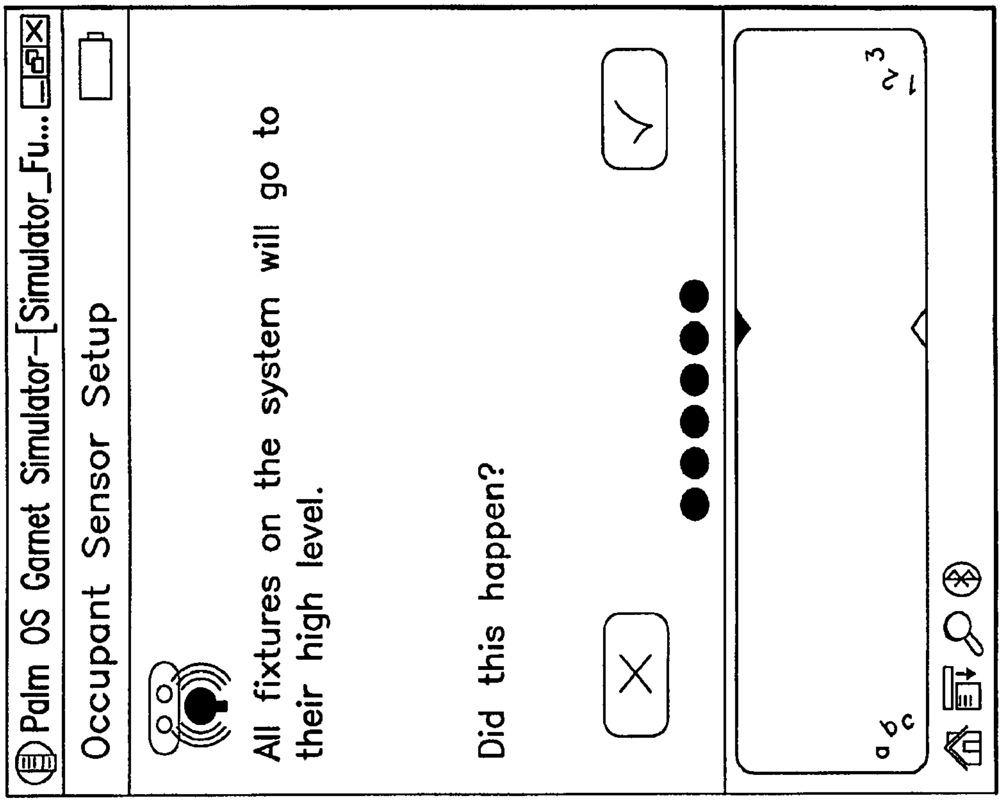
Figure 11K:
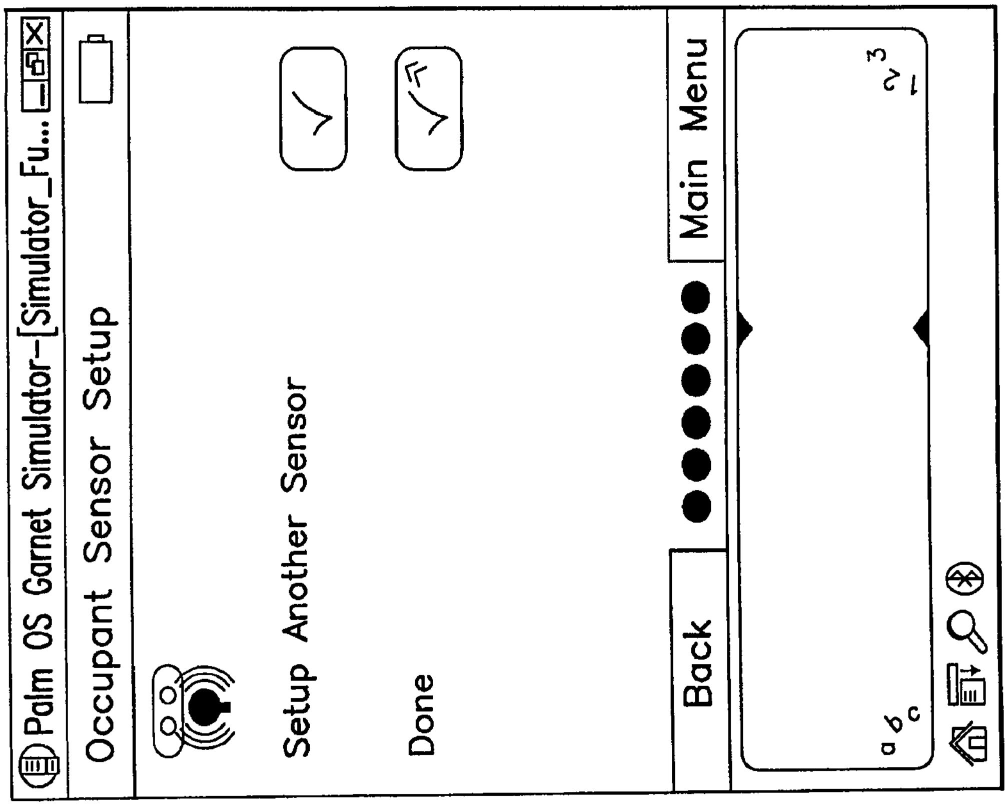
Figure 12A:
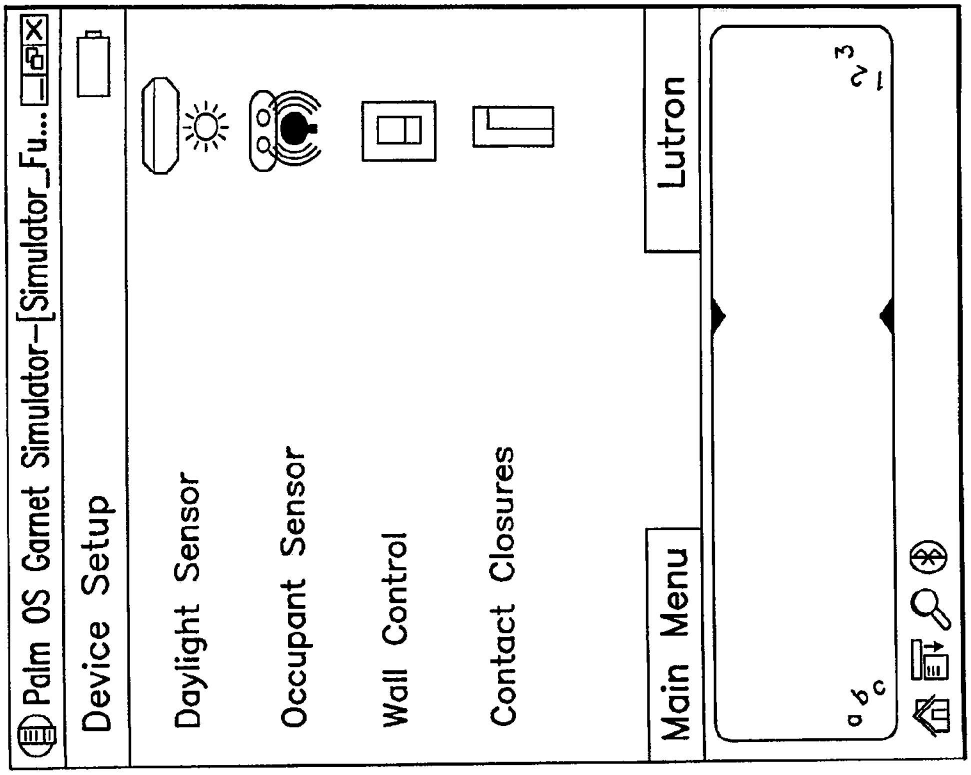
FIGS. 12A-12J illustrate example display screens for configuring a ballast to operate in semi-automatic or automatic ways.
Figure 12B:
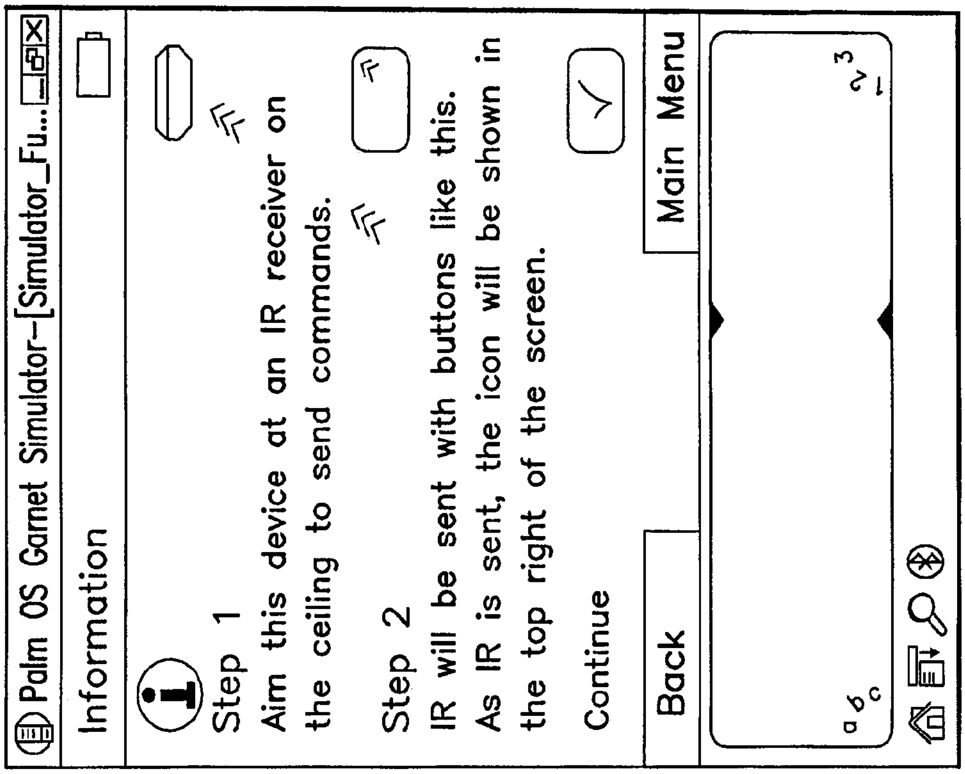
Figure 12C:
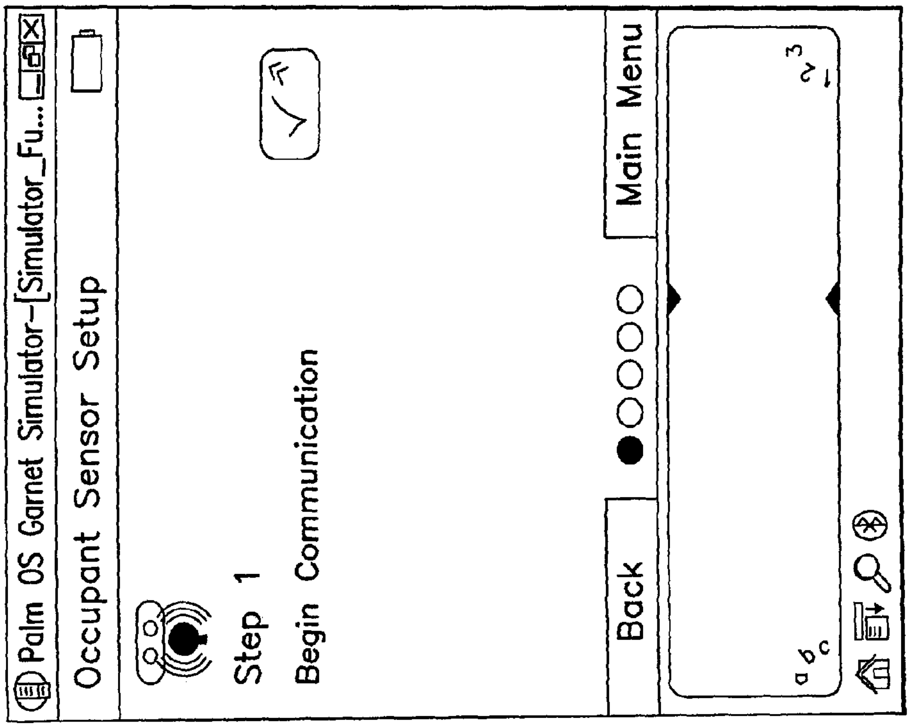
Figure 12D:
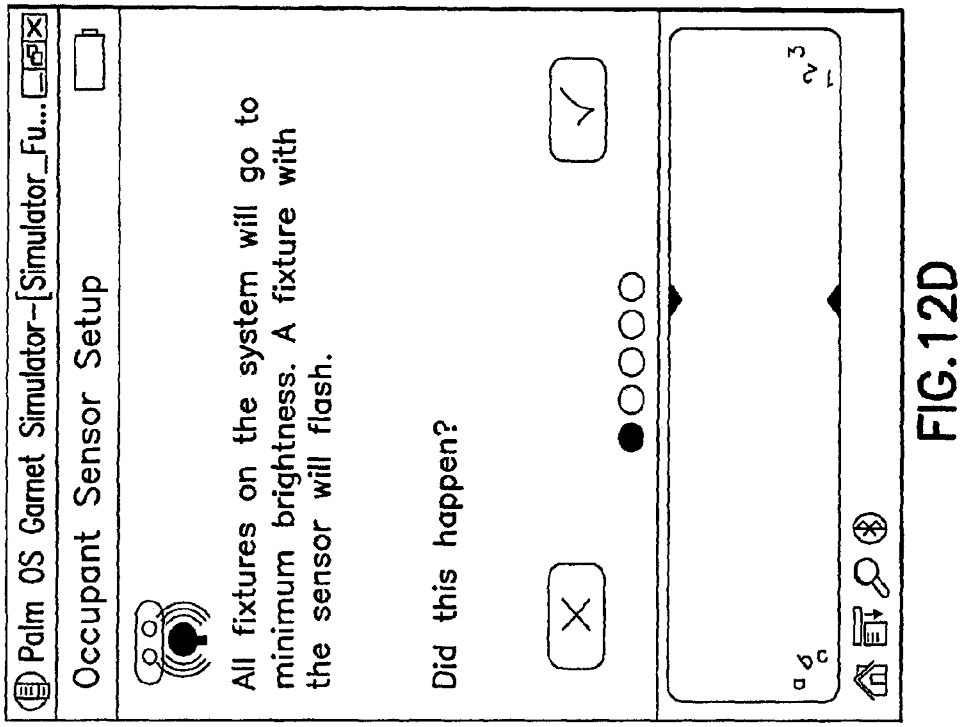
Figure 12E:
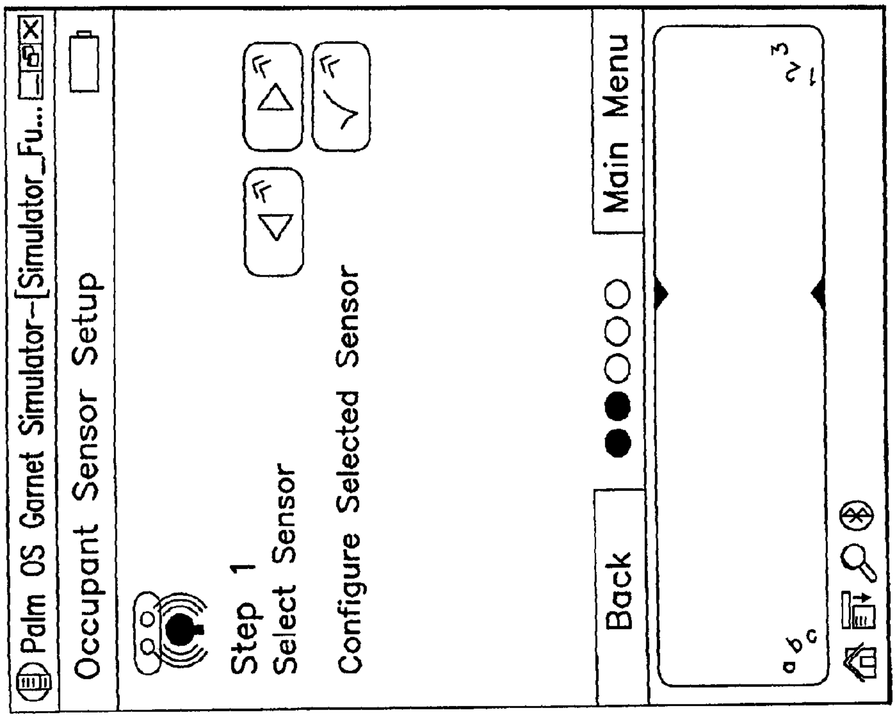
Figure 12F:
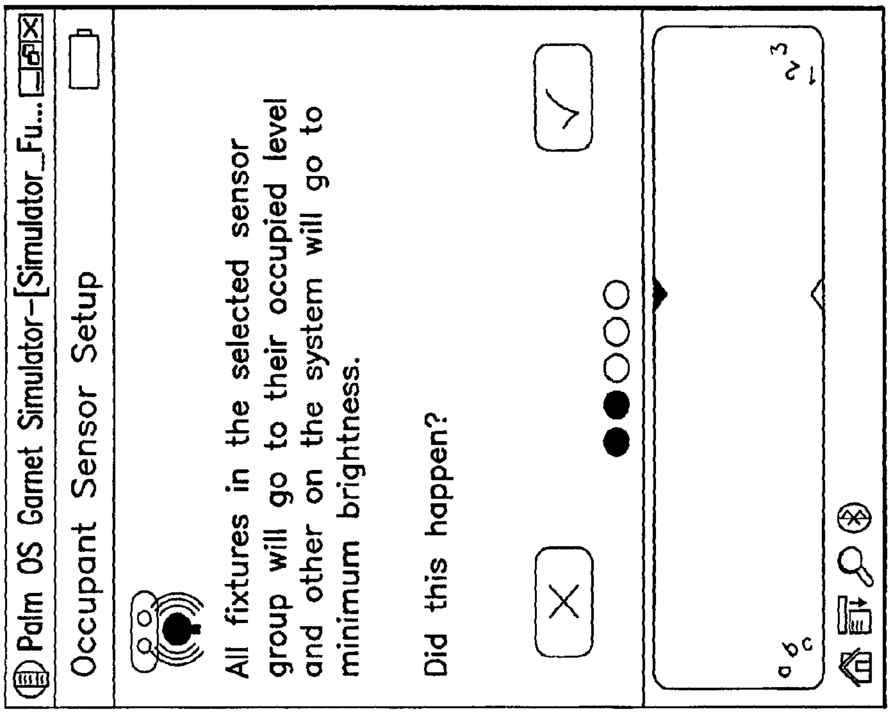
Figure 12G:
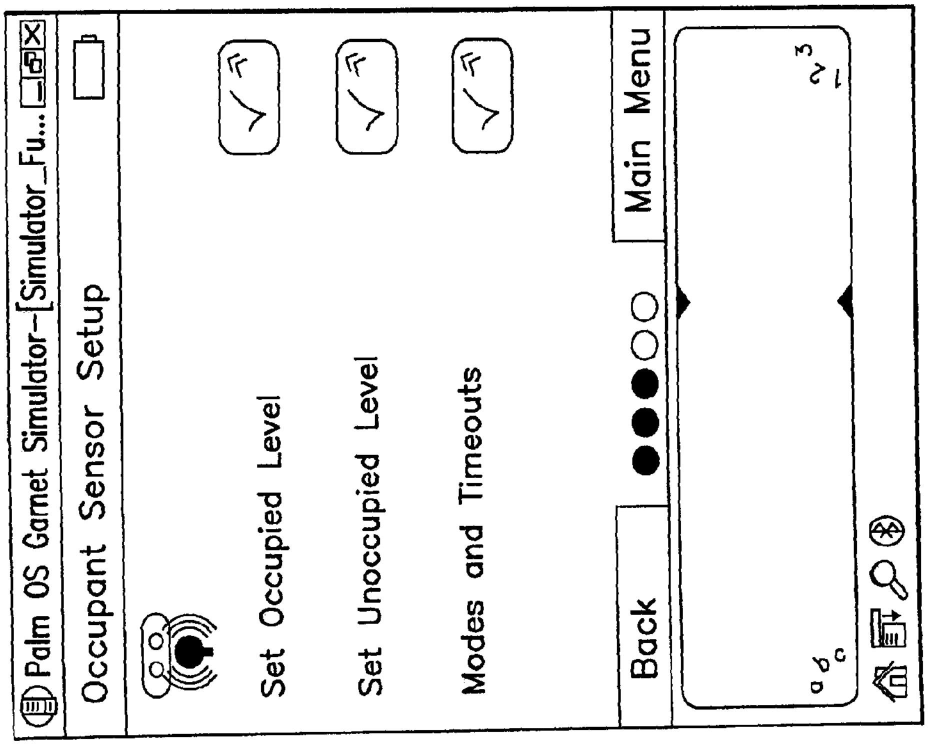
Figure 12H:
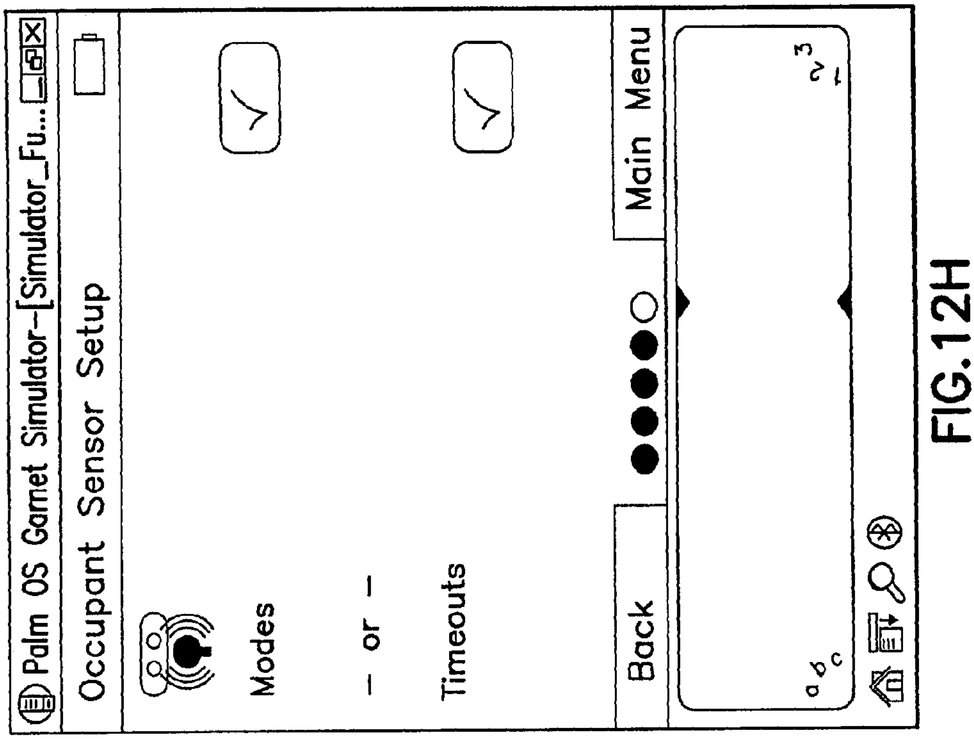
Figure 12I:
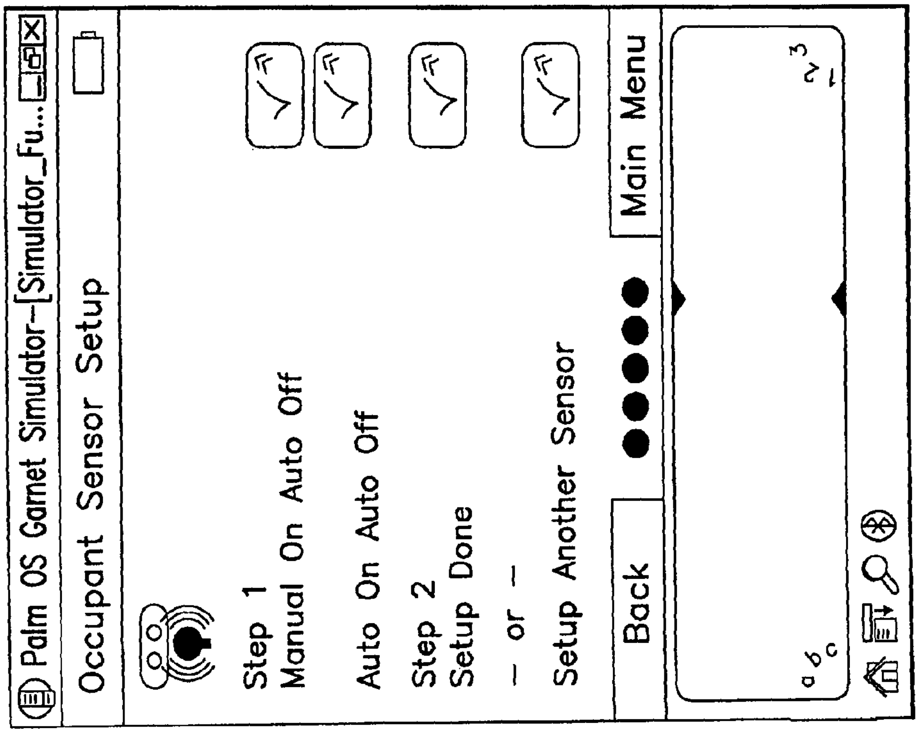
Figure 12J:
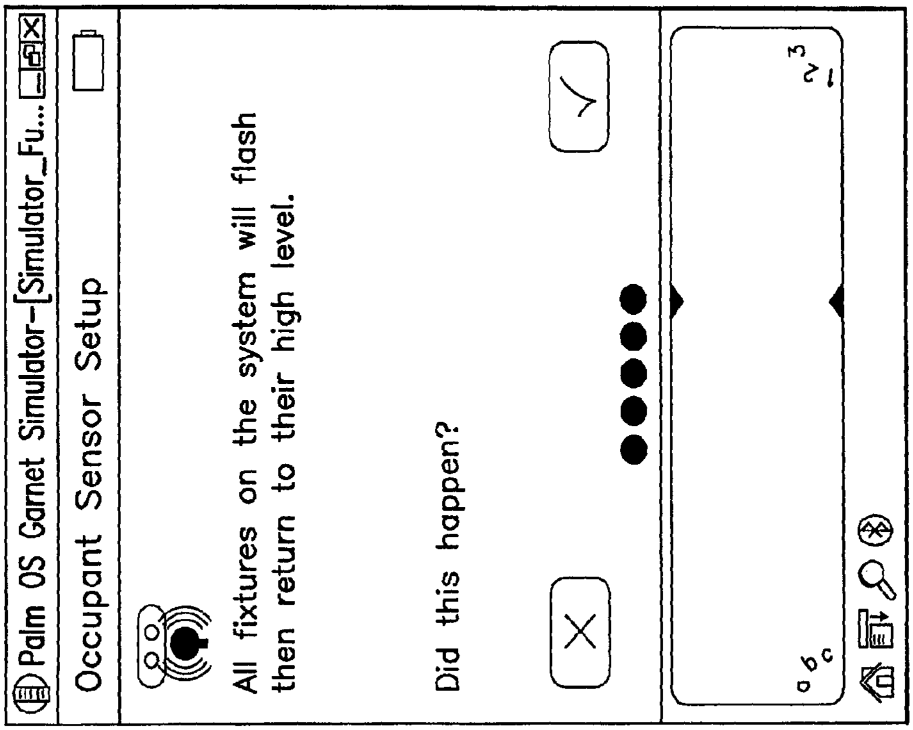

FIG. 11H is displayed when the user has selected (in FIG. 11G) an option to set a ballast 102 output level for modes and timeouts. FIG. 11H prompts the user to confirm that the fixture(s) are operating at an occupied level. After the user selects an option in FIG. 11G to define a timeout value, the user is provided with a display that warns the user that the timeout setting defined during this process is in addition to a default timeout set in the occupancy sensor 108. The user may decide after being warned in FIG. 11I to abort the process. In FIG. 11J, the user is provided with controls to increase or decrease a value representing the amount of time (e.g., 30 seconds, one minute, two minutes, five minutes, or ten minutes) for ballast 102 to time out. When the user is satisfied with the timeout value set in FIG. 11J, the user selects an icon (illustrated as a button comprising a checkmark) to select the timeout value, and a display screen as shown in FIG. 11K is provided on handheld programming device 101 comprising controls to enable the user to complete setting the timeout value, or to select another occupancy sensor 108. After making the selection in FIG. 11K, the user is prompted in FIG. 11L to confirm that all fixtures operate at high level. Thus, by interacting with the display screens on handheld programming device 101 and illustrated in the examples shown in FIGS. 11A-11L, a user can define respective timeout values for a plurality of ballasts 102 that react in response to a plurality of occupancy sensors 108 registering an occupied state.

FIGS. 12A-12J illustrate example display screens for configuring a ballast 102 to operate in response to the occupancy sensor in different modes. For example, the occupancy sensor may be configured to turn a ballast on via a manual control and, thereafter, turn off automatically when the room is unoccupied, or alternatively, turn on and off automatically.

Figure 13:
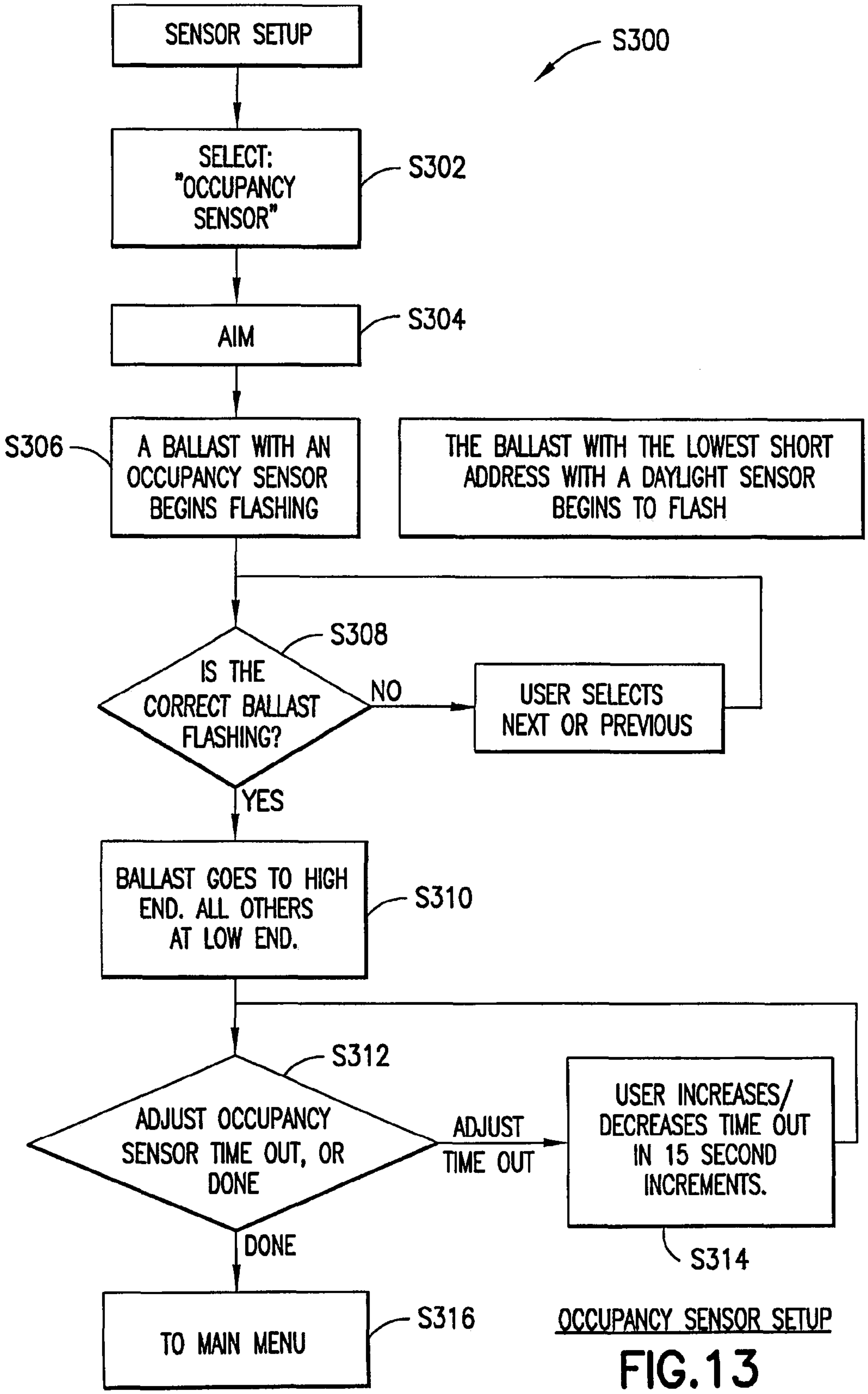
FIG. 13 is a flowchart showing a method for configuring an occupancy sensor device using a handheld programming device.

FIG. 13 is a flowchart that shows steps S300 that are used in accordance with a method for configuring an occupancy sensor device using handheld programming device 101. In the example flow chart shown in FIG. 9, a user defines an occupancy sensor time out value. At step S302, the user makes a selection on handheld programming device 101 to configure a ballast connected to the occupancy sensor device 108. At step S304, the user aims handheld programming device at an IR receiver 104 and all fixtures on the system operate at a minimum intensity with the exception of a fixture connected to the occupancy sensor 108. The ballast with the occupancy sensor begins flashing (step S306). Alternatively, the ballast 102 having the lowest short address with an occupancy sensor begins to flash. At step S308, the user determines whether the correct ballast is flashing. If not, the user uses handheld programming device 101 to select a different ballast (step S310). If the user determines the correct ballast is flashing, then the user selects the ballast and the ballast operates at a maximum intensity. The user uses handheld programming device 101 to set an occupied level and an unoccupied level. At step S312, the user adjusts the occupancy sensor time out control, representing the amount of time in which ballast 102 should cause lamp to turn off. For example, at step S314, the user increases or decreases the time out value by selecting a value on handheld programming device 101. After the user is satisfied with the sensor time out value, selected in step S312, the user proceeds to step S316 and the process ends. Thus, using handheld programming device 101, a user can make selections to configure an occupancy sensor device 108.

Figure 14:
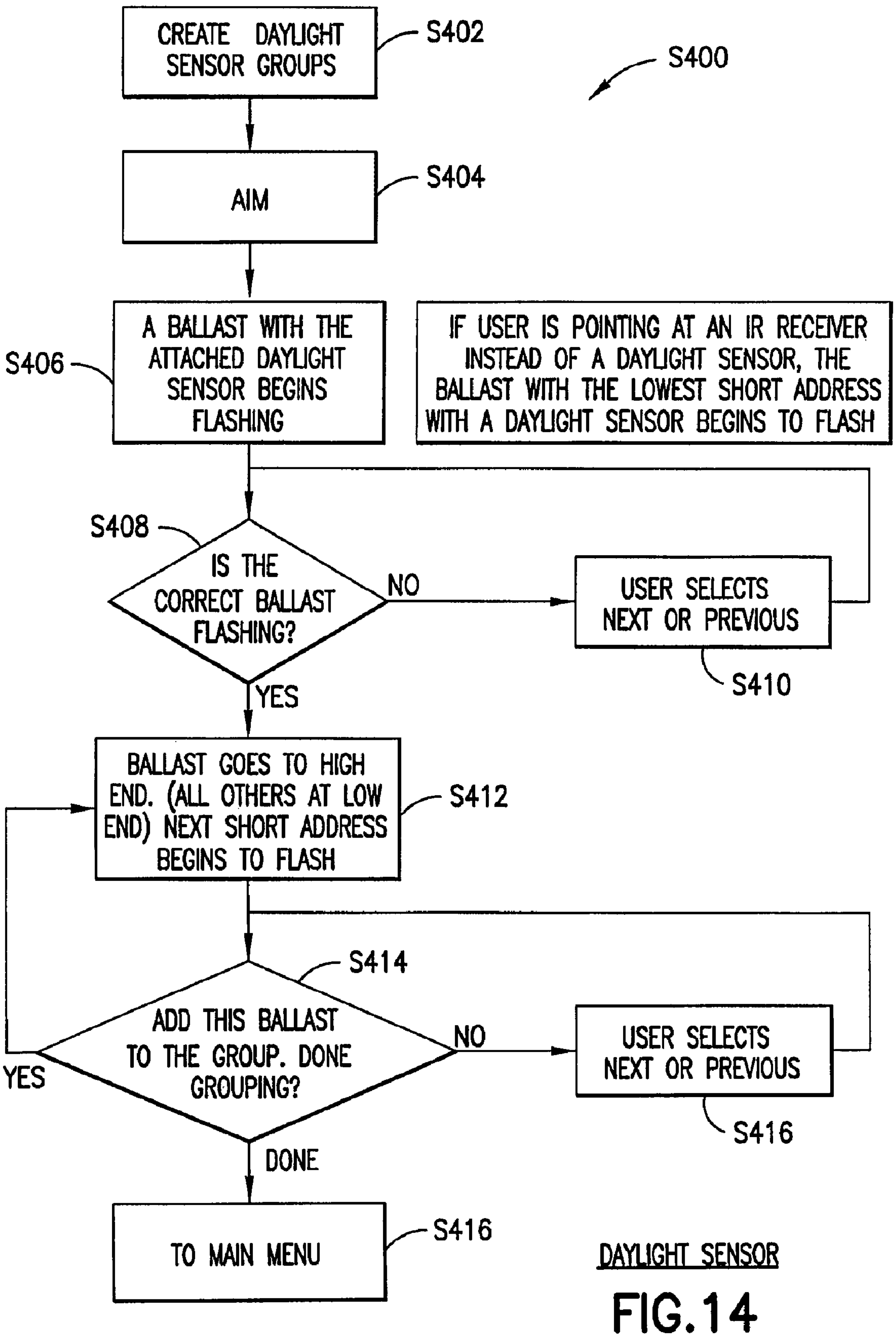
FIG. 14 is a flowchart showing a method for configuring a group of ballasts with a particular photosensor.

FIG. 14 is a flowchart showing steps for a method S400 for configuring a group of ballasts with a particular photosensor 106. At step S402, a user makes a selection on handheld programming device 101 for defining a daylight sensor group. At step S404, the user aims his handheld programming device at an IR receiver 104. A ballast that is coupled to the photosensor 106 begins flashing (step S406). If the user is pointing at an IR receiver instead of a daylight sensor, the ballast with the lowest short address with a daylight sensor begins to flash. In step S408, the user makes a determination whether the ballast that is flashing is the desired one. If the user determines the ballast that is flashing is not the desired one, the user selects a different ballast using handheld programming device 101, substantially as described above (step S410). When the user is satisfied that the correct ballast is flashing, the user selects the ballast and the ballast operates at its maximum intensity (step S412). Alternatively, the ballast having the next short address begins to flash. The user observing the next flashing ballast makes a determination at step S414 whether that next ballast should be added to the group. If not, then the user selects a next or previous ballast, substantially as described above (step S416). If the user desires to add that ballast to the group, the user selects the ballast and the second ballast, thereafter, operates at its maximum intensity and the process loops back to step S412. Accordingly, the ballast having the next short address begins to flash, and the user either selects that ballast for the group, selects a different ballast for the group, or ends the process at step S418. Thus, using handheld programming device 101, a user can configure a group of ballasts to operate with a particular photosensor 106.

Figure 15:
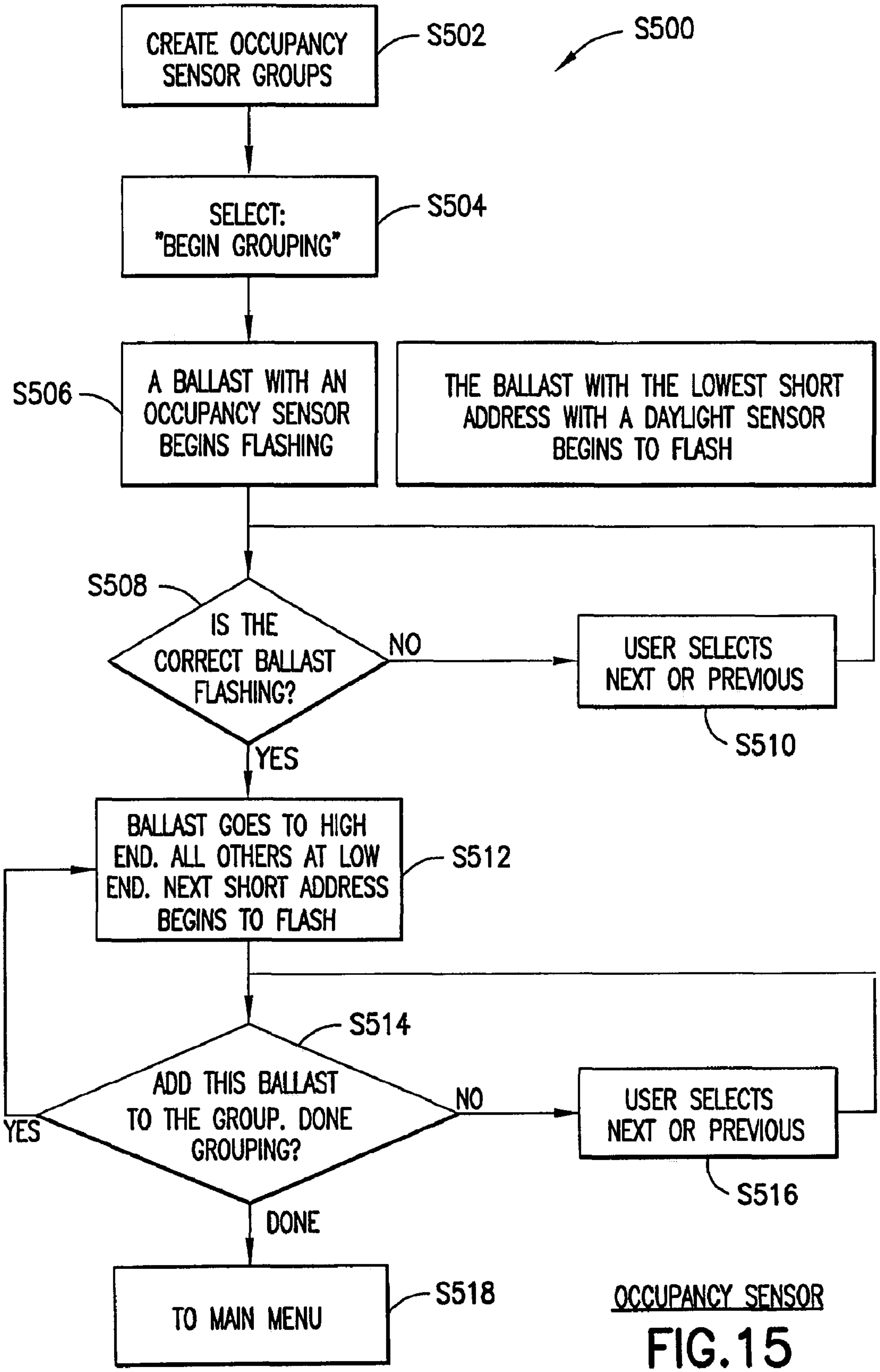
FIG. 15 is a flowchart illustrating a method for defining an occupancy sensor group using a handheld programming device.

FIG. 15 is a flowchart illustrating steps for a method S500 for defining an occupancy sensor group using handheld programming device 101. At step S502, the user selects a choice on handheld programming device 101 for creating an occupancy sensor group. Thereafter, the user aims handheld programming device 101 and an IR receiver 104. At step S506, a ballast 102 that is electrically connected to an occupancy sensor begins flashing. Alternatively, the ballast with the lowest short address with a daylight sensor begins to flash. In step S508, the user makes a determination whether the ballast that is flashing is the correct one. If the user determines the ballast that is flashing is not the correct one, the user selects a different ballast using handheld programming device 101, substantially as described above (step S510).

When the user is satisfied in step S508 that the correct ballast is flashing, the user selects the ballast and the ballast operates at its maximum intensity (step S512). Alternatively, the ballast having the next short address begins to flash. The user observing the next flashing ballast makes a determination at step S514 whether that next ballast should be added to the group. If not, then the user selects a next or previous ballast, substantially as described above (step S516). If the user desires to add that ballast to the group, the user selects the ballast and the second ballast, thereafter, operates at its maximum intensity and the process loops back to step S512. Accordingly, the ballast having the next short address begins to flash, and the user either selects that ballast for the group, selects a different ballast for the group, or ends the process at step S518.

In addition to configuring ballasts and sensor devices, handheld programming device 101 provides an interface for grouping ballasts 102 to operate together in response to photosensors 106, occupancy sensors 108, IR receivers 104 and contact closures 112.

Figure 16:
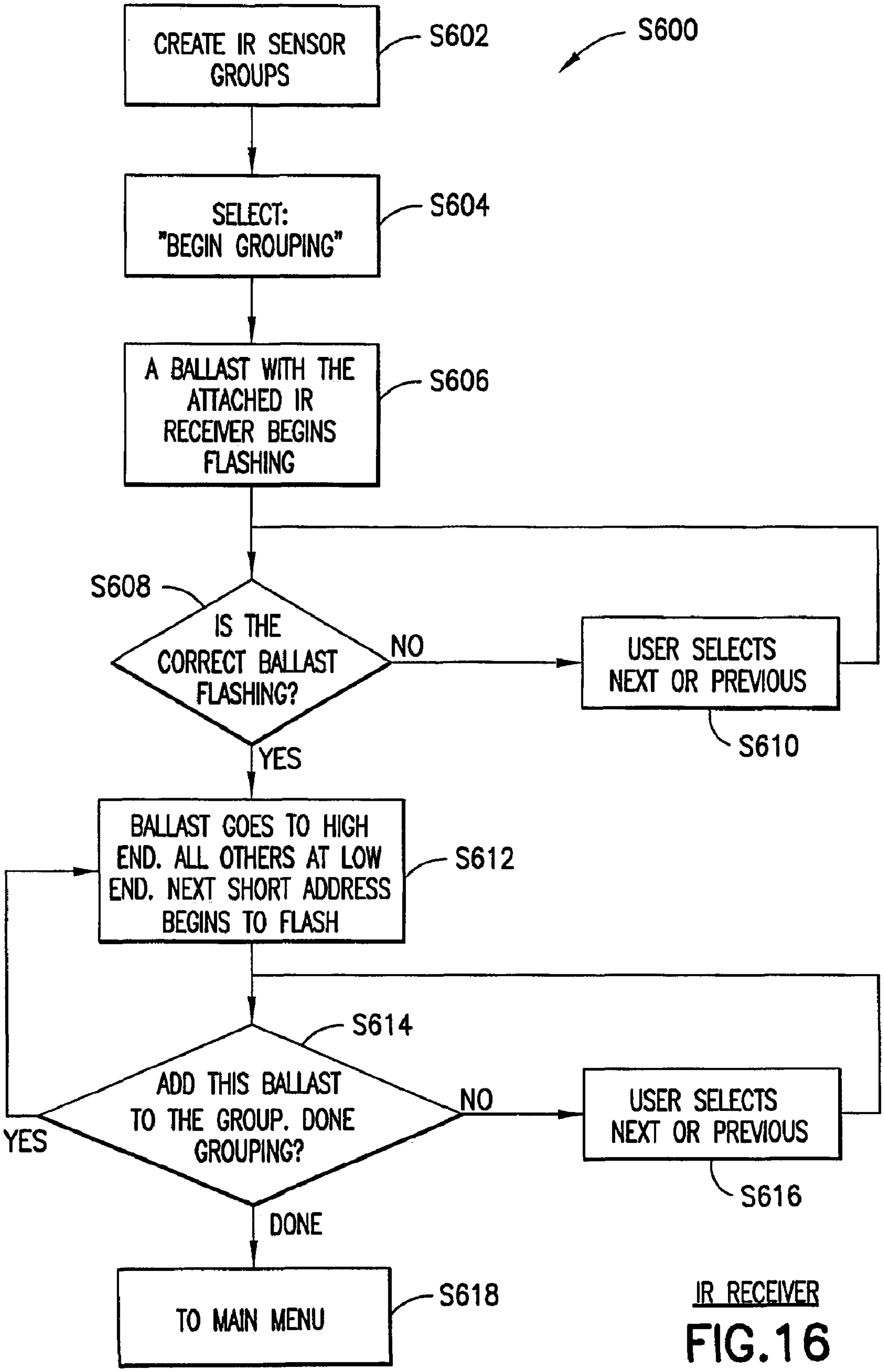
FIG. 16 is a flowchart showing a method for configuring a group of ballasts with a particular infrared receiver device.

In addition to grouping ballasts 102 with a respective photosensor 106 or occupancy sensor 108, the present invention enables a user to use a handheld programming device 101 to associate or group a plurality of ballasts 102 to receive commands via a single infrared receiving device 104. FIG. 16 shows a flow chart showing steps for a method S600 for configuring a group of ballasts 102 with a particular infrared receiver device 104. At step S602, a user makes a selection on handheld programming device 101 for defining a group of ballasts 102 to operate via a single infrared receiver 104. At step S604, the user aims his handheld programming device at an IR receiver 104. A ballast that is coupled to the infrared receiver 104 begins flashing (step S606). In step S608, the user makes a determination whether the ballast that is flashing is the correct one. If the user determines in step S608 that the ballast that is flashing is not the correct one, the user selects a different ballast using handheld programming device 101, substantially as described above (step S610). When the user is satisfied that the correct ballast 102 is flashing, the user selects it and the ballast operates at its maximum intensity (step S612). The user observing the next flashing ballast 102 makes a determination at step S614 whether that ballast should be added to the group. If not, then the user selects a next or previous ballast, substantially as described above (step S616). If the user desires to add that ballast to the group, the user selects the ballast and that ballast 102, thereafter, operates at its maximum intensity and the process loops back to step S612. Accordingly, the ballast having the next short address begins to flash, and the user either selects that ballast for the group, selects a different ballast 102 for the group, or ends the process at step S618. Thus, using handheld programming device 101, a user can associate a group a plurality of ballasts 102 to receive commands via a single infrared receiving device 104.

As noted above, the present invention provides an improvement over prior art lighting control systems, such as those implementing the DALI protocol, by enabling a user to operate a handheld programming device 101 in order to replace and configure one or more ballasts 102. In one embodiment, after a plurality of replacement ballasts 102 are physically installed on ballast link 116, a user uses handheld programming device 101 to cause bus supply 114 to reference information that relates to a replaced ballast 102 and that is stored in database 118. A new record for the new ballast 102 is preferably created, and the setting and configuration information relating to the replaced ballast 102 copied to the record representing the new ballast 102. Thereafter, the information is transmitted over ballast link 116 to the new ballast 102 and all of the setting and configuration information from the replaced ballast 102 is automatically provided to the new ballast 102, and the new ballast 102 performs exactly in the same way as the replaced ballast 102 did. By repeating the process, a plurality of ballasts 102 can be replaced in a single process. In a prior art DALI system replacement of a plurality of ballasts 102 is not possible because there would be no way to distinguish two or more unassigned ballasts 102 from each other. The organization of the database 118 is discussed later herein with reference to FIG. 28.

Figure 17:
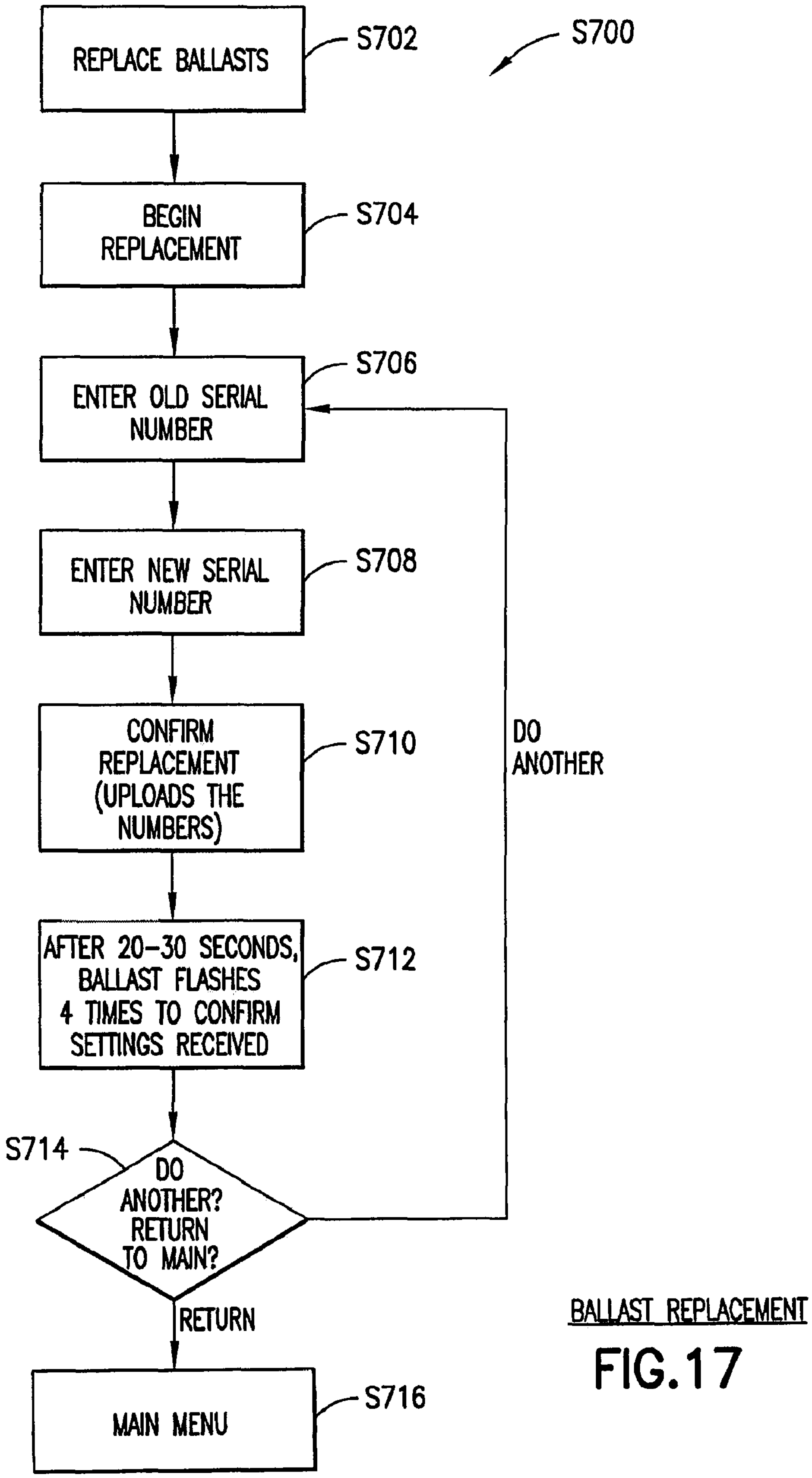
FIG. 17 is a flowchart illustrating a method for replacing one or a plurality of ballasts using a handheld programming device.

FIG. 17 is a flowchart illustrating steps for a method S700 for replacing one or a plurality of ballasts 102 using a handheld programming device 101. At step S702, the user makes a selection on handheld programming device 101 to replace ballasts 102. At step S704, the user aims handheld programming device 101 at an IR receiver 104, and selects an option to initiate a communication. In the embodiment shown, when communicating via the IR receiver 104, the user uses handheld programming device 101 to enter the serial number of the replaced (old) ballast 102 (step S706). Thereafter, the user enters the serial number of the replacement (new) ballast 102 (step S708). When the replaced serial number and the replacement serial number are entered, the user transmits the information by selecting an option on handheld programming device to confirm the replacement serial numbers (step S710).

After a brief period of time, for example, about ten seconds, bus power supply 114 completes a process of transferring the configuration and setting information of the replaced ballast 102 to the replacement ballast 102, and the lamp associated with the replacement ballast flashes, for example, four times (step S712). By flashing, the replacement ballast 102 alerts the user that the ballast is configured according to the replaced ballast 102. Thereafter, the user makes a determination, in step S714, whether another ballast 102 is to be replaced. If so, the process loops back to step S706, and the user identifies another ballast 102 to be replaced by its serial number. Alternatively, if the user does not desire to replace another ballast 102, the user selects an option to terminate the process and return, for example, to the main menu on handheld programming device 101 (step S716). Thus, using handheld programming device 101, a user can replace one or a plurality of ballasts 102 installed on ballast link 116.

In addition to configuring ballasts 102 and sensor devices 106 and 108, the present invention provides an interface for a user to use handheld programming device 101 to define the operation of the ballast 102 in response to the contact closure inputs 112. For example, using handheld programming device 101, a user defines settings for a single ballast 102 or group of ballasts 102 for a contact closure that is in a closed state. Alternatively, the user defines settings for a single ballast 102 or group of ballasts 102 for a contact closure that is in a open state. Moreover, a single ballast 102 or group of ballasts 102 can be so configured for a plurality of contact closures.

Figure 18A:
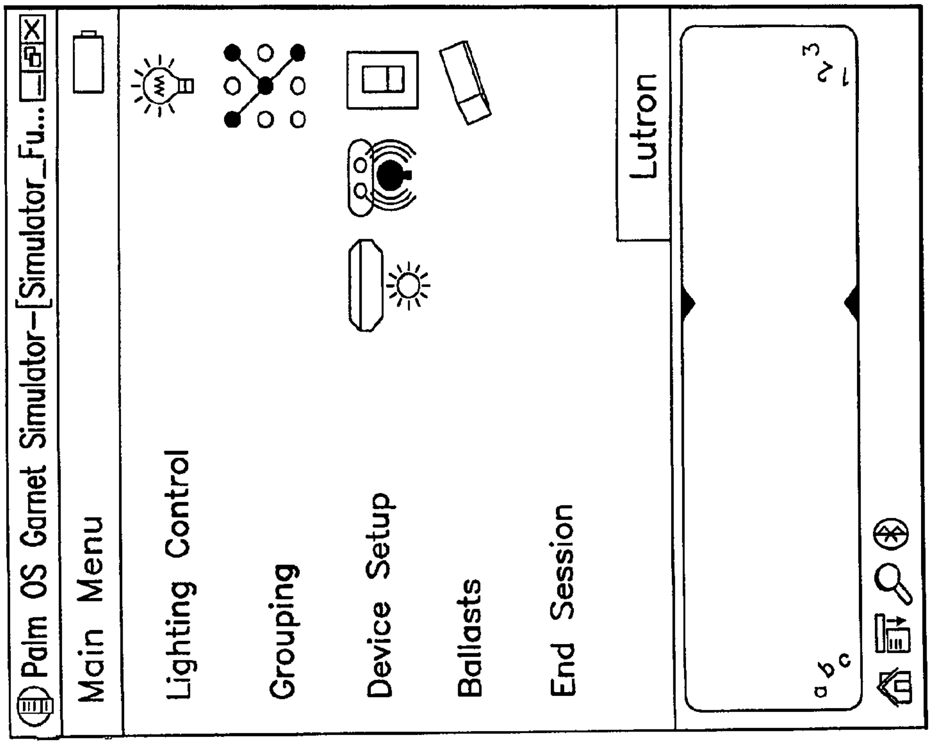
FIGS. 18A-18I illustrate example display screens provided on a handheld programming device for defining closed level settings for one or more ballasts that are associated with a particular contact closure input that is in a closed state.
Figure 18B:
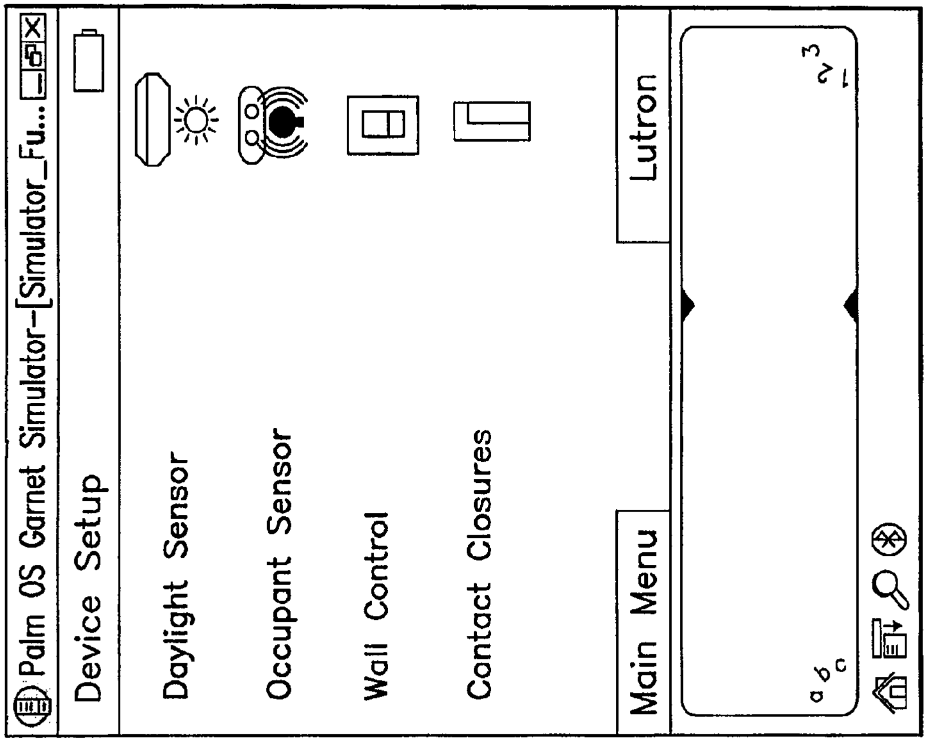
Figure 18C:
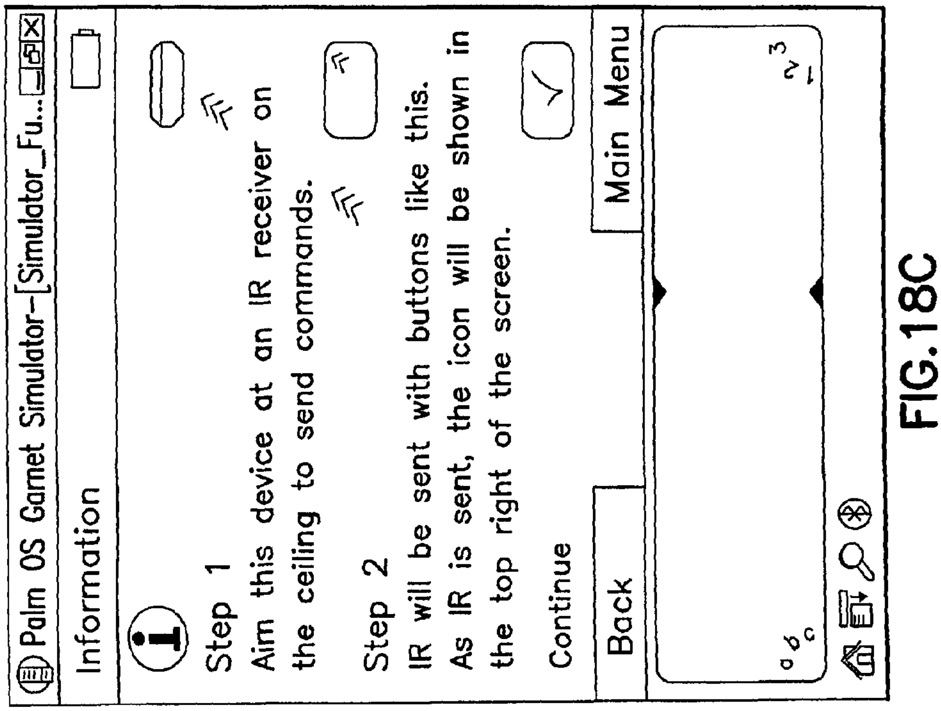
Figure 18D:
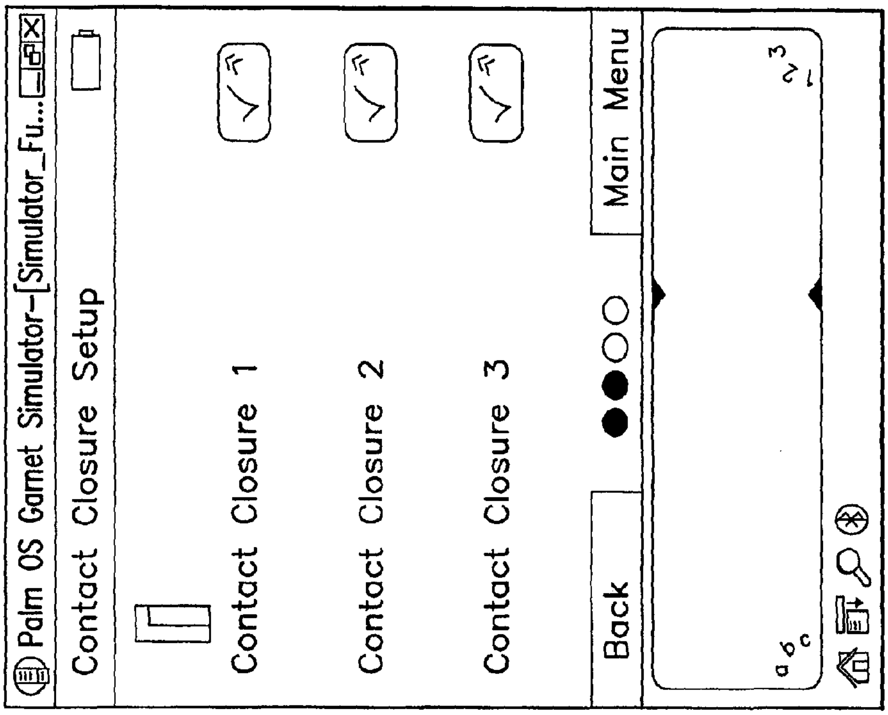
Figure 18E:
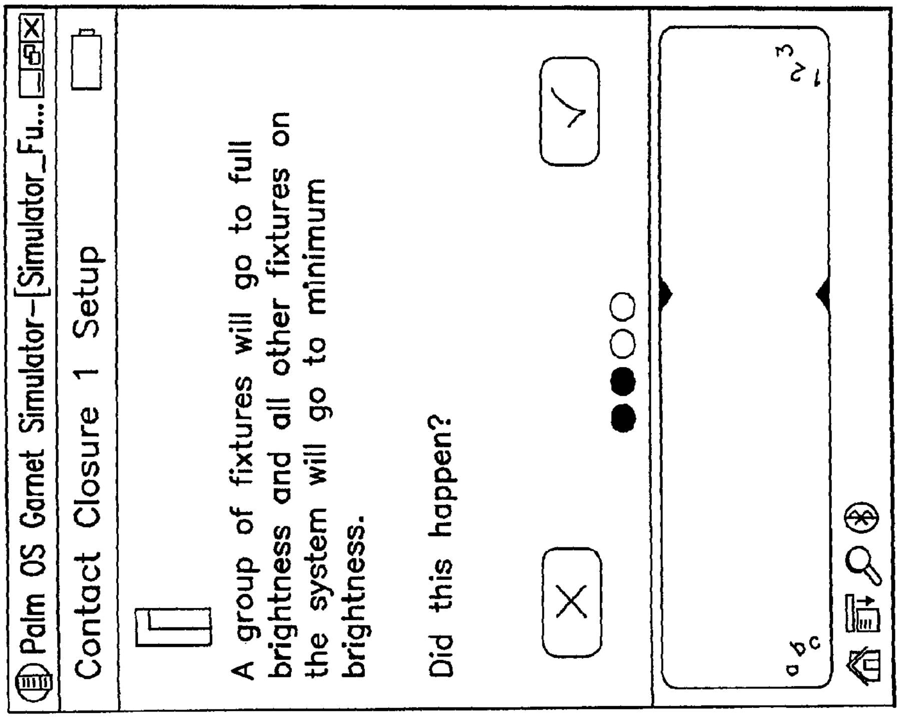
Figure 18F:
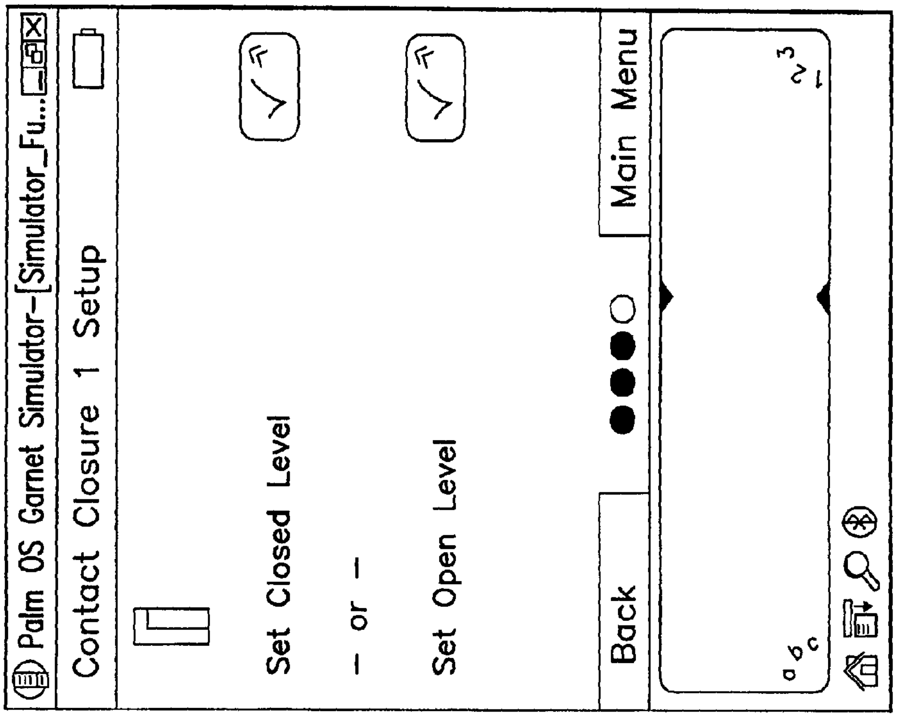
Figure 18G:
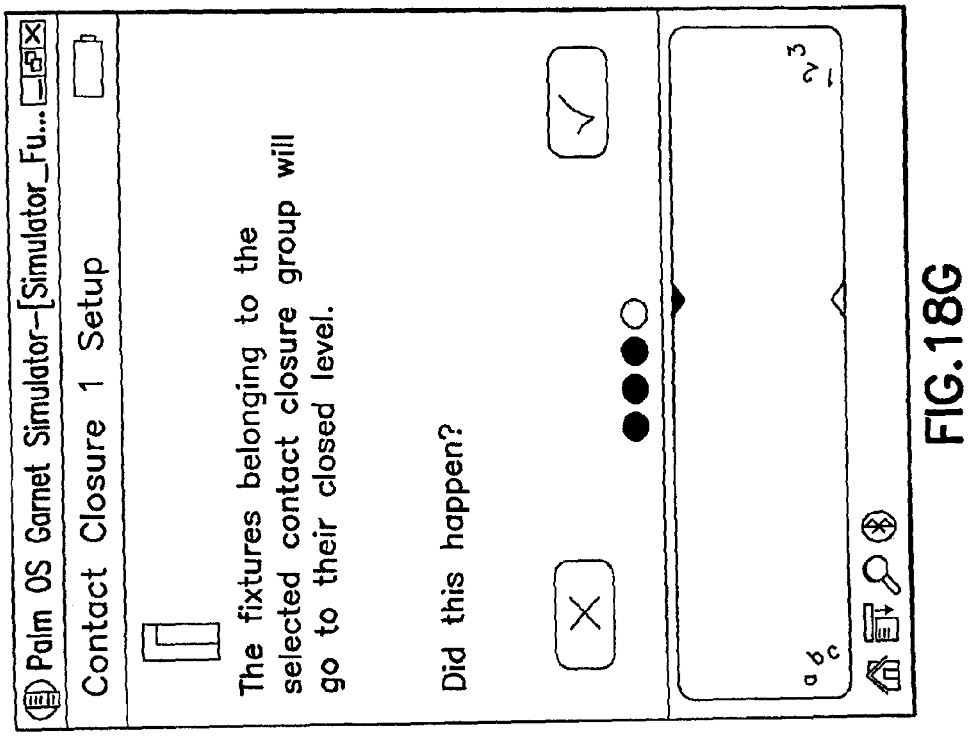
Figure 18H:
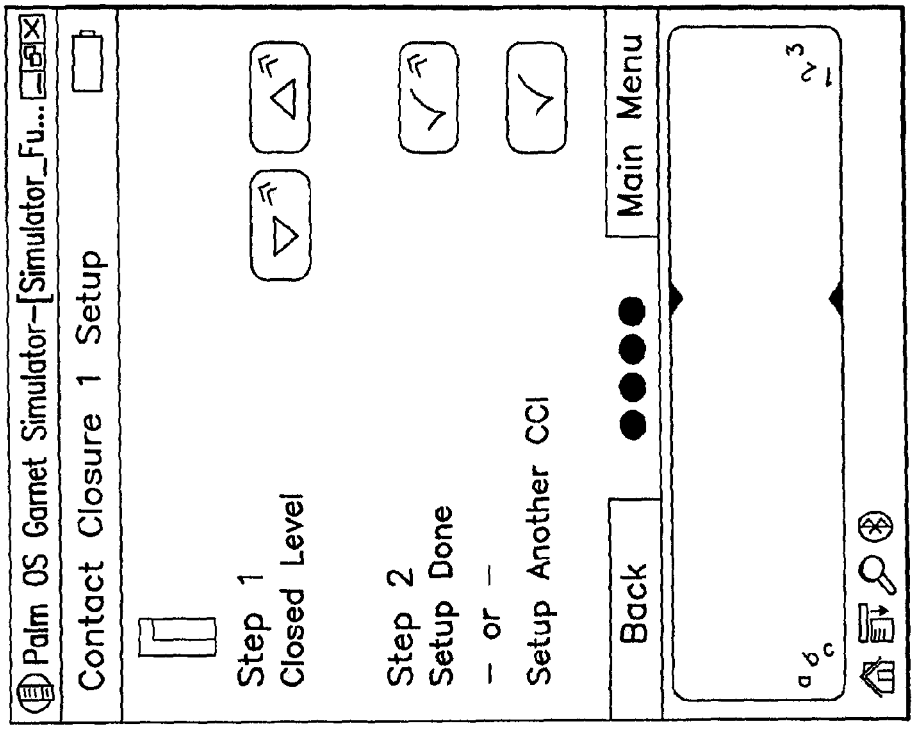
Figure 18I:
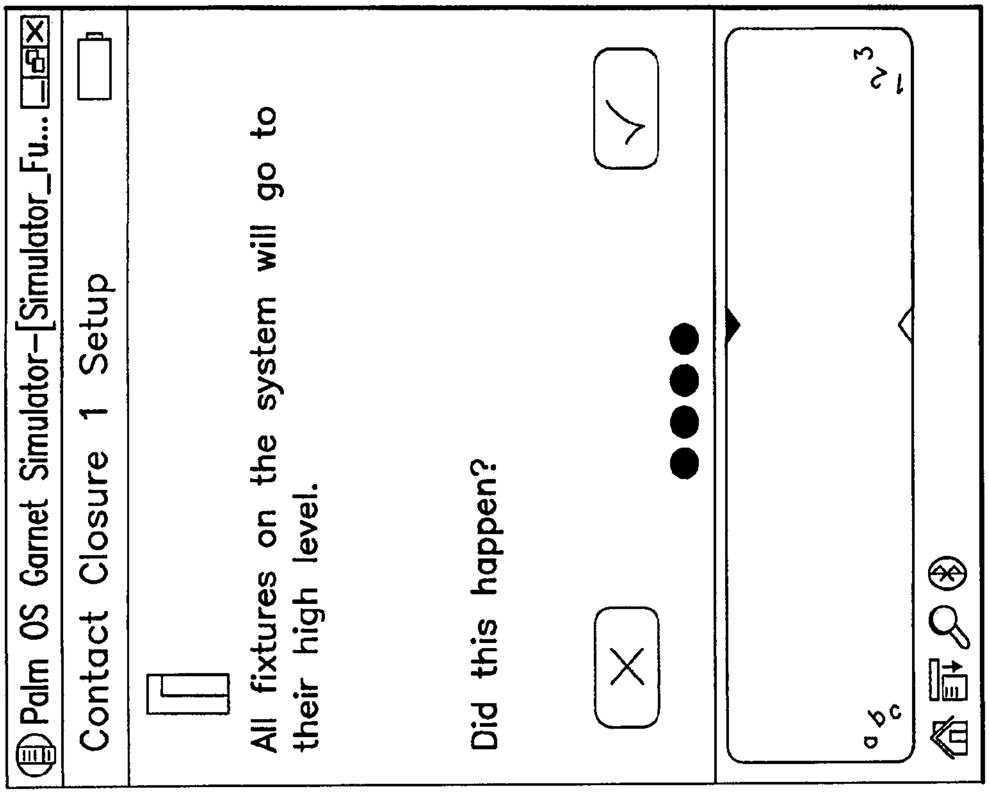

FIGS. 18A-18I illustrate example display screens provided on handheld programming device 101 for defining closed level settings for one or more ballast(s) 102 that are associated with a particular contact closure input 112 that is in a closed state. In FIG. 18A, a user selects an option for "Device Setup" and selects, in FIG. 18B, an option for contact closure 112. In FIG. 18C, the user is prompted to aim handheld programming device at an IR receiver 104 and select an icon, formatted as a button comprising a checkmark, to continue. After the user selects the icon, FIG. 18D is displayed that lists one or more contact closures 112 for the user to select for defining a closed level. In FIG. 18E, the user is prompted to confirm (by selecting an icon) that one or more fixtures configured with the respective contacted closure that was selected in FIG. 18D are operating at full brightness, and all other fixtures are operating at minimum brightness. If the user indicates that this has occurred, then FIG. 18F is displayed and the user is prompted to select an option for setting a "closed level", i.e., the intensity level that results when the contact closure input 112 is in the closed state, or an "open level", i.e., the intensity level that results when the contact closure input 112 is in the open state. FIG. 18G is displayed when the user has selected (in FIG. 18F) an option to set a closed level, and the user is prompted to confirm that the fixture(s) are operating at a closed level. In a default state, lighting loads associated with a contact closure input 112 operate at a minimum brightness, for example, when the contact closure input is closed. When the user confirms that the lighting loads are operating at a closed level, then, in FIG. 18H, the user is provided with controls to increase or decrease the intensity of the fixtures. When the user is satisfied with the level set for the closed level, the user selects a choice to complete setting the level, or to select another contact closure input 112. After making the selection in FIG. 18H, the user is prompted in FIG. 18I to confirm that all fixtures operate at high level. Thus, by interacting with the display screens on handheld programming device 101 and illustrated in the examples shown in FIGS. 18A-18I, a user can define levels for the closed state of a contact closure input 112.

Figure 19A:
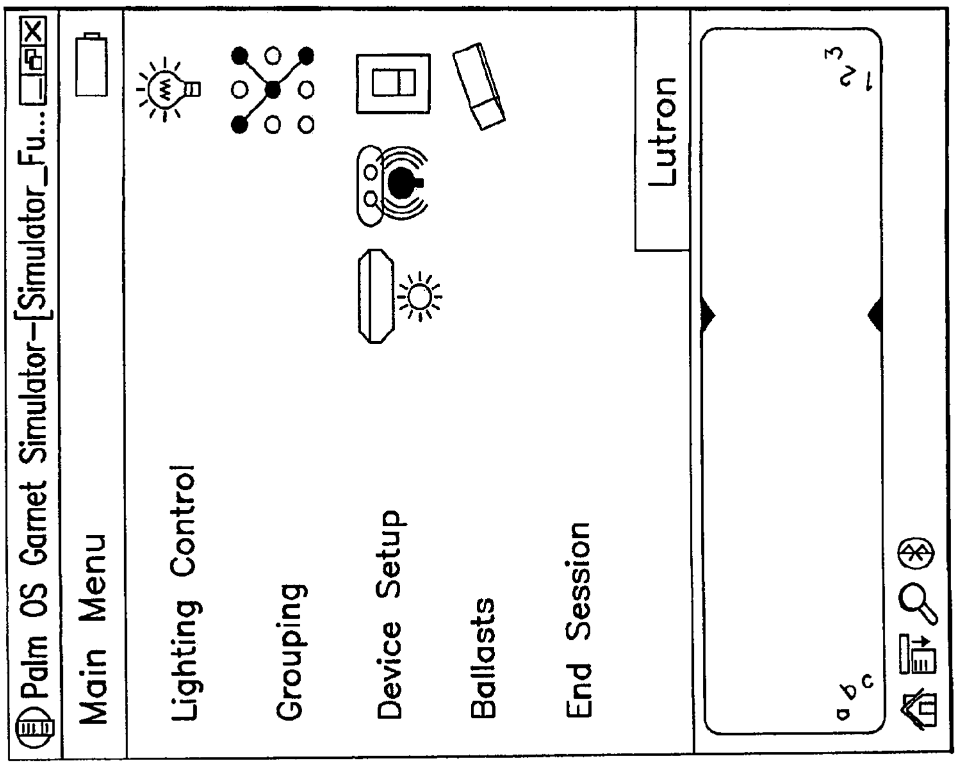
FIGS. 19A-19I illustrate example display screens provided on a handheld programming device for defining open level settings for one or more ballasts that are associated with a particular contact closure input that is in an open state.
Figure 19B:
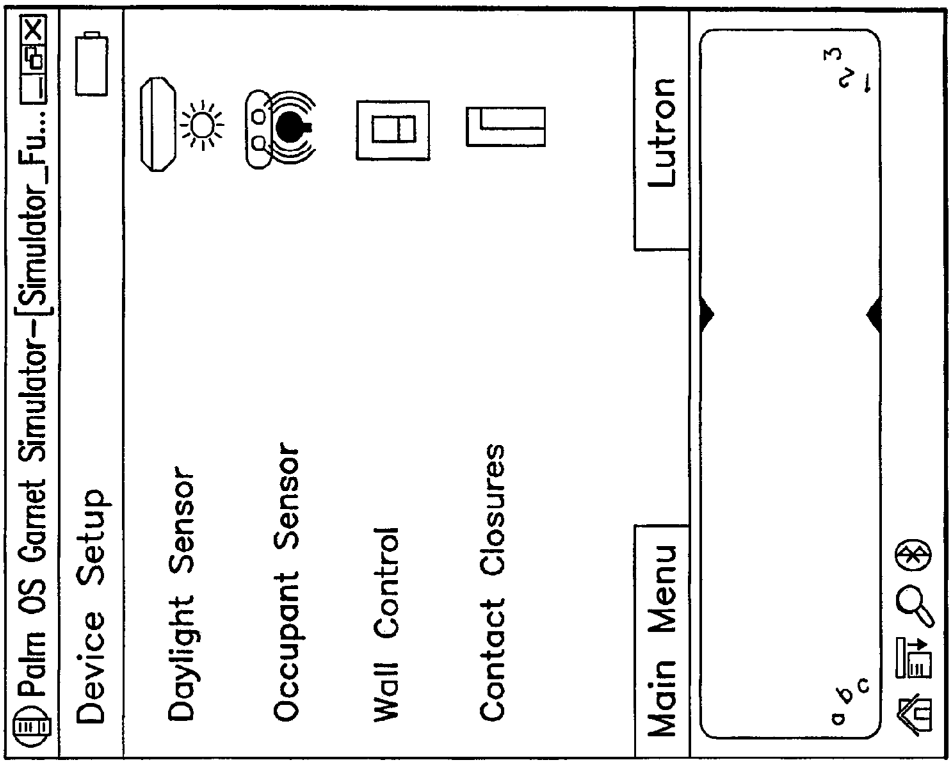
Figure 19C:
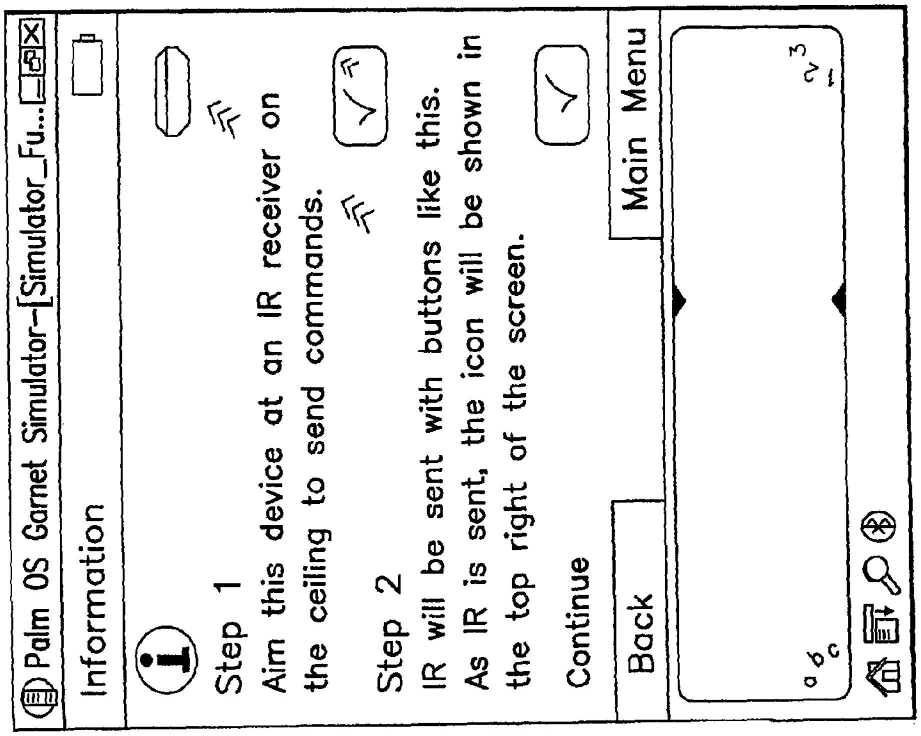
Figure 19D:
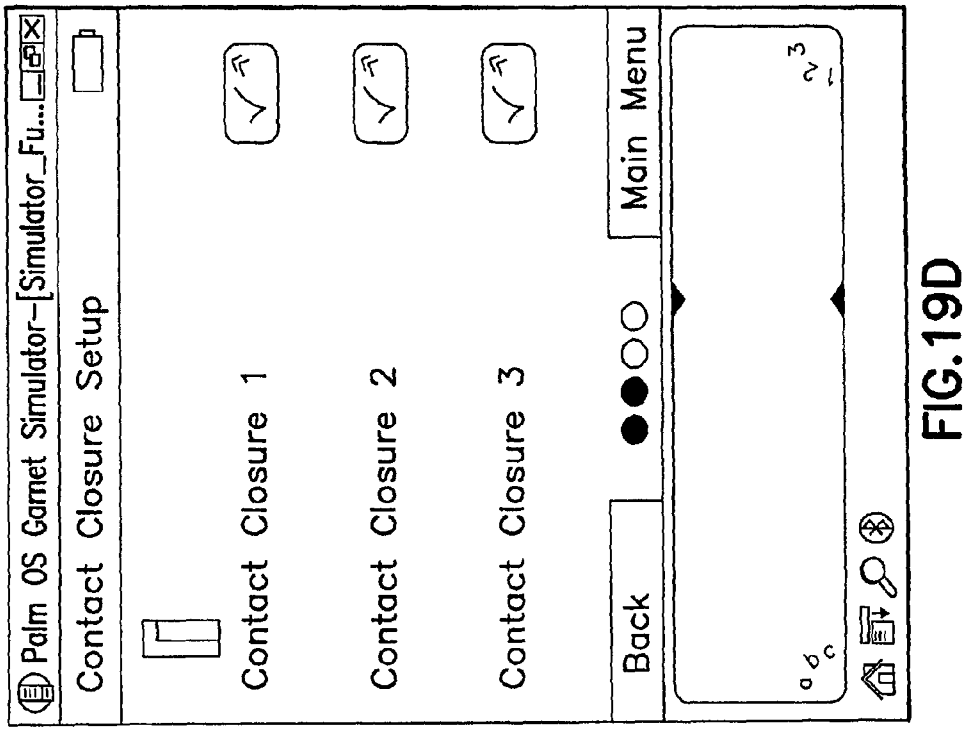
Figure 19E:
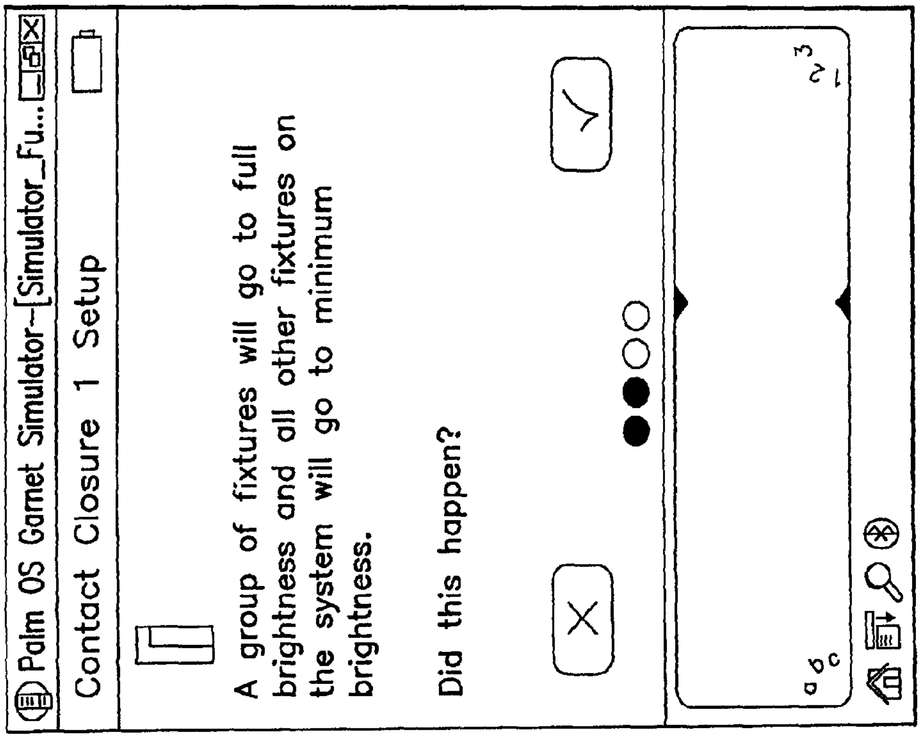
Figure 19F:
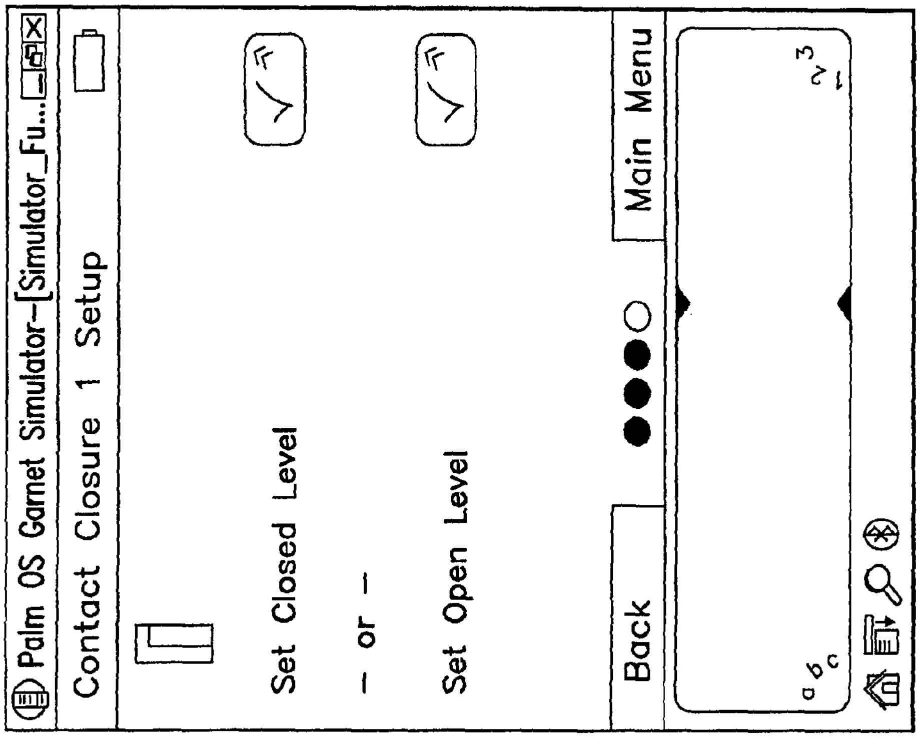
Figure 19G:
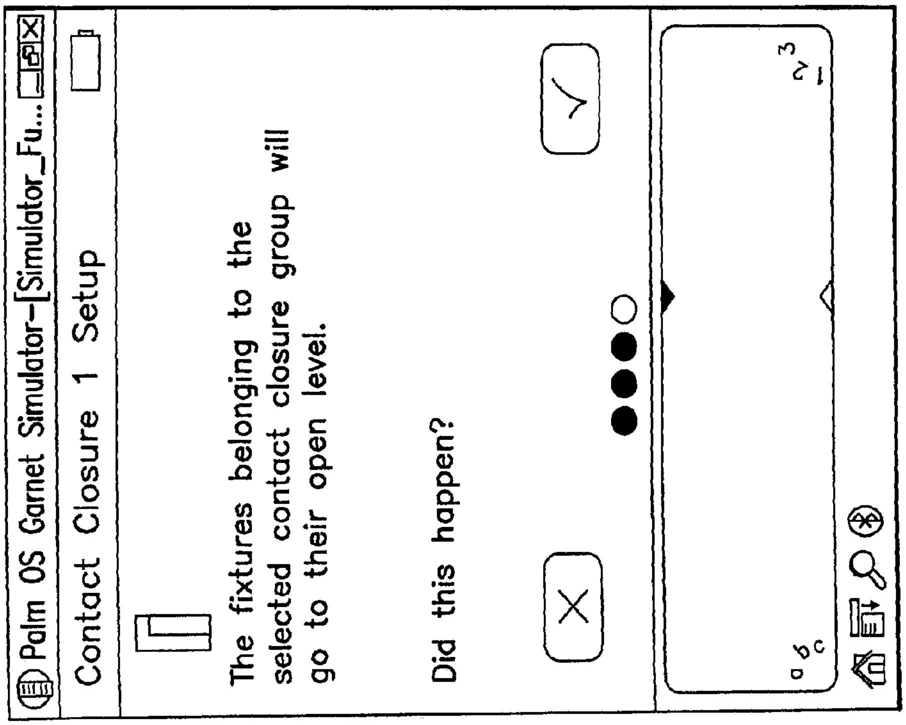
Figure 19H:
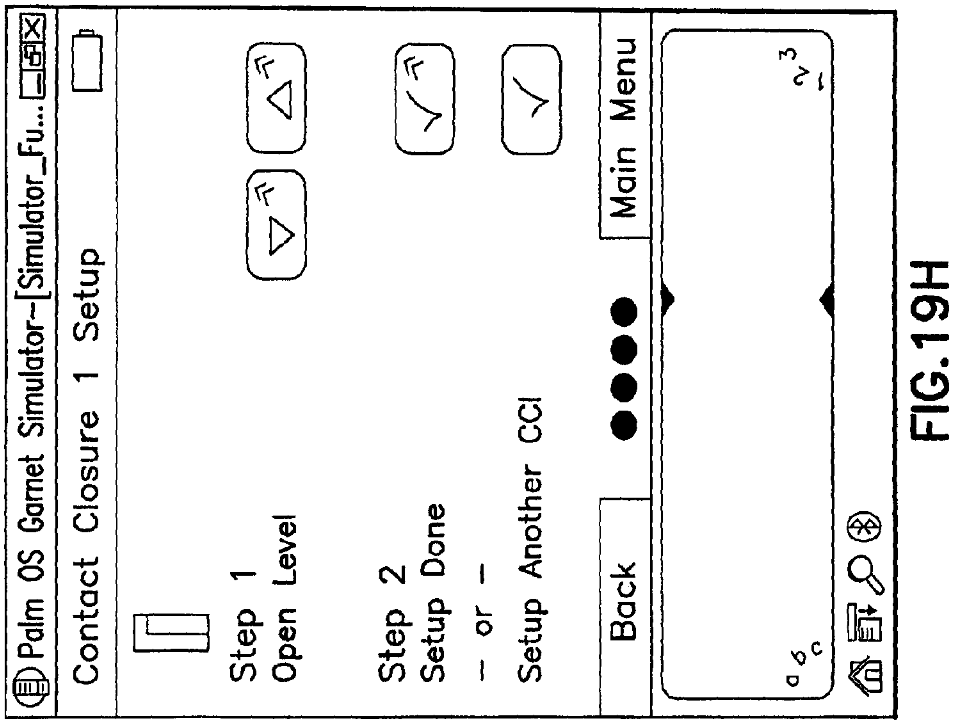
Figure 19I:
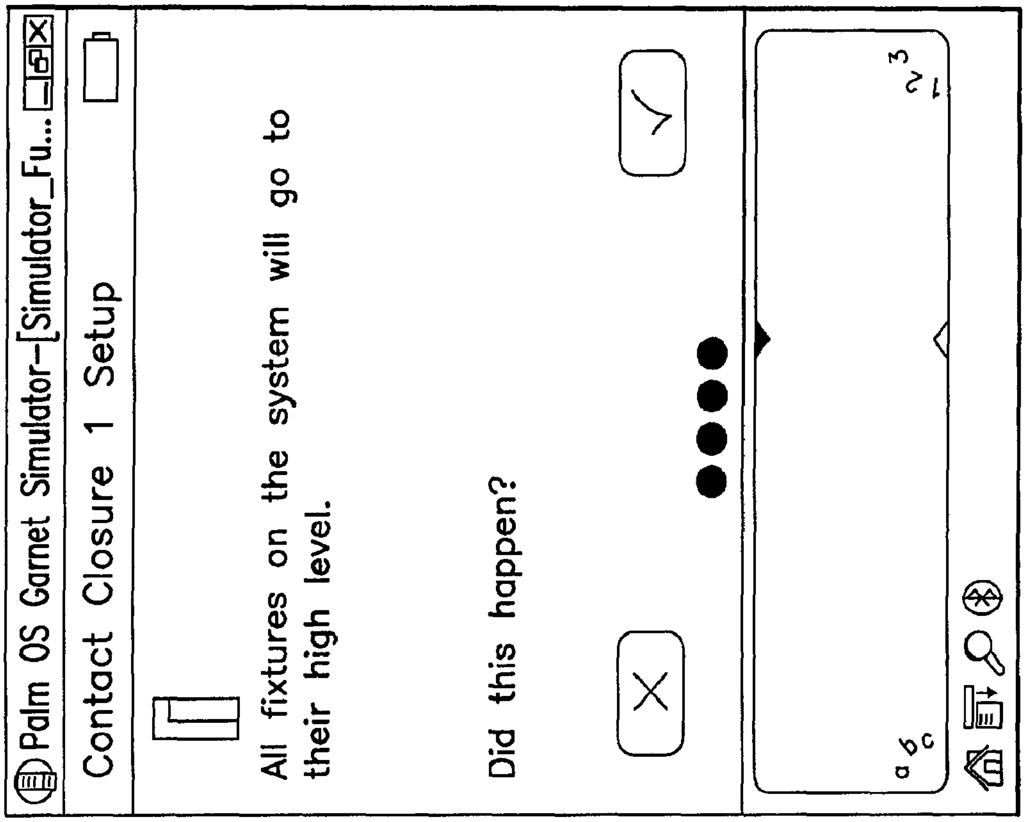

FIGS. 19A-19I illustrate example display screens provided on handheld programming device 101 for defining open level settings for one or more ballasts 102 that are associated with a particular contact closure input 112 that is in an open state. In FIG. 19A, a user selects an option for "Device Setup" and selects, in FIG. 19B, an option for contact closure input 112. In FIG. 19C, the user is prompted to aim handheld programming device at an IR receiver 104. After the user selects the icon, FIG. 19D is displayed that lists one or more contact closure inputs 112 for the user to select for defining a open level. In FIG. 19E, the user is prompted to confirm that one or more fixtures configured with the respective contacted closure that was selected in FIG. 19D are operating at full brightness, and all other fixtures are operating at minimum brightness. If the user indicates that this has occurred, then FIG. 19F is displayed and the user is prompted to select an option for setting an open level or an open level. FIG. 19G is displayed when the user has selected (in FIG. 19F) an option to set an open level, and the user is prompted to confirm that the fixture(s) are operating at an open level. In a default state, fixtures associated with a contact closure input 112 operate at a maximum intensity, for example, when the contact is open. When the user confirms that the fixtures are operating at an open level, then, in FIG. 19H the user is provided with controls to increase or decrease the intensity of the fixtures. When the user is satisfied with the level set for the open level, the user selects a choice to complete setting the level, or to select another contact closure input 112. After making the selection in FIG. 19H, the user is prompted, in FIG. 19I, to confirm that all fixtures operate at high level. Thus, by interacting with the display screens on handheld programming device 101 and illustrated in the examples shown in FIGS. 19A-19I, a user can define levels for the open state of a contact closure input 112.

Figure 20A:
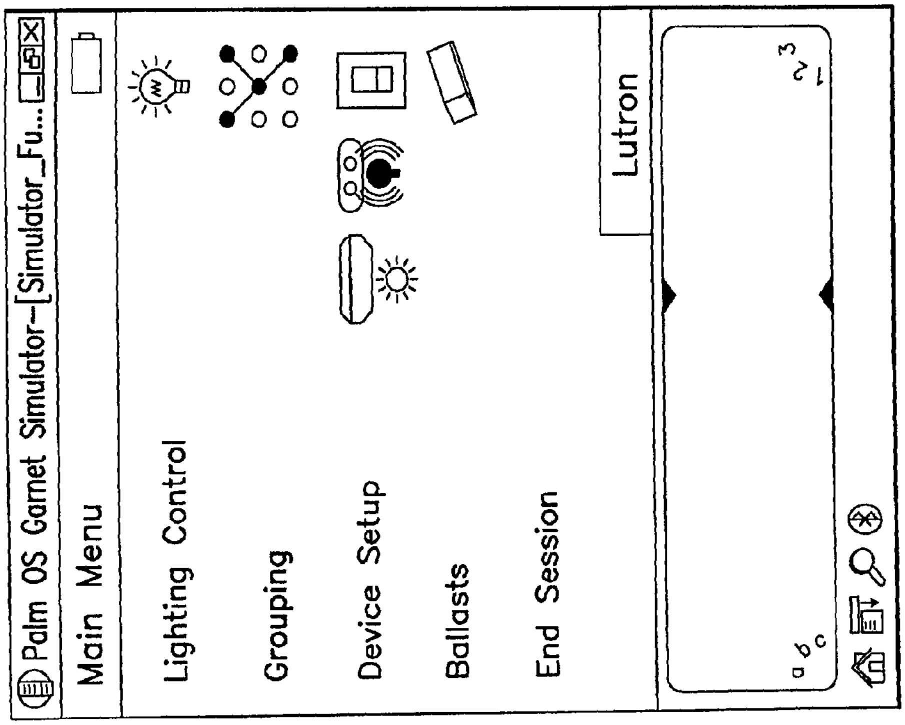
FIGS. 20A-20I illustrate example display screens provided on a handheld programming device for defining a group of ballasts to receive instructions via a single IR receiver.
Figure 20B:
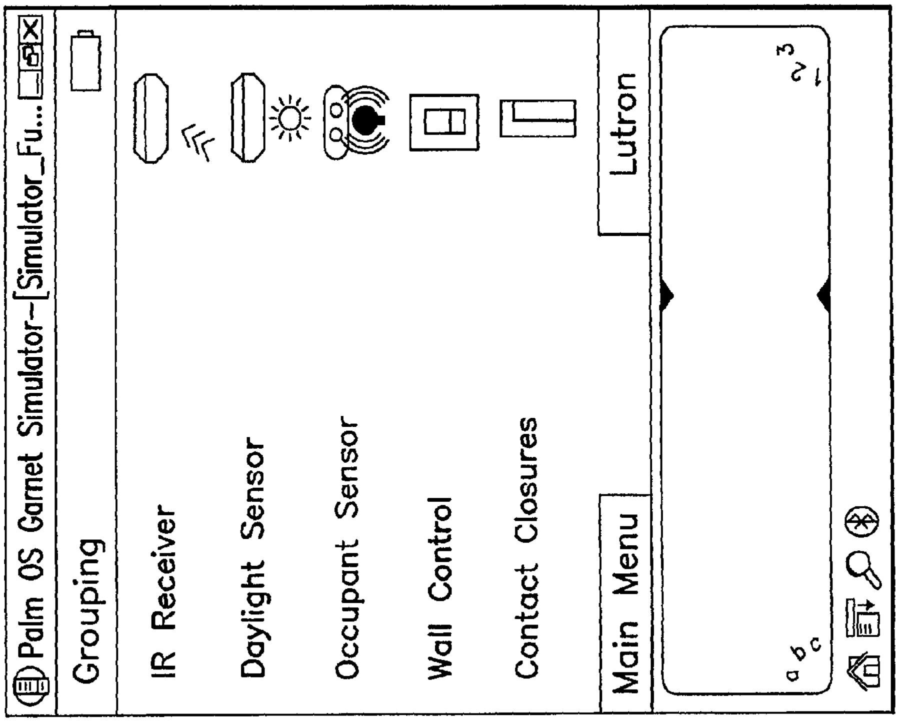
Figure 20C:
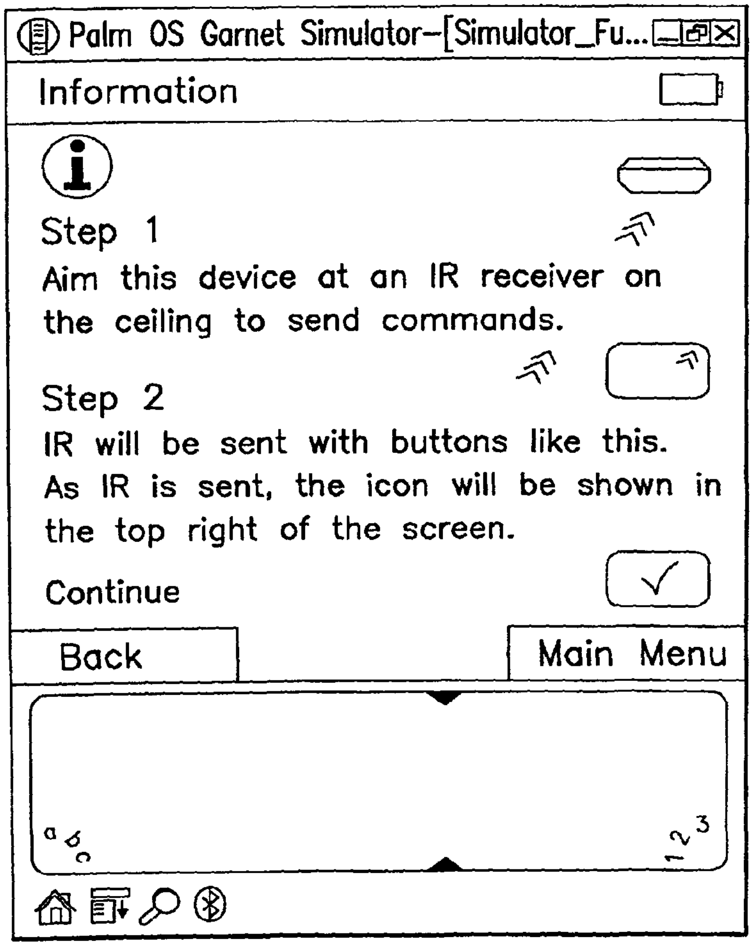

FIGS. 20A-20I illustrate example display screens provided on handheld programming device 101 for defining a group of ballasts 102 to receive instructions via a single IR receiver. In FIG. 20A, a user selects an option for a device setup. In FIG. 20B, the user selects an option for IR receiver 104. In FIG. 20C, the user is prompted to aim handheld programming device at an IR receiver 104 and select an icon, formatted as a button comprising a checkmark, to continue, and in FIG. 20D, the user is prompted to begin communicating over ballast link 116.

Figure 20D:
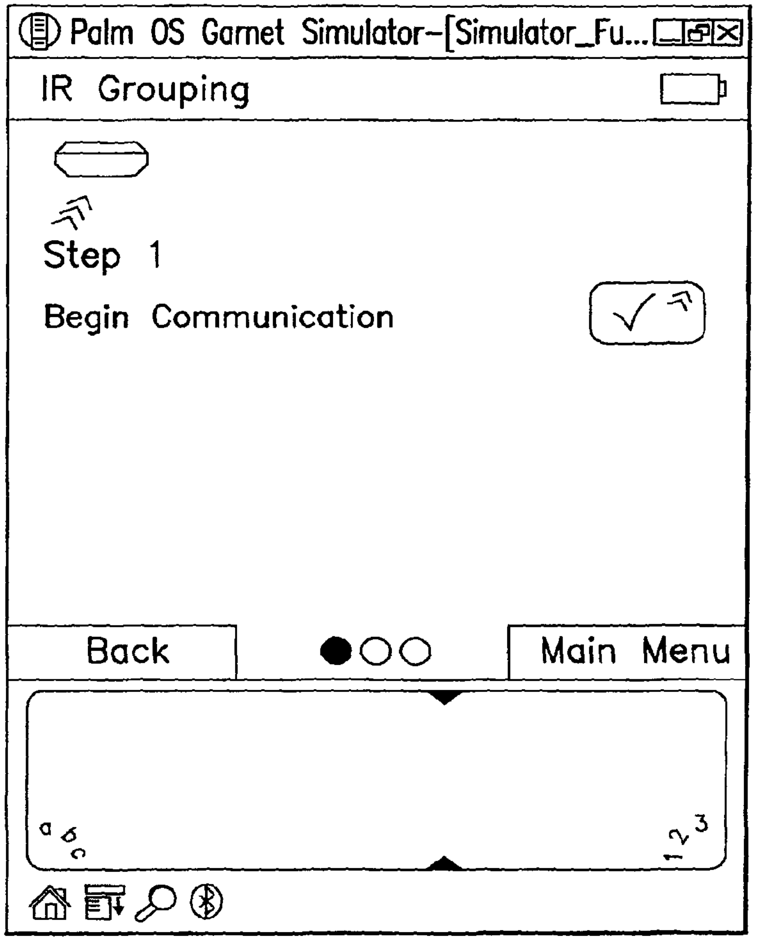
Figure 20E:
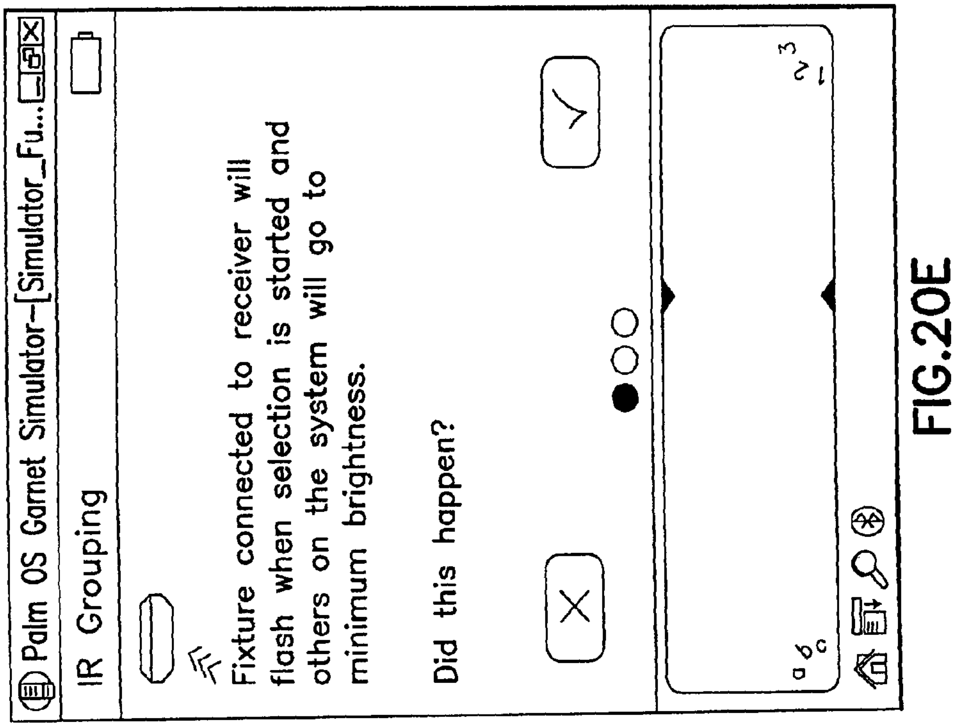
Figure 20F:
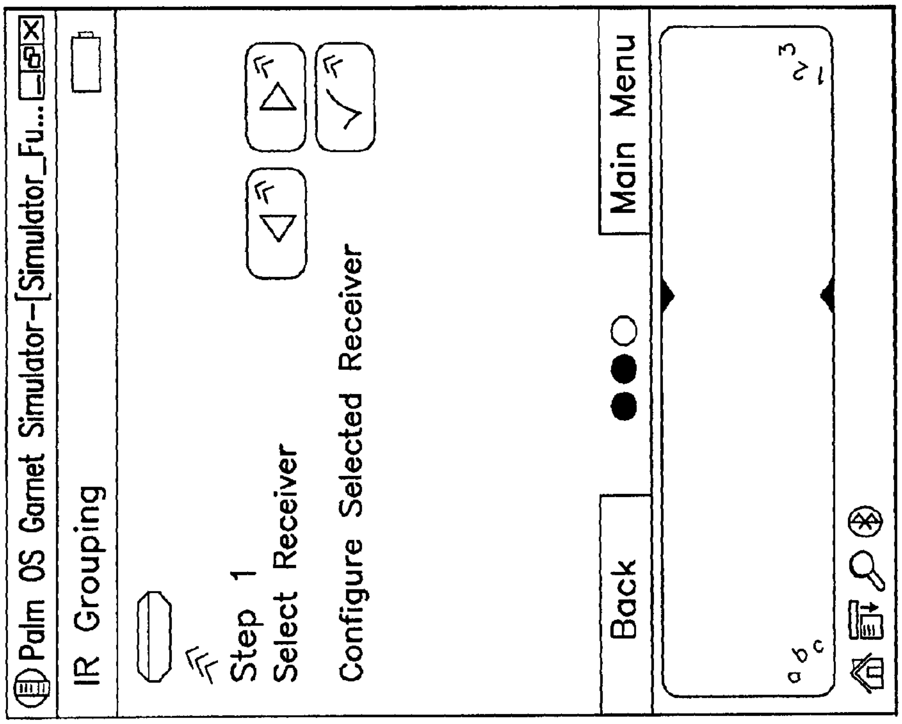
Figure 20G:
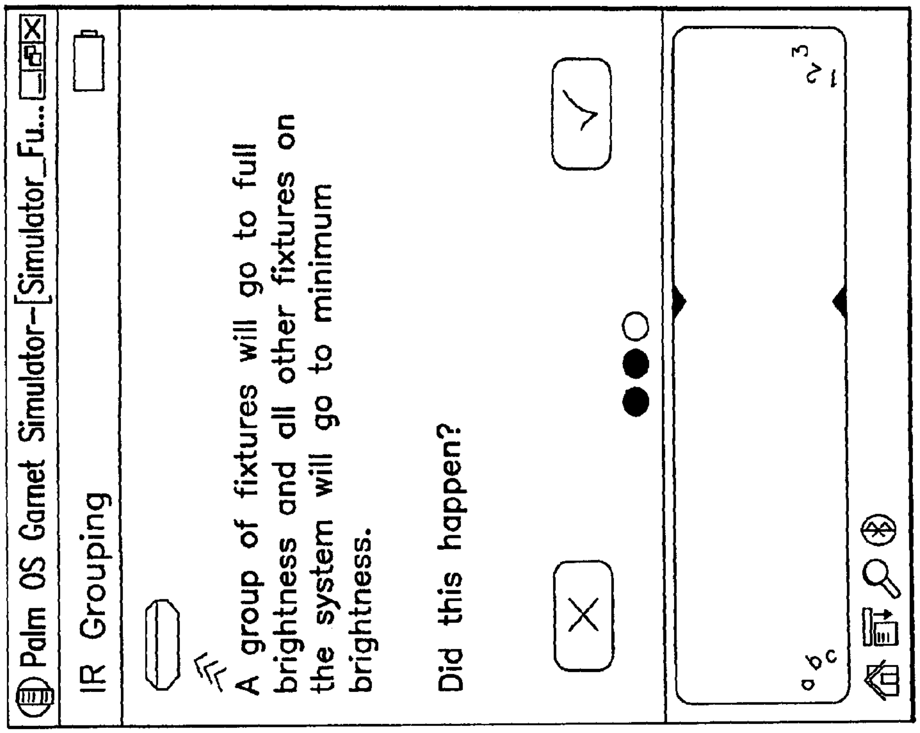
Figure 20H:
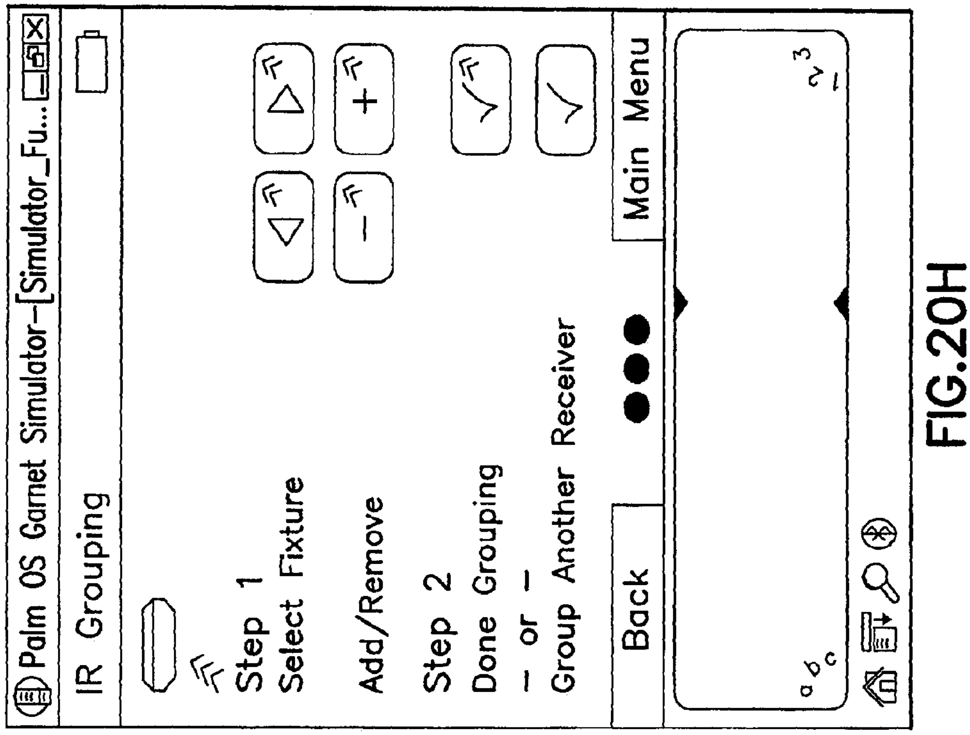
Figure 20I:
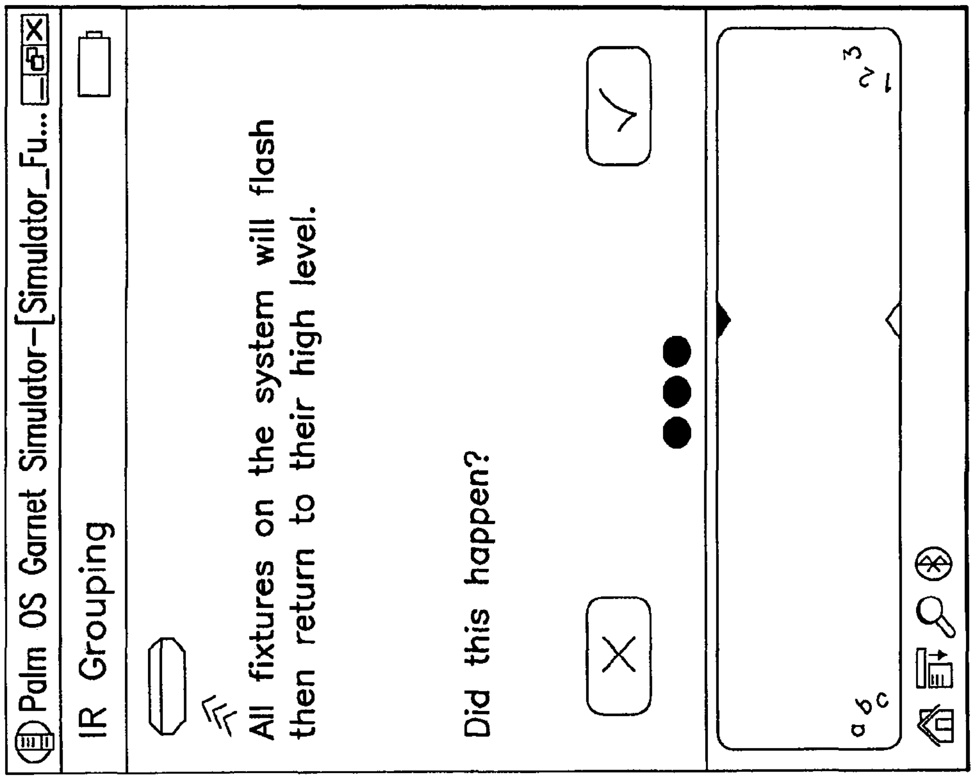

After the user selects the icon in FIG. 20D, FIG. 20E is displayed to prompt the user to confirm that all of the fixtures on ballast link 116 are operating at minimum brightness, and a fixture associated with the IR receiver 104 is flashing. In FIG. 20F, handheld programming device 101 displays controls for the user to select a different IR receiver 104 on ballast link 116. The user preferably configures the respective IR receiver 104 that is selected in FIG. 20F. The user, in FIG. 20G is prompted to confirm (by selecting an icon) that a group of fixtures associated with the respective IR receiver 104 selected in FIG. 20F is operating at full brightness and all other fixtures are operating at minimum brightness. If the user indicates that this has occurred, then FIG. 20H is displayed and the user is prompted to select an option for selecting fixtures, adding and removing fixtures and complete the grouping process, or select another IR receiver 104 for grouping. Thereafter, as shown in FIG. 20I, all fixtures on ballast link 116 flash and then return to the high level. Thus, by interacting with the display screens on handheld programming device 101 and illustrated in the examples shown in FIGS. 20A-20I, a user can define respective group of ballasts 102 to be associated with one or more IR receivers 104.

Figure 21A:
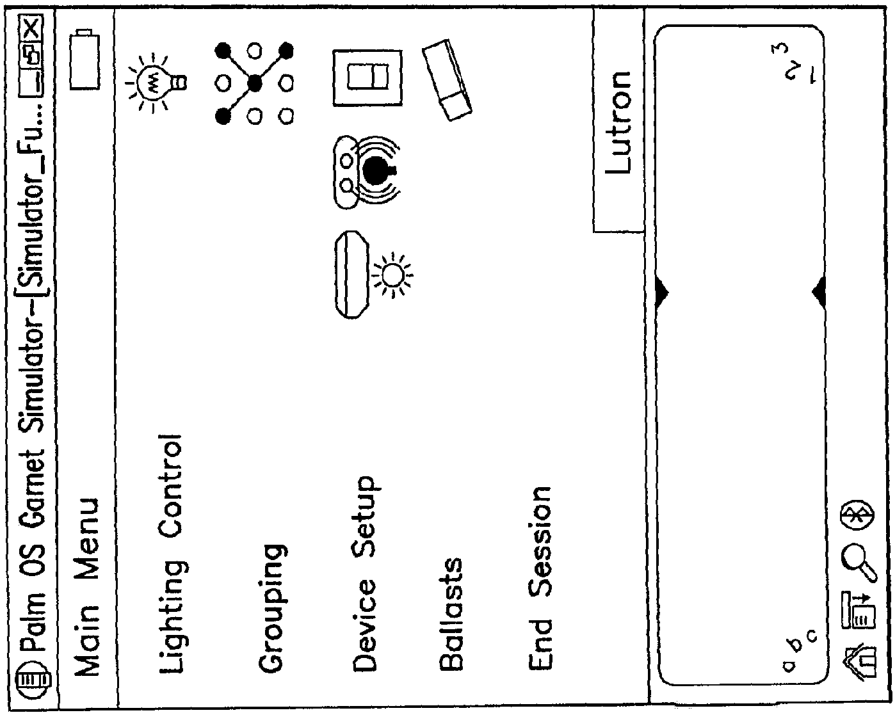
FIGS. 21A-21I illustrate example display screens provided on a handheld programming device for defining a group of ballasts to operate in association with a photosensor device.
Figure 21B:
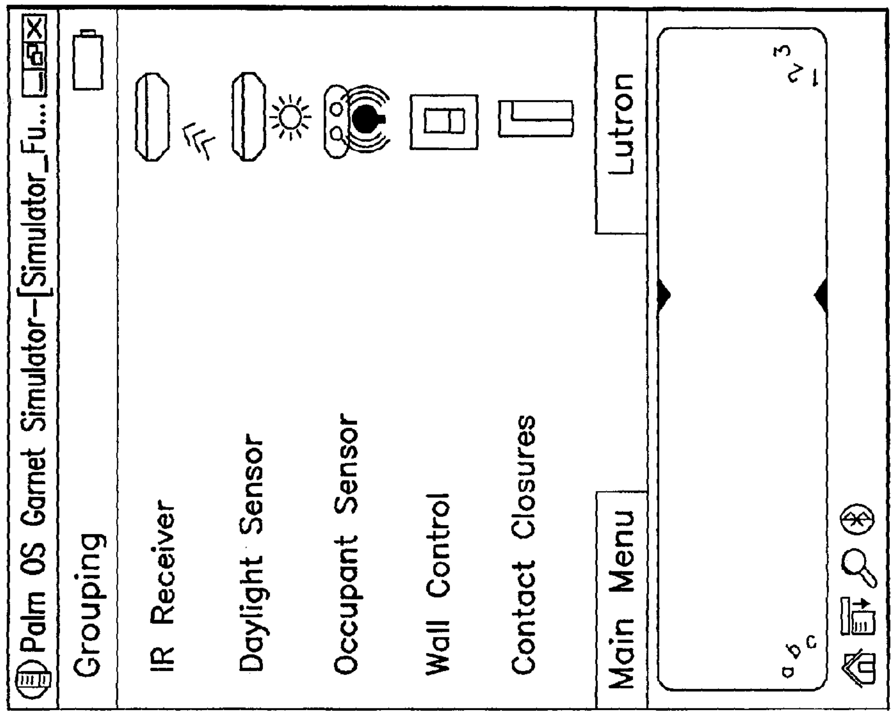
Figure 21C:
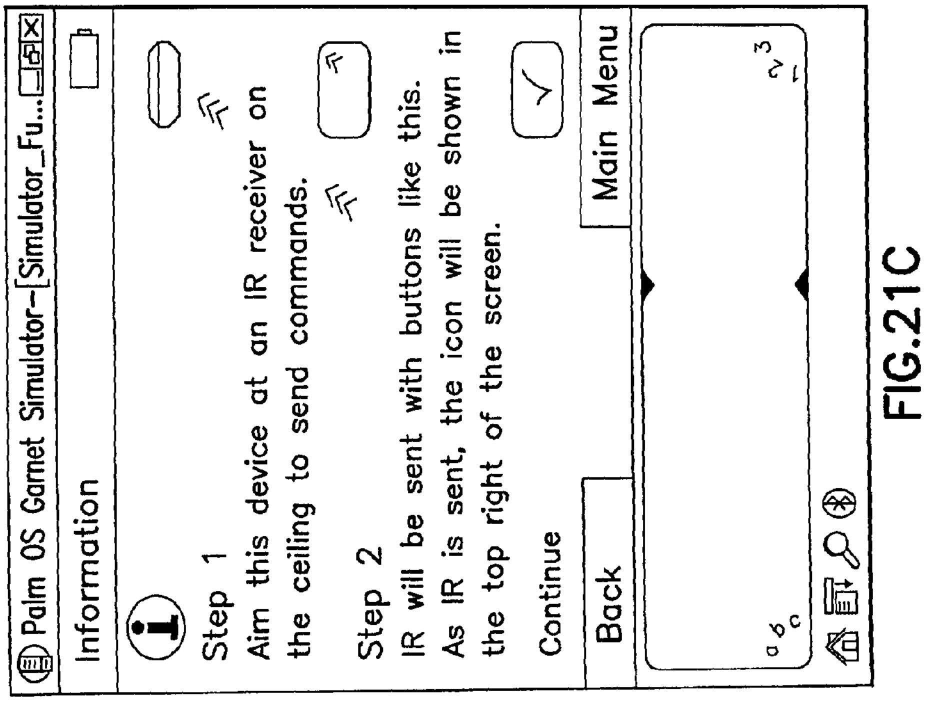

FIGS. 21A-21I illustrate example display screens provided on handheld programming device 101 for defining a group of ballasts 102 to operate in association with a photosensor device 106. In FIG. 21A, a user selects an option for a device setup. In FIG. 21B, the user selects an option for photosensor device 106. In FIG. 21C, the user is prompted to aim handheld programming device at an IR receiver 104 and select an icon, formatted as a button comprising a checkmark, to continue, and in FIG. 21D, the user is prompted to begin communicating over ballast link 116.

Figure 21D:
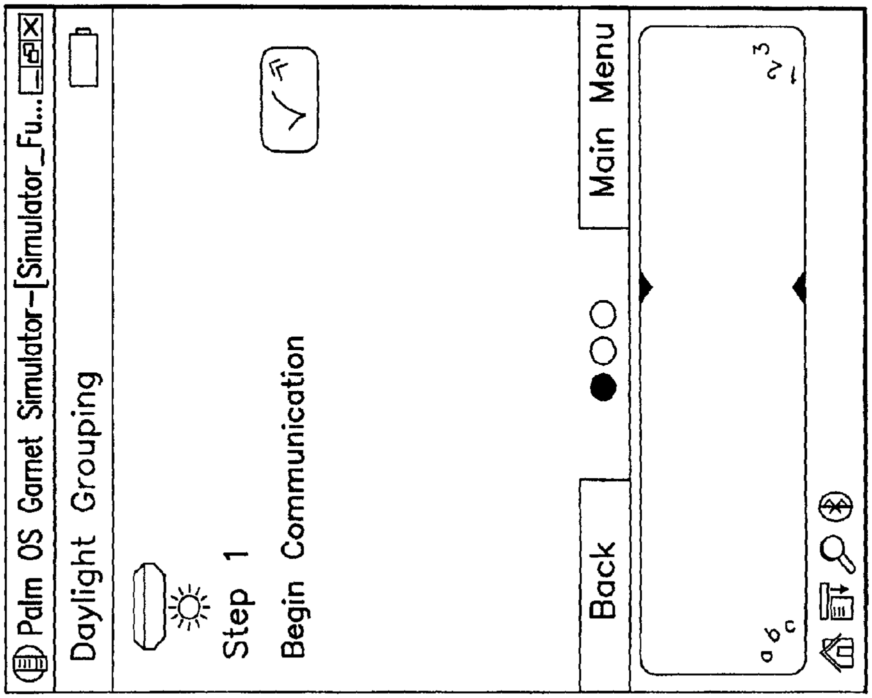
Figure 21F:
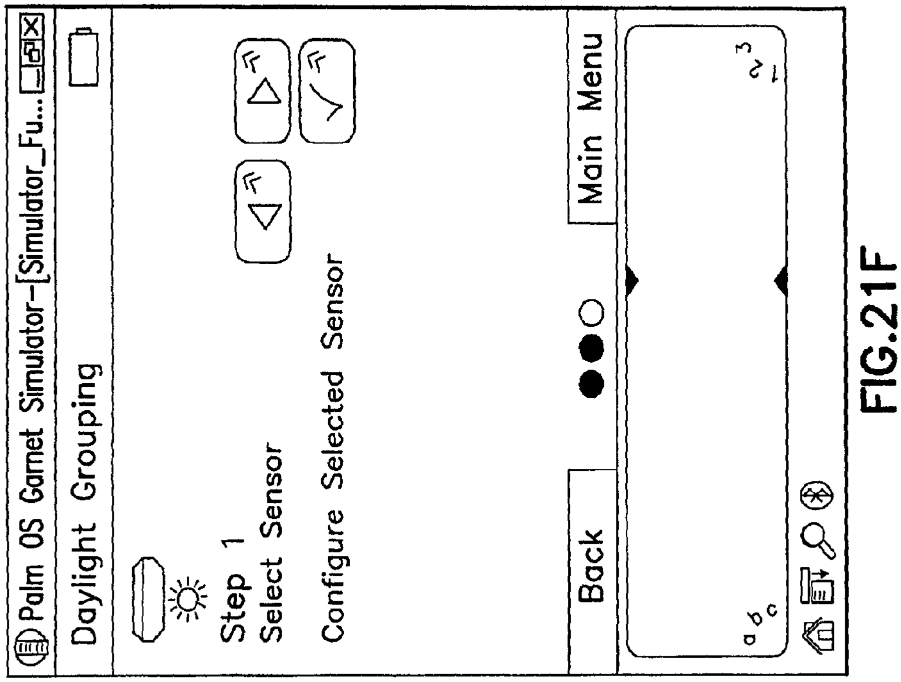
Figure 21E:
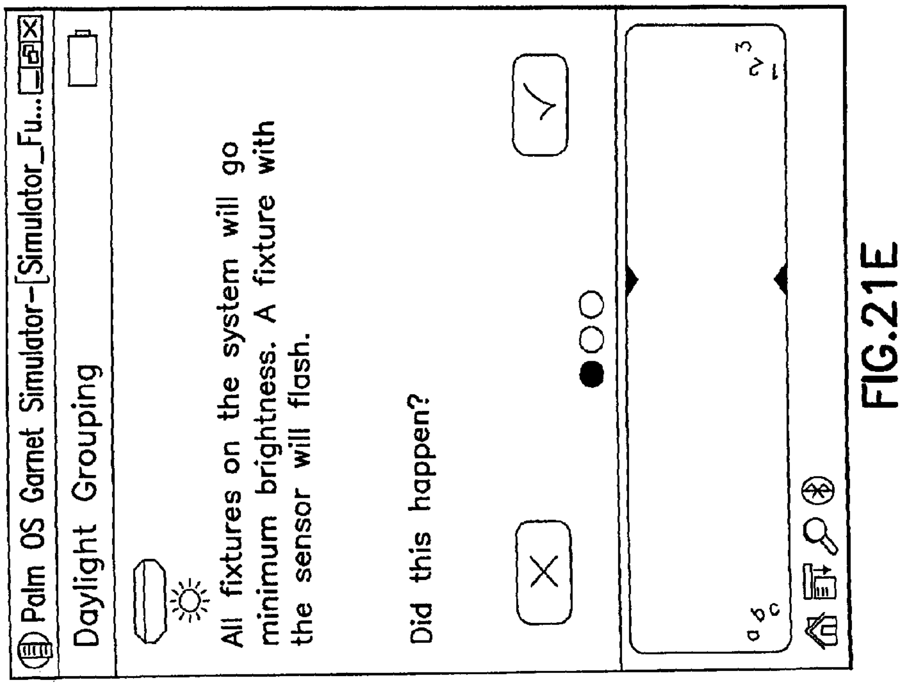
Figure 21H:
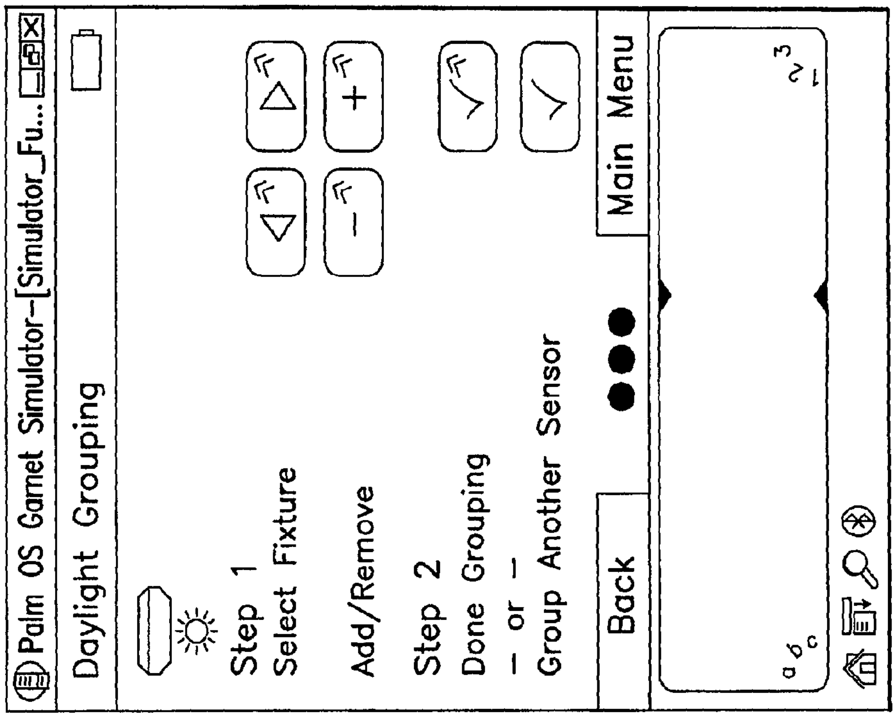
Figure 21G:
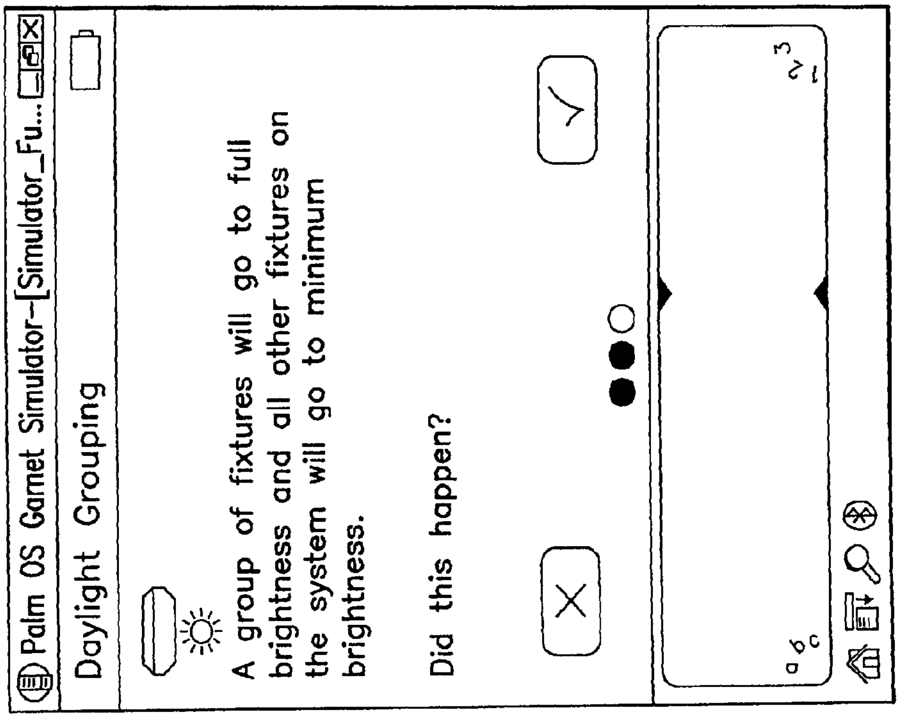
Figure 21I:
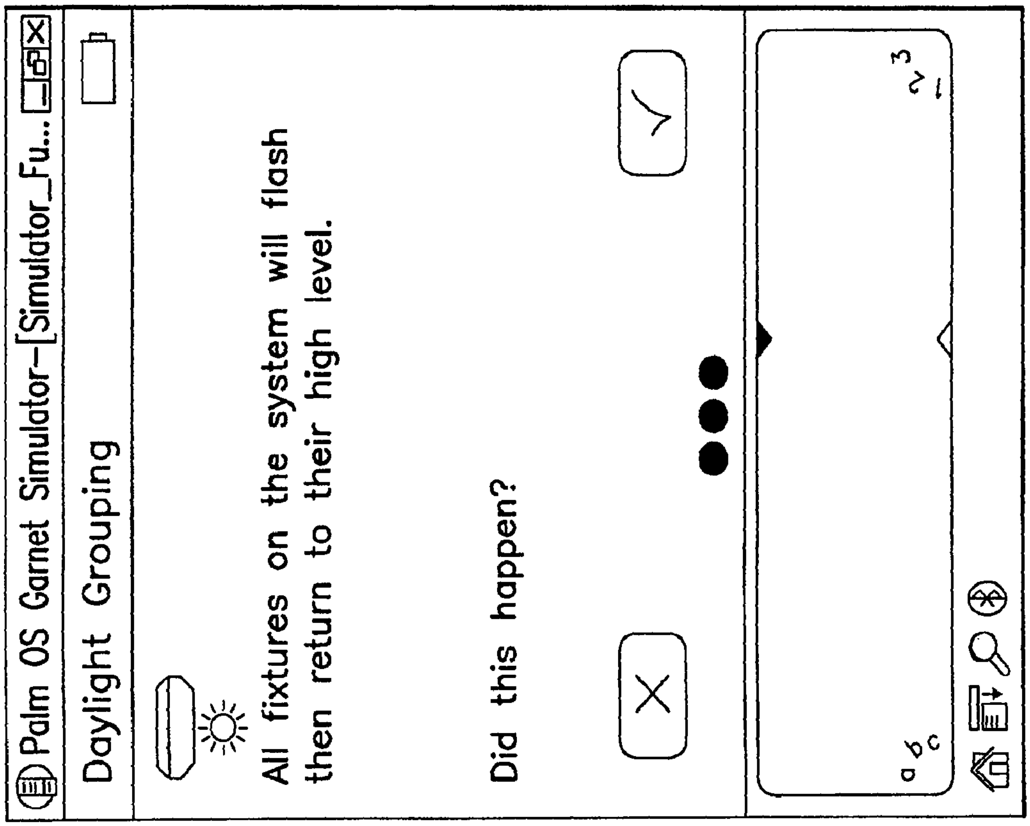

After the user selects the icon in FIG. 21D, FIG. 21E is displayed to prompt the user to confirm that all of the fixtures on ballast link 116 are operating at minimum brightness, and a fixture associated with the photosensor 106 is flashing. In FIG. 21F, handheld programming device 101 displays controls for the user to select a different photosensor 106 on ballast link 116. The user preferably configures the respective photosensor device 106 that is selected in FIG. 21F. The user, in FIG. 21G is prompted to confirm (by selecting an icon) that a group of fixtures associated with the respective photosensor 106 selected in FIG. 21F is operating at full brightness and all other fixtures are operating at minimum brightness. If the user indicates that this has occurred, then FIG. 21H is displayed and the user is prompted to select an option for selecting fixtures, adding and removing fixtures and complete the grouping process, or select another photosensor 106 for grouping. Thereafter, as shown in FIG. 21I, all fixtures on ballast link 116 flash and then return to the high level. Thus, by interacting with the display screens on handheld programming device 101 and illustrated in the examples shown in FIGS. 21A-21I, a user can define respective group of ballasts 102 to be associated with one or more photosensors 106.

Figure 22A:
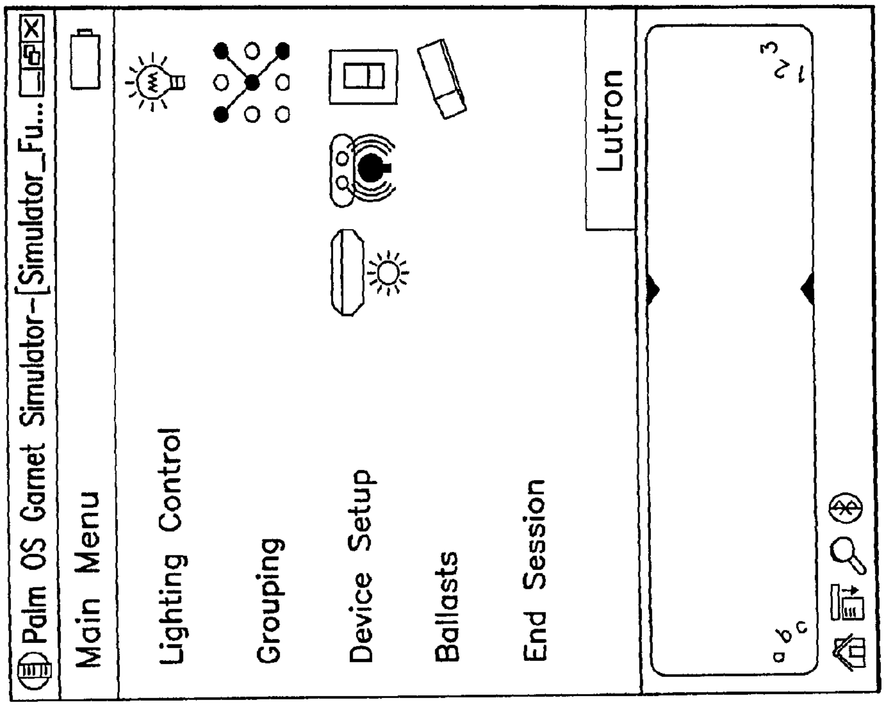
FIGS. 22A-22I illustrate example display screens provided on a handheld programming device for defining a group of ballasts to operate in association with an occupancy sensor.
Figure 22B:
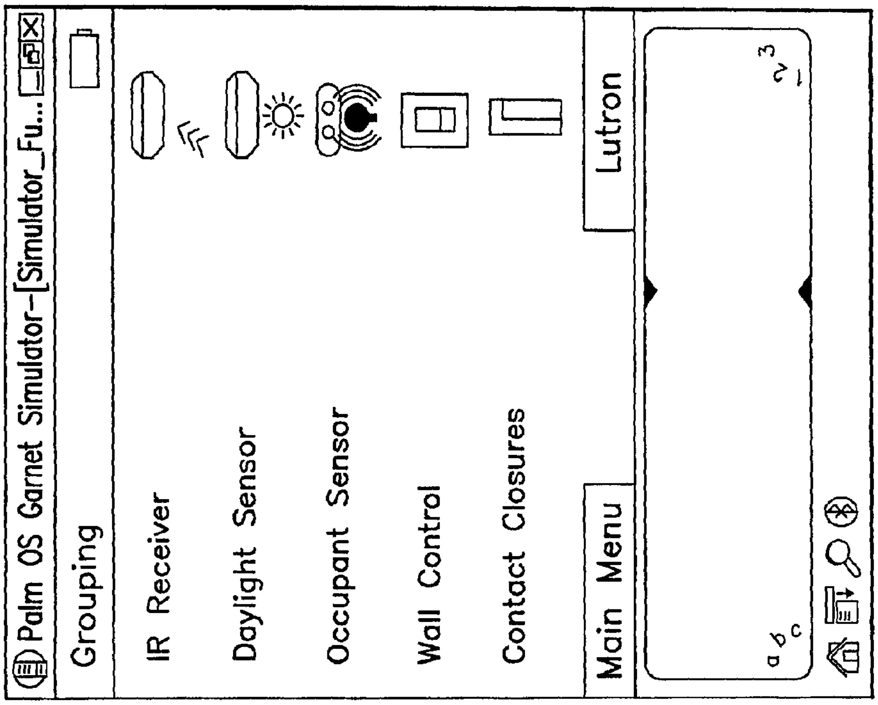
Figure 22C:
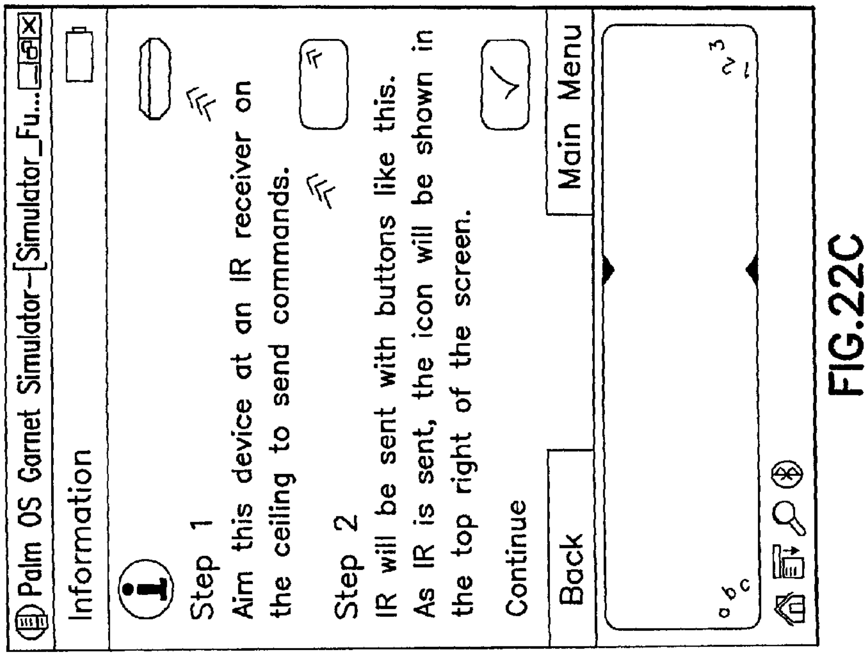

FIGS. 22A-22I illustrate example display screens provided on handheld programming device 101 for defining a group of ballasts 102 to operate in association with an occupancy sensor 108. In FIG. 22A, a user selects an option for a device setup. In FIG. 22B, the user selects an option for occupancy device 108. In FIG. 22C, the user is prompted to aim handheld programming device at an IR receiver 104 and select an icon, formatted as a button comprising a checkmark, to continue, and in FIG. 212, the user is prompted to begin communicating over ballast link 116.

Figure 22D:
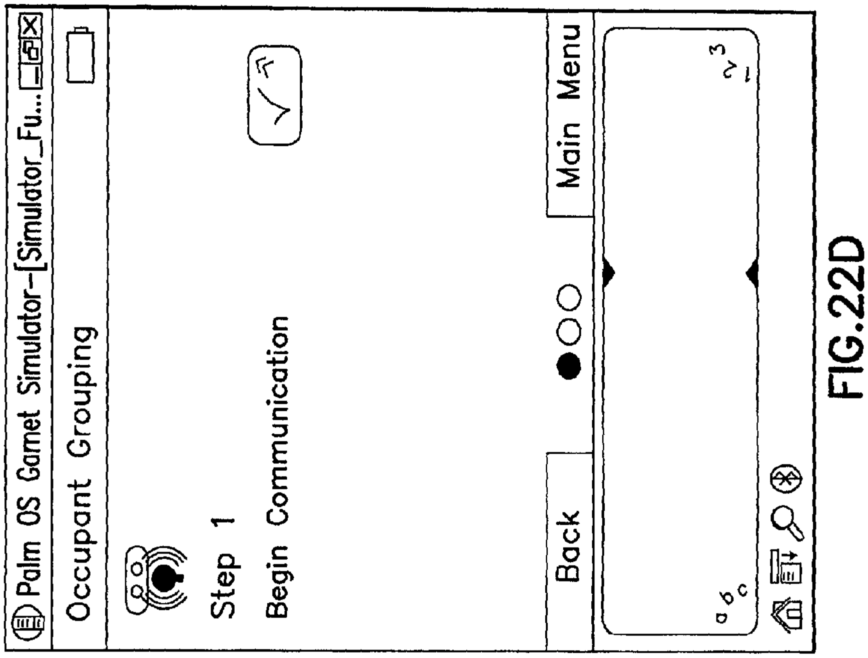
Figure 22E:
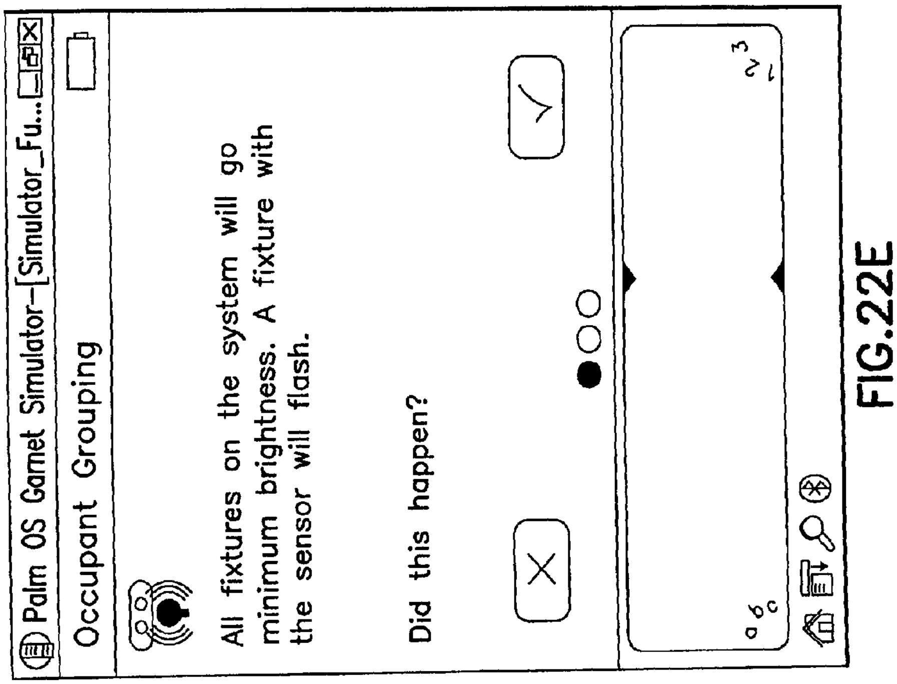
Figure 22F:
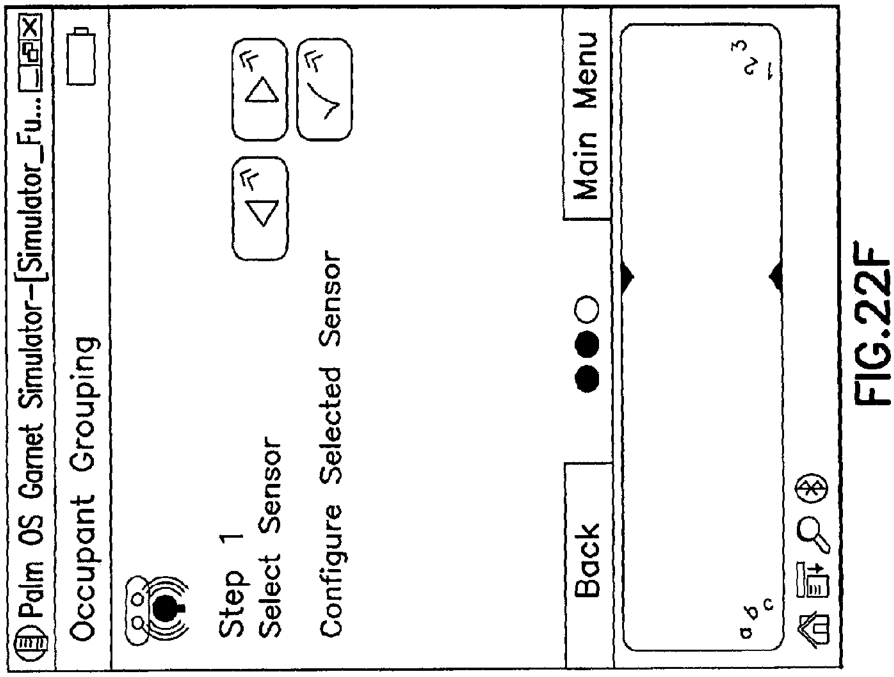
Figure 22G:
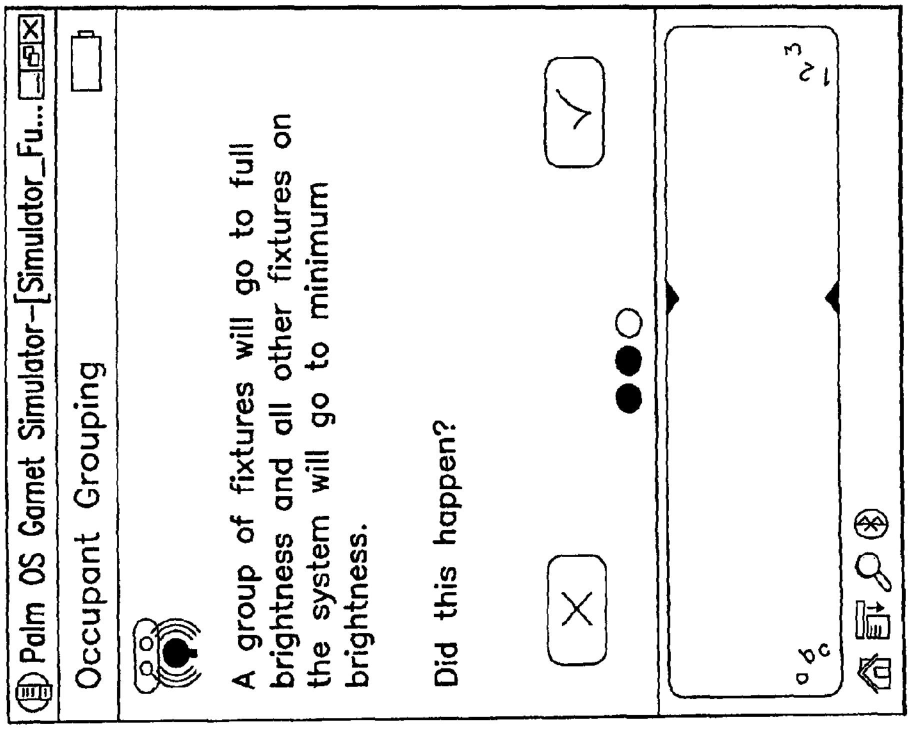
Figure 22H:
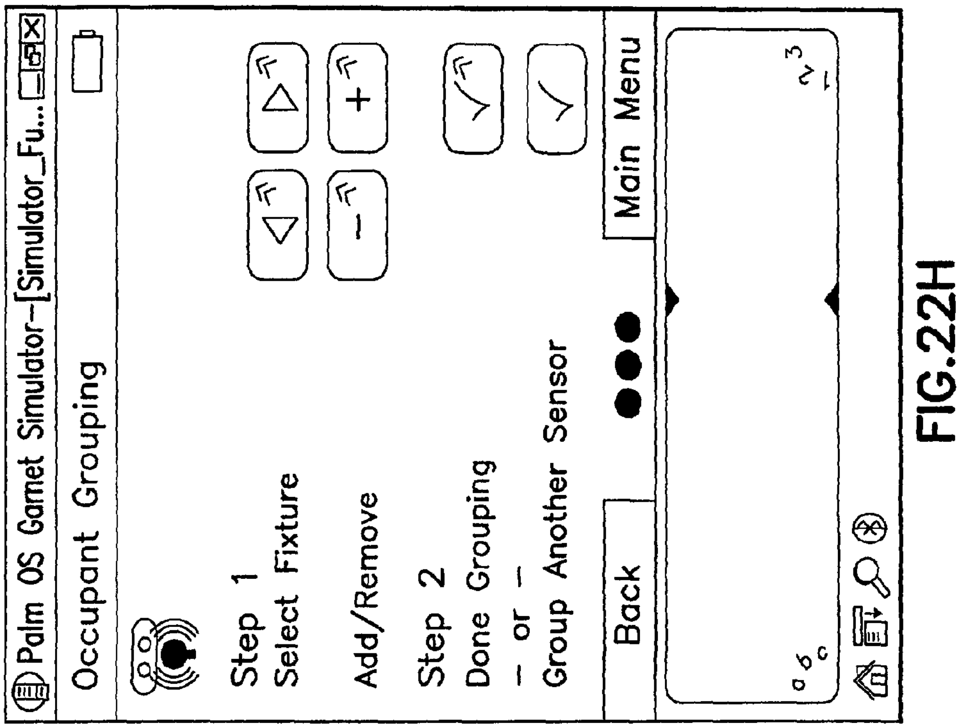
Figure 22I:
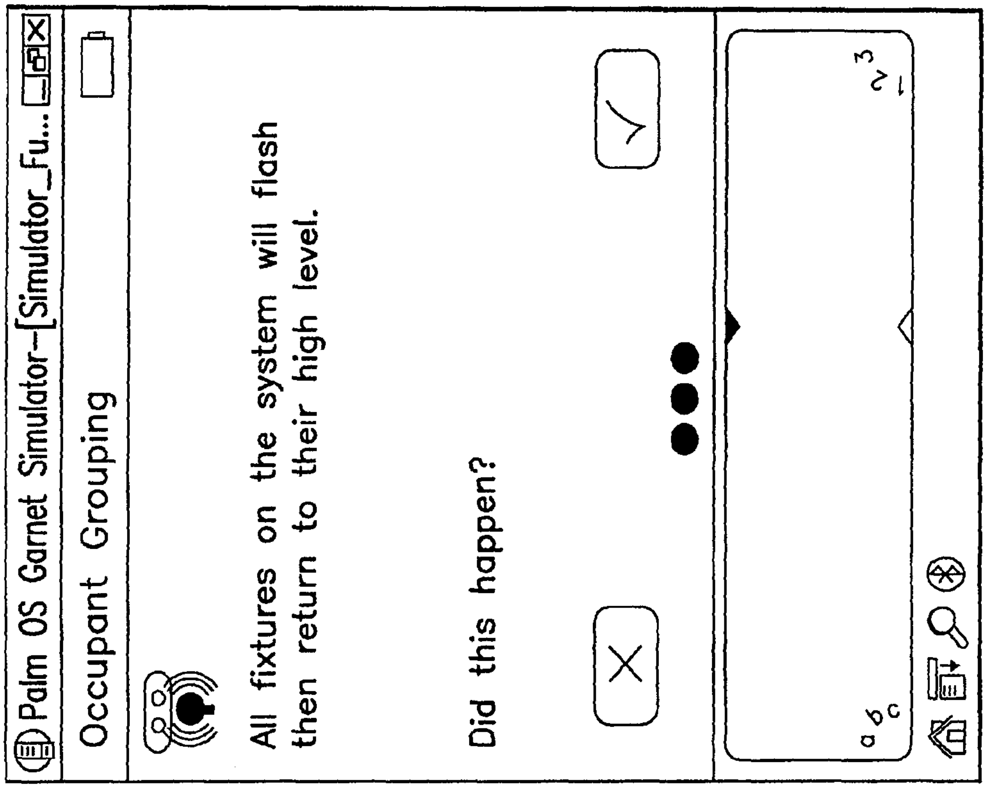

After the user selects the icon in FIG. 22D, FIG. 22E is displayed to prompt the user to confirm that all of the fixtures on ballast link 116 are operating at minimum brightness, and a fixture associated with the occupancy device 108 is flashing. In FIG. 22F, handheld programming device 101 displays controls for the user to select a different occupancy device 108 on ballast link 116. The user preferably configures the respective occupancy device 108 that is selected in FIG. 22F. The user, in FIG. 22G is prompted to confirm (by selecting an icon) that a group of fixtures associated with the respective occupancy device 108 selected in FIG. 22F is operating at full brightness and all other fixtures are operating at minimum brightness. If the user indicates that this has occurred, then FIG. 22H is displayed and the user is prompted to select an option for selecting fixtures, adding and removing fixtures and complete the grouping process, or select another occupancy device 108 for grouping. Thereafter, as shown in FIG. 22I, all fixtures on ballast link 116 flash and then return to the high level. Thus, by interacting with the display screens on handheld programming device 101 and illustrated in the examples shown in FIGS. 22A-21I, a user can define respective group of ballasts 102 to be associated with one or more occupancy devices 108.

Figure 23A:
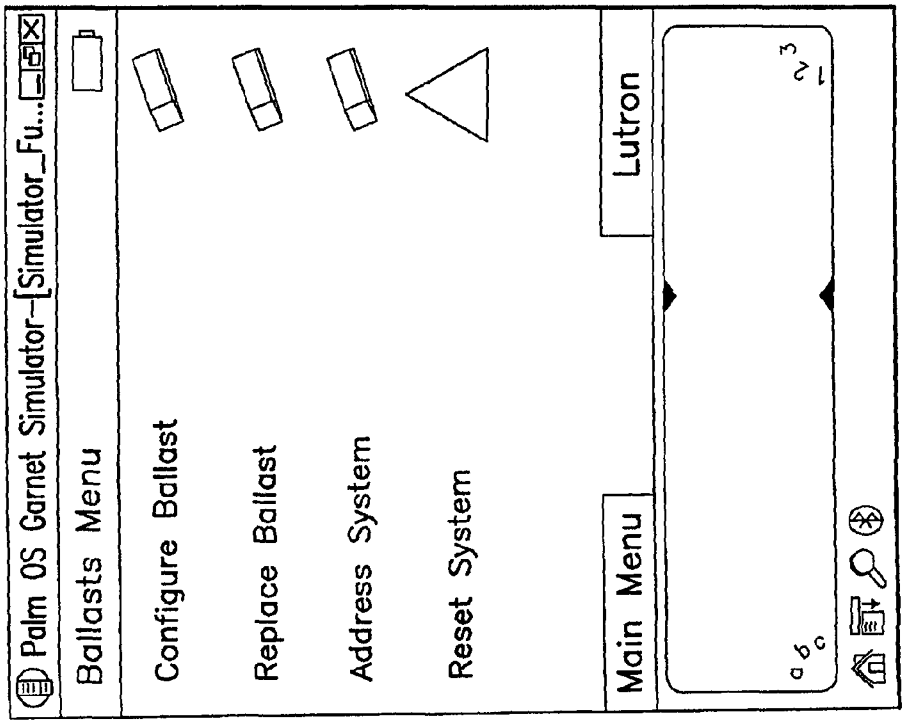
FIGS. 23A-23L illustrate example display screens provided on a handheld programming device for replacing a ballast in accordance with the present invention.
Figure 23B:
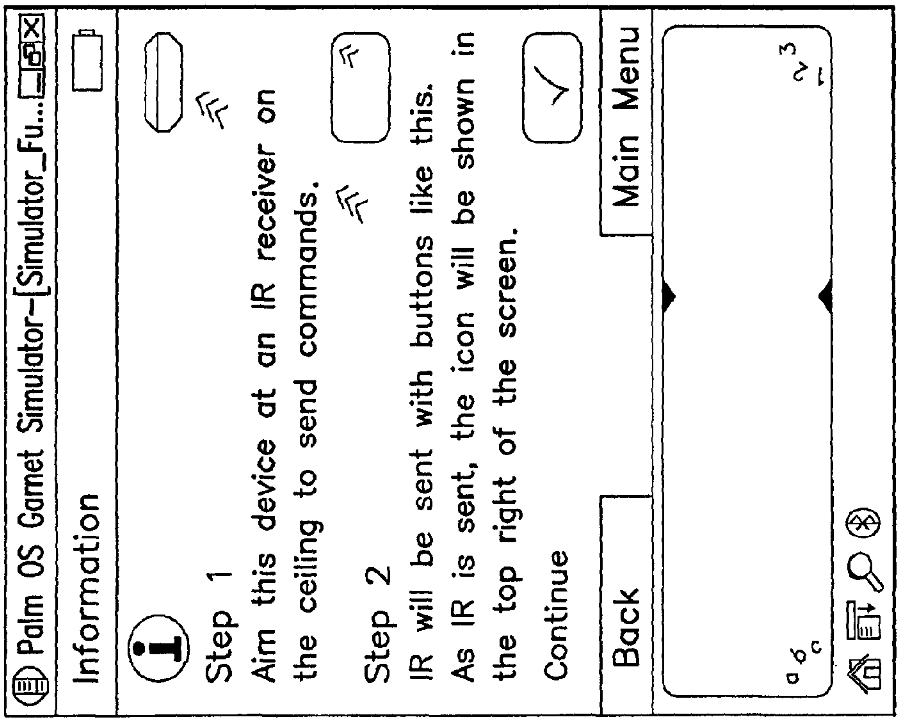
Figure 23D:
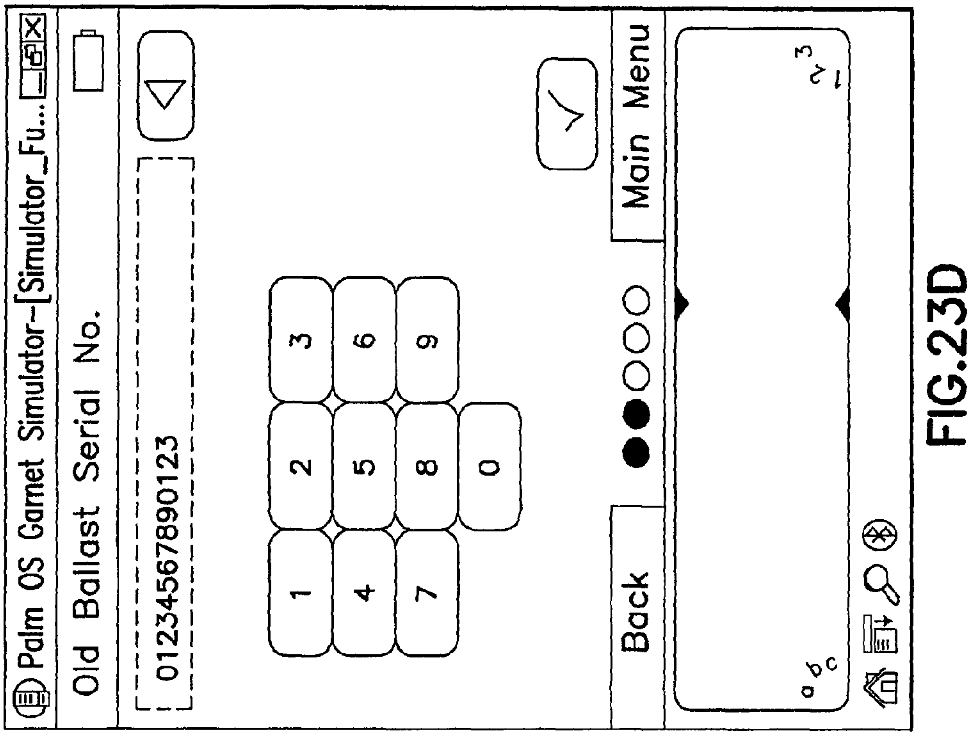
Figure 23C:
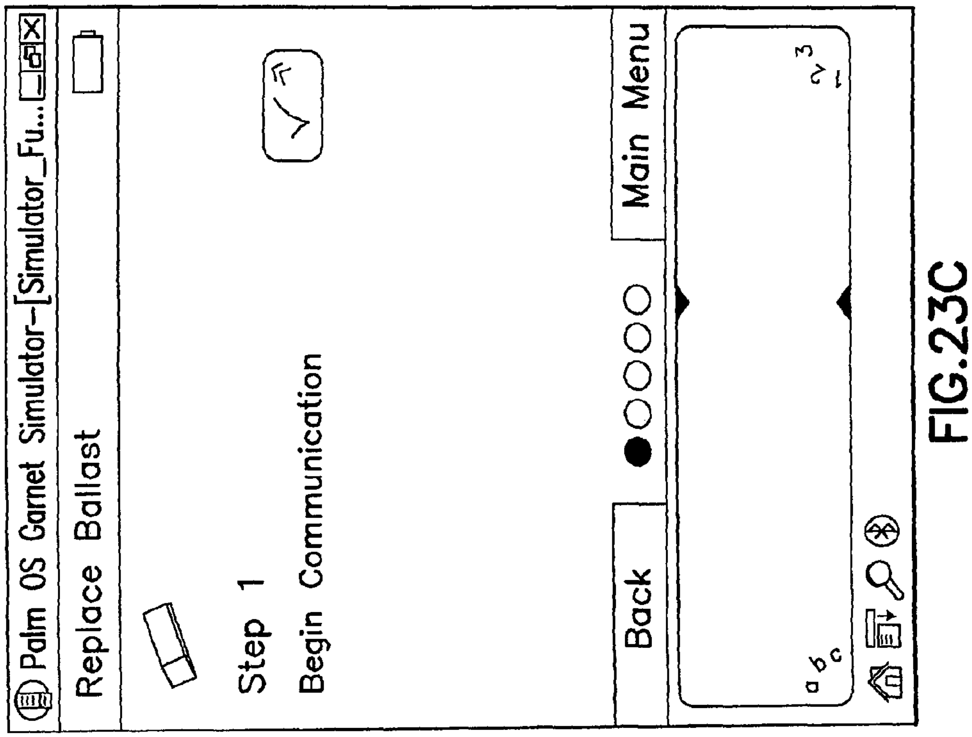
Figure 23E:
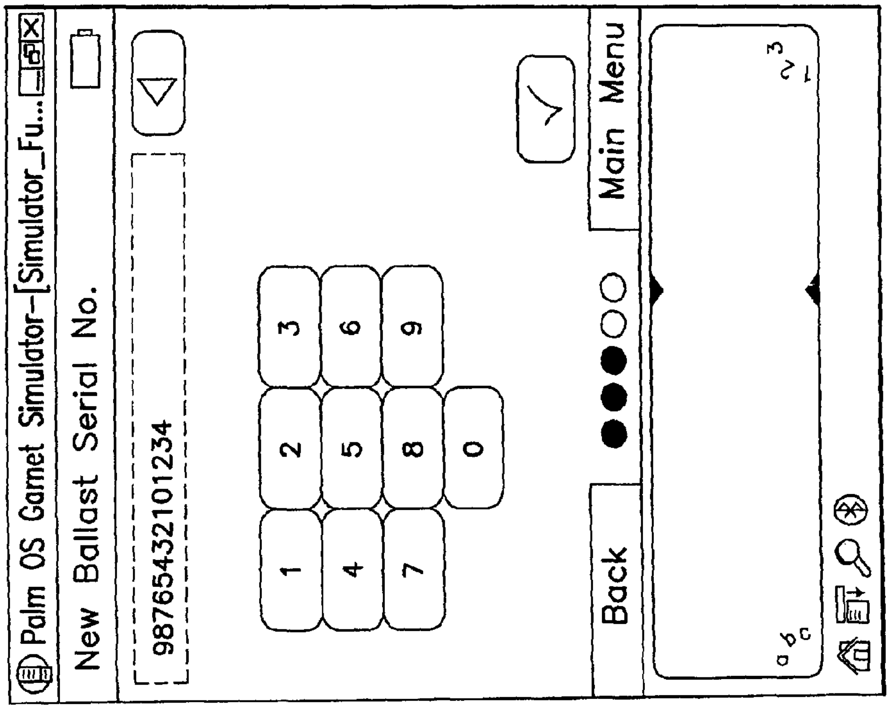
Figure 23F:
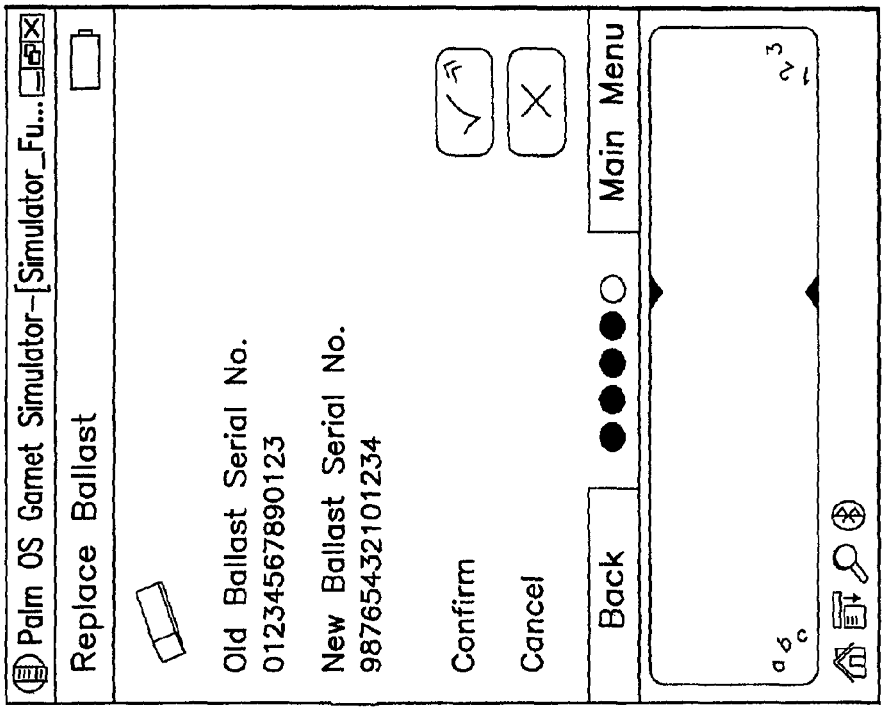

FIGS. 23A-23L illustrate example display screens provided on handheld programming device 101 for replacing a ballast 102 in accordance with the present invention. In FIG. 23A, a user selects an option to replace a ballast 102. In FIG. 23B, the user is prompted to aim handheld programming device at an IR receiver 104 and select an icon, formatted as a button comprising a checkmark, to continue, and in FIG. 23C, the user is prompted to begin communicating over ballast link 116. After the user selects the icon, FIG. 23D is displayed to prompt the user to enter the replaced ("old") ballast 102 serial number. In FIG. 23E, handheld programming device 101 displays controls for the user to enter the replacement ("new") ballast 102 serial number. In FIG. 23F, the user confirms the replacement by selecting a graphical screen control, such as an icon.

Figure 23G:
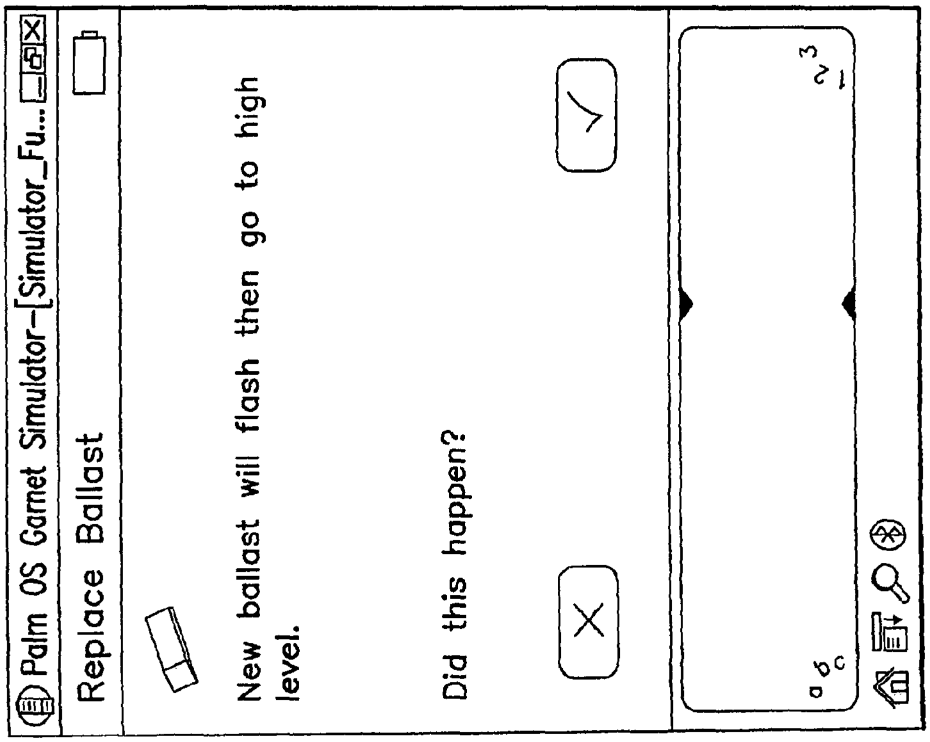
Figure 23H:
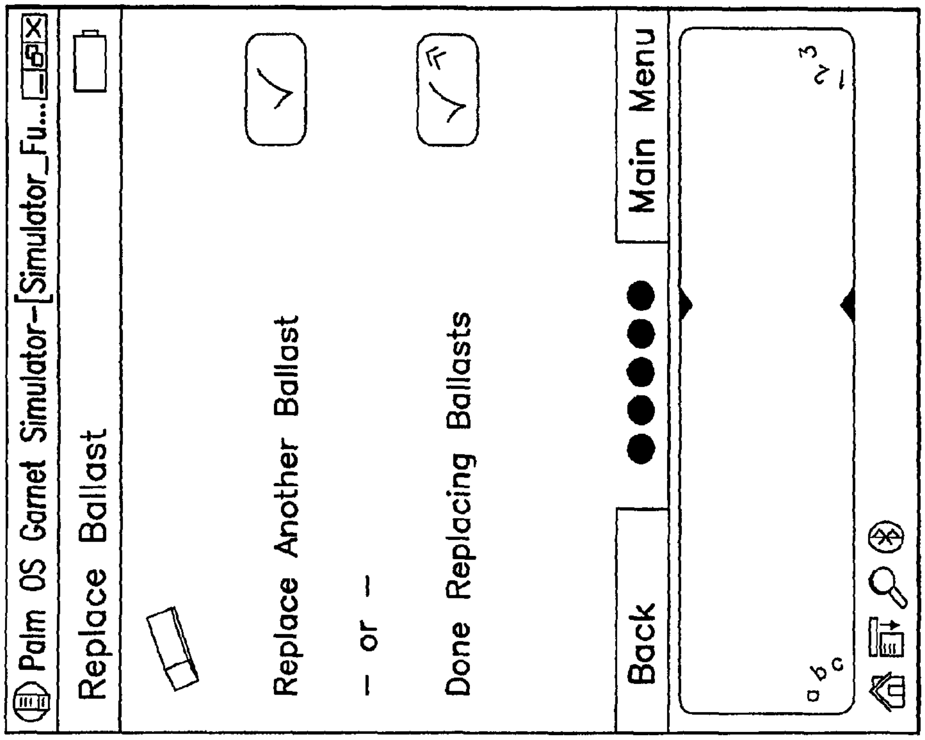
Figure 23I:
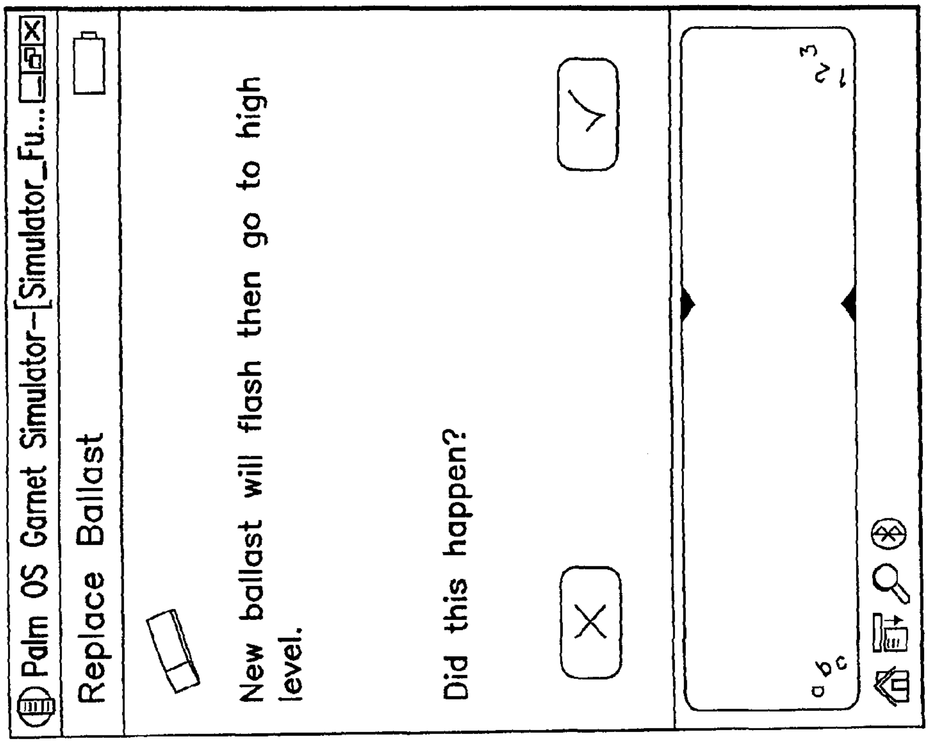

FIG. 23G illustrates a display screen that enables the user to confirm that the new replacement ballast 102 flashed and then went to a high light level. If the replacement ballast 102 flashed and then went to a high light level, the user is provided confirmation that bus supply 116 has copied the configuration and setting information corresponding to replaced ballast 102, from its database to the replacement ballast 102. The user, in FIG. 23H, is prompted to replace another ballast 102, or to complete the process. In FIG. 23I, the user is prompted to confirm that the replacement ballast has operating at high level.

Figure 23J:
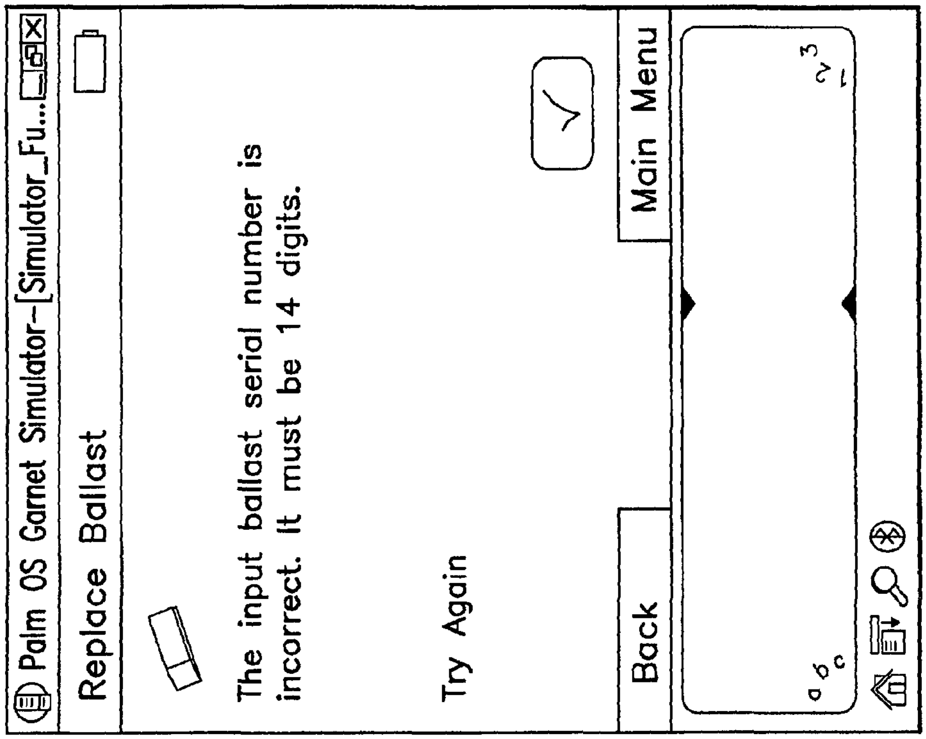
Figure 23K:
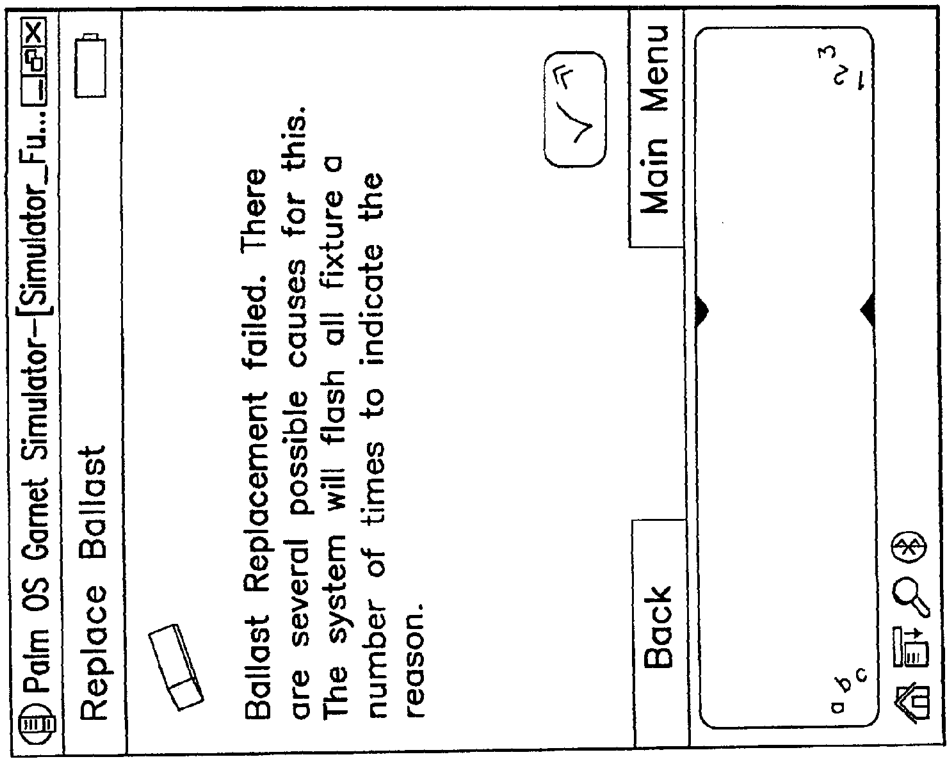
Figure 23L:
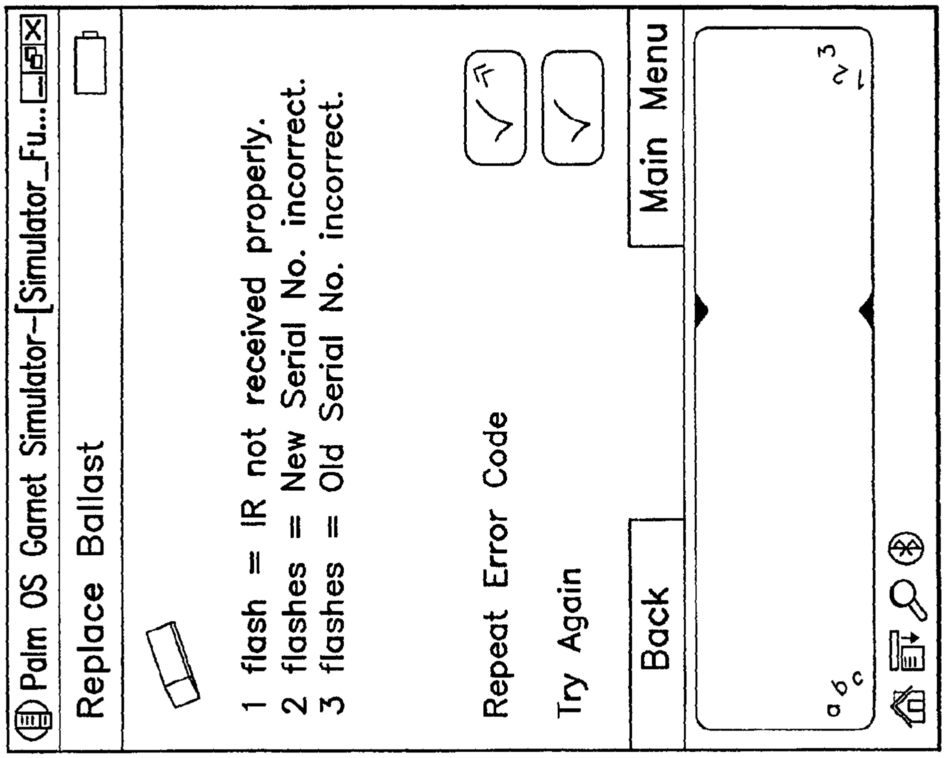

FIG. 23J illustrates an example error message that occurs in case the user made an error in data entry, for example as shown in FIGS. 23D and 23E. In the example shown in FIG. 23J, the user is prompted that the input ballast serial number is incorrect and must be formatted to be fourteen digits in length. The user is prompted to go back to the displays shown in FIGS. 23D and 23E and make the appropriate corrections. FIG. 23K is an example display screen showing an error message that the ballast replacement process failed. In FIG. 23K, the fixtures are flashed a preset number of times. The number of times the fixtures flash represents a particular error code. For example, and as shown in FIG. 23L, a single flash represents the IR receiver 104 did not receive the commands correctly; two flashes represents the replacement ballast 102 serial number is incorrect; and three flashes represents the replaced ballast 102 serial number is incorrect. The user is, accordingly, prompted to repeat the process.

Thus, by interacting with the display screens on handheld programming device 101 and illustrated in the examples shown in FIGS. 23A-23L, a user can replace a plurality of ballasts 102.

Figure 24B:
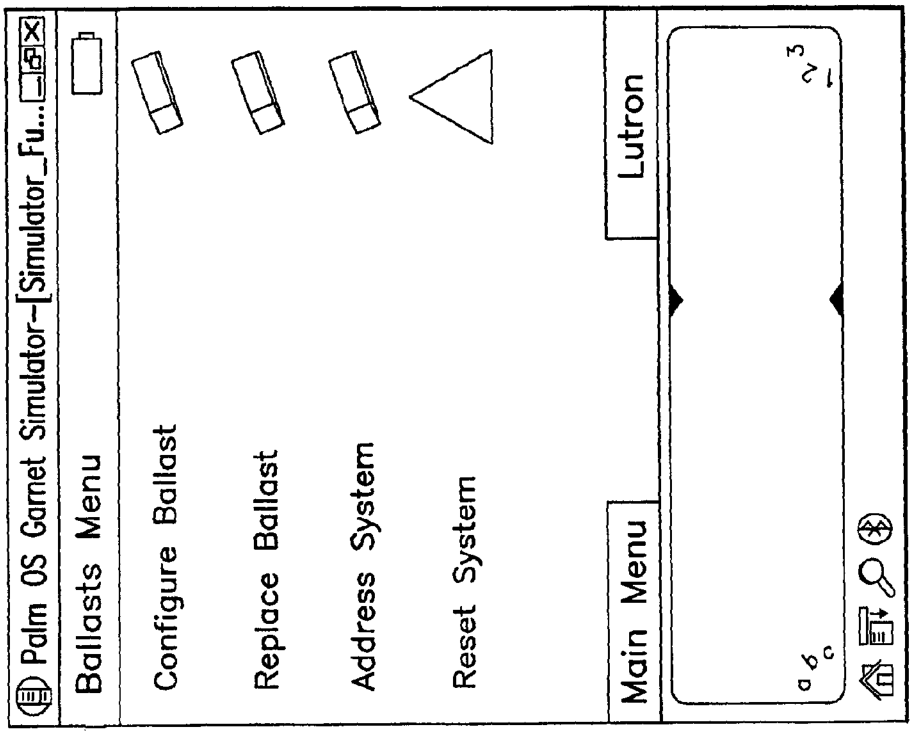
FIGS. 24A-24K show example display screens provided on a handheld programming device for addressing a new ballast system, and resetting the system in accordance with the present invention.
Figure 24A:
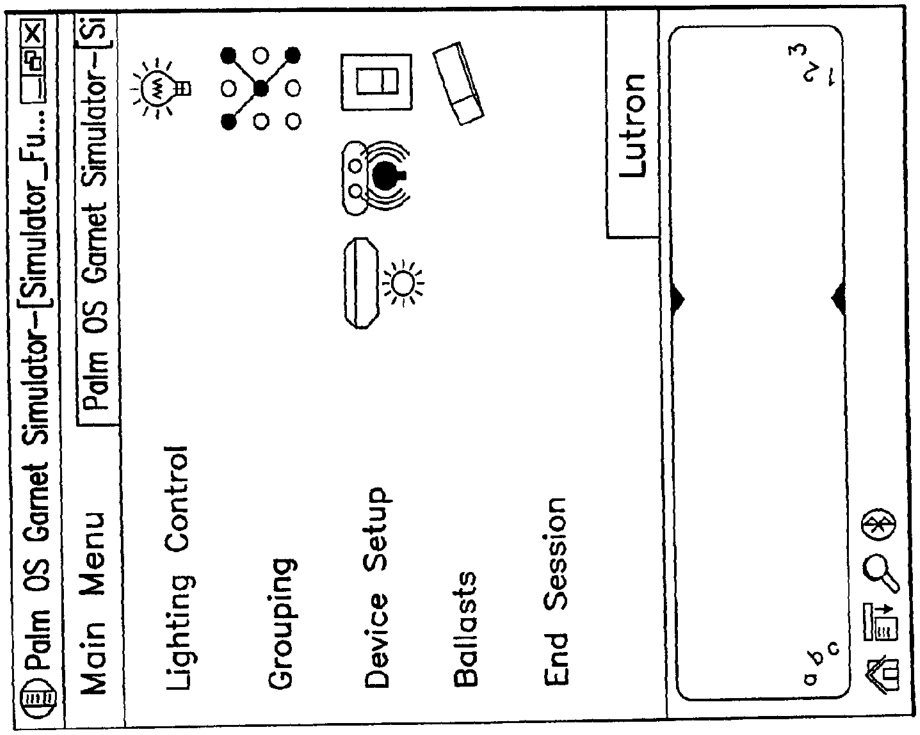
Figure 24C:
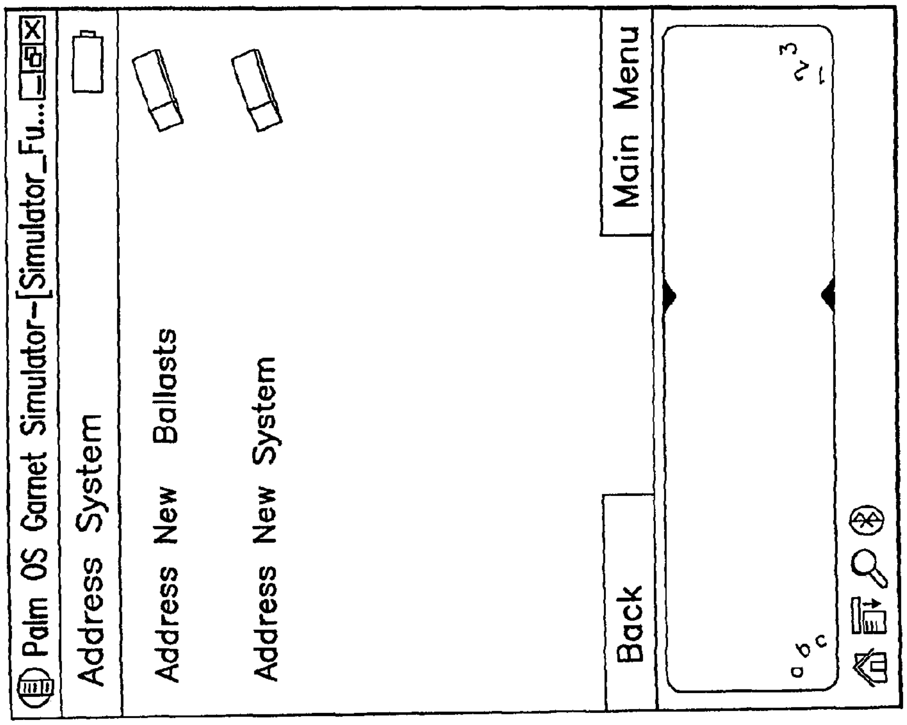
Figure 24D:
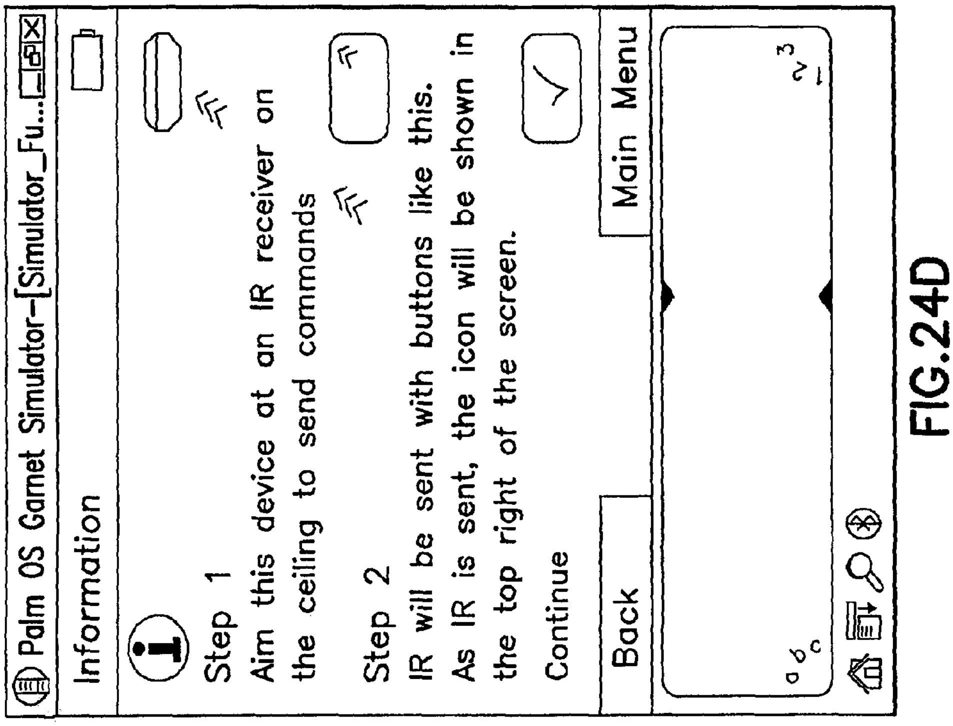

In some cases, a user will desire to reset an entire ballast link system 100 to original factory defaults and, accordingly, to reconfigure all of the devices on link 116. FIGS. 24A-24K illustrate example display screens provided on handheld programming device 101 for addressing a new ballast system 100, and resetting the system 100 in accordance with the present invention. In FIG. 24A, a user selects an option to device setup. In FIG. 24B, the user selects a choice to address the system. In FIG. 24C, the user is prompted to select whether he is addressing a new ballast 102, or an entire new system 100. After selecting the option for addressing system 100, FIG. 24D is displayed and the user is prompted to aim handheld programming device at an IR receiver 104 and select an icon, formatted as a button comprising a checkmark, to continue.

Figure 24E:
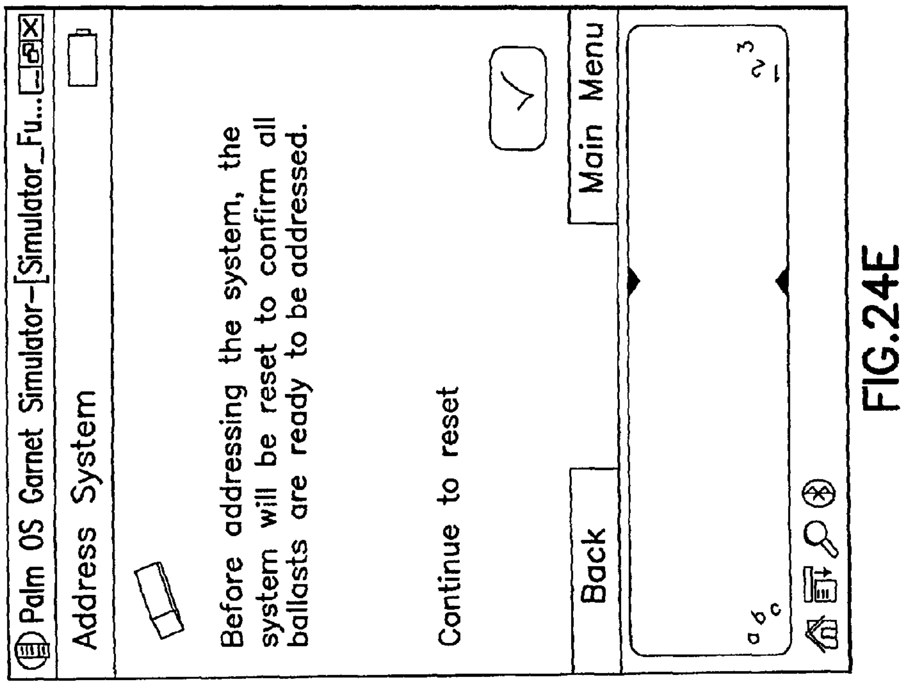
Figure 24F:
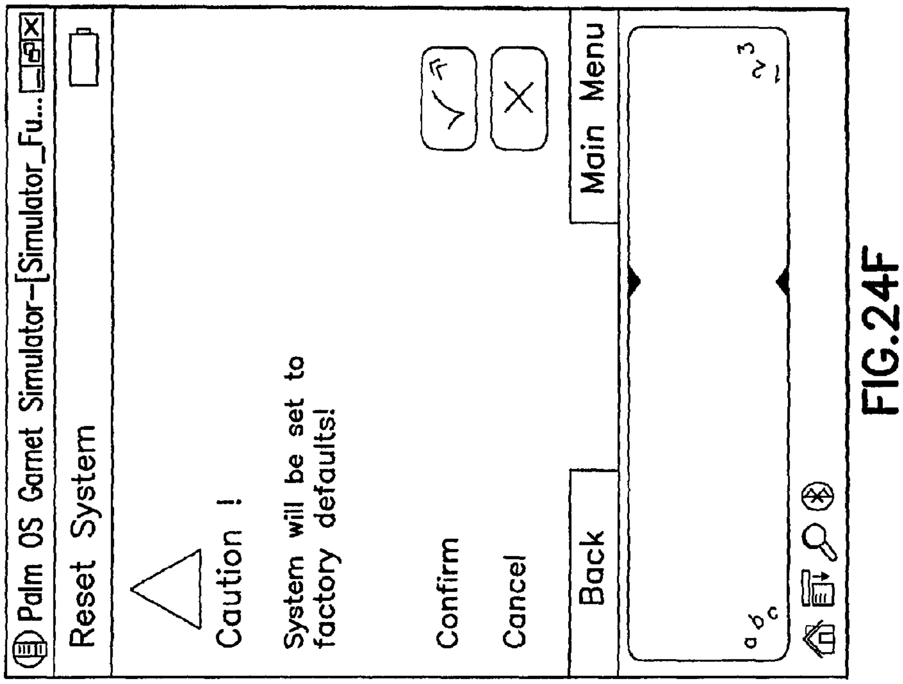
Figure 24G:
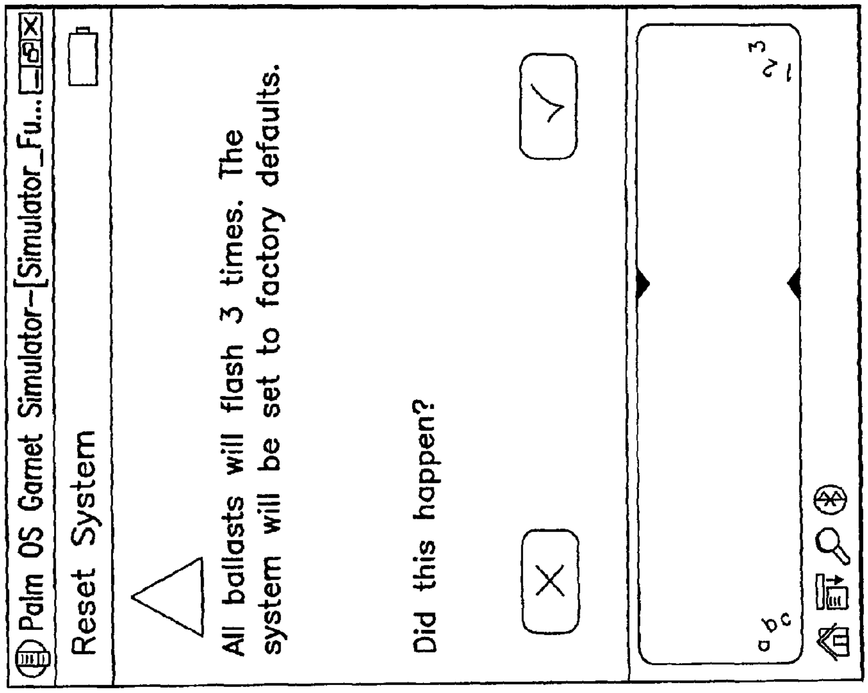
Figure 24H:
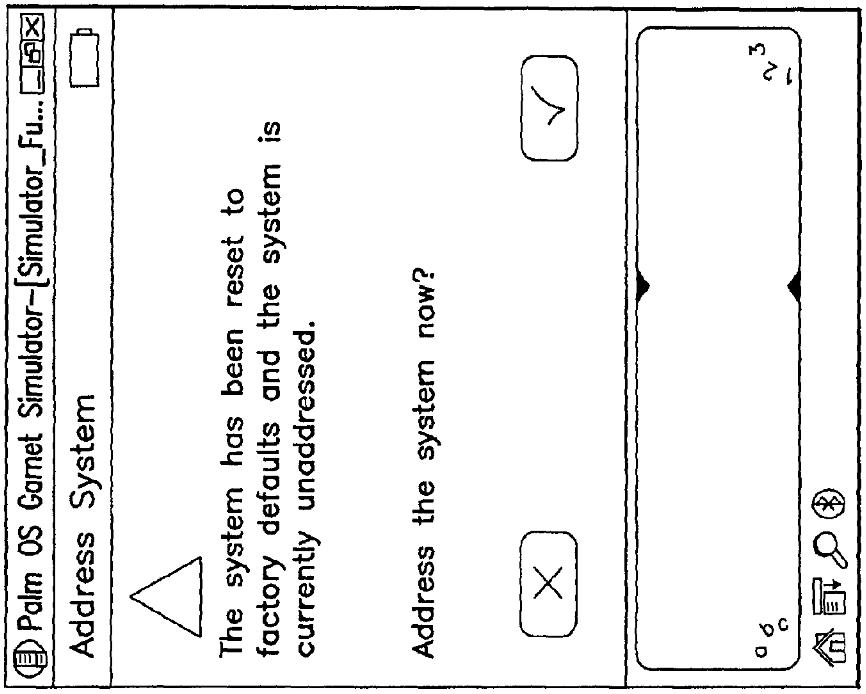
Figure 24I:
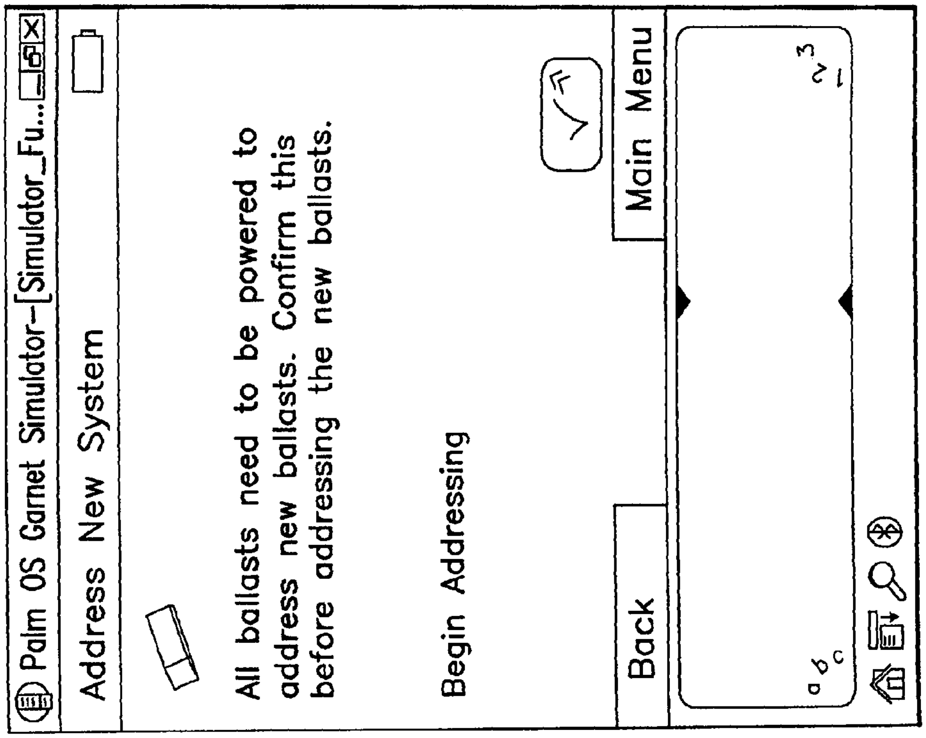
Figure 24J:
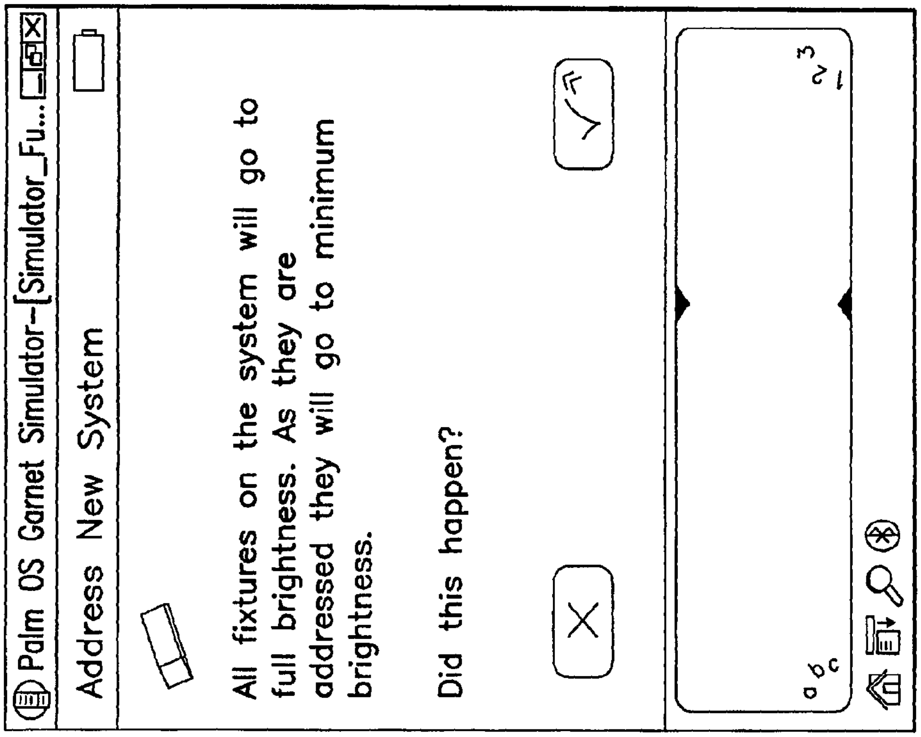
Figure 24K:
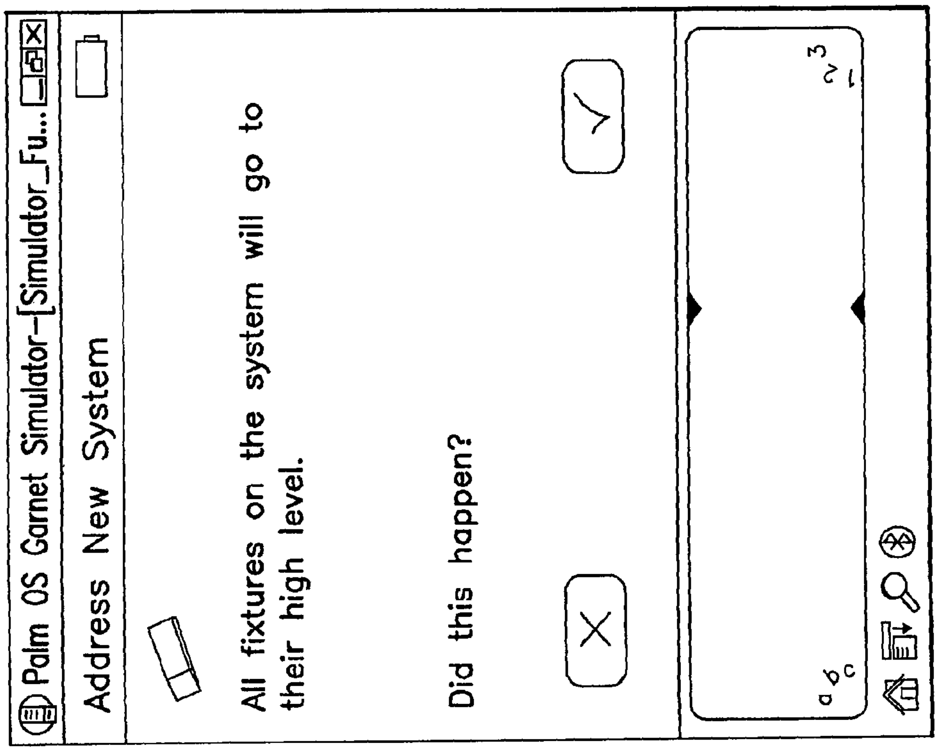
Figure 25A:
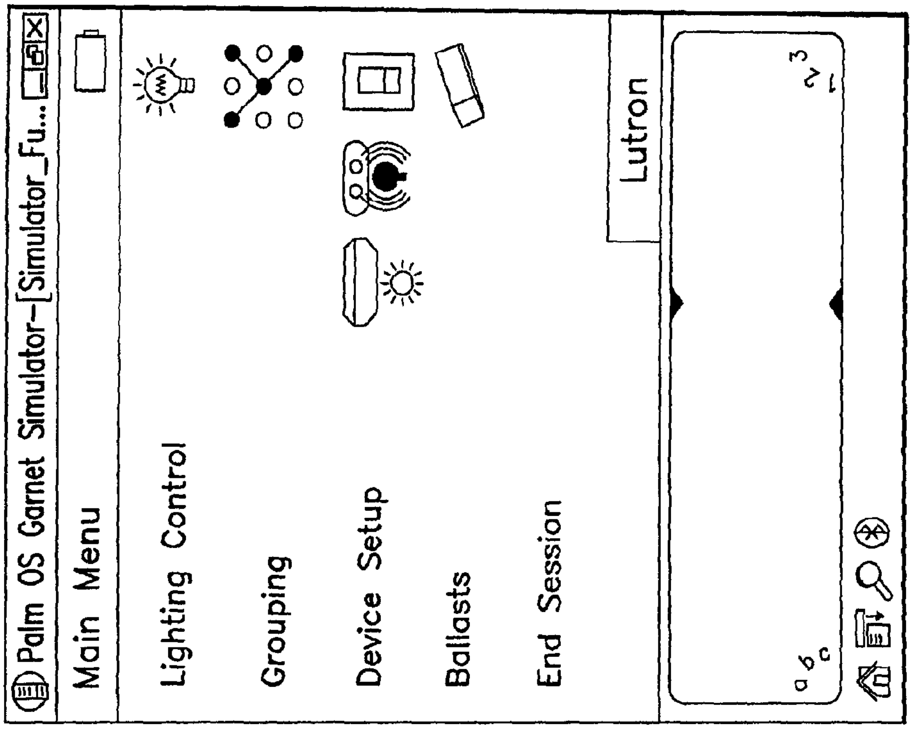
FIGS. 25A-25F show example display screens provided on a handheld programming device for resetting devices to factory defaults.
Figure 25B:
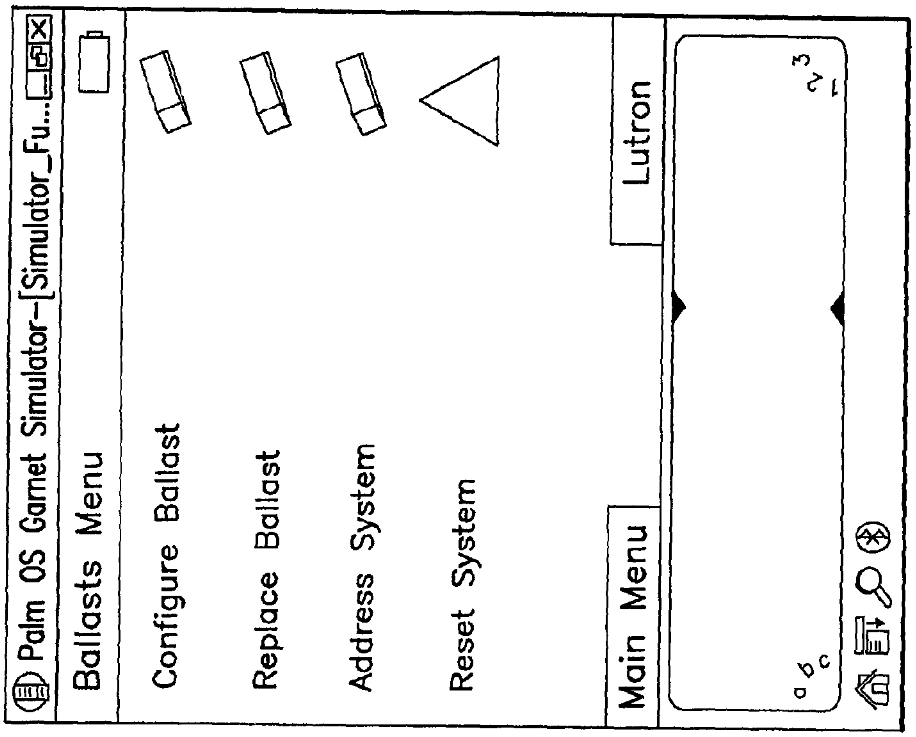
Figure 25C:
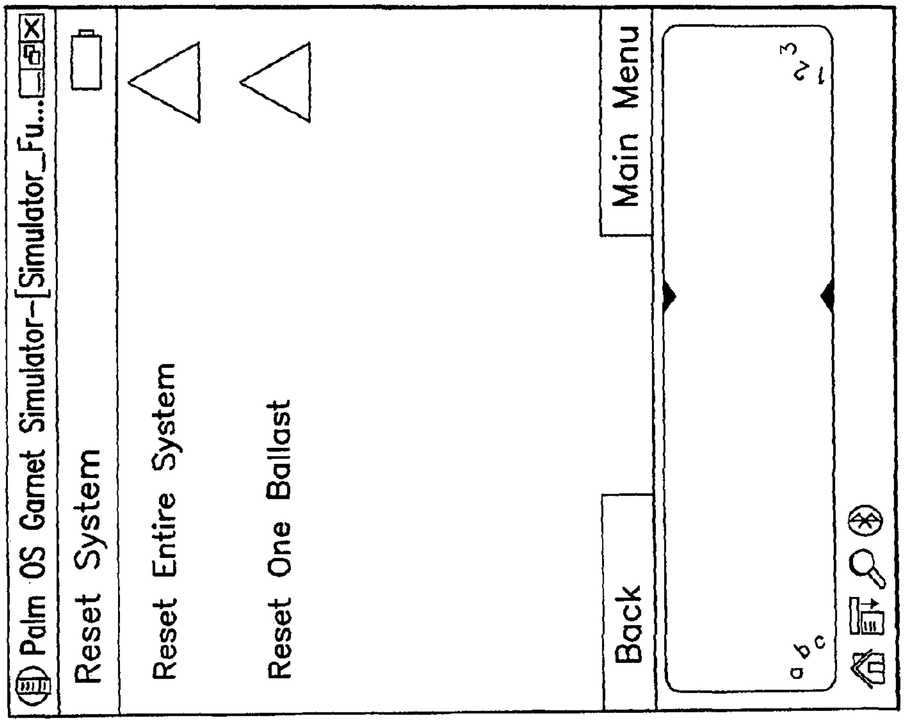
Figure 25D:
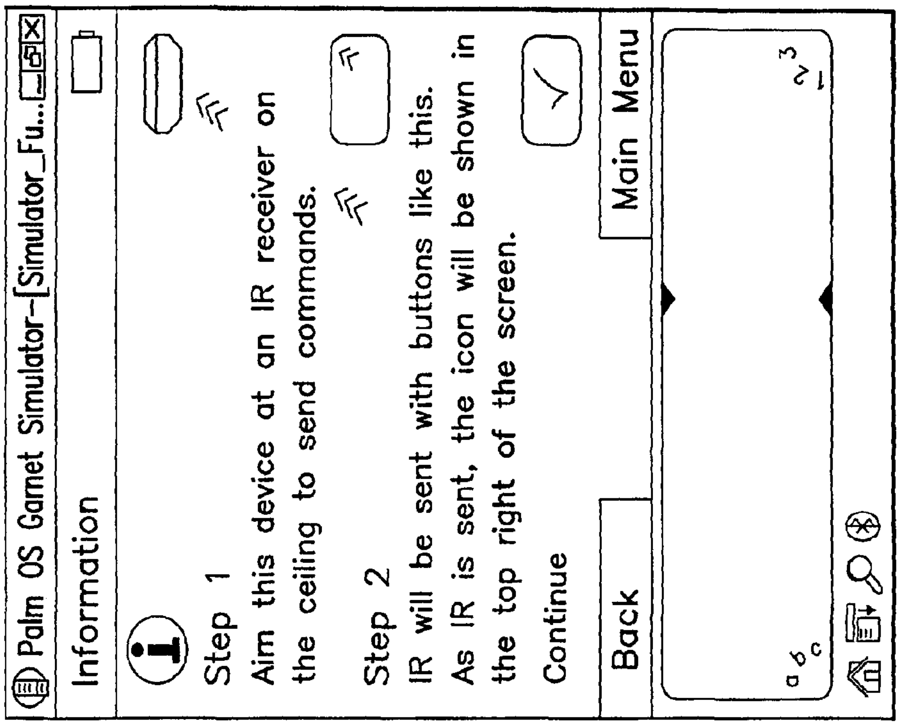
Figure 25E:
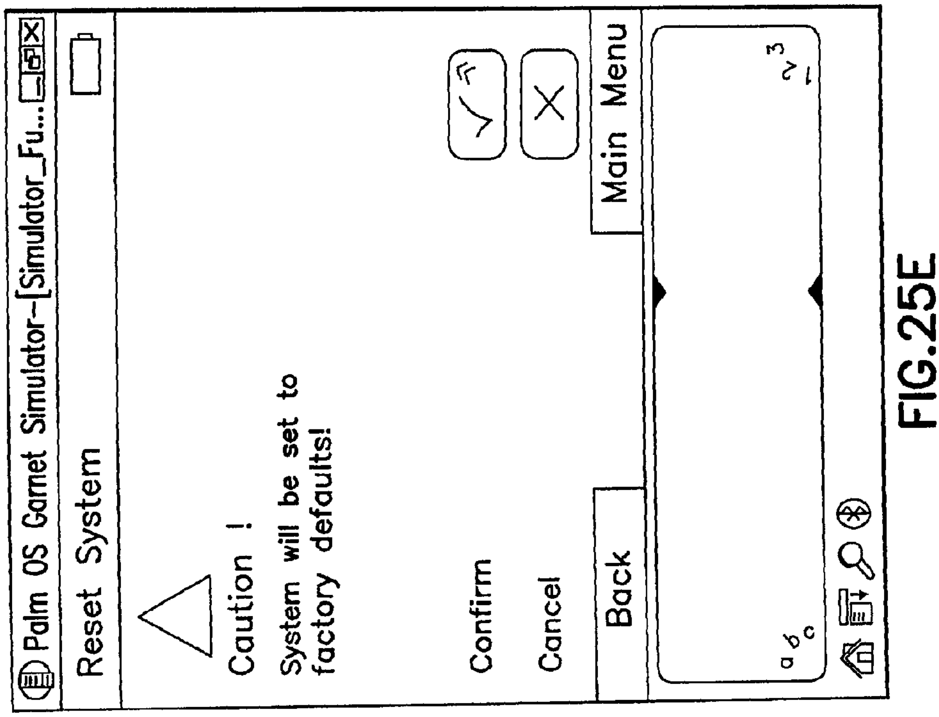
Figure 25F:
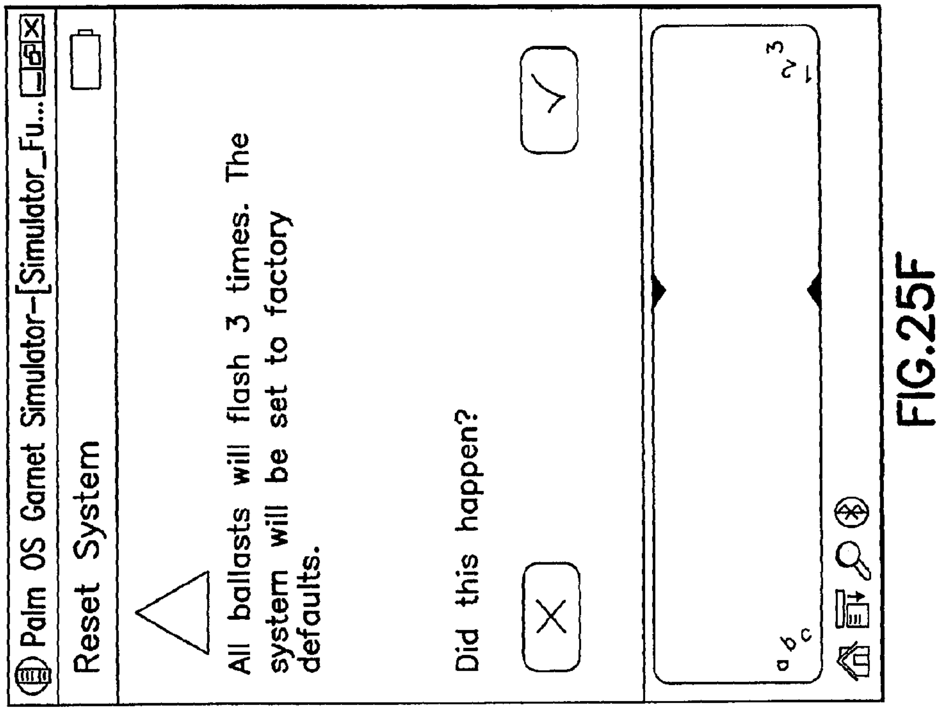

In FIG. 24E, the user is prompted to confirm that the entire system will be reset. Given that resetting system 100 is a very invasive procedure, the user is afforded a second option to confirm is intention to reset the system in FIG. 24F. When the user confirms in FIG. 24F that he wishes to reset the system, FIG. 24G is displayed alerting the user that all ballasts 102 will flash three times, and the system 100 will be restored to factory defaults. In FIG. 24H, the user is informed that the reset process has occurred, and the user is prompted to begin addressing the system to begin programming configurations and settings, as described herein. In FIG. 24I, the user is prompted to confirm that all ballasts 102 have been powered to be addressed, and the user is prompted to begin addressing the devices on system 100. In FIG. 24J, user is prompted to that all fixtures on the system will go to full brightness, and as they are addressed they will operate a minimum brightness. The user is prompted to confirm that occurred. In FIG. 24K, the user is prompted to confirm that all fixtures on system 100 are at their respective high levels, and, accordingly, the new system is addressed. Thus, by interacting with the display screens on handheld programming device 101 and illustrated in the examples shown in FIGS. 24A-24K, a user can reset and address all devices on system 100.

In case a user simply wishes to reset the devices in system 100 to factory defaults, he selects choices from display screens shown in FIGS. 25A-25F. By selecting, in FIG. 25B, an option to reset the system 100, and thereafter by making appropriate choices as shown in FIGS. 25C-25F, the user can restore factory default settings for devices on ballast link 116.

Figure 26A:
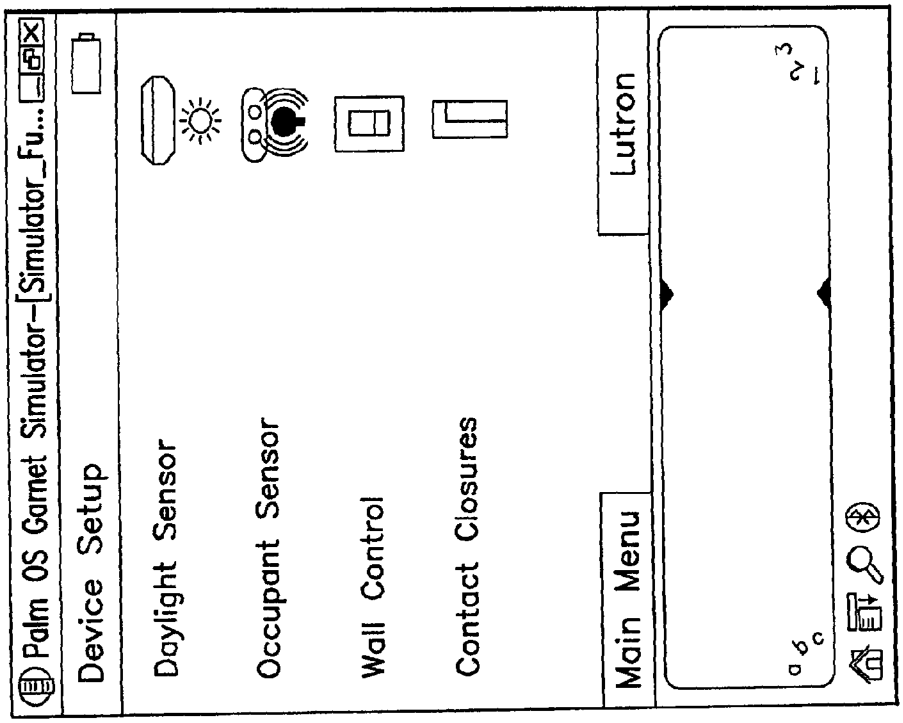
FIGS. 26A-26J illustrate example display screens provided on a handheld programming device for defining operational settings for ballasts that are configured in a row-by-column grid.
Figure 26B:
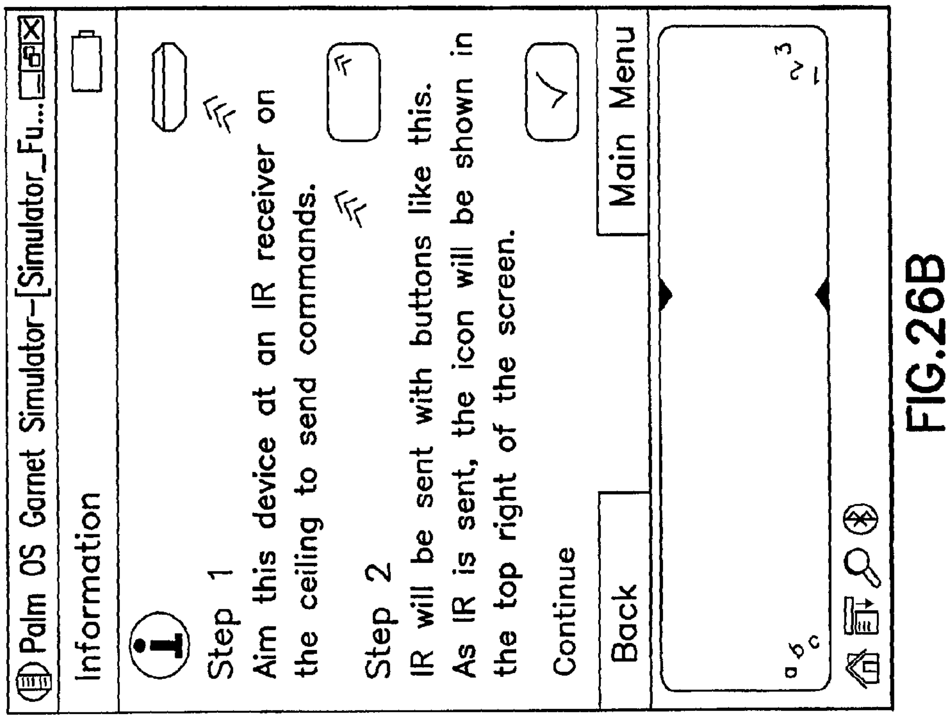
Figure 26D:
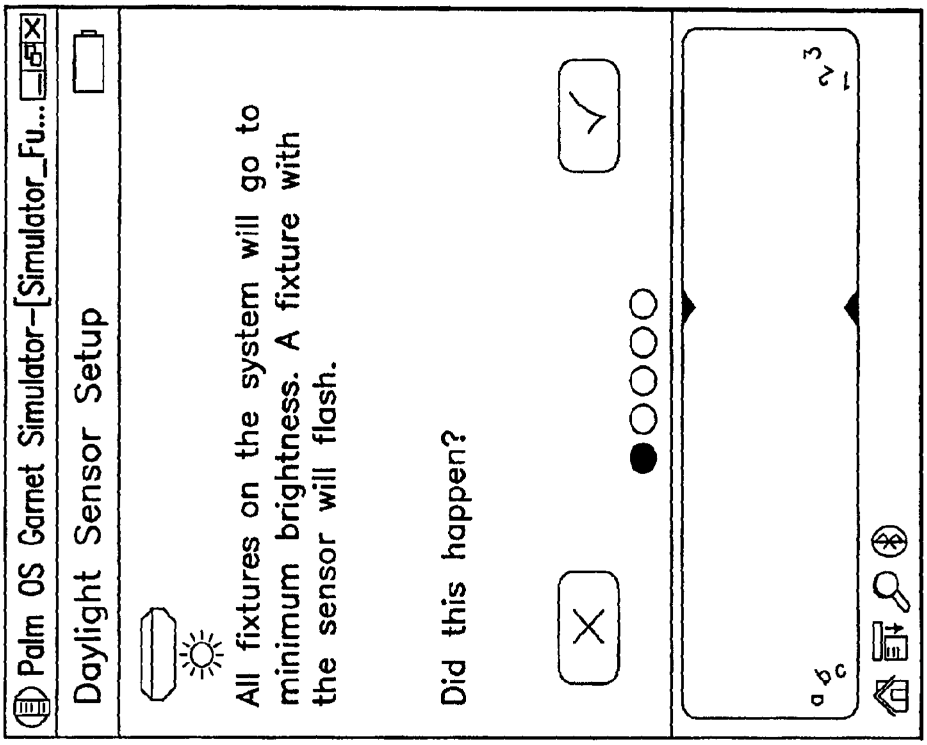
Figure 26C:
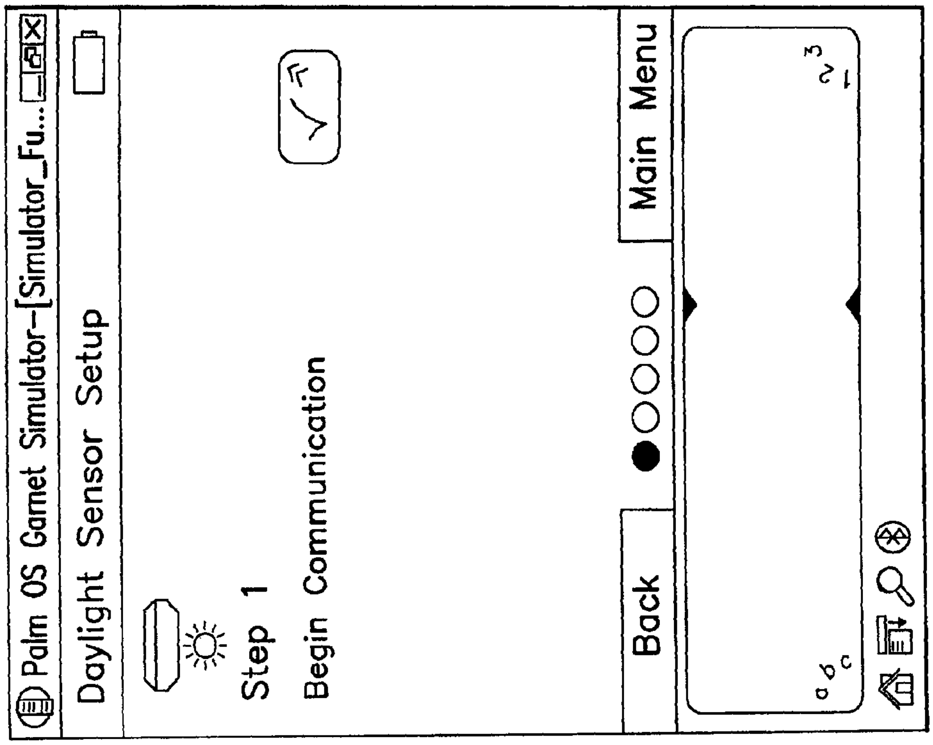
Figure 26E:
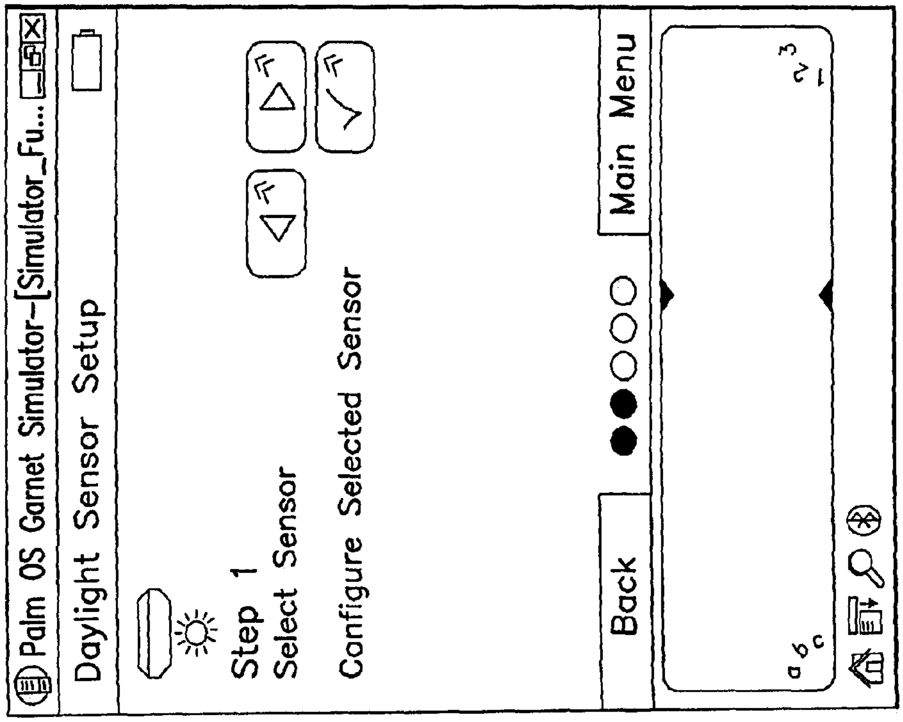

FIGS. 26A-26J illustrate example display screens provided on handheld programming device 101 for defining operational settings for ballasts 102 that are configured in a row-by-column grid 200 (FIG. 2). In FIG. 26A, a user selects an option to configure a daylight (i.e., photosensor) 106. In FIG. 26B, the user is prompted to aim handheld programming device at an IR receiver 104 and select an icon, formatted as a button comprising a checkmark, to continue, and in FIG. 26C, the user is prompted to begin communicating over ballast link 116. After the user selects the icon, FIG. 26D is displayed to prompt the user to confirm that all of the fixtures on ballast link 116 are operating at minimum brightness, and a fixture associated with the photosensor 106 is flashing. In FIG. 26E, handheld programming device 101 displays controls for the user to select a different photosensor 106 on ballast link 116. The user preferably configures the respective photosensor 106 that is selected in FIG. 26E.

Figure 26F:
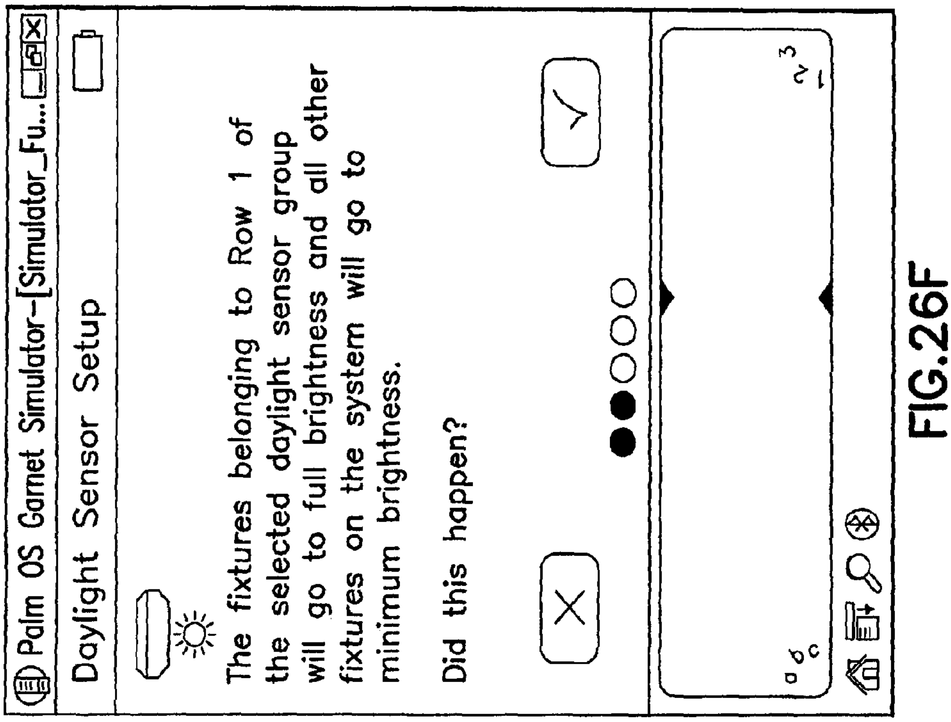
Figure 26G:
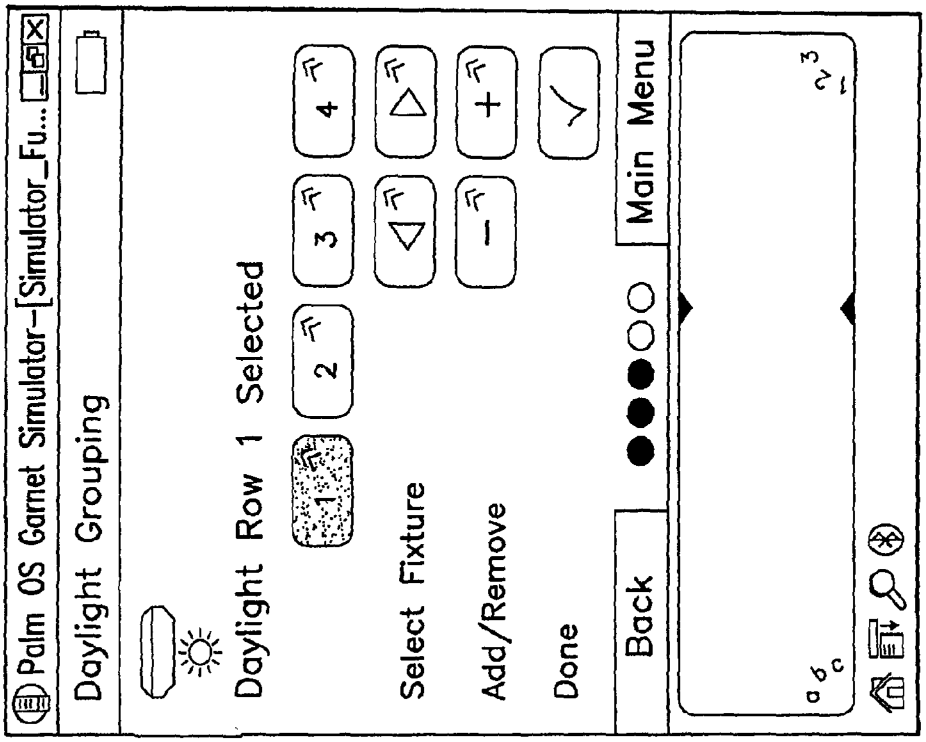
Figure 26H:
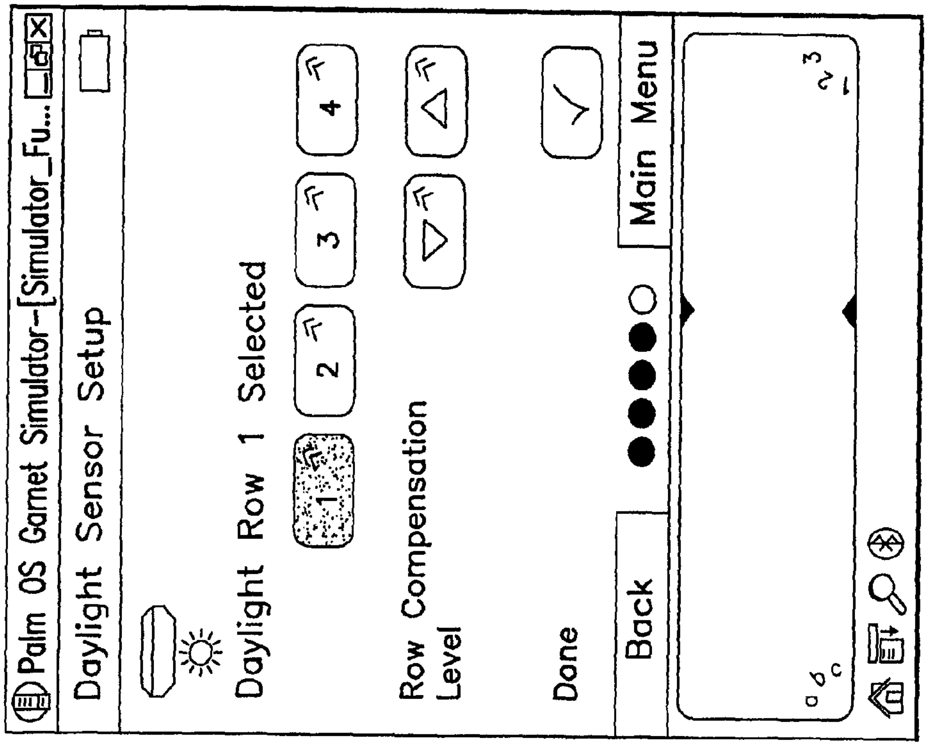
Figure 26I:
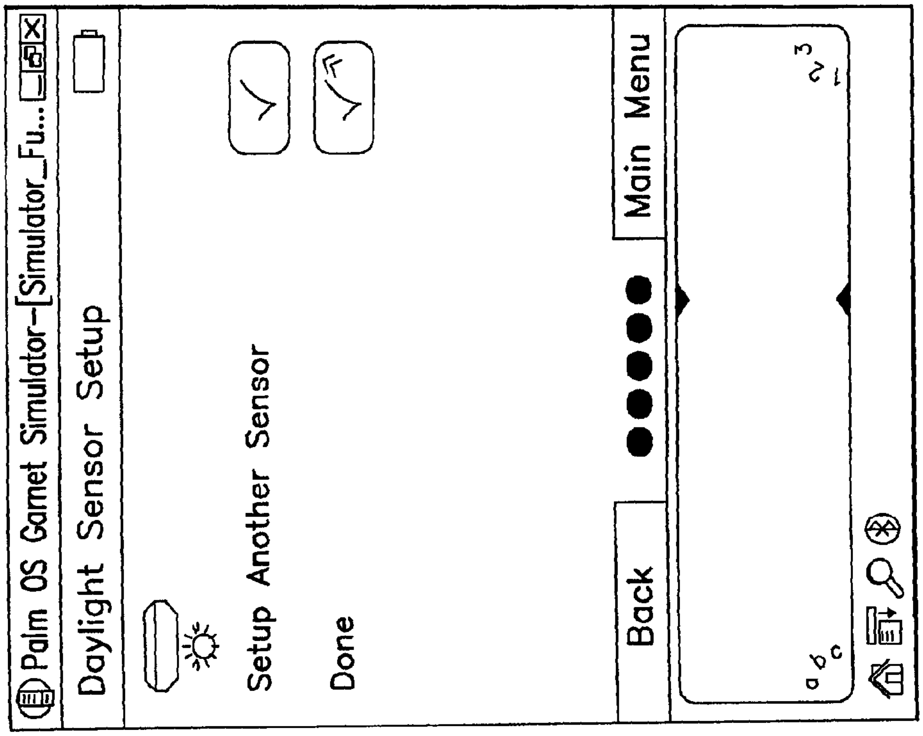
Figure 26J:
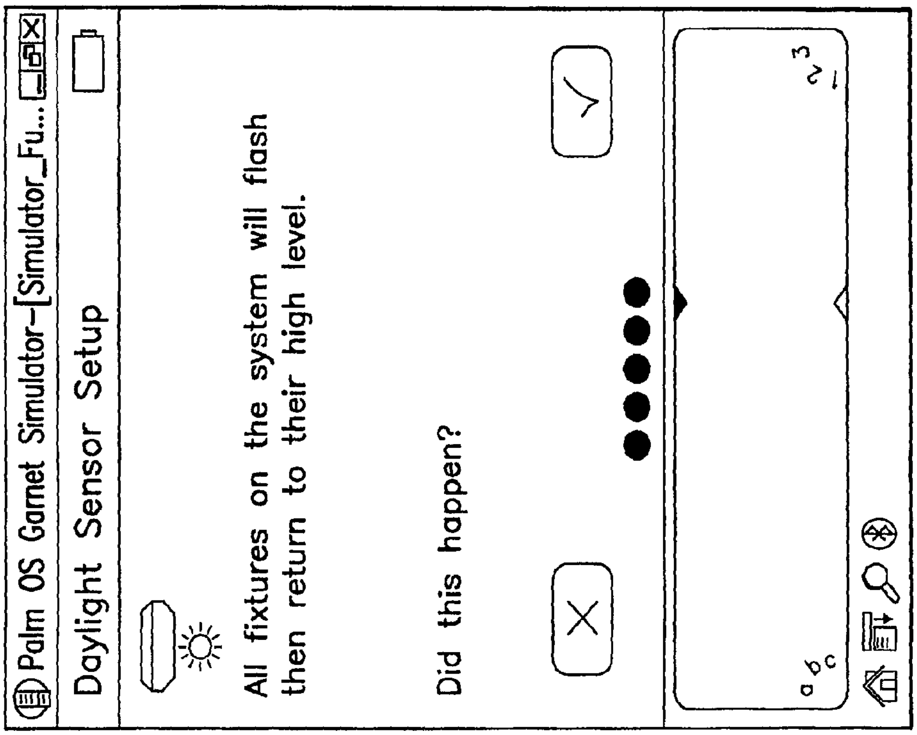

Using controls displayed in FIG. 26F, the user confirms (by selecting an icon) that the fixtures belonging to Row 1 of the selected sensor 106 group operate at full brightness, and all other fixtures in system 100 operate at minimum brightness. If so, the user is provided controls, in FIG. 26G to select a respective row, select respective fixtures to associate with the row, to add or remove fixtures from a defined row, and to submit the selections. In FIG. 26H, the user uses handheld programming device 101 to select a respective row (with associated fixtures), and select a control to increase or decrease the intensity level in order to compensate for light, for example, that comes in from a window. When the user is satisfied with his settings, he selects a control to complete the process, and is prompted, in FIG. 26I, to select another photosensor 106, or to complete the process. When complete, the user is prompted in FIG. 26J to confirm that all fixtures in system 100 flash and return to respective maximum levels. Thus, by interacting with the display screens on handheld programming device 101 and illustrated in the examples shown in FIGS. 26A-26J, a user can define respective intensity levels for rows of fixtures.

In addition to defining groups of rows for responding to photosensors 106, a user can define scenes and activate the scenes via wall control 110. FIGS. 27A-27J illustrate example screen displays for configuring a wall control 110 to define and activate scenes in accordance with rows defined in a row-by-column grid 200.

Figure 27A:
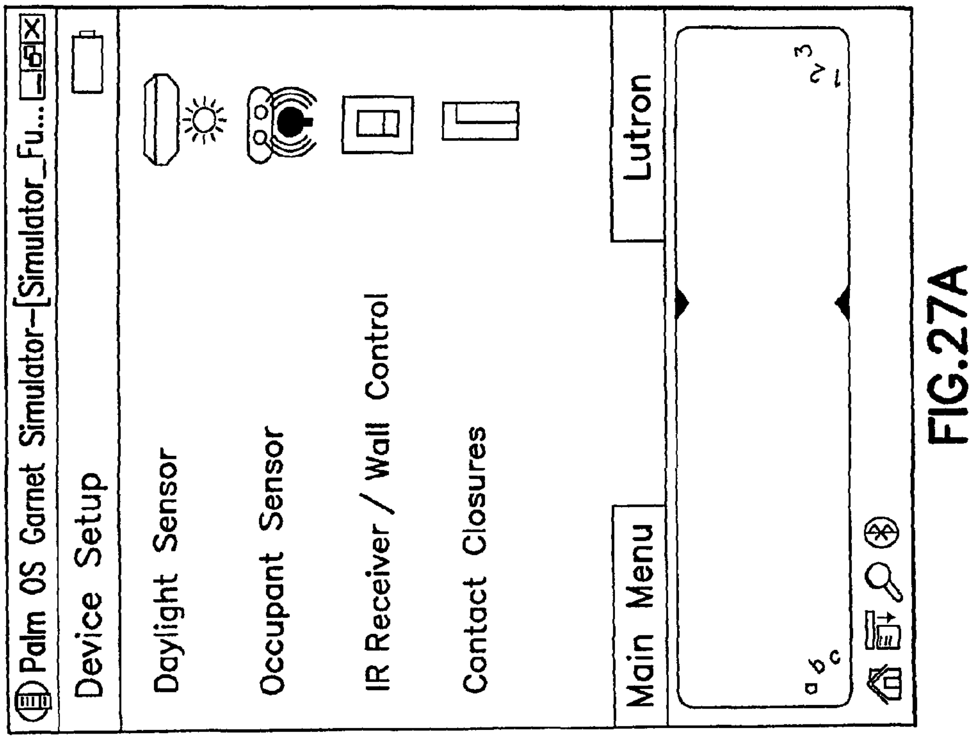
FIGS. 27A-27J illustrate example screen displays for configuring a wall control to define and activate scenes in accordance with rows defined in a row-by-column grid.
Figure 27B:
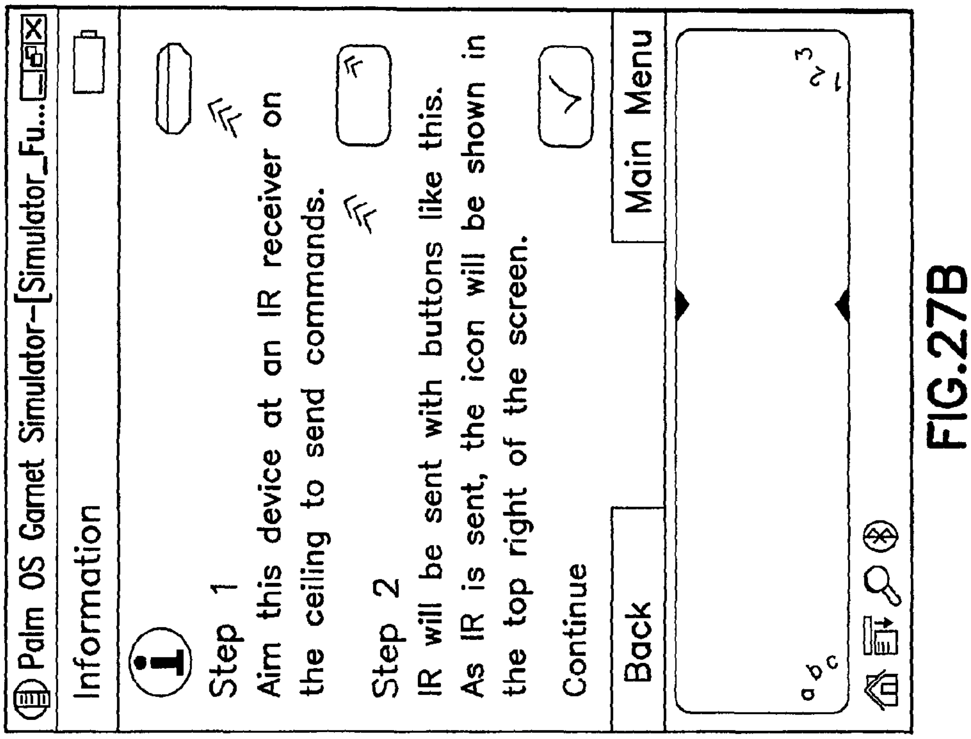
Figure 27C:
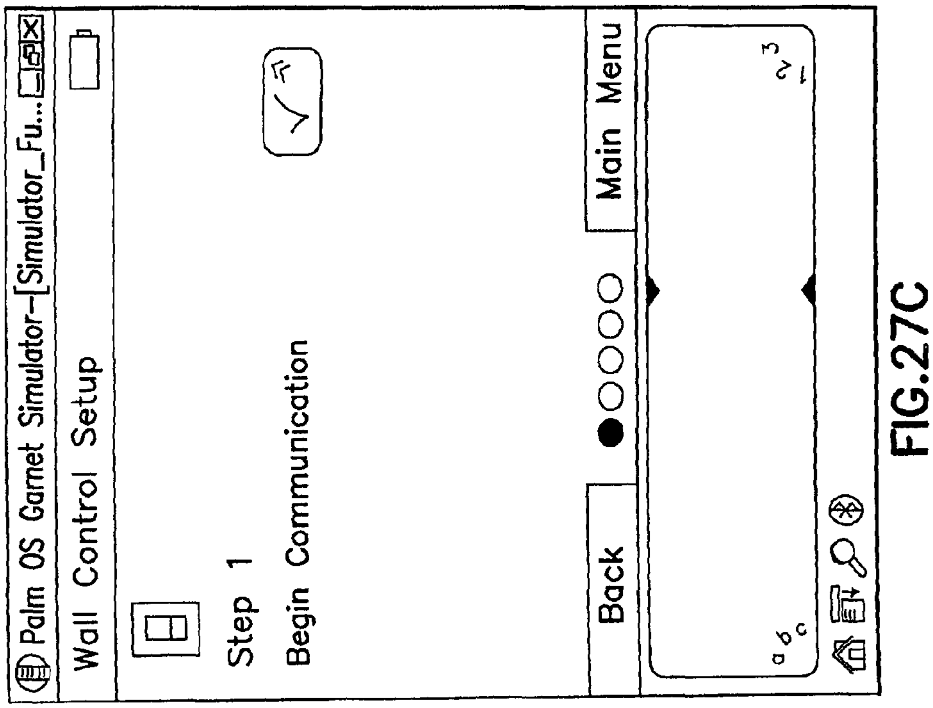
Figure 27D:
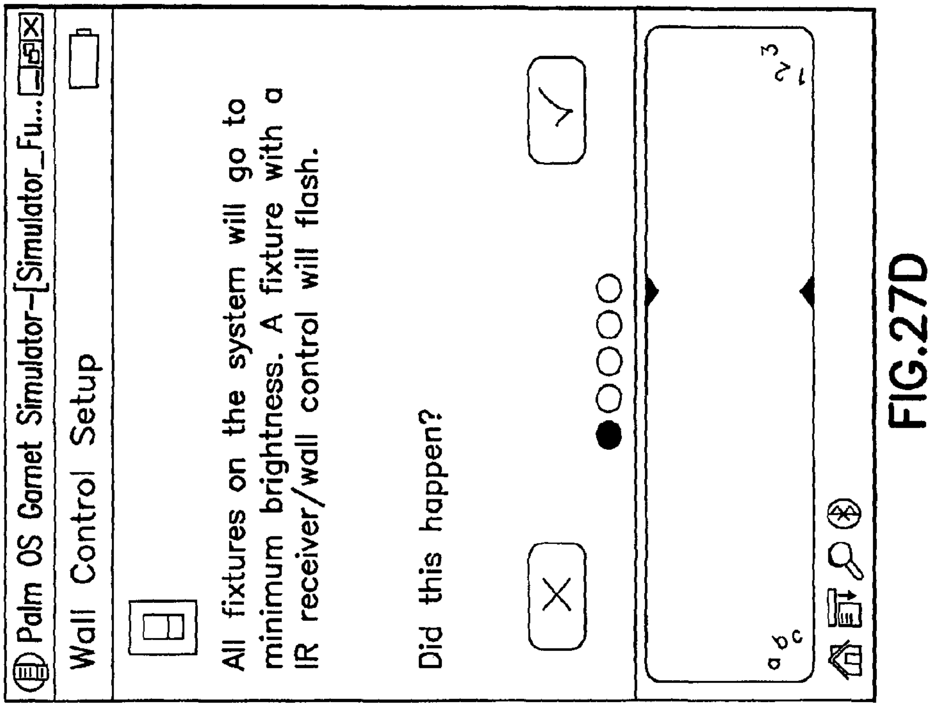
Figure 27E:
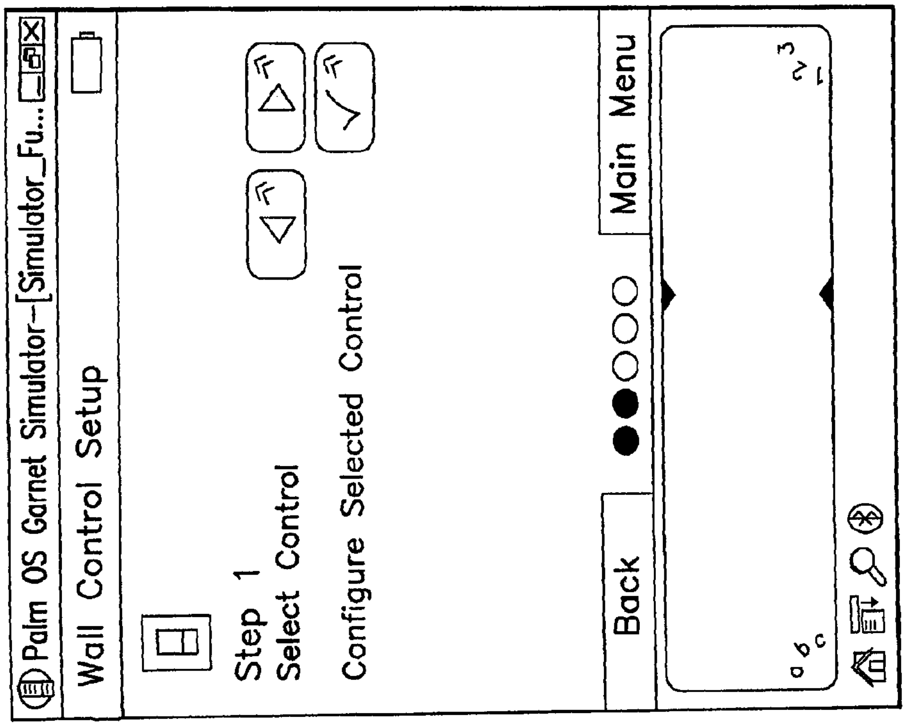

In FIG. 27A, a user selects an option to configure a wall control 110. In FIG. 27B, the user is prompted to aim handheld programming device at an IR receiver 104 and select an icon, formatted as a button comprising a checkmark, to continue, and in FIG. 27C, the user is prompted to begin communicating over ballast link 116. After the user selects the icon, FIG. 27D is displayed to prompt the user to confirm that all of the fixtures on ballast link 116 are operating at minimum brightness, and a fixture associated with the wall control 110 is flashing. In FIG. 27E, handheld programming device 101 displays controls for the user to select a different wall control 110 on ballast link 116. The user preferably configures the respective wall control 110 that is selected in FIG. 27E.

Figure 27F:
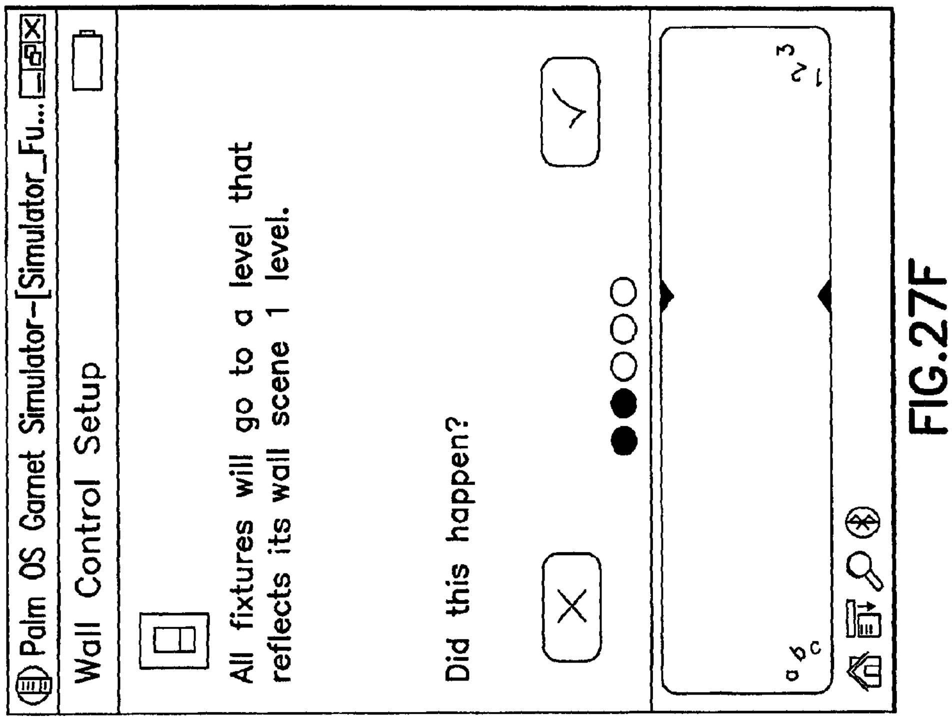
Figure 27G:
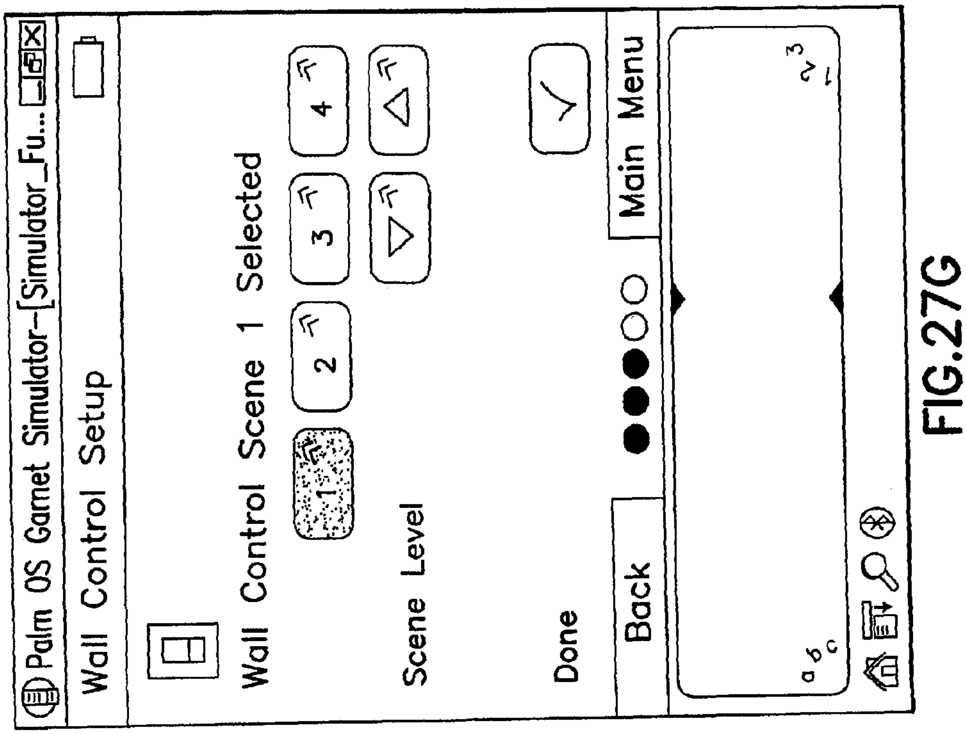
Figure 27H:
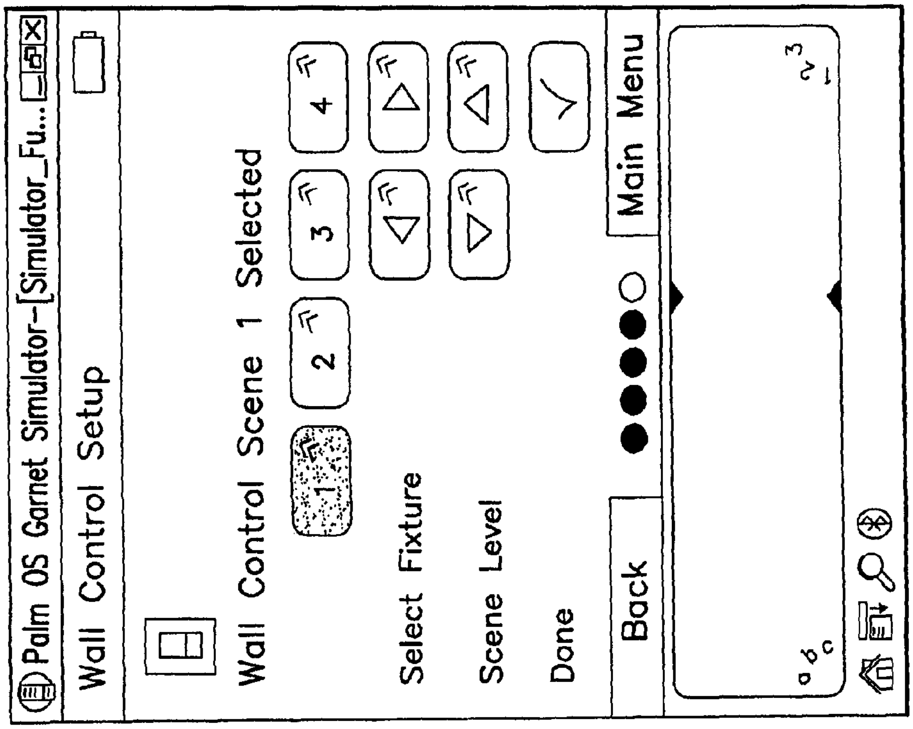
Figure 27I:
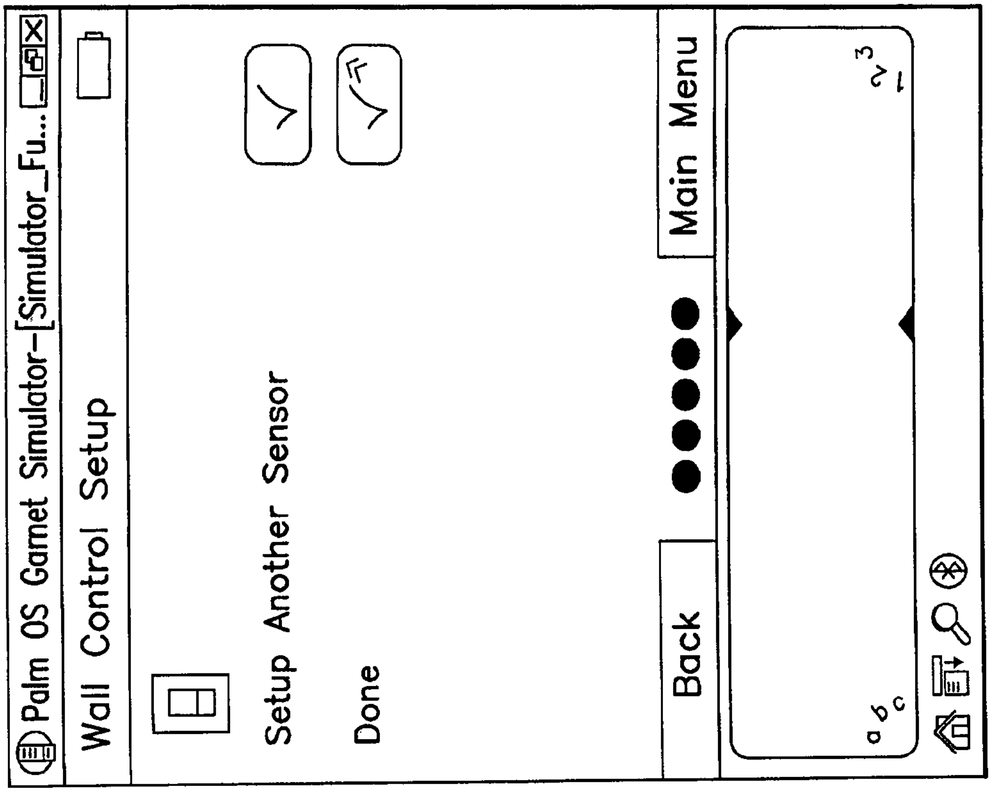
Figure 27J:
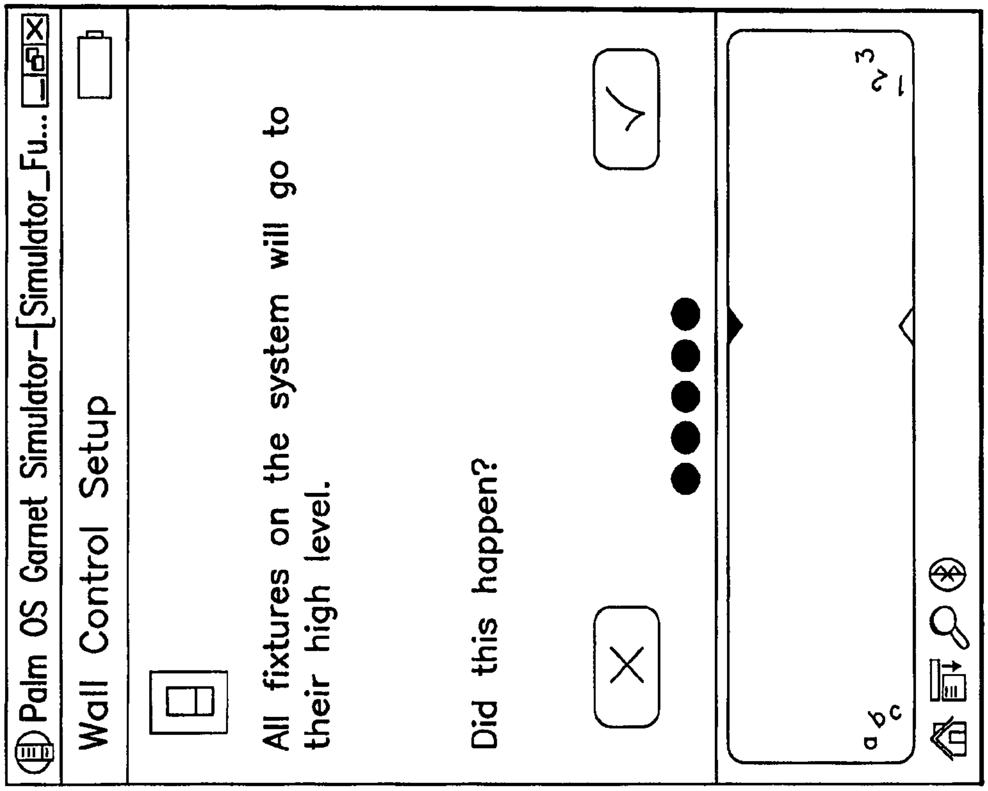

Using controls displayed in FIG. 27F, the user confirms (by selecting an icon) that the fixtures group defined in scene 1 of the selected wall control 110 operate at a respective scene level. If so, the user is provided controls, in FIG. 27G to select a respective row, select respective scenes, and to adjust the respective scene intensity levels. Further, in FIG. 27H, a user associates a fixture with a scene, adds or removes fixtures from a defined scene, and submit the selections. When the user is satisfied with his settings, he selects a control to complete the process, and is prompted, in FIG. 27I, to select another wall control 110, or to complete the process. When complete, the user is prompted in FIG. 27J to confirm that all fixtures in system 100 flash and return to respective maximum levels. Thus, by interacting with the display screens on handheld programming device 101 and illustrated in the examples shown in FIGS. 27A-27J, a user can define respective intensity levels for scenes associated with one or more wall controls 110.

In a preferred embodiment of the present invention, a user can use handheld programming device 101 to restore database 118 on power bus 114. For example, in case power bus 114 fails and requires replacement, the database 118 on the replaced power bus 114 may not be accessible. Preferably, once a replacement power bus 118 is physically installed and powered, the user selects one or more controls on handheld programming device 101 to instruct replacement power bus 114 to build database 118. Each ballast 102 preferably stores in its respective memory the configuration and setting information for that ballast 102. For example, a single ballast's values for high end trim, low end trim, emergency settings, grouping settings or the like are stored in the memory of the ballast 102. During a power bus 114 replacement process, power bus 118 preferably instructs each ballasts 102 on ballast link 116, one at a time, to transmit its respective configuration and setting information to the replacement power bus 114. Power bus 114 preferably assigns an identifier (i.e., the short address) to each ballast 102, and populates database 118 with the respective information of each ballast 102.

FIG. 28 illustrates a representation of an example database record layout 300 for a data table storing configuration and setting information for ballasts 102, in accordance with an example database stored on bus power supply 114. In the example shown in FIG. 28, ballast short address field 302 stores a plurality of short addresses assigned by bus power supply 114 representing ballasts 102 operating on ballast link 116. Data field 304 represents a long string of data, for example, 128 bytes in length, which stores various configuration and settings information for each respective ballast 102. Data shown in row 306 of data field 304 represents numbered bytes (e.g., 0-127) of information. Data shown in row 308 of data field 304 represents the data stored in the respective numbered bytes. In the example shown in FIG. 28, a serial number of a respective ballast 102 comprises seven bytes. As known in the art and as noted above, information is coded in the various bytes of serial number of ballast 102.

One skilled in the art will recognize that bus power supply 114 can communicate with ballasts 102 quickly as a function of the short address values stored in field 302. If bus supply 114 was limited to communicating with ballasts 102 exclusively via respective serial numbers, the data processing performance would be much slower because bus power supply 114 would be limited to searching through a 128 character byte array (or other data field) in order to locate a seven byte serial number. By indexing data table 300 on short address field 302, substantial performance gains are realized. Thus, for example, when a user selects on handheld programming device 101 a control to lower the intensity settings of a group of ballasts 102, the response time is extremely short and the user can view the reduction in intensity substantially in real time.

Other database tables (not shown) are preferably stored in database 118 on bus power supply 114. For example, a table is preferably maintained that stores data that correlate photosensor identifiers with ballast short addresses. Similarly, a table is maintained on bus power supply 114 that stores data that correlate occupancy sensor identifiers with ballast short addresses. Another table is preferably maintained that corresponds IR receivers 104 with wall controls 110. Another table preferably stores information related to grids 200 and corresponding ballast 102 values, such as described above with reference to FIG. 2. Another table is preferably maintained that stores ballast system information, such as values associated with high end trim, fade time, occupancy sensor mode information, time-outs, and the like. The data tables are formatted similarly to the example shown in FIG. 28. Therefore, a plurality of tables are preferably stored and used by bus power supply 114 to enable the processes described herein, such as with reference to handheld programming device 101.

Thus, as described and shown herein, the present invention enables a user to perform various effect configuration and control of a plurality of devices installed on ballast link 116. Unlike prior art systems, the present invention enables a user operating handheld programming device 101 to communicate over ballast link 116 to configure a ballast 102, associate ballasts 102 with one or more photosensors, occupancy sensors, and operational groups, and to store such configuration information related to a plurality of ballasts in bus power supply 114. The invention further enables a user (via handheld programming device 101) to associate a plurality of photosensors 106 and/or occupancy sensors 108 with one or more ballasts 102.

Further, the invention comprises a novel way to address ballasts 102 on ballast link 116 by assigning a short address to each ballast 102 instead of searching through a relatively long string of data that includes a ballast's hard coded serial number therein. Moreover, the invention includes a novel way for a bus power supply 114 to store and rebuild ballast 102 configuration and setting information, for example, in case of bus supply 104 failure. Moreover, the invention enables a plurality of ballasts 102 to be replaced with restored configuration information in a single process, even after a plurality of ballasts 102 are installed and powered on ballast link 116.

Moreover, by providing a useful method of communicating by flashing fixtures associated with ballasts 102, users of the present invention are notified quickly and conveniently that operations are proceeding correctly. Moreover, a plurality of display screens provided on handheld programming device 101 enables a user to be informed and instructed during various processes, such as described herein.

Although the present invention has been described in relation to particular embodiments thereof, many other variations and modifications and other uses will become apparent to those skilled in the art. Therefore, the present invention should not be limited by the specific disclosure herein.

What is claimed is:

1. A method for replacing a plurality of ballasts in a lighting control system, the method comprising:

storing in a bus supply that is electronically connected to the plurality of ballasts by a communication bus, configuration information regarding respective configuration settings for each of a first plurality of ballasts;

replacing the first plurality of ballasts with a second plurality of ballasts;

transmitting an instruction to the bus supply to configure each of the second plurality of ballasts with the respective configuration settings of each of the first plurality of ballasts;

and configuring each of the second plurality of ballasts with the respective configuration settings of a respective one of the first plurality of ballasts with the configuration information stored in the bus supply.

2. The method of claim 1, wherein the step of transmitting an instruction comprises transmitting unique identifiers for each of the first plurality of ballasts and the second plurality of ballasts.

3. A system for replacement of a plurality of ballasts in a lighting control system, the system comprising:

a bus supply that is electronically connected to the lighting control system by a communication bus and that stores configuration information regarding respective configuration settings for each of a first plurality of ballasts;

the first plurality of ballasts replaced with a second plurality of ballasts; and a handheld programming device operable to transmit wirelessly an instruction to the bus supply to configure each of the second plurality of ballasts with the respective configurations of each of the first plurality of ballasts, wherein the bus supply is operable to use the configuration information to configure each of the second plurality of ballasts with the respective configurations of each of the first plurality of ballasts.

* * * * *

UNITED STATES PATENT AND TRADEMARK OFFICE
Certificate

Patent No. 7,764,162 B2 Patented: July 27, 2010

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Audwin W. Cash, St. Lucie, FL (US); Christopher J. Rigatti, Pittsburgh, PA (US); and Dragan Veskovic, Allentown, PA (US).

Signed and Sealed this Fifteenth Day of March 2011.

JACOB Y. CHOI
*Supervisory Patent Examiner*
Art Unit 2821
Technology Center 2800